United States Patent [19]

Getson, Jr. et al.

[11] 4,159,532
[45] Jun. 26, 1979

[54] FIFO LOOK-AHEAD SYSTEM

[75] Inventors: Edward F. Getson, Jr., Lynn, Mass.; John H. Kelley, Nashua; Albert T. McLaughlin, Hudson, both of N.H.; Donald J. Rathbun, Andover, Mass.

[73] Assignee: Honeywell Information Systems Inc., Waltham, Mass.

[21] Appl. No.: 821,931

[22] Filed: Aug. 4, 1977

[51] Int. Cl.² ............................................. G06F 13/00
[52] U.S. Cl. ................................................ 364/900
[58] Field of Search ... 364/200 MS File, 900 MS File; 365/78

[56] References Cited

U.S. PATENT DOCUMENTS

| | | | |
|---|---|---|---|
| 3,417,377 | 12/1968 | Vietor et al. | 364/900 |
| 3,896,417 | 7/1975 | Beecham | 364/900 |

Primary Examiner—Mark E. Nusbaum
Assistant Examiner—Thomas M. Heckler
Attorney, Agent, or Firm—Gerald E. Lester; Nicholas Prasinos; Ronald T. Reiling

[57] ABSTRACT

A logic data control system including a first-in-first-out (FIFO) buffer predictor is provided for the transfer of data between a main memory unit and a peripheral control unit of a data processing system. Data from main memory is stored into the input registers of the peripheral unit, and thereafter loaded into an array of data FIFOs for transfer to a peripheral storage device. A predictor FIFO operates in parallel with the data FIFOs, and is loaded with a dummy or flag byte each time a data request is made to main memory. When a data word is loaded into the data FIFOs, the input register of the predictor FIFO is sensed. If the flag byte in the predictor FIFO has dropped from the input register into the FIFO stack, a request is issued to main memory for an additional data word. When the data FIFOs are filled, the predictor FIFO also is filled and cannot generate an additional data request until a data byte has been unloaded from the data FIFOs to a peripheral storage device. The input register to the predictor FIFO thereupon is emptied, and another data request may be made to main memory.

4 Claims, 13 Drawing Figures

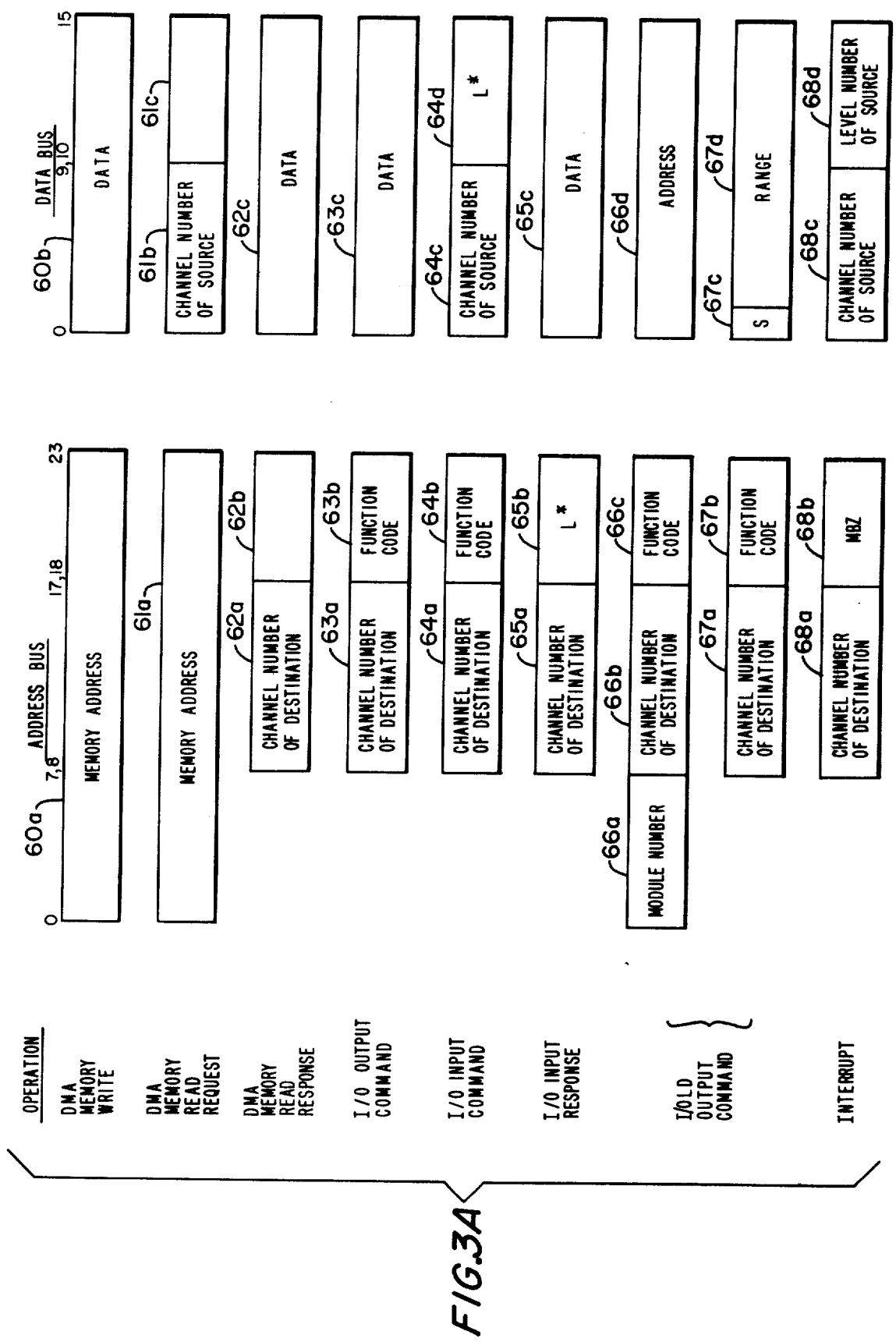

FIFO LOOK-AHEAD SYSTEM

BACKGROUND OF THE INVENTION

1. Field of the Invention

The invention relates to the data transfer control systems, and more particularly to a method and system for maintaining a data transfer rate through a peripheral controller to a peripheral storage device without the loss of data.

2. Prior Art

Data processing systems having a plurality of system units electrically coupled to a common communication bus for the asynchronous transfer of information therebetween are disclosed in U.S. Pat. No. 3,993,981 and in U.S. application Ser. No. 643,439 filed Dec. 22, 1975, each assigned to the assignee of the present invention.

In the transfer of data from a main memory unit of such a data processing system to a peripheral storage device, two problems may occur which cause a degeneration of the data transfer rate. If the peripheral controller does not request an additional data word from main memory immediately upon receiving a data word in response to a previous request, the communication bus may be captured by another system unit. Further, if the peripheral controller requests data at a rate exceeding the transfer rate to the peripheral storage device, data may be lost.

In prior systems, the data transfer rate has been decreased below a safety threshold to avoid the above-mentioned problems, or data requests have been issued immediately upon receipt of a data word in response to a previous request without regard to the availability of storage locations. In operating environments where the data transfer rates approach the marginal areas of safety, neither of these approaches have proven satisfactory.

The present invention provides a method and system for predicting the storage capacity of a peripheral controller before a data word request is issued. Access to the common communication bus thereby is maintained as required to accommodate the data transfer rate, and no data is lost.

SUMMARY OF THE INVENTION

In a data processing system having plural system units electrically coupled to a common communication bus for asynchronous transfer of information therebetween, a logic data transfer control system is provided for controlling the transfer of data words from a main memory to a peripheral controller.

More particularly, the logic control system includes an array of data first-in-first-out (FIFO) buffers and a predictor FIFO operating in parallel. When a data request is made to main memory, the predictor FIFO is loaded with a dummy or flag byte. When the data byte is received from main memory and loaded into the data FIFOs, a next data request to main memory is issued if the input register of the predictor register is not filled. If the input register of the predictor FIFO is filled, however, no additional data request is made until the data in the input register falls into the FIFO stack.

When the data FIFOs are filled, the predictor FIFO also is filled, and no further data request to main memory may be made until a data byte is transferred to a peripheral storage device. In that event, the flag byte in the input register of the predictor FIFO falls into the FIFO stack. The input register thereupon signals the occurrence of a favorable prediction for storage capacity, and an additional data word is requested from main memory. When the data is received from main memory and loaded into the input registers of the data FIFOs, the input register of the predictor FIFO again is sensed as before described. If the data byte transfer to the peripheral storage device has emptied the input register of the predictor FIFO, an additional data request is issued to main memory. Otherwise, no further data requests are made until a transfer to the peripheral storage device is made.

In one aspect of the invention, data words received from main memory are stored in a left byte FIFO and a right byte FIFO. In transferring the data to a disk storage device, the left and right bytes are alternately selected for transfer to the disk storage device. When the right FIFO is unloaded, the predictor FIFO also is unloaded to synchronize the operation of the predictor FIFO with that of the data FIFOs.

DESCRIPTION OF THE DRAWINGS

For a more complete understanding of the present invention and for further objects and advantages thereof, references may now be had to the following description taken in conjunction with the accompanying drawings in which:

FIGS. 3A and 3B are a graphical illustration of communication words transferred through the common bus of FIG. 1;

DESCRIPTION OF THE PREFERRED EMBODIMENTS

FIG. 1

Figure 1:
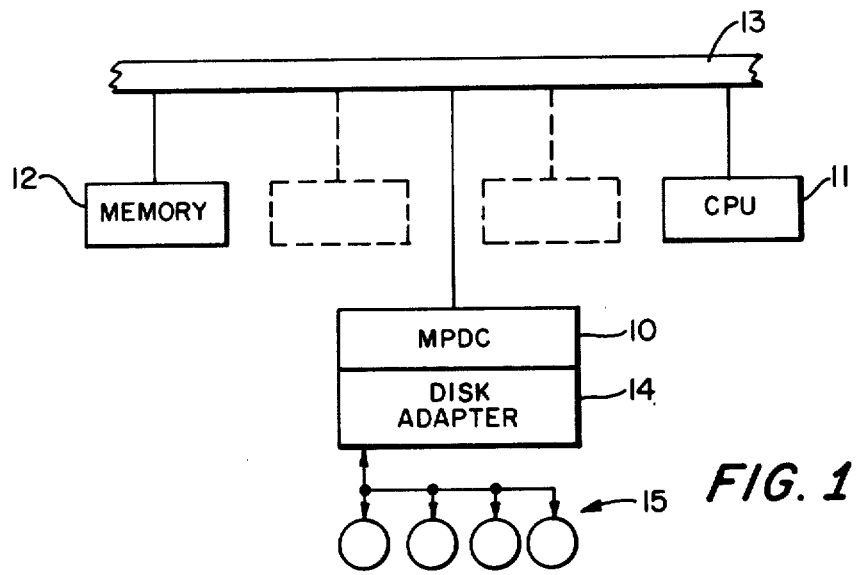
FIG. 1 is a functional block diagram of a data processing system having system units electrically coupled to a common communication bus.

FIG. 1 illustrates in functional block diagram form a computer system having a medium-performance disk controller (MPDC) 10 in electrical communication with a central processor unit 11 and a main memory unit 12 by way of a common communication bus hereinafter referred to as megabus 13. The MPDC 10 is a microprogrammed peripheral control subsystem for storing and retrieving data from mass storage media. The controller includes a Read Only Store (ROS) memory to be later described having stored therein microprogram instructions. The ROS communicates with mass storage adapters such as the device adapter 14, which has the facility to support plural daisy-chained disk devices 15.

The megabus 13 provides an information path between any two units in the system. The paths are asynchronous in design, thereby enabling units of various speeds to operate efficiently. The bus accommodates information transfers including communication requests, control commands, status signals and data transfers between main memory 12 and disk devices 15.

Any system unit requiring communication with any other system unit issues a bus cycle request. When the bus cycle is granted, the requesting unit becomes the master and the addressed system unit becomes the slave. Some bus interchanges require a response cycle as well as a request cycle. By way of example, the master unit may identify itself to a slave unit and indicate that a response is required. When the required information becomes available, the slave assumes the role of master and initiates a transfer to the requesting unit.

In the servicing of bus cycle requests, the central processor has the lowest priority, the MPDC 10 has the next to the lowest priority, and the memory 12 has the highest priority.

A more detailed background description of the system of FIG. 1 is given in U.S. Pat. No. 3,993,981 which is assigned to the assignee of the present invention, and which is incorporated by reference herein.

Figure 2:
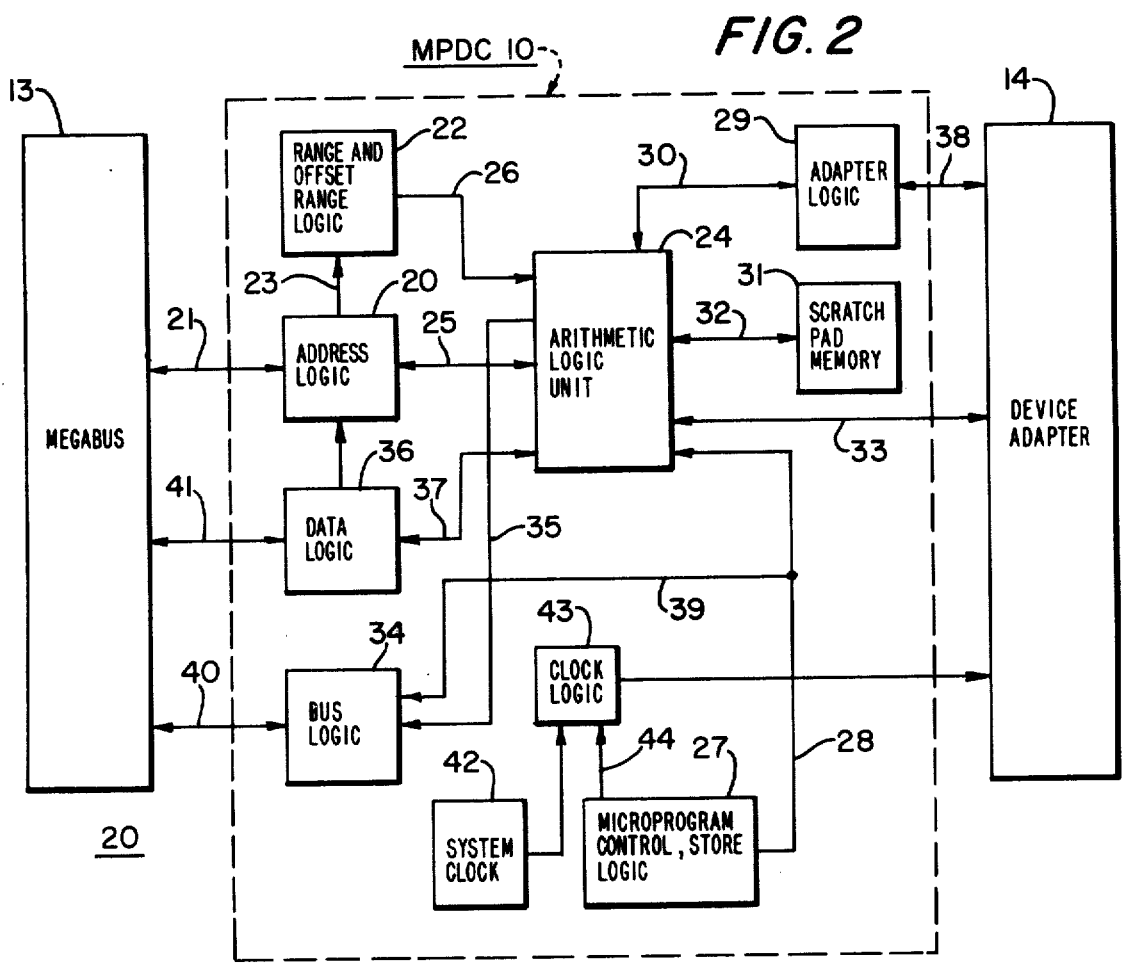
FIG. 2 is a functional block diagram of the disk controller of FIG. 1.

FIGS. 2 and 3

FIG. 2 illustrates in functional block diagram form the MPDC 10 of FIG. 1, and FIG. 3 graphically illustrates the binary instruction formats necessary for the operation of the MPDC.

The megabus 13 is connected to an address logic unit 20 by way of an address cable 21. Logic unit 20 is comprised of address transceivers through which memory addresses, channel destination numbers and function codes are transferred between the MPDC 10 and the megabus 13. The logic unit 20 further is comprised of control logic for distributing information on the address cable 21 throughout the MPDC.

Logic unit 20 is connected to a range and offset range logic unit 22 by way of a unidirectional control cable 23, and connected to an arithmetic logic unit 24 by way of a bidirectional control cable 25. The logic unit 22 includes a 16-bit range counter which is loaded with the number of bytes to be transferred during a read or write operation. The logic unit further includes a 16-bit offset range counter which is loaded with a count indicating the number of leading data bytes to be ignored during a read data transfer.

The arithmetic logic unit (ALU) 24 is the focal point of all data operations within the MPDC. Such data operations may occur between MPDC 10 and the megabus 13, or between the MPDC and the device adapter 14. The ALU performs both logic and arithmetic operations on incoming data, and is comprised of an A-operand multiplexer (AMUX), a B-operand multiplexer (BMUX), an eight-bit arithmetic unit (AU), and an eight-bit accumulator (ACU) to be further described. Under firmware control, the AMUX selects one of eight data fields and the BMUX selects one of four data fields. The AU performs 8-bit arithmetical and logical operations on the data selected by the multiplexers, and supplies the result to the accumulator for temporary storage.

The ALU receives range and offset range control signals from the logic unit 22 by way of a control cable 26, and firmware control signals from a microprogram control store logic unit 27 by way of a control cable 28. The ALU 24 further communicates with an adapter logic unit 29 by way of a bidirectional control cable 30, and with a scratchpad memory unit 31 by way of a bidirectional control cable 32. In addition, the ALU 24 communicates with the device adapter 14 by way of a bidirectional control cable 33, and supplies control information to a bus logic unit 34 by way of a unidirectional control cable 35. The ALU also receives and transfers data to a data logic unit 36 by way of a bidirectional data cable 37.

The adapter logic unit 29 is connected to the device adapter 14 by way of a bidirectional communication cable 38. The logic unit 29 provides the MPDC with a communication path to control the transfer of data and status information between the adapter 14 and the MPDC 10.

The scratchpad memory unit 31 includes logic comprised of an index register, an address register, an address selector, a scratchpad memory, and the logic elements controlling the operation of the scratchpad memory. The scratchpad memory is a 1.024 K-bit by 8-bit read/write memory which is segmented into indexed and non-indexed sections, each section containing two quadrants. The non-indexed section of the memory is comprised of 256 work locations and 256 reserve locations. The indexed section of the memory is comprised of 256 locations for the storage of device-related information and 256 reserve locations. The 256 locations for device-related information are further subdivided into four sections, each comprising 64 locations per channel.

The address register of the scratchpad memory unit 31 is a 10-bit register, wherein the high order bit selects either the indexed or non-indexed mode. The second high order bit selects a 256-location quadrant, and the next two bits select 64 locations within the quadrant. The six low order bits select a scratchpad address. Data is written into the selected address of the scratchpad memory unit from the AMUX of the ALU 24 during the execution of a firware memory write command. The data out of the scratchpad memory is delivered to the AMUX and the BMUX for distribution throughout the MPDC.

The microprogram control store logic unit 27 is typical of that known in the art, and includes a return register unit, a selector, a microprogram address counter, a Read Only Store (ROS) memory, a microprogram instruction register (MPIR), a decoder and a firmware distribution unit to be further described. The ROS provides permanent storage for resident control firmware and diagnostic microprograms, and may be addressed to select various microinstruction sequences for execution. The ROS provides a 16-bit wide output derived from the outputs of sixteen 1,024 by 4-bit programmable Read Only Memory (PROM) chips. The ROS output is applied to the MPIR which is a 16-bit wide register used to store the output of the ROS for one clock cycle during a microinstruction execution.

The bus logic unit 34 receives control signals from the ALU 24 by way of cable 35, and from the microprogram control store logic unit 27 by way of cable 28 and a control cable 39. The logic unit 34 is connected to the megabus 13 by way of a bidirectional control cable 40. The bus logic unit 34 performs asynchronous handshaking operations by responding to and generating megabus cycle requests. Further, simultaneous requests and grants of megabus cycles are accommodated on a priority basis with the MPDC at an intermediary priority position and the main memory at a position of increased priority.

The data logic unit 36 includes error checkers, five 16 word by 4-byte first-in-first-out (FIFO) data buffers and a read selector for accommodating the transfer of data or a bidirectional data cable 41 between the MPDC 10 and the megabus 13. Any information entering the MPDC 10 from the megabus 13 is gated through data transceivers and checked for parity. The same logic is used to deliver the MPDC channel number to the megabus 13 in response to a bus cycle request from a system unit. Four of the five FIFOs receive data, and the fifth FIFO is used to prevent the MPDC from making a cycle request when the data FIFOs are full. The FIFO chips are capable of stacking 14 words, plus retaining one word in the input and output registers to provide a total capacity of 16 words.

Clock signals for controlling the operation of the MPDC 10 are provided by a system clock unit 42 comprised of an 8 MHz crystal oscillator. The system clock signal is applied to a clock logic unit 43 which provides a 4 MHz square wave that is distributed throughout the MPDC. The clock logic unit 43 also receives control signals from the microprogram control store logic unit 27 by way of a control line 44 to enable or reset the logic unit.

The operations performed by the MPDC 10 include a direct memory access (DMA) read, a DMA write, an I/O output command, an I/O input command and an interrupt operation. Each of the operations require a single bus cycle except for the DMA read and the I/O input commands which require two bus cycles.

Figure 3B:
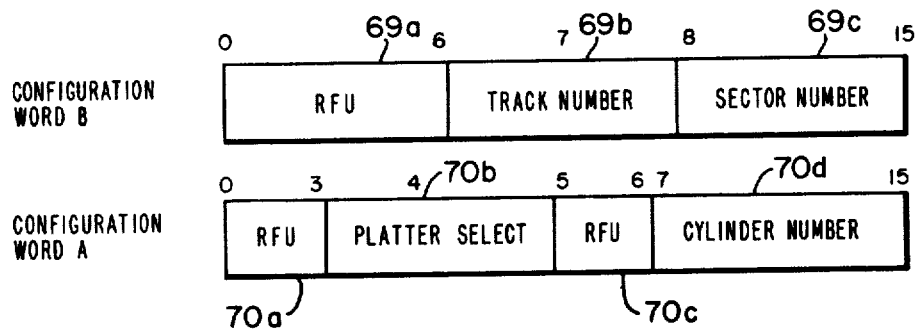

Referring to FIGS. 3a and 3b, the specific parameter formats for machine instructions used in megabus communications with the MPDC are illustrated. When a data transfer is to occur, the CPU 11 of FIG. 1 issues a machine instruction referred to as an I/O Output Command which includes a destination channel number, a 6-bit function code, and a data word as illustrated by the I/O output command format of FIG. 3a. The destination channel number identifies the system device to which a request is directed, and the function code provides the address in scratchpad memory unit 31 to which a data transfer is directed. The function code further identifies a CPU command as an input or an output command. The data word may include a task to be executed, range and offset range counts, a main memory address, or configuration words used to control the disk device during a data transfer. As shown in FIG. 3a, the destination channel numbers and function codes are transferred between the megabus 13 and the MPDC 10 by way of the address logic unit 20. The source channel number, main memory addresses, range and offset range and information stored in reserve areas are transferred between the megabus and the MPDC by way of the data logic unit 36. If data is to be written into main memory 12 of FIG. 1, the CPU 11 issues a DMA memory write operation. In response thereto, the starting memory address 60a is applied to the megabus 13 via the address cable 21, and the data 60b to be written into memory is applied to the megabus via the cable 41. As illustrated in FIG. 3a, the memory address register is a 24-bit register, while the data register is a 16-bit register.

If data is to be read from main memory 12, the CPU 11 issues a machine instruction referred to as a DMA memory read request. The instruction includes a 24-bit memory address 61a, a 10-bitsource channel number 61b, and a 6-bit reserve area 61c. The memory address 61a is received from the megabus 13 via cable 21 leading to the address logic unit 20. The channel number 61b and reserve area 61c are received by the data logic unit 36 by way of data cable 41. In response to the DMA read request instruction, the MPDC issues a DMA memory read response instruction comprising a 10-bit destination channel number 62a, a 6-bit reserve area 62b, and 16 bits of data 62c to be transferred. The destination channel number and reserve area are transferred to the megabus by way of the address cable 21, while the 16 bits of data are transferred to the megabus by way of data cable 41. It is to be understood that the contents of the reserve area 62b is identical to that of the reserve area 61c. Thus, information stored by the CPU into the reserve area 61c is returned to the megabus by way of the reserve area 62b.

The CPU 11 may transfer data from main memory and indicate a task which the MPDC 10 is to perform upon the data. For example, the CPU may issue an I/O output command instruction comprising a 10-bit destination channel number 63a to identify the MPDC, a 6-bit function code 63b to identify a scratchpad memory address, and 16 bits of data 63c to be stored in the indicated scratchpad location. As before described, the destination channel number and function code are received by the address logic unit 20 by way of address cable 21, and the data is stored in the data logic unit 36. The data is transferred under firmware control from the logic unit 36 to the ALU 24, and thereafter stored in the scratchpad memory unit 31. The CPU 11 issues additional I/O output commands to store into the scratchpad a range, an offset range, a main memory address, a task to be executed and configuration words for controlling the operation of the disk device during a data transfer. The firmware further may determine from the low order bit of the function code whether the task includes an input or an output operation. The task may include any of the before-described MPDC operations.

If the CPU 11 reqires information from the MPDC 10, an I/O input command instruction may be issued. The instruction is comprised of a 10-bit destination channel number 64a, a 6-bit function code 64b, a 10-bit source channel number 64c identifying the source of the request, and a 6-bit reserve area 64d. In response to the CPU request, the MPDC issues an I/O input response instruction comprising a 10-bit destination channel number 65a, a 6-bit reserve area 65b having stored therein the data appearing in reserve area 64d, and 16 bits of data 65c.

When data is to be written into the scratchpad memory unit 31, a two cycle operation occurs. The CPU 11 issues an I/O load output command which is comprised of two instructions. The first instruction includes an 8-bit module number 66a indicating the high order eight bits of a main memory address, a 10-bit destination channel number 66b, a 6-bit function code 66c, and 16 address bits 66d indicating the low order bits of a 24-bit main memory address. The module number, destination channel number and function code are transferred through address logic unit 20 and ALU 24 to the scratchpad memory unit 31 under firmware control. The firmware thereafter accesses the function code in the scratchpad memory to identify the scratchpad memory address into which the main memory address data is to be written. Upon loading the address in the scratchpad memory, the firmware commands the bus logic unit 34 to issue a ready signal to the megabus 13. The CPU in response thereto issues a second instruction including a 10-bit destination channel number 67a designating the MPDC, a 6-bit function code 67b, a high order bit 67c indicating whether the range count is positive or negative, and 15 range bits 67d indicating the number of data bytes to be transferred. The firmware thereupon accesses the function code to determine the scratchpad memory locations into which the range and S bit are to be stored.

In an interrupt operation, the MPDC issues an interrupt instruction comprising a 10-bit destination channel number 68a, a 6-bit logic zero area 68b, a 10-bit source channel number 68c, and a 6-bit source priority level number 68d. When the MPDC completes an operation, the interrupt instruction is issued to the CPU 11. If the priority level number of the MPDC is higher than the priority level of the task that is currently being performed by the CPU, the MPDC interrupt will be serviced immediately. Otherwise, the MPDC enters a wait state until a CPU is received.

The formats of two configuration words used to control the operation of a disk device during a data transfer are illustrated in FIG. 3b. The configuration words A and B include an image of an ID field of a disk sector on which a particular operation will be initiated. More particularly, the configuration word B includes a 7-bit area reserved for user (RFU) 69a, a 1-bit track number 69b and an 8-bit sector number 69c. The sector number field is incremented by one after each data field is successfully transferred during a read or a write operation.

Configuration word A includes a 4-bit RFU field 70a, a 1-bit platter select field 70b, a 2-bit RFU field 70c, and a 9-bit cylinder number field 70d. The cylinder number and platter select fields are used as the the seek arguments for disk seek operations.

The operation of the invention may best be described in the context of a read or a write operation. If the firmware on evaluating a task word in memory unit 31 detects a command for writing a record onto a disk, the firmware accesses the configuration words A and B in memory unit 31 by way of the ALU 24. The firmware thereafter stores the words in the device adapter 14, which compares the words with track information read from the disk. During the period that the logic unit 29 is searching for an ID match, the firmware commands the bus logic unit 34 to request data from the main memory unit 12. In response thereto, the main memory transfers 32 bytes of data to the FIFOs of the data logic unit 36. As the data is being loaded into the data logic unit, the range count in logic unit 22 is decremented and the address logic unit is incremented.

When an ID match occurs, the adapter 14 initiates a write gap operation on the indicated record of the disk system. Sixteen of the 32 bytes of data in the data logic unit 36 thereupon are moved from the data logic unit 36 to the device adapter 14 by way of ALU 24. As the data is being transferred to the adapter 14, the firmware commands the bus logic unit 34 to request additional data from the memory unit 12. The above-described process continues until the range field of the logic unit 22 is exhausted.

If data is to be read from a disk device and written into main memory 12, the CPU 11 first issues machine instructions for storing configuration words A and B, range, offset range, a beginning main memory address and a task to be performed into the scratchpad memory.

In response to firmware initiated control signals from the adapter logic unit 29, the device adapter 14 searches a disk device to find the data record to be transferred. When the disk track has been identified as before described, the data is transferred under hardware control to the data logic unit 36 by way of cable 33 and ALU 24. The hardware accesses the offset range count of the logic unit 22 to detect the number of leading data bytes to be ignored. The logic unit 36 thereafter forms 2-byte words from the succeeding data, and transfers a word under hardware control to the megabus 13 each time two bytes are received. The data transfer continues from the disk adapter 14 to the data logic unit 36 until the range register of the address logic unit 20 indicates that the data transfer is complete.

Figure 4:
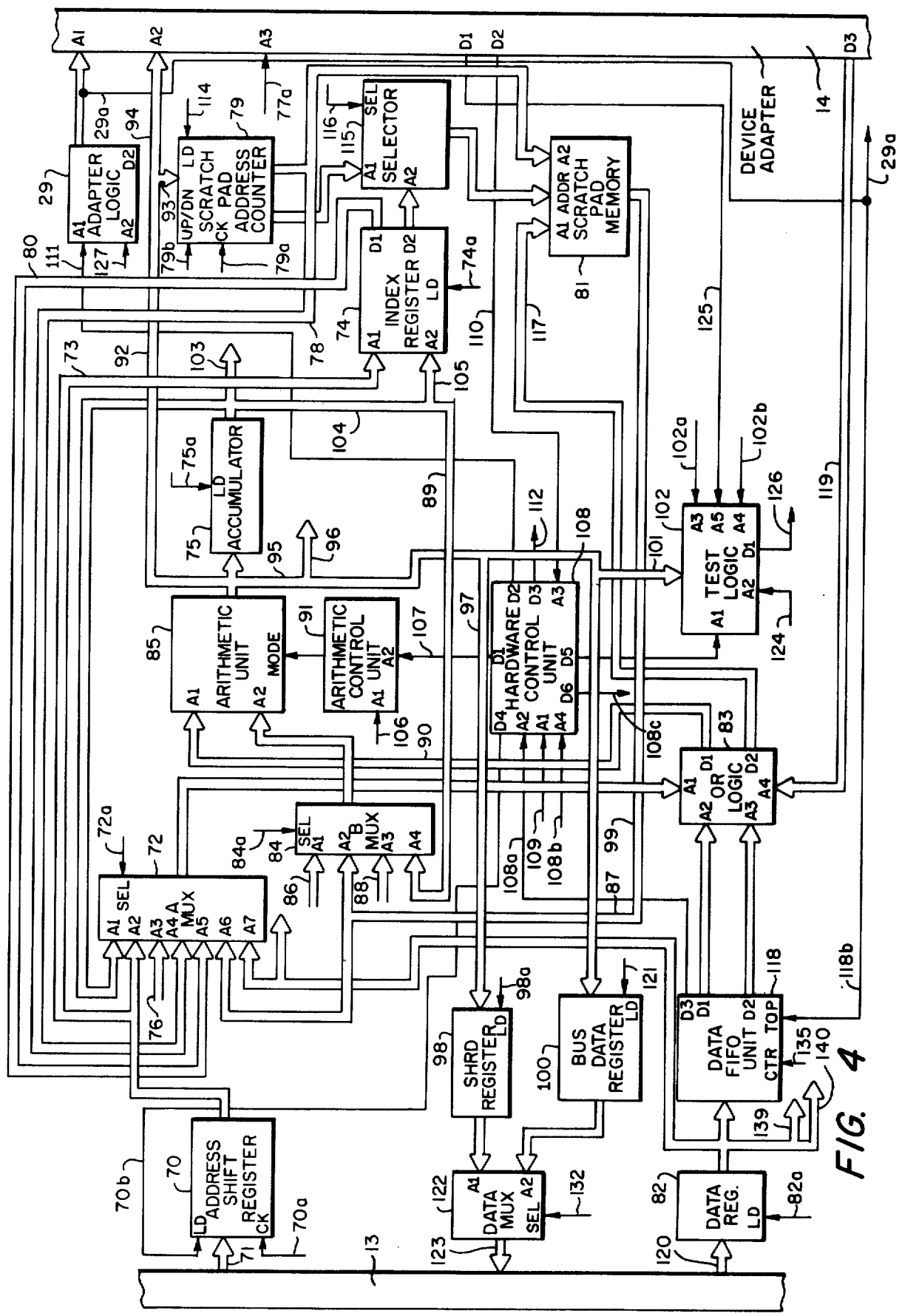
FIGS. 4 and 5 are a detailed functional block diagram of the disk controller of FIG. 1.
Figure 5:
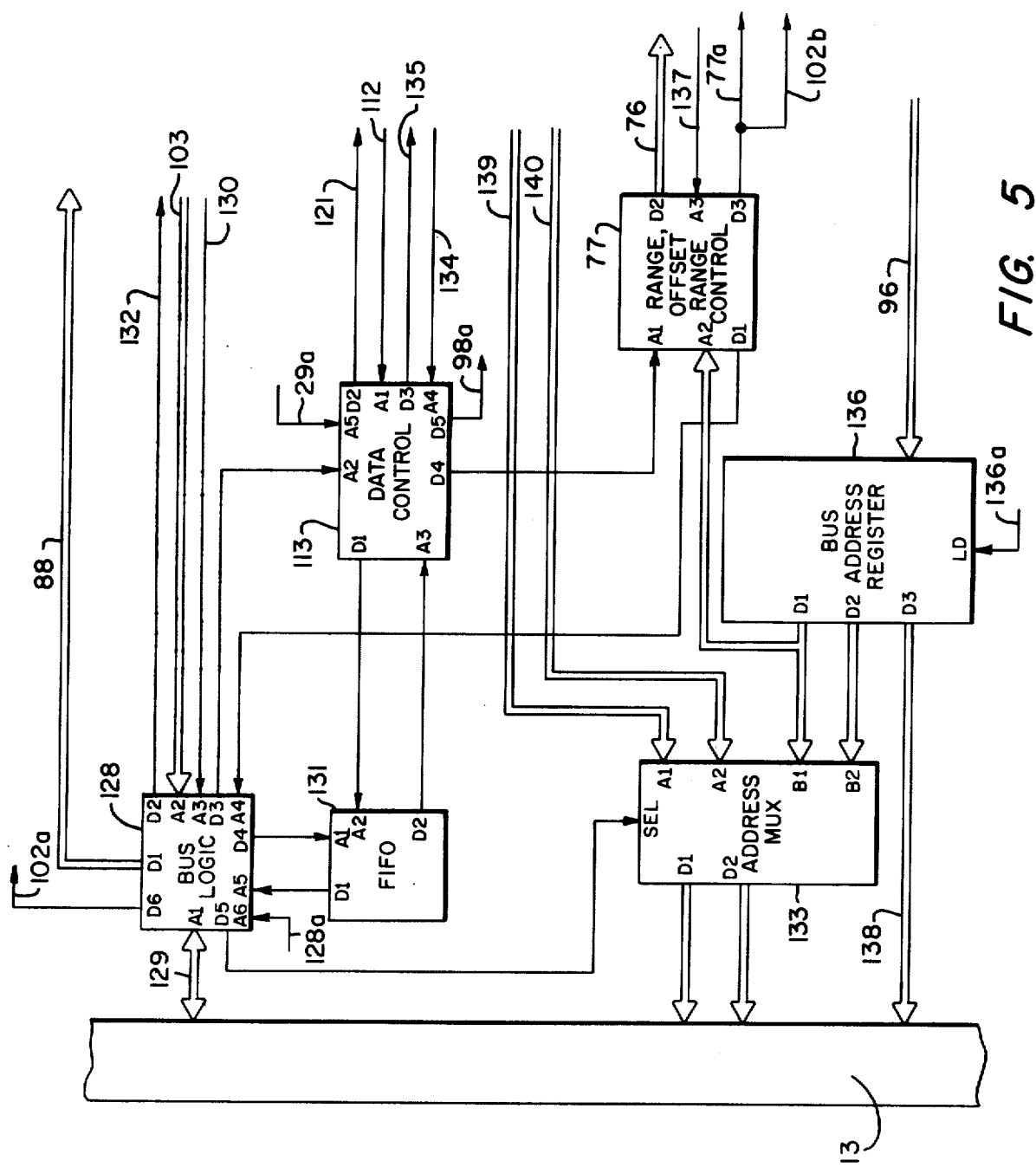

FIGS. 4 and 5

FIGS. 4 and 5 illustrate in a more detailed functional block diagram form the system of FIG. 2.

A 24-bit address shift register 70 is connected to the megabus 13 by way of a 24-bit data cable 71. The output of the shift register is applied to the A2 input of an 8 to 1 multiplexer 72 (AMUX). Bits 15 and 16 of the shift register output are applied by way of a data cable 73 to the two-bit A1 input of an index register 74. The clock (CK) input to shift register 70 is connected to a control line 70a leading to a firmware output terminal to be further described.

The A1 input to AMUX 72 is connected to the 8-bit output of an accumulator 75, and the A3 input to AMUX 72 is connected by way of a data cable 76 to the output of a range and offset range control unit 77 to be later described. The A4 input to AMUX 72 is connected by way of a data cable 78 to an output of an 8-bit scratchpad address counter 79. The A5 input to AMUX 72 is connected to a data cable 80 leading from the D1 two-bit output of index register 74, and the A6 input to AMUX 72 is connected to the 8-bit output of a 1K by 8-bit scratchpad memory 81. The A7 input to AMUX 72 is connected to the output of a 16-bit data register 82. The select (SEL) input to the AMUX 72 is connected by way of a control line 72a to a firmware output terminal. The 8-bit output of AMUX 72 is connected to the A1 input of an OR logic unit 83.

A 4-to-1 multiplexer 84 (BMUX) has an 8-bit output connected to the A2 input of an arithmetic unit 85. The A1 input to BMUX 84 is supplied by firmware on a control cable 86. The A2 input to BMUX 84 is connected to the output of scratchpad memory unit 81 by way of a data cable 87. The A3 input to BMUX 84 is supplied by way of a control cable 88, and the A4 input to the multiplexer is connected to the output of accumulator 75 by way of a data cable 89. The select (SEL) input to the multiplexer is supplied by firmware on a control line 84a.

The A1 input to arithmetic unit 85 is connected by way of a data cable 90 to the 8-bit D1 output of logic unit 83, and the mode input to the arithmetic unit is connected to the output of an arithmetic control unit 91. The 8-bit output of the arithmetic unit is applied to the input of accumulator 75, and applied by way of data cables 92 and 93 to the data input of counter 79. Further, the output of the arithmetic unit is applied by way of data cables 92 and 94 to the A2 input of device adapter 14, and by way of data cable 95 to a data cable 96. The arithmetic unit output also is applied by way of data cables 95 and 97 to the input of a second half-read (SHRD) register 98, and by way of data cables 95 and 99 to the 8 bit data inputs of a 16-bit bus data register 100. The arithmetic unit output in addition is applied to data cables 95 and 101 leading to the data input of a test logic unit 102.

The output of accumulator 75 further is applied to a data cable 103, and to the two bit A2 input of index register 74. The load (LD) input to the accumulator is connected by way of a control line 75a to a firmware output terminal.

The A1 input of arithmetic control unit 91 is connected by way of a control line 106 to an output terminal of the firmware control system, and the A2 input to the control unit 91 is connected by way of a control line 107 to the D1 output of a hardware control unit 108.

The A1 input to control unit 108 is connected to a control line 109 leading to an output of the firmware control system, and the A2 input to the control unit 108 is connected to a control line 108a. The A3 interrupt input of control unit 108 is supplied by the device adapter 14 to a control line 110. The A4 input to the control unit is connected to a control line 108b leading from system hardware control. The D2 output of control unit 108 is connected by way of a control line 111 to the A1 input of adapter logic unit 29, and the D3 output of the control unit 108 is connected to a control line 112 leading to the A1 input of a data control unit 113. The D4 output of control unit 108 is connected by way of a control line 70b to the load (LD) input of shift register 70, and the D5 output is connected to the A1 input of test logic unit 102. The D6 output of the control unit is connected to a control line 108c leading to the system hardware control.

Firmware generated clock signals on a control line 79b are supplied to the clock (CK) input of address counter 79, and firmware control signals on a control line 114 are supplied to the LD input of the counter. Further, the up/down select input to the counter receives firmware control signals by way of a control line 79b. Two output bits of the counter are applied to the A1 input of a selector 115. The low order six bits of the counter output are applied to the A2 input of the scratchpad memory unit 81.

The A2 input of selector 115 is connected to the D2 output of index register 74, the LD input of which is supplied by firmware to a control line 74a. The 3 bit output of the selector 115 is applied to the address (ADDR) input of scratchpad memory unit 81, and the SEL input of the selector receives firmware control signals by way of a control line 116.

The A1 input to memory unit 81 is connected by way of a data cable 117 to the 8 bit D2 output of logic unit 83. The A2 input to logic unit 83 is connected to the D1 output of data FIFO unit 118, and the A3 input to logic unit 83 is connected to the D2 output of unit 118. The A4 input to logic unit 83 is supplied by the device adapter 114 by way of a data cable 119.

The data input to the data register 82 is connected to a 16 bit data cable 120 electrically connected to the megabus 13, and the output of the data register further is connected to the input of the data FIFO unit 118. The LD input to the register is supplied by hardware control on a control line 82a. The output of the register further is applied to data cables 139 and 140.

The LD input to data register 100 is supplied by data control unit 113 on a control line 121. The output of register 100 is applied to the A2 input of a 2-to-1 data multiplexer 122. The 16 bit A1 input to the multiplexer is supplied by the SHRD register 98, the LD input of which is supplied by data control unit 113 on a control line 98a. The output of the multiplexer is applied by way of a 16 bit data cable 123 to the megabus 13.

Referring to test logic unit 102, a status signal is applied to the A2 input of the logic unit by the firmware control system on a control line 124. In addition, the bus logic unit 128 supplies a status signal by way of a control line 102a to the A3 input of the logic unit 102, and the control unit 77 supplies an end of range signal to the A4 input of the logic unit by way of a control line 102b. The A5 input of logic unit 102 is connected to a control line 125 carrying interrupt signals from the D1 output of device adapter 14. The test logic unit supplies a control signal to a control line 126 leading to a firmware control system to be further described.

The adapter logic unit 29 also receives a firmware signal on a control line 127 connected to its A2 input. The output of the logic unit is applied to the A1 input of device adapter 14. A control line 29a leading from the output of the logic unit is connected to the A5 input of data control unit 113, and to a control line 118b leading to the transfer on parallel (TOP) input of Data FIFO unit 118.

As illustrated by FIG. 5, the megabus 13 is connected to bus logic unit 128 by way of a bidirectional data cable 129. The A2 input to logic unit 128 is connected to data cable 103 carrying the output of accumulator 75, and the A3 input to the logic unit is connected to a control line 130 leading to an output of the firmware control system. The A4 input to logic unit 128 is connected to the D1 output of control unit 77, and the A5 input to the logic unit is connected to the D1 output of a first-in-first-out (FIFO) unit 131. The A6 input to the logic unit is supplied by system hardware on a control line 128a. The D1 output of logic unit 128 is connected to data cable 88, and the D2 output is connected to a control line 132 leading to the select (SEL) input of data multiplexer 122. The D3 output of the logic unit is connected to the A2 input of data control unit 113, and the D4 output is connected to the A1 input of FIFO unit 131. The D5 output of logic unit 128 is connected to the SEL input of a dual 2-to-1 address multiplexer 133, and the D6 output of the logic unit is connected to control line 102a.

The A2 input to FIFO unit 131 is connected to the D1 output of control unit 113, and the D2 output of the FIFO unit is connected to the A3 input of control unit 113. The A4 input to control unit 113 is connected to an output of the firmware control system by way of a control line 134, and the A5 input of the control unit is connected to line 29a. The D2 output of the control unit is connected to control line 121, and the D3 output is applied by way of a control line 135 to a control (CTR) input of data FIFO unit 118. The D4 output of data control unit 113 is applied to the A1 input of control unit 77, and the D5 output is applied to control line 98a leading to the LD input of register unit 98.

The A2 input to control unit 77 is connected to the D1 output of a bus address register unit 136, and the A3 input to the control unit is connected by way of a control line 137 to an output of the firmware control system. The D2 output of the control unit 77 is applied to data cable 76 leading to an input of AMUX 72. The D3 output of control unit 77 is applied to a control line 77a leading to the A3 input of device adapter 14, and to control line 102b leading to the A4 input of test logic unit 102 as before described.

The bus address register unit 136 is comprised of a 24-bit up counter which may be controlled to count either bytes or words, where a word is comprised of two bytes. The 8-bit D1 output of unit 136 also is applied to the B1 input of address multiplexer 133, and the 8-bit D2 output of the unit 136 is applied to the B2 input of multiplexer 133. The 8-bit D3 output of unit 136 is applied by way of a data cable 138 to the megabus 13. The LD input to the register unit 136 is supplied by firmwave on a control line 136a. The 8-bit A1 and A2 inputs to address multiplexer 133 are supplied by data register 82 by way of data cables 139 and 140.

In operation, the MPDC 10 interfaces with the disk adapter 14 which in turn may service plural disk devices as illustrated in FIG. 1.

If an unsolicited bus request is received from the megabus 13, the bus logic unit 128 issues a signal on line 102a leading to the test logic unit 102. Further, a device adapter 14 request is indicated by an interrupt signal on control line 127. The logic unit thereby is notified whether a device adapter request or a megabus 13 request is to be serviced. The test logic unit 102 thereupon indicates to the firmware by way of a signal on control line 125 the microinstruction sequence to be executed. In the event that a request is directed to a disk device which is already involved in executing a task, the bus logic unit 128 will issue a not accepted (NAK) status signal to the megabus 13 under system hardware control. If a disk device not presently involved in executing a task is addressed by the megabus 13, but the MPDC is presently involved in executing a previous task involving a second disk device, then the logic unit 128 may issue a wait status signal to the megabus 13. If the disk device which is addressed is not busy, and the MPDC is not involved in servicing the device while executing a previous task, then an accept (ACK) status signal is issued to the megabus 13.

It is to be understood that in the operation of the MPDC, the data paths for a data transfer are prepared by firmware operating in combination with the system of FIGS. 4 and 5. The data transfer, however, occurs under system hardware firmware control. Detailed descriptions of such hardware may be found in U.S. Pat. No. 3,993,981, and in the following Honeywell reference manuals: MPDC Reference Manual, Doc. No. 71010241-100, Order No. FM55, Rev. 0; MPDC Cartridge Disc Adapter Reference Manual, Doc. No. 71010239-100, Order No. FM57, Rev. 0; and MPDC Disc Adapter Reference Manual, Doc. No. 71010441-100, Order No. FK90, Rev. 0.

In a read or a write operation, the CPU 11 of FIG. 1 initially supplies a channel destination number and a function code to the address shift register 70. The shift register is compared under system hardware control to a destination number set in hex rotary switches, and if a match is detected the bus logic unit 128 acknowledges the match to the bus 13. As before described, the acknowledgement may be a wait, a nonacceptance (NAK), or an acceptance (ACK). If an ACK acknowledgement is issued by the logic unit 128 to the megabus 13, the logic unit in addition issues a busy signal to the megabus 13 to place subsequent bus requests in a wait state. The system hardware thereafter controls the transfer of data between megabus 13 and MPDC 10.

In order to provide means for controlling the operation of the disk during a read or a write operation, the CPU 11 also supplies a configuration word A to megabus 13 which under hardware control is loaded into the data register 82 and address shift register 70. Upon completing the load operation, the system hardware issues an ACK signal to the megabus 13 followed by a busy signal. Firmware senses the busy signal, and controls the transfer of the data in address shift register 70 and data register 82 through the arithmetic unit 85 for storage into scratchpad memory 81. When the firmware has completed the memory store operation, it signals the system hardware which then controls the loading of the address and data registers with a configuration word B. The configuration word B then is loaded into scratchpad memory under firmware control, and the process is repeated to receive in order a main memory address, a range count, a task and a status request. When the task is loaded into the data register 82 and stored in scratchpad memory 81, the task is executed under firmware control. Upon completing the task, the function code is interrogated to detect the presence of status requests which may be honored.

In the memory store operation, the firmware senses the function code to determine the scratchpad address in which information is to be stored from data register 82. Further, firmware is able to distinguish between data formats by interrogating the function code. A function code of hex 0 7 indicates that a task has been loaded into the scratchpad memory, a function code of hex 1 1 identifies a configuration word A and a function code of hex 1 3 identifies a configuration word B. In addition, a function code of hex O D identifies a range count (data bytes to be transferred). It is to be noted that the configuration words A and B, the task, and the range have formats as illustrated by the data field of I/O output command word of FIG. 3a. A main memory address input, however, is comprised of the module number and address fields illustrated by the I/O LD output command word of FIG. 3a.

During a read operation wherein data is read from a disk device and stored in main memory unit 12, the system hardware loads the high order bits of a main memory address, a function code and a channel destination number from megabus 13 into the address shift register 70, and loads the low order bits of the main memory address, a range or a task into the data register 82. Under firmware control, the information in the address shift register 70 is clocked through the AMUX 72 and the OR logic unit 83 to the A1 input of the arithmetic unit 85. Further, in response to a firmware command on line 106, the arithmetic control unit 91 issues a mode to the arithmetic unit 85 to select the A1 input. The A1 input to the arithmetic the arithmetic unit thereupon is supplied to the input of the scratchpad address counter 79, and loaded into the address counter under a firmware command supplied to control line 114.

Two bits of the address shift register output on data cable 73 are supplied to the A1 input of index register 74 to indicate the disk device from which information is to be read. Under firmware control by way of control line 74a, the two identification bits are loaded into the index register. The output of the index register is supplied to the selector 115 as is the two high-order bits of the address counter 79.

The firmware further initializes the address counter 79 by issuing an up/down signal on control line 79a, and a clock signal on control line 79b. The counter is commanded to count up or down at the rate indicated by the firmware generated clock signal. In response to the inputs from the index register and the address counter, the selector 115 addresses the scratchpad memory unit 81. The data resident in the data register 82 thus is transferred under firmware control to the scratchpad memory address indicated by selector 115 by way of a data path through the AMUX 72, the OR logic unit 83 and data cable 117. The configuration words A and B, a main memory address, a range, and a task thereby are loaded into scratchpad memory.

Upon completing the memory store operation, the firmware accesses the function code in the address shift register 70 to determine whether a task is indicated. More particularly, the firmware supplies a hex code 0 7 by way of cable 86 to the A1 input of BMUX 84. The BMUX is selected to the A1 input via a firmware control signal on control line 84a. The hex code thereupon is routed through the arithmetic unit 85 and stored in accumulator 75. Thereafter, the ouptut of address counter 79 is channelled through the AMUX 72 and the OR logic unit 83 to the A1 input of arithmetic unit 85. Under firmware control, the arithmetic unit compares the code in the accumulator 75 with the output of the address counter 79. If a match occurs, a task is indicated and the test logic unit 102 issues a signal to the firmware by way of control line 126 to initiate the execution of a next sequence of microinstrucions. In addition, the bus logic unit 128 in response to firmware control signals on line 130 sets the addressed disk device channel busy. Thereafter, any further information which is sent by way of megabus 13 to address the device for which the present task is assigned shall be acknowledged with a NAK status signal.

Upon detecting the presence of a task, the firmware accesses the task stored in the scratchpad memory 81 and transfers that information through the AMUX 72 and OR logic unit 83 to the arithmetic unit 85. Under firmware control, the arithmetic unit 85 and the test logic unit 102 tests the task information to determine the command to be executed. For example, the task may indicate that a disk seek, a recalibrate, a read or a write operation is required. The results of these tests are supplied by the test logic unit 102 to firmware by way of control cable 126.

In a write operation wherein data is to be read from main memory unit 12 and written on a disk device, the adapter logic unit 29 under firmware control issues a strobe to the device adapter 14 to load an internal data counter with a count of four. Further, the adapter logic unit 29 is commanded to issue a sequence of four strobes to load configuration words A and B into a data buffer of the device 14. More particularly, the information is routed under firmware control from the scratchpad memory 81 through the BMUX 84 and the arithmetic unit 85 to data cables 92 and 94 leading to the device adapter 14.

Before the logic unit 29 issues a BEGIN EXECUTION command to the device adapter 14, the megabus 13 must be set up for the transfer of data. The firmware supplies two dummy bytes of offset range to the BMUX 84 by way of cable 86, and controls the transfer of the bytes through the arithmetic unit 85 and along data cable 96 to the bus address register 136. The loading of the address register 136 is accomplished under firmware control on line 136a. The firmware then accesses the range information stored in the scratchpad memory unit 81, and transfers that information through the BMUX 84 and the arithmetic unit 85 to data cable 96 leading to the bus address register 136. As the range data is loaded into register 136, the offset range data is transferred to control unit 77. The two bytes of range data thereafter are transferred from the bus address register 136 into the control unit 77 under firmware control, and three bytes of the address information in scratchpad memory are stored into the bus address register 136. The MPDC thereby is prepared for receiving data from main memory for writing on the indicated disk device.

To initiate a data transfer, the firmware accesses the scratchpad memory 81 to transfer the MPDC channel number previously supplied by the CPU 11, and transfers the channel number through the BMUX and arithmetic unit 85 for storage in the bus data register 100. At this time, the main memory address from which data is to be initially read resides in the bus address register 136, and the MPDC channel destination number resides in bus data register 100.

The firmware also supplies bus logic commands to the BMUX 84 by way of cable 86, and stores those commands in the accumulator 75. From the accumulator, the commands are supplied by way of data cable 103 to the bus logic unit 128. These commands in logical sequence instruct the bus logic unit 128 to issue a response-required request to main memory to acknowledge that data is to be supplied to the MPDC, to issue a main memory channel number identifying the main memory unit as the system unit addressed, and to issue an indication as to whether the MPDC is in a byte or a word mode.

In normal operation, a read or a write command is always preceded by a seek command wherein the firmware commands the adapter device 14 to position the read-write heads of the disk device. In addition, the device adapter is instructed to select the proper head from which the information is to be read or written. The device adapter 14 then compares the configuration words A and B with data read from the surface of the disk. If a match is detected which indicates that a designated record is in position, the device adapter 14 issues a write command to the disk device and begins to write a header gap on the record. During this period, the device adapter 14 also issues an interrupt by way of control line 110 to the hardware control unit 108. In response thereto, the control unit issues a signal to the A1 input of test logic unit 102 to notify firmware by way of control cable 126 that control should be turned over to the before-described system hardware. Firmware thereupon issues an enable hardware command to control line 109, and further issues commands by way of control line 134 to the data control unit 113 to control the operation of FIFO unit 131 in requesting data from memory. The FIFO unit 131 operates to anticipate the availability of space in the data FIFO unit 118 for the receipt of data word from main memory. More particularly, each time the bus logic unit 128 requests a data word from main memory, a dummy byte is loaded into the FIFO unit 131. The bus logic unit 128 thereafter requests a second word of data only if the dummy byte has dropped from the input register of the FIFO unit 131 into the FIFO stack. Main memory thereupon issues data words by way of megabus 13 to the data register 82.

When the bus logic unit 128 has requested a data word from main memory and accepted the word, the logic unit issues a signal to the A2 input of data control unit 113. In response thereto, the control unit issues a command on control line 135 to the data FIFO unit 118 to store data from the data register 82. The above-described operation is repeated until the data FIFO unit 118 is filled with 32 bytes of data.

When the data FIFOs are filled, unit 118 issues a signal by way of control lines 118a to the hardware control unit 108. Control unit 108 thereupon issues a strobe by way of control line 111 to the adapter logic unit 20. Logic unit 29 in turn issues a strobe to the device adapter 14 to indicate that a data byte may be transferred from the data FIFOs to the device adapter 14. The same strobe is applied by way of control lines 29a and 118b to the TOP (transfer out parallel) terminal of data FIFO unit 118. The D1 and D2 outputs of the FIFO unit thereupon are transferred through the OR Logic 83 and through the arithmetic unit 85 to the device adapter 14 by way of data cables 92 and 94.

The logic unit 29 strobe also is applied by way of control line 29a to the data control unit 113. The reception of two of such strobes indicates that a two-byte data word has been transferred from the data FIFO unit 118 to device adapter 14. The data control unit 113 thereupon issues a control signal to the A2 input of FIFO unit 131 to drop a dummy byte out of the output register of the FIFO stack. The input register of the FIFO unit thereby is emptied, and issues a signal to the bus logic unit 128 to initiate a request for an additional data word from main memory. The above-described process continues until the device adapter unit 14 indicates that a record has been written.

It is to be understood that the device adapter 14 controls the write operation on the disk device. As the data is being written on the disk, the device adapter signals the test logic unit 102 by way of control line 125 to cease supplying data until the internal buffers of the device adapter have been emptied. During this period, the test logic unit 102 notifies the firmware control system that control may be transferred from the hardware to the firmware. When the device adapter 14 is ready to receive additional data, the logic state of control line 125 is changed. The test logic unit 102 thereupon notifies the firmware to return control to the hardware to resume the data transfer. This process continues until a data transfer is completed as indicated by a range count of zero.

Each time the bus logic unit 128 requests an additional data word, the data control unit 113 under system hardware control decrements the range counters of control unit 77 by one. Further, after a data request including a main memory address has been issued to the megabus 13 and accepted by the main memory unit 12, the control unit 77 increments the bus address register 136 by two and decrements the range counters by one. When the range count has been exhausted, the range control unit 77 issues an end-of-range (EOR) signal by way of control lines 77a and 102b to the device adapter 14 and the test logic unit 102, respectively.

It is to be noted that the control cable 125 includes two interrupt lines. A first interrupt line is a firmware request line to indicate that control should be returned to firmware while the device adapter 14 is between records. The second interrupt line is used to notify firmware that non-data service requests may be serviced. Such action normally indicates that there is some type of error in the device adapter 14.

If the EOR signal is issued during a record or at the end of a record on the disk device, the firmware will terminate the write order. If the EOR signal is received by the device adapter 14 before an end of record occurs, the device adapter fills the remaining portion of the record with dummy bytes. If an EOR signal does not occur, however, and there is no device adapter error indicated on interrupt cable 127, then the firmware will update the configuration words A and B in device adapter 14 to point to a next logical sector of the disk device.

FIG. 6

Figure 6:
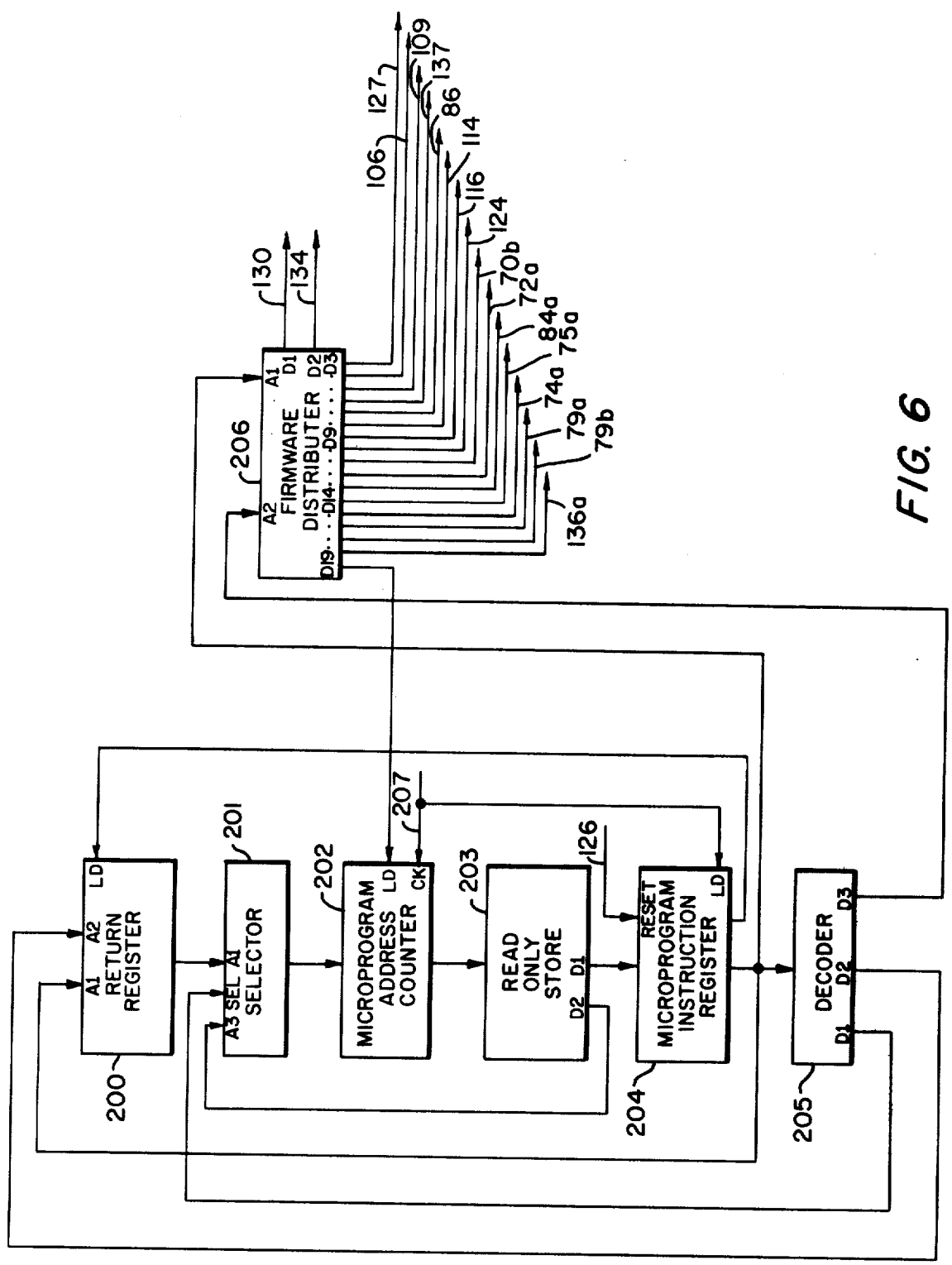
FIG. 6 is a functional block diagram of a firmware control system used in controlling the operation of the system of FIGS. 4 and 5.

FIG. 6 illustrates in functional block diagram form a firmware control system for controlling the operation of the system illustrated in FIGS. 4 and 5.

The 12-bit output of a 16-bit return register 200 is connected to the A1 input input of a selector 201. The 12-bit output of the selector 201 in turn is applied to the input of a 16-bit microprogram address counter 202, and the 12-bit output of the address counter is connected to the input of a 4.0 K by 16-bit Read Only Store (ROS) 203 having the microinstructions of a microprogram stored therein. The 16-bit D1 output of the ROS is connected to the input of a 16-bit microprogram instruction register 204, and the D2 output of the ROS is applied to the A3 input of the selector 201.

The microprogram instruction register 204 further receives a control signal from the test logic unit 102 of FIG. 4 by way of a control line 126 to reset or clear the register. The 16-bit output of the microprogram instruction register 204 is applied to the input of a decoder 205, to the A1 input of return register unit 200, and to the A1 input of a firmware distributor 206. A one-bit output of the register 204 is applied to the LD input of return register 200.

The D1 output of decoder 205 is applied to the A2 input of the selector 201, and the D2 output of the decoder is applied to the A2 input of return register unit 200. Further, the D3 output of decoder 205 is applied to the A2 input of distributor 206. The D1 output of the distributor is applied to control line 130 leading to the bus logic unit 128, and the D2 output is applied to control line 134 leading to the data control unit 113. The D3 output of distributor 208 is applied to control line 127 connected to the A2 input of adapter logic unit 29, and the D4 output is applied to control line 106 leading to the arithmetic control unit 91. The D5 output is supplied to control line 109 connected to the A1 input of hardware control unit 108, and the D6 output is connected to line 137 leading to the A3 input of control unit 77. The D7 output is connected to control cable 86, and the D8 output is applied to control line 114 carrying load commands to the counter 79. The D9 output is applied to control line 116, and the D10 output is applied to control line 124. The D11 output is applied to control line 70b, the D12 output to control line 72a and the D13 output to control line 84a. The D14 output is applied to line 75a, the D15 output to line 74a and the D16 output to line 79a. The D17 output is applied to line 79b and the D18 output to line 136a. The D19 output of distributor 206 is applied to the LD input of counter 202, the clock input of which is supplied by the system hardware by way of control line 207. Control line 207 further is connected to the LD input of register 204.

The 16-bit firmware commands stored in ROS 203 are divided into four fields: the OPCODE, the AMUX 72 select, the BMUX 84 selected and the miscellaneous fields. The firmware commands further are segmented into seven categories each representative of bit configurations for performing a designated operation. The seven basic categories of firmware commands are: miscellaneous commands, bus logic commands, ALU commands, constant value data commands, memory commands, test commands, and branch commands. Each of the firmware categories is identified by a particular OPCODE which is a binary decode of bits 0, 1 and 2 of ROS 203.

In operation, the microprogram address counter 202 is loaded from selector 201 under firmware control, and thereafter clocked by hardware system control signals on line 207. The address counter output addresses the ROS 203, which in response thereto supplies microinstructions to the instruction register 204. The register 204 loads the microinstructions under hardware control, and applies the microinstruction bit configuration to decoder 205, distributor 206 and return register 200.

The order in which the microinstruction sequences stored in ROS 203 are executed may be controlled in any of several ways. The test logic unit 102 may issue a reset signal causing a no-op instruction to occur in the instruction register 204. The instruction register thereupon skips the current instruction in the register, and proceeds to the next occurring instruction. In the alternative, the address counter 202 may be loaded with a microinstruction address formed from Read Only Store 203 and register 200. The firmware control system of FIG. 6 thus offers significant versatility in the execution of microprograms.

As each microinstruction addressed in ROS 203 is loaded into register 204, the instruction bit configuration and a binary code from decoder 205 identifying the instruction category are applied to distributor 206. In response thereto, the distributor applies firmware control signals to the system of FIGS. 4 and 5 as before described.

A copy of the microprogram stored in the ROS 203 is reproduced in its entirety, and attached hereto as Appendix A.

The operation of decoder 205 and firmware distributor 206 may better be understood by reference to Tables A-K. The OPCODES are defined in Table A, which provides a pointer to one of Tables B-K. For example, the OPCODE 0 0 0 refers to the miscellaneous commands of Table B. The OPCODE of 0 1 0 refers to Table C, the OPCODE 0 1 1 to Table D, the OPCODE 1 0 0 to Table E, and the OPCODE 1 0 1 to Table F. Further, the OPCODE 1 1 0 refers to Table G and the OPCODE 1 1 1 to Table I.

Table A

| Opcode Instructions | | | MICROINSTRUCTIONS |
|---|---|---|---|
| 0 | 0 | 0 | MISCELLANEOUS |
| 0 | 0 | 1 | RFU |
| 0 | 1 | 0 | BUS LOGIC |
| 0 | 1 | 1 | ALU |
| 1 | 0 | 0 | CONSTANTS |
| 1 | 0 | 1 | MEMORY |
| 1 | 1 | 0 | TEST |
| 1 | 1 | 1 | BRANCH |

Table B

| OPERATION | Miscellaneous Commands BINARY VALUE | MNEMONIC | HEX CODE |
|---|---|---|---|
| NO OPERATION | 0 0 0 0 0 0 0 0 0 0 0 0 0 0 0 0 | NOP | 0 0 0 0 |
| CLEAR COMMAND | 0 0 0 1 0 0 0 0 0 0 0 0 0 0 0 0 | CLR | 1 0 0 0 |
| SET ERROR FLOPS | 0 0 0 0 1 0 0 0 0 0 0 0 0 0 0 0 | SEF | 0 8 0 0 |
| ENABLE HARDWARE DATA PATH | 0 0 0 0 0 1 1 0 0 0 0 0 0 0 0 0 | EHP | 0 6 0 0 |
| DISABLE HARDWARE DATA PATH | 0 0 0 0 0 0 1 0 0 0 0 0 0 0 0 0 | DHP | 0 2 0 0 |
| RESET DIAGNOSTIC MODE | 0 0 0 0 0 0 0 0 1 0 0 0 0 0 0 0 | RSD | 0 0 8 0 |
| SET DIAGNOSTIC MODE | 0 0 0 0 0 0 0 1 1 0 0 0 0 0 0 0 | STD | 0 1 8 0 |
| HALT | 0 0 0 0 0 0 0 0 0 1 0 0 0 0 0 0 | HLT | 0 0 4 0 |
| RFU | 0 0 0 0 0 0 0 0 0 0 1 0 0 0 0 0 | — | 0 0 2 0 |
| CLEAR FLOPS AND REGISTERS | 0 0 0 0 0 0 0 0 0 0 0 1 0 0 0 0 | CRF | 0 0 1 0 |
| RESET DEVICE ADAPTER | 0 0 0 0 0 0 0 0 0 0 0 0 1 0 0 0 | RDA | 0 0 0 8 |
| SET QLT (BLT DONE) | 0 0 0 0 0 0 0 0 0 0 0 0 0 1 0 0 | QLT | 0 0 0 4 |
| SET BUS ACK | 0 0 0 0 0 0 0 0 0 0 0 0 0 0 1 0 | SBA | 0 0 0 2 |
| RFU | 0 0 0 0 0 0 0 0 0 0 0 0 0 0 0 1 | — | 0 0 0 1 |
| ENABLE READ PATH | 0 0 0 0 0 1 1 0 0 0 0 0 0 0 0 0 | ERP | 0 6 0 0 |
| ENABLE WRITE PATH | 0 0 0 0 0 1 1 0 0 0 0 0 0 0 0 1 | EWP | 0 6 0 1 |

Table C

| OPERATION | Bus Logic Commands BINARY VALUE | | | | | | | MNEMONIC | HEX CODE |
|---|---|---|---|---|---|---|---|---|---|
| INCREMENT ADDRESS CNTR. | 0 1 0 | 0 | 0 | 0 | 0 1 0 0 0 0 0 0 | 0 | | IAC | 4 1 0 0 |
| RESET STATUS | 0 1 0 | 0 | 0 | 0 | 0 0 1 0 0 0 0 0 | 0 | | RST | 4 0 8 0 |
| DECREMENT RANGE CNTR. | 0 1 0 | 0 | 0 | 0 | 0 0 0 1 0 0 0 0 | 0 | | DRC | 4 0 4 0 |
| CYCLE | 0 1 0 | $A_1$ | $A_2$ | $A_1$ | 0 0 0 0 1 0 0 0 | $A_1$ | | CYC | |
| SET CHANNEL READY | 0 1 0 | 0 | 0 | 0 | 0 0 0 0 1 1 0 0 | 0 | | SCR | 4 0 1 8 |
| RESET CHANNEL READY | 0 1 0 | 0 | 0 | 0 | 0 0 0 0 1 0 0 0 | 0 | | RCR | 4 0 1 0 |
| SET REGISTER BUSY | 0 1 0 | 0 | 0 | 0 | 0 0 0 0 0 0 1 0 | 0 | | SRB | 4 0 0 4 |
| RESET REGISTER BUSY | 0 1 0 | 0 | 0 | 0 | 0 0 0 0 0 0 0 1 | 0 | | RPB | 4 0 0 2 |
| RESET INTERRUPT LATCH | 0 1 0 | 0 | 0 | 0 | 0 0 0 0 0 0 0 0 | 1 | | RIL | 4 0 0 1 |
| CLEAR BUS | 0 1 0 | 0 | 0 | 0 | 0 0 1 0 0 0 1 1 | 0 | | CLB | 4 0 8 6 |

$A_0 A_1 A_2 A_3$ = SELECT AOP MUX INPUT.

Table D

| OPERATION | ALU Commands BINARY VALUE | | | | | | | | | | | | MNEMONIC | HEX CODE |
|---|---|---|---|---|---|---|---|---|---|---|---|---|---|---|
| AOP NEGATION | 0 1 1 | $A_1 A_2 A_3$ | $B_0 B_1$ | C | S | 0 | 0 | 0 | 0 | 1 | $A_0$ | | ANT | N/A |
| BOP NEGATION | 0 1 1 | $A_1 A_2 A_3$ | $B_0 B_1$ | C | S | 0 | 1 | 0 | 1 | 1 | $A_0$ | | BNT | N/A |
| ZERO ALU | 0 1 1 | $A_1 A_2 A_3$ | $B_0 B_1$ | C | S | 0 | 0 | 1 | 1 | 1 | $A_0$ | | ZER | N/A |
| AOP TRANSFER | 0 1 1 | $A_1 A_2 A_3$ | $B_0 B_1$ | C | S | 1 | 1 | 1 | 1 | 1 | $A_0$ | | XFA | N/A |

Table D-continued

| OPERATION | ALU Commands BINARY VALUE | | | | | | | | | | | MNEMONIC | HEX CODE |
|---|---|---|---|---|---|---|---|---|---|---|---|---|---|
| BOP TRANSFER | 0 1 1 | $A_1 A_2 A_3$ | $B_0 B_1$ | C | S | 1 | 0 | 1 | 0 | 1 | $A_0$ | XFB | N/A |
| NOR A TO B | 0 1 1 | $A_1 A_2 A_3$ | $B_0 B_1$ | C | S | 0 | 0 | 0 | 1 | 1 | $A_0$ | NOR | N/A |
| NAND A TO B | 0 1 1 | $A_1 A_2 A_3$ | $B_0 B_1$ | C | S | 0 | 1 | 0 | 0 | 1 | $A_0$ | NND | N/A |
| XOR A TO B | 0 1 1 | $A_1 A_2 A_3$ | $B_0 B_1$ | C | S | 0 | 1 | 1 | 0 | 1 | $A_0$ | XOR | N/A |
| XNOR A TO B | 0 1 1 | $A_1 A_2 A_3$ | $B_0 B_1$ | C | S | 1 | 0 | 0 | 1 | 1 | $A_0$ | XNR | N/A |
| AND A TO B | 0 1 1 | $A_1 A_2 A_3$ | $B_0 B_1$ | C | S | 1 | 0 | 1 | 1 | 1 | $A_0$ | AND | N/A |
| OR A TO B | 0 1 1 | $A_1 A_2 A_3$ | $B_0 B_1$ | C | S | 1 | 1 | 1 | 0 | 1 | $A_0$ | ORR | N/A |
| AOP PLUS ONE | 0 1 1 | $A_1 A_2 A_3$ | $B_0 B_1$ | C | S | 0 | 0 | 0 | 0 | 0 | $A_0$ | INC | N/A |
| AOP MINUS ONE | 0 1 1 | $A_1 A_2 A_3$ | $B_0 B_1$ | C | S | 1 | 1 | 1 | 1 | 0 | $A_0$ | DEC | N/A |
| SUBTRACT B FROM A | 0 1 1 | $A_1 A_2 A_3$ | $B_0 B_1$ | C | S | 0 | 1 | 1 | 0 | 0 | $A_0$ | SUB | N/A |
| ADD A TO B | 0 1 1 | $A_1 A_2 A_3$ | $B_0 B_1$ | C | S | 1 | 0 | 0 | 1 | 0 | $A_0$ | ADD | N/A |
| LEFT SHIFT AOP | 0 1 1 | $A_1 A_2 A_3$ | $B_0 B_1$ | C | S | 1 | 1 | 0 | 0 | 0 | $A_0$ | LSH | N/A |
| CARRY OUT IN | 0 1 1 | $A_1 A_2 A_3$ | $B_0 B_1$ | 1 | S | X | X | X | X | X | $A_0$ | COTI | N/A |
| STORE RESULT IN AOP | 0 1 1 | $A_1 A_2 A_3$ | $B_0 B_1$ | C | 1 | X | X | X | X | X | $A_0$ | SRIA | N/A |

$A_0 A_1 A_2 A_3$ = AOP REG. SELECT
$B_0 B_1$ = BOP REG. SELECT
C = DETERMINE CARRY IN
S = DETERMINE A OR B RESULT STORAGE.

Table E

| OPERATION | Constant Commands BINARY VALUE | | | | | | | MNEMONIC | HEX CODE |
|---|---|---|---|---|---|---|---|---|---|
| LOAD CONSTANT TO AOP | 1 0 0 | $A_1 A_2 A_3$ | C C C C C | 0 | C | 0 | C C | LCN | N/A |
| AOP ANDED WITH CONSTANT | 1 0 0 | $A_1 A_2 A_3$ | C C C C C | 0 | C | 1 | C C | ACN | N/A |
| AOP ORED WITH CONSTANT | 1 0 0 | $A_1 A_2 A_3$ | C C C C C | 1 | C | 0 | C C | OCN | N/A |

$A_1 A_2 A_3$ = AOP REG. SELECT
C = VALUE OF CONSTANT.

Table F

| OPERATION | Memory Commands BINARY VALUE | | | | MNEMONIC | HEX CODE |
|---|---|---|---|---|---|---|
| MEMORY WRITE | 1 0 1 | $A_1 A_2 A_3$ | 1 0 0 0 0 0 0 0 | $A_0$ | MWT | N/A |
| INCREMENT SP ADDRESS | 1 0 1 | 0 0 0 | 0 1 0 0 0 0 0 0 | 0 | IMA | A100 |
| DECREMENT SP ADDRESS | 1 0 1 | 0 0 0 | 0 0 0 0 0 1 0 0 | 0 | DMA | A008 |
| MEMORY WRITE & INC | 1 0 1 | $A_1 A_2 A_3$ | 1 1 0 0 0 0 0 0 | $A_0$ | WIA | N/A |
| MEMORY WRITE & DEC | 1 0 1 | $A_1 A_2 A_3$ | 1 0 0 0 0 1 0 0 | $A_0$ | WDA | N/A |
| SET SP TEST MODE | 1 0 1 | 0 0 0 | 0 0 1 0 0 0 0 0 | 0 | SPT | A080 |
| RFU | 1 0 1 | 0 0 0 | 0 0 0 1 0 0 0 0 | 0 | — | A040 |
| LOAD REQUESTING CHANNEL | 1 0 1 | 0 0 0 | 0 0 0 0 1 0 0 0 | 0 | LRC | A020 |
| LOAD INDEX REG. WITH AOP | 1 0 1 | $A_1 A_2 A_3$ | 0 0 0 0 1 1 0 0 | $A_0$ | LIR | N/A |
| SET MODULE BAD PARITY | 1 0 1 | 0 0 0 | 0 0 0 0 1 0 1 0 | 0 | MBP | A004 |
| RFU | 1 0 1 | 0 0 0 | 0 0 0 0 0 0 0 1 | 0 | — | A002 |

$A_0 A_1 A_2 A_3$ = AOP REG. SELECT.

Table G

| OPERATION | Test Commands BINARY VALUE | | | | | | | | | MNEMONIC | HEX CODE |
|---|---|---|---|---|---|---|---|---|---|---|---|
| TEST FOR ZERO | 1 1 0 | $A_1 A_2 A_3$ | 0 0 0 1 | T | T | T | T | T | $A_0$ | TFZ | N/A |
| TEST FOR ONE | 1 1 0 | $A_1 A_2 A_3$ | 0 0 1 0 | T | T | T | T | T | $A_0$ | TFO | N/A |
| RETURN | 1 1 0 | 0 0 0 | 1 0 0 0 | 0 | 0 | 0 | 0 | 0 | 0 | RTN | C200 |

$A_0 A_1 A_2 A_3$ = AOP REG. SELECT
TTTTT = 0 TEST MUX INPUT.

Table H

| MNEMONIC | FUNCTION | Test Parameters HEX CODE | DESCRIPTION |
|---|---|---|---|
| TAHR | HDTSRO+00 | 00 | ADAPTER HARDWARE REQUEST |
| TBCA | SHRCOM+00 | 01 | BUS CYCLE ACTIVE |
| TRSP | BSRSVP+30 | 02 | BUS RESPONSE REQUIRED |
| TEQZ | ALUEQZ+00 | 03 | ALU OUTPUT EQUALS 00 |
| TEQF | ALUEQF+00 | 04 | ALU OUTPUT EQUALS FF |
| TCOT | ALUCOT+00 | 05 | ALU CARRY OUT |
| TREQ | CREREQ+00 | 06 | CHANNEL REQUEST |
| TACK | ACKRSP+00 | 07 | BUS ACK RESPONSE |
| TAX0 | ALUAXO-00 | 08 | AOP MULTIPLEXER, BIT 0 |
| TAX1 | ↓ 1 | 09 | ↓ BIT 1 |
| TAX2 | ↓ 2 | 0A | ↓ BIT 2 |
| TAX3 | ↓ 3 | 0B | ↓ BIT 3 |
| TAX4 | ↓ 4 | 0C | ↓ BIT 4 |
| TAX5 | ↓ 5 | 0D | ↓ BIT 5 |

Table H-continued

| MNEMONIC | FUNCTION | Test Parameters HEX CODE | DESCRIPTION |
|---|---|---|---|
| TAX6 | ↓ 6 | 0E | ↓ BIT 6 |
| TAX7 | ALUAX7−00 | 0F | AOP MULTIPLEXER, BIT 7 |
| TORZ | ORCAR3−00 | 10 | OFFSET RANGE ZERO |
| TRGZ | EOR(XXX)+00 | 11 | RANGE ZERO |
| TSBS | SBSOBS+00 | 12 | SINGLE BYTE STORED |
| TSAW | SPAWRP+00 | 13 | SP ADDRESS WRAPAROUND |
| TADB | BUSY(XX)+00 | 14 | ADAPTER BUSY |
| TNDS | NDTSRQ+00 | 15 | NON-DATA SERVICE REQUEST |
| TORH | OFRNGZ=00 | 16 | OFFSET RANGE HISTORY |
| TDCN | MYDCNN−00 | 17 | MY DATA CYCLE NOW |
| TBSY | BDRBSY+00 | 18 | BUS DATA REGISTER BUSY |
| TUBR | UBRO(XX)+00 | 19 | UNSOLICITED BUS REQUEST |
| TINT | RESINT+00 | 1A | RESUME INTERRUPT |
| TNAK | NAKRSP+00 | 1B | NAK RESPONSE |
| TBYT | BSAD23+00 | 1C | BYTE MODE |
| TATY | BSPYCK+00 | 1D | BUS PARITY CHECK |
| TNBR | NOHTRQ+00 | 1E | NO BUFFER REQUEST |
| TFDR | FDTSRQ+00 | 1F | FIRMWARE DATA SERVICE REQUEST |

Table I

| OPERATION | Branch Commands BINARY VALUE | MNEMONIC | HEX CODE |
|---|---|---|---|
| GO TO | 1111 AAAAAAAAAAAA | GTO | FXXX |
| LOAD RETURN | 1110 AAAAAAAAAAAA | LRA | EXXA |

Table J

AOP Multiplexer Input Selection

| $A_0$ | $A_1$ | $A_2$ | $A_3$ | SELECTED REGISTER (SRIA)* | MNEMONIC | SELECTED REGISTER (SRIA)* | MNEMONIC |
|---|---|---|---|---|---|---|---|
| 0 | 0 | 0 | 0 | ACCUMULATOR | AACU | ACCUMULATOR | AACU |
| 0 | 0 | 0 | 1 | SCRATCH PAD MEMORY | ASPM | SCRATCH PAD MEMORY | ASPM |
| 0 | 0 | 1 | 0 | SCRATCH PAD ADDRESS | ASPA | SCRATCH PAD ADDRESS (INDEXED) | ASPA |
| 0 | 0 | 1 | 1 | INDEX REGISTER | AIDX | SCRATCH PAD ADDRESS (INDEXED) | ASPA1 |
| 0 | 1 | 0 | 0 | ADAPTER DATA REGISTER | AAD0 | ADAPTER DATA REGISTER | AAD0 |
| 0 | 1 | 0 | 1 | ADAPTER DEVICE ID | AAD1 | ADAPTER DATA COUNTER | AAD1 |
| 0 | 1 | 1 | 0 | ADAPTER STATUS 1 | AAD2 | ADAPTER COMMAND REGISTER | AAD2 |
| 0 | 1 | 1 | 1 | ADAPTER STATUS 2 | AAD3 | ADAPTER UNIT SELECT | AAD3 |
| 1 | 0 | 0 | 0 | BUS ADDRESS OUT | ABUS1 | BUS REGISTER IN | ABUS1 |
| 1 | 0 | 0 | 1 | BUS DATA OUT 1 | ABUS2 | BUS DATA IN 1 | ABUS2 |
| 1 | 0 | 1 | 0 | BUS DATA OUT 2 | ABUS3 | BUS DATA IN 2 | ABUS3 |
| 1 | 0 | 1 | 1 | BUS RANGE OUT | ABUS4 | BUS ADDRESS IN | ABUS4 |
| 1 | 1 | 0 | 0 | ADAPTER RFU | AAD4 | RESET ADAPTER INDEX COUNT | AAD4 |
| 1 | 1 | 0 | 1 | ADAPTER RFU | AAD5 | ADAPTER STATUS & FIFQ CLEAR | AAD5 |
| 1 | 1 | 1 | 0 | ADAPTER RFU | AAD6 | ADAPTER SEEK PULSE | AAD6 |
| 1 | 1 | 1 | 1 | ADAPTER RFU | AAD7 | ADAPTER DATA BYTE TAKEN | AAD7 |

*SRIA AND $\overline{SRIA}$ = STORE RESULT IN SELECTED AOP REGISTER.

Table K

| $B_0$ | $B_1$ | BOP MUX Input SELECTED DATA INPUT | MNEMONIC |
|---|---|---|---|
| 0 | 0 | ACCUMULATOR | BACU |
| 0 | 1 | SCRATCH PAD MEMORY | BSPM |
| 1 | 0 | BUS STATUS<br>. 0-3 (ZEROS)<br>. 4 BUS YELLOW IND.<br>. 5 BUS NAK<br>. 6 BUS PARITY ERROR<br>. 7 BUS RED IND. | BBST |
| 1 | 1 | BOP CONSTANT | |

The instructions of Tables C–G and I include A-fields comprised of bits $A_0$–$A_3$. Each of the A-fields refer to registers providing data to the AMUX 72 of FIG. 4. Table D further includes instructions having a B-field comprised of bits $B_0$ and $B_1$. The B-field is defined by Table K, wherein it is indicated that the BMUX may be selected to the accumulator 75, the scraptchpad memory unit 81, to the bus logic unit 128 by way of cable 88 for bus status inputs, and to the firmware control system by way of cable 86 for a constant value input. Where two-byte arithmetic is being performed by the arithmetic unit 85, the C-field of Table D is used to provide a carry-in feature wherein the result of a previous AU 85 operation may be used in a subsequent operation. The F-field of the instructions of Table D provides a command to store the result of the AU 85 operation into a register designated by the A-field. The remaining low-order bits of Table D refer to the mode select bits for commanding the AU 85 to perform the indicated operation.

The instruction set of Table E includes a C-field for constant values, and the low-order bits of the instructions of Table F provide for the generation of strobes for loading the registers indicated by the A-field thereof. The instruction set of Table G includes test or T-fields which are defined by the entries of Table H. The A-field of Table I refers to the address of the microprogram to which a transfer is to be made.

Table L provides a cross-reference between the mnemonics used in the Tables A–K and the component parts of the system as described in FIGS. 4–8.

TABLE L

| Microinstruction Mnemonic | Hardware Device |
| --- | --- |
| RFU | Reserved For User |
| Bus Logic | Bus logic unit 128 |
| ALU | Arithmetic Unit 85, Arithmetic Control Unit 91, Accumulator 75 |
| Accumulator | Accumulator 75 |
| Scratchpad Memory | Scratchpad Memory Unit 81 |
| Scratchpad Address | Scratchpad Address Counter 79 |
| BLT | Bus Logic Tests |
| Address Counter | Bus Address Counters 300, 302 and 303 |
| Range Counter | Range Counters 306–309 |
| AOP | AMUX 72 |
| BOP | BMUX 84 |
| SP Address | Scratchpad Address Counter |
| Memory | Scratchpad Memory Unit 81 |

FIG. 7

Figure 7A:
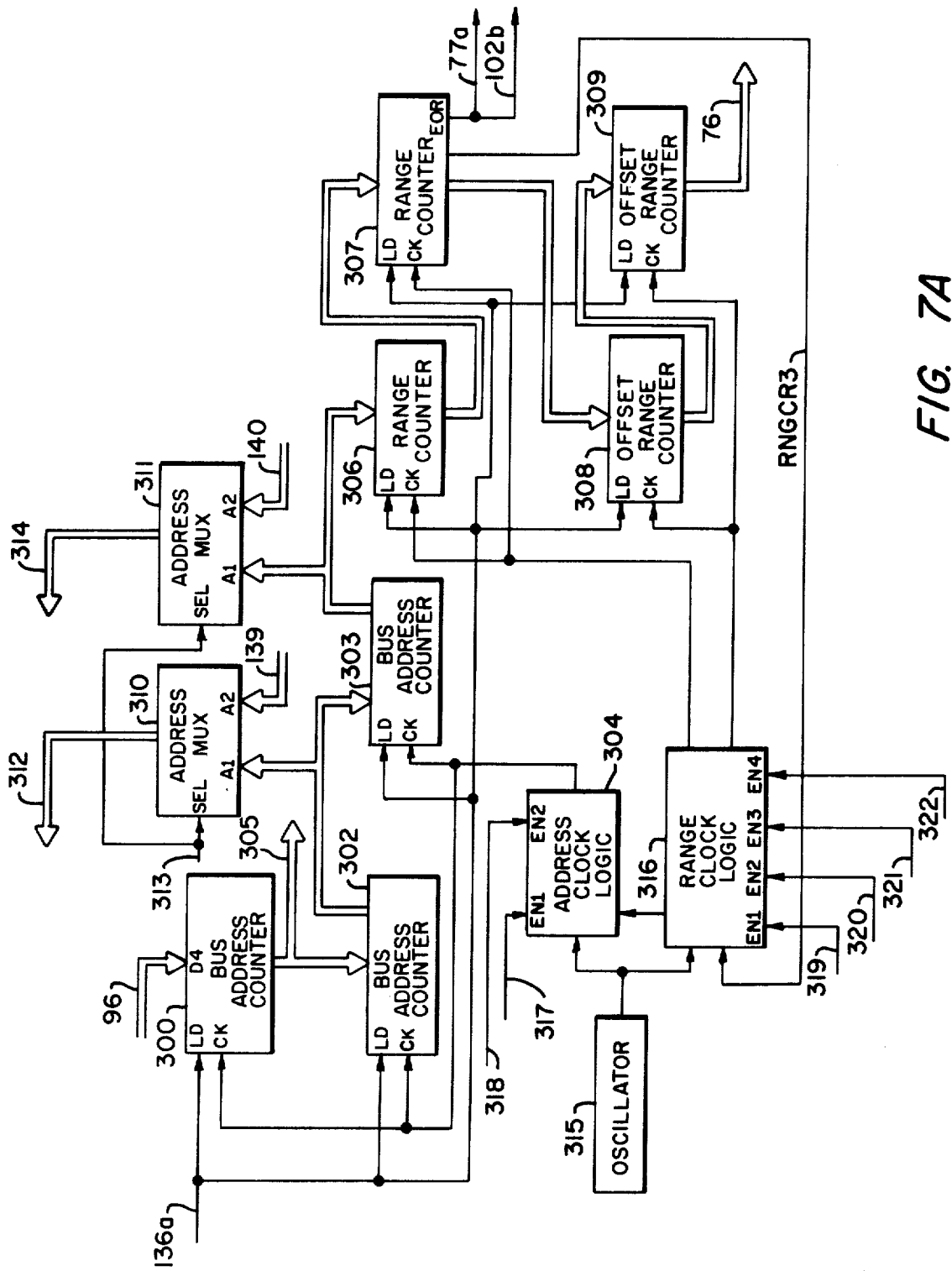
FIGS. 7A and 7B are detailed functional block diagrams of the range and offset range control unit of FIGS. 4 and 5.
Figure 7B:
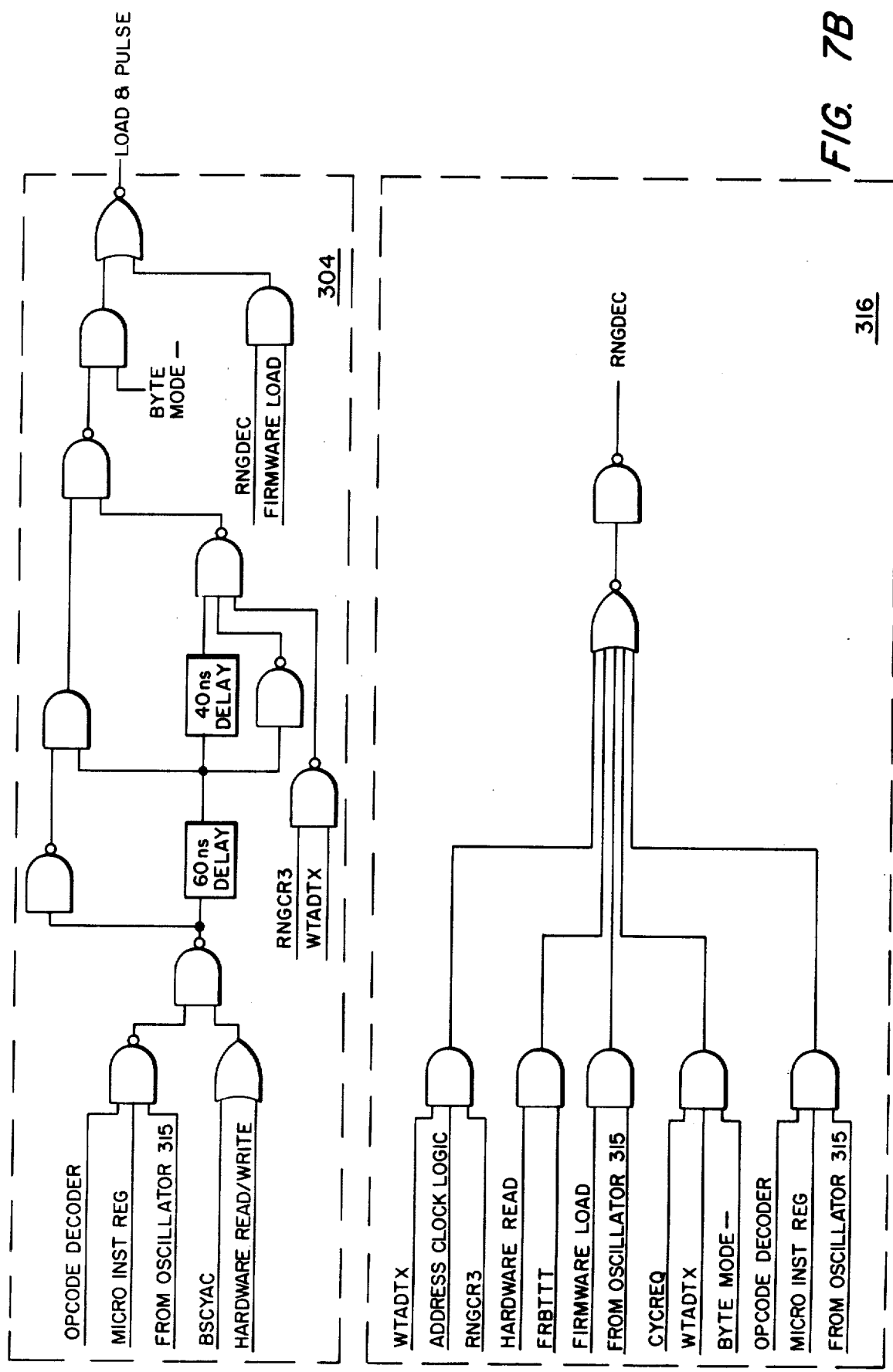

FIG. 7 illustrates in a more detailed functional block diagram form the range and offset range control unit 77, the address multiplexer 133 and the bus address register 136. A bus address counter 300 receives data from AU 85 on an 8-bit data cable 96, and load commands from firmware on control line 136a. The clock input to counter 300 is connected to the clock input of a bus address counter 302, to the clock input of a bus address counter 303, and to the output of an address clock logic unit 304. The 8-bit output of the counter 300 is applied to the megabus 13 by way of a data cable 305, and to the data input of counter 302.

In the preferred embodiment described herein, address counters 300, 302 and 303 form a 24-bit memory address up counter.

The load input of counter 302 is connected to control line 136a and to the load inputs of counter 303, a range counter 306, a range counter 307, an offset range counter 308, and an offset range counter 309. The counters 306 and 307 form a 16-bit range down counter, and the counters 308 and 309 form a 16-bit offset range down counter. The 8-bit output of counter 302 is applied to the A1 input of an address multiplexer 310, and to the data input of counter 303. The 8-bit output of counter 303 is applied to the A1 input of an address multiplexer 311, and to the data input of range counter 306.

Address multiplexer 310 also receives at its A2 input data from data register 82 of FIG. 4 by way of cable 139. The 8-bit output of the multiplexer is applied to a data cable 312 leading to megabus 13. The select (SEL) input to multiplexer 310 is supplied by the bus logic unit 128 on a control line 313.

The address multiplexer 311 also receives data from the data register 82 by way of data cable 140, and supplies 8 bits of data to a data cable 314 leading to megabus 13. The SEL input to multiplexer 311 is connected to the SEL input of multiplexer 310.

The 8-bit output of range counter 306 is connected to the input of range counter 307. The output of counter 307 in turn is applied to the input of counter 308, and the 8-bit output of counter 308 is applied to the input of counter 309. The 8-bit output of counter 309 in turn is applied to control line 76 leading to the A3 input of AMUX 72.

The clock source for the system of FIG. 7 is a 4.0 MHz oscillator 315, which supplies clock signals to address clock logic unit 304 and a range clock logic unit 316. The logic unit 304 receives enable signals from bus logic unit 128 and from firmware on control lines 317 and 318, respectively. In response thereto, the logic unit 304 issues increment commands to counters 300, 302 and 303.

The range clock logic unit 316 receives enable signals from bus logic unit 128, the firmware and the data control unit 113 by way of control lines 319–321, respectively. Further, the control unit 113 supplies an offset range enable signal to the EN4 input of logic unit 316. When enabled, the logic unit 316 supplies decrement commands to counters 306–307 or counters 308–309.

If data is to be read from or written onto a disk device controlled by the device adapter 14, the CPU 11 of FIG. 1 supplies a channel destination number and a function code to the address shift register 70 of FIG. 4 as before described. In addition, the CPU supplies configuration words A and B, a main memory address, a range count, an offset range count, a task and a status request to the data register 82. The firmware accesses the function code in register 70 to detect the address in scratchpad memory unit 81 in which the data of register 82 is to be stored.

The firmware then serially shifts seven bytes of data a byte at a time from scratchpad memory unit 81 into address counters 300, 302 and 303, range counters 306 and 307, and offset range counters 308 and 309. Upon completion of the load operation, a main memory address resides in address counters 300, 302 and 303, a range count in counters 306–307, and an offset range count in counters 308–309.

In a read operation wherein data is to be read from the disk device and written into main memory unit 12, the megabus 13 is supplied both data and a 24-bit address in main memory in which the data is to be written. More particularly, the data resides in the bus data register 100. When a data word comprising two data bytes is to be transferred from the MPDC 10 to the megabus 13, the bus logic unit 128 selects the multiplexers 310 and 311 to the A1 inputs. The main memory module to which the data is to be transferred thereby is made available to the megabus 13. The main memory address in which the transferred data is to be written thereupon is supplied from address counters 300, 302 and 303 to cables 305, 312 and 314 respectively. Each time the main memory unit issues an acknowledgement signal and accepts data into the indicated address, the main memory address in counters 300, 302 and 303 is incremented by two.

During a data transfer from device adapter 14 to MPDC 10, the data control unit 113 of FIG. 5 issues a logic one signal to control line 322 each time a data byte is transferred. The range clock logic unit 316 is enabled thereby to decrement the offset range counters 308 and 309. The output of counter 309 is applied by way of cable 76 to the AMUX 72 and the AU 85 of FIG. 4. As long as the offset range count is greater than zero, the data bytes are ignored and are not transferred to megabus 13. When the offset range count is exhausted, however, data transfer control switches from the offset range counters to the range counters 306 and 307. More particularly, the data control unit 113 disables the EN4 input to logic unit 316, and thereafter issues enable signals to the EN3 input of the logic unit by way of control line 321. The logic unit 316 in response thereto decrements the range counters each time a data byte is transferred from the device adapter 14 to the MPDC 10.

Each of the data bytes transferred after control switches to the range counters are transferred to megabus 13.

When the range count in counters 306 and 307 is exhausted, counter 307 issues an end-of-range (EOR) signal on lines 77a and 102b as before described.

A write operation wherein data is read from main memory and written onto a disk device is accomplished in a manner similar to that of the read operation. A channel designation number and a function code are loaded into the address shift register 70, and data including configuration words A and B, a main memory address, a range count, a task and a status request are loaded from data register 82 into scratchpad memory unit 81. An offset range count is not used in writing data onto a disk device.

After the device adapter 14 has positioned the write heads of the disk device, and issued a hardware service request signal on line 110 of FIG. 4, a firmware loads two dummy bytes into the offset range counters 308 and 309, a range count into counters 306 and 307, and a main memory address into counters 300, 302 and 303. The firmware further transfers a MPDC channel number from scratchpad memory unit 81 to the bus data register 100, and thence through data multiplexer 122 to megabus 13. Under firmware control, the bus logic unit 128 issues a response-required data request to main memory, and selects the multiplexers 310 and 311 to their A2 inputs to supply the main memory channel number in address shift register 70 to megabus 13. The bus logic unit thereafter selects the multiplexers 310 and 311 to their A1 inputs to supply the main memory address to megabus 13.

Each time the bus logic unit 128 requests an additional data byte from main memory, the logic unit also issues a logic one signal to control line 319 to enable the range clock logic unit. The range counters 306 and 307 thereupon are decremented by one. Further, after a data request and a main memory address have been issued to megabus 13 and accepted by the main memory unit 12, the bus logic unit 128 enables the EN1 input of the address clock logic unit 304. In response thereto, the address counters 300, 302 and 303 are incremented by two.

When the range count has been exhausted, counter 307 issues an EOR signal to lines 77a and 102b as before described. The data transfer from main memory unit 12 to disk device 14 thereby is designated complete.

The system of FIG. 7 represents a significant improvement over prior firmware data transfer controls, which required too much time for bookkeeping. Previously, bookkeeping parameters were stored in memory, and had to be retrieved and restored when a parameter was updated. In the instant hardware/firmware invention, the bus address counters 300, 302 and 303, the range counters 306-307, and the offset range counters 308-309 may be loaded serially to substantially decrease the number of microinstructions required in a load operation. Further, during a data transfer, the counters may be incremented or decremented under hardware control to accommodate an increased data flow rate.

FIG. 8

Figure 8:
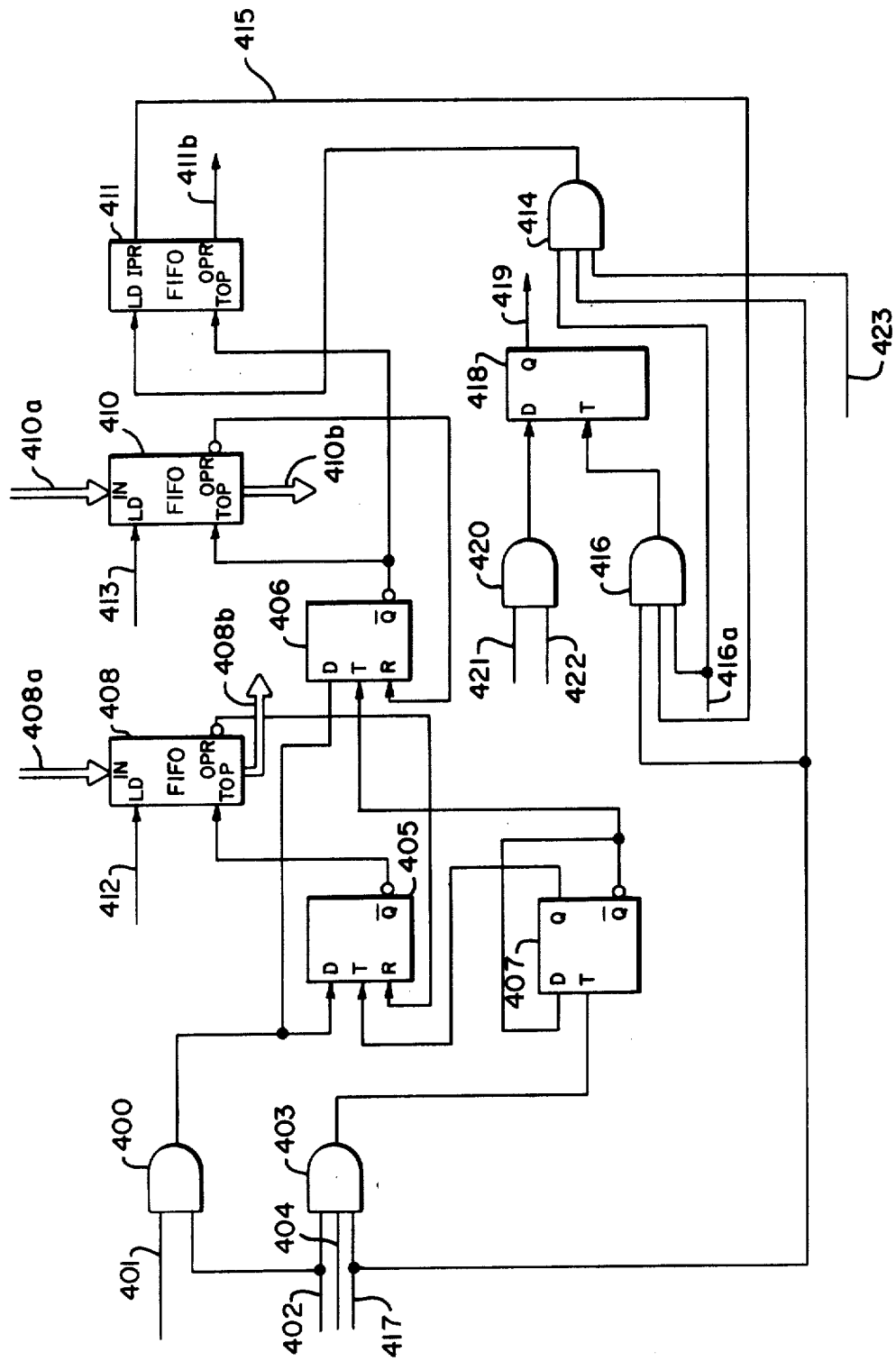
FIG. 8 is a detailed logic diagram of the data FIFO unit of FIG. 4, which is an embodiment of the invention.

FIG. 8 illustrates in detailed logic diagram form the FIFO unit 131 of FIG. 5, which embodies the invention described herein.

In referring to the electrical schematics illustrated in the Figures, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

An AND gate 400 has one input connected to a control line 401, and a second input connected to both a control line 402 and one input of an AND gate 403. A second input to gate 403 is connected to a control line 404 leading to line 110 of FIG. 4, and a third input is connected to a control line 417.

The output of gate 400 is connected to the D input of a flip-flop 405, and to the D input of a flip-flop 406. The output of gate 403 is applied to the trigger (T) input of a flip-flop 407.

The trigger input to flip-flop 405 is connected to the Q output of flip-flop 407, and the reset input of flip-flop 405 is connected to the output register (OPR) output of a 16-word by eight bit FIFO 408. When the OPR output is at a logic 1 level, the output register is filled. Further, when the OPR output is at a logic zero level, the output register is empty. The Q of flip-flop 405 is applied to the transfer on parallel (TOP) input of FIFO 408.

The Q output of the flip-flop 407 is connected to its D input, and to the T input of flip-flop 406. The reset input to flip-flop 406 is connected to the OPR output of a 16-word by 8 bit FIFO 410. The Q output of the flip-flop 406 is connected to the TOP input of FIFO 410, and to the TOP input of a 16-word by 8 bit FIFO 411.

The load (LD) input to FIFO 408 is connected to a control line 412, and the data input to the FIFO is connected to a data cable 408a leading from data register 82 of FIG. 4. The parallel data output of FIFO 408 is connected to a data cable 408b leading to cable 94. The LD input of FIFO 410 is connected to a control line 413, and the data input to the FIFO is connected to a data cable 410a leading from data register 82. The parallel output of the FIFO is applied through a data cable 410b to cable 94.

The LD input to FIFO 411 is connected to the output of an AND gate 414. The input register (IPR) output of the FIFO 411 is connected by way of a control line 415 to one input of an AND gate 416. The IPR output is at a logic one level when the input register is empty, and at a logic zero level when the input register is filled. The OPR output of FIFO 411 is applied by way of a control line 411b to line 102b of FIG. 5.

A second input to gate 416 is connected to a third input to gate 403, and to a control line 417. A third input to gate 416 is connected to one input of gate 414, and to a control line 416a. The output of gate 416 is applied to the T input of a flip-flop 418, the Q output of which is applied to a control line 419 leading to the bus logic unit 128.

The D input of flip-flop 418 is connected to the output of an AND gate 420, one input of which is connected to a control line 421. A second input to gate 420 is connected to a control line 422.

A second input to gate 414 is connected to control line 417, and a third input to gate 414 is connected to a control line 423.

In a write operation wherein data is read from the main memory 12 of FIG. 1 and written into a disk device serviced by the device adapter 14, a problem may arise during the transfer of a sequence of data bytes. If a request for additional data is not issued by the MPDC 10 when a data byte is received from the main memory unit 12, other system devices may intercede to communicate with the memory unit. The MPDC thus would not be able to maintain a transfer rate to the disk device. If a request for data is made without regard for empty buffer locations, data stored in the data register 82 of FIG. 4 may be lost before the full range of data to be transferred from main memory has been written upon the disk device. The logic system of FIG. 8 provides a means for obviating such a problem.

In operation, when data is to be transferred from the main memory unit 12 to the MPDC 10, firmware issues a logic 1 signal to control line 417. If the megabus 13 is clear for a data transfer, the bus logic unit 128 of FIG. 5 issues a logic 1 signal to control line 422 to indicate that the megabus 13 is ready. Further, until the data transfer is completed, the control line 421 leading from the range and offset range control unit 77 remains at a logic 1 level to indicate that the range count has not been exhausted. The output of gate 420, therefore, is at a logic 1 level which is applied to the D input of the flip-flop 418.

Prior to any data being transferred to the MPDC 10, the FIFO's 408, 410 and 411 are empty. The IPR output of FIFO 411 thus is at a logic 1 level indicating that the input register is empty. Further, the bus logic unit 128 supplies a logic 1 signal to control line 416a during a time period when the MPDC 10 is not using the megabus 13 in servicing a bus cycle request. Thus, the output of the gate 416 is at a logic 1 level to toggle the flip-flop 418, thereby issuing a bus cycle request on line 419 leading to the bus logic unit 128.

In generating a bus cycle request for output on the megabus 13, the bus logic unit 128 issues a logic 1 signal to control line 423 to indicate that an MPDC 10 bus cycle request has been issued. The firmware control signal on control line 417 thereupon is applied through gate 414 to the load input of FIFO 411. A dummy byte or control flag byte thereby is loaded into the FIFO under firmware control, and the IPR output of the FIFO transitions to a logic zero level. It is thus seen that each time a cycle request is generated at the Q output of flip-flop 418 to request additional data from main memory unit 12, a dummy byte is loaded into the FIFO 411.

When the main memory unit responds to the bus cycle request, the bus logic unit 128 issues a logic zero signal to control line 423 and a logic 1 signal to control lines 412 and 413. Data bytes supplied by the main memory unit 12 to the megabus 13 thereby are loaded from data cables 408a and 410a into FIFO 408 and FIFO 410, respectively. The bus logic unit 128 thereupon transitions the control line 416a to a logic 1 level to indicate that the bus cycle request for data has become inactive. If the dummy data byte loaded into the FIFO 411 has dropped from the input register into the FIFO stack, the IPR output of the FIFO will transition to a logic 1 level to again trigger the flip-flop 418 to issue another cycle request on control line 419.

The above-described process continues until the FIFOs 408 and 410 are filled as indicated by the output register (OPR) outputs of the FIFOs. The FIFO 411 thus serves to indicate in advance that if a data word is loaded into the data FIFOs 408 and 410, the data word will pass into the FIFO stack before another data word can be requested of main memory unit 12. More particularly, each time a data request is made to main memory unit 12 a dummy byte is loaded into the FIFO 411. If the dummy byte has passed into the FIFO stack before a next data request is made to main memory, then the time delays are such that it is known that the data bytes in the FIFOs 408 and 410 shall pass into the respective FIFO stacks before additional data bytes are received from main memory.

When the FIFO units 408 and 410 are filled with data, the OPR outputs of the FIFO units are at a logic zero level indicating a filled condition. Further, the IPR output of FIFO 411 is at a logic zero level. The gate 416 thus is disabled, and the generation of cycle requests on control line 419 is terminated.

When the OPR output of FIFO 411 transitions to a logic 1 level to indicate that the data FIFOs 408 and 410 are filled, the hardware control unit 108 issues a strobe to the adapter logic unit 29. The logic unit 29 in turn issues a strobe to the device adapter 14 to indicate that the data FIFOs may be emptied. The device adapter 14 thereon issues a logic 1 hardware service request signal to control line 404, and the firmware in response thereto issues a hardware enable signal to control line 402. The firmware further issues a logic 1 signal to control line 401 to indicate that a write on disk operation has been initiated.

The flip-flop 407 is triggered by the output of gate 403, and toggles between set and reset conditions. For example, if the flip-flop is in a set condition, it resets upon being triggered. Further, if the flip-flop is in a reset condition, it sets upon being triggered. The Q and Q outputs of the flip-flop thereby alternately trigger the flip-flops 405 and 406 respectively. If the flip-flop 405 is triggered, the Q output of the flip-flop is applied to the TOP input of the FIFO 408. In response thereto, the data byte in the output register of the FIFO is supplied to data cable 408b leading to the device adapter 14. When the output register is emptied, the OPR output of the FIFO 408 immediately resets the flip-flop 405. In like manner, when the flip-flop 406 is triggered, the Q output of the flip-flop supplies an unload signal to the FIFO 410. When the output register of the FIFO is emptied, the OPR output of the FIFO resets the flip-flop 406. It is apparent that the flip-flop 407 in combination with the flip-flops 405 and 406 alternately selects data bytes from FIFO 408 and FIFO 410. The data bytes transmitted to the device adapter 14 thus are comprised of a left byte from FIFO 408 and a right byte from FIFO 410.

Each time the FIFO 410 is unloaded, the FIFO 411 also is unloaded. As soon as the input register to the FIFO 411 is emptied, the IPR output of the FIFO transitions to a logic 1 level to generate a cycle requests as before described. As data bytes are loaded into the FIFOs 408 and 410, the FIFOs again are unloaded. Before a cycle request for a next data byte is requested from main memory unit 12, however, the input register to the FIFO 411 must be emptied.

Two conditions may occur which may prevent the generation of a cycle request on control line 419 when the input register to FIFO 411 is empty. When the range count indicating the total number of data bytes to be transferred from main memory unit 12 to the device adapter 14 is exhausted, line 421 transitions to a logic zero. Further, if an unsolicited bus request or other data occurs on the megabus 13 to cause the MPDC 10 to issue a NAK, the gate 420 is disabled. The Q output of the flip-flop 418 thus does not transition to a logic 1 level when triggered, and no further cycle requests may be made.

In summary, the invention is comprised of a logic data transfer control system responsive to both firmware and hardware control, and including data FIFOs operating in parallel with a predictor FIFO. Each time a data word is loaded from main memory to the data FIFOs, the input register of the predictor FIFO is sensed. If the input register is empty, a data request is issued to main memory and the predictor FIFO is loaded with a dummy byte. Since no data request is issued unless the input register of the predictor FIFO is empty, no data is lost.

When the data FIFOs are filled, the predictor FIFO is filled and no further data requests may be made without unloading data bytes to the disk device. Each time the right data FIFO is unloaded, the predictor FIFO is unloaded. Synchronization between the predictor FIFO and the data FIFO thereby is provided.

The look-ahead characteristic of the predictor FIFO may be seen in the sequence of operating steps. When a data request to main memory is made, the predictor FIFO thereafter is loaded with a dummy byte. The data FIFOs, however, are not loaded until a data byte is received from main memory. Thus, if the dummy byte in the predictor FIFO has dropped into the FIFO stack by the time a data word is loaded into the data FIFOs, a prediction can be made that the newly received data word will drop into the FIFO stacks before a next data word is received. Under these conditions, a next request for data is issued to main memory.

FIG. 9

Figure 9:
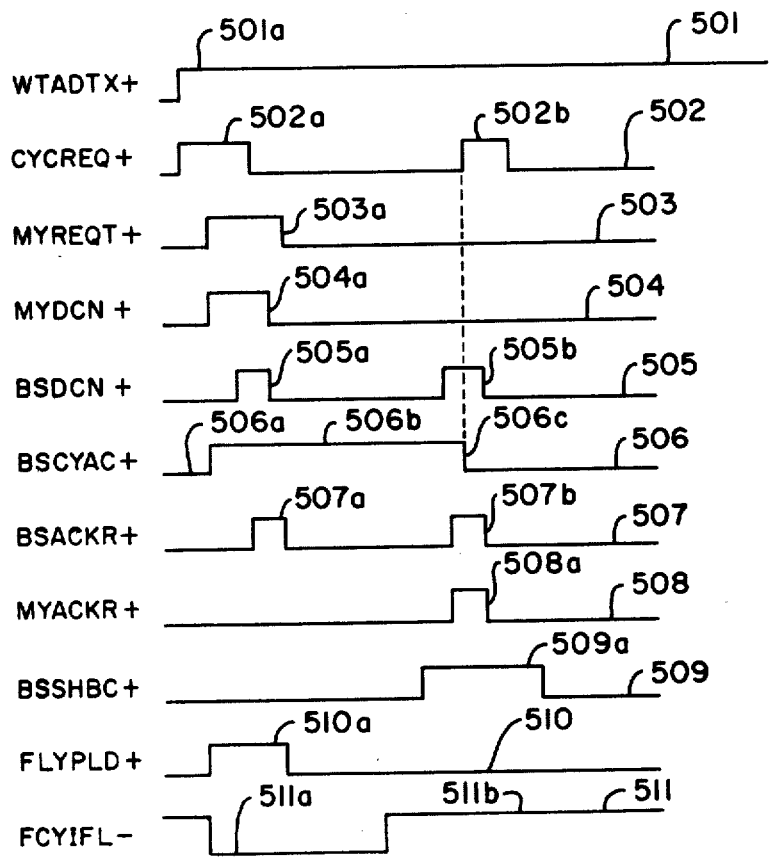
FIG. 9 is a timing diagram of the operation of the system of FIG. 8.

FIG. 9 is a timing diagram illustrating in graphic form the operation of the system of FIG. 8.

It is to be understood that the system disclosed herein is comprised of devices in intercommunication on an asynchronous bus. Thus, absolute time values are not disclosed in the description of the timing diagrams of FIGS. 9-11. It is the order of occurrence rather than the absolute time of occurrence which is of primary importance.

Referring to FIG. 9, a waveform 501 illustrates a signal issued by firmware to place the MPDC 10 into a write mode, and a waveform 502 illustrates a cycle request signal issued by the bus logic unit 128 of FIG. 5 in response to firmware commands. A waveform 503 illustrates a bus cycle request made by the MPDC 10 to the megabus 13, and a waveform 504 illustrates a strobe issued by the bus logic unit 128 to set the cycle request logic signals of waveform 502 onto the megabus 13 as indicated by waveform 503. A waveform 505 illustrates a logic signal formed on the megabus 13 in response to the logic signals of waveforms 503 and 504. A waveform 506 illustrates a waveform generated in the MPDC 10 to indicate that the MPDC is busy. A waveform 507 illustrates a logic signal issued by a slave to the megabus 13 in response to a bus request issued by a master device. A waveform 508 illustrates an acknowledgement logic signal issued by the MPDC 10 to the megabus 13 in response to a second-half bus cycle signal from the main memory unit 12 as illustrated by a waveform 509. A waveform 510 illustrates the load signal issued by the gate 414 to the FIFO 411 of FIG. 8, and a waveform 511 illustrates the logical inverse of the input register output of the FIFO 411.

In the mnemonics used to describe the waveforms 501-511 in FIG. 9, a plus sign (+) indicates that the condition signified by the mnemonic occurs when the associated waveform is at a logic 1 level. A negative sign (−) indicates that the designated condition occurs when the waveform is at a logic zero level.

Figure 11:
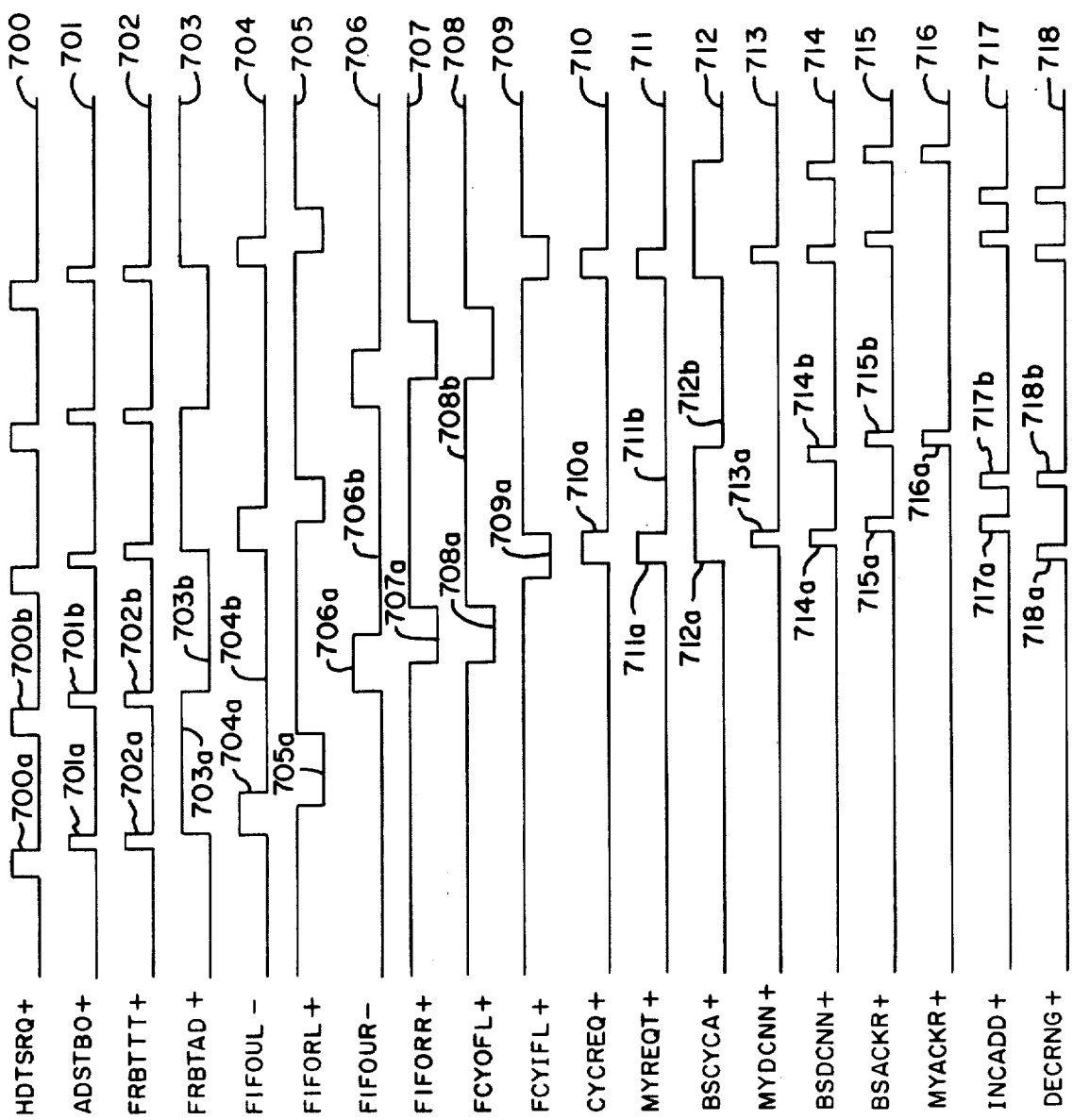
FIG. 11 is a timing diagram of the operation of the system of FIGS. 4-8 during a data transfer from the main memory unit to the disk adapter of FIG. 1.

When data is to be written from main memory unit 12 of FIG. 1 to a disk device serviced by the device adapter 14, firmware transitions the control line 417 of FIG. 8 to a logic 1 level as indicated at 501a of waveform 501. Since the bus cycle is not active as indicated at 506a of waveform 506, the MPDC 10 is not engaged in servicing a previous bus cycle request. Thus the control line 416a is at a logic 1 level, and a logic 1 signal issued by the input register FIFO 411 as illustrated at 511a of FIG. 11 is applied through the gate 416 to trigger the flip-flop 418. The Q output of flip-flop 418 thereupon transitions to a logic one level as illustrated at 502a. The cycle request 502a thereby is placed onto the megabus 13 as control line 419. When a cycle of the megabus 13 is available, the bus logic unit 128 of FIG. 5 will issue a logic 1 pulse 504a to place the cycle request 502a onto the megabus 13 as illustrated by the logic 1 pulse 503a. The signal appearing on the megabus 13 in response to the pulses 503a and 504a is illustrated by a logic 1 pulse 505a of waveform 505.

The bus logic unit 128 issues a logic 1 pulse 506b concurrently with pulse 504a to indicate that the bus cycle is active, i.e., the MPDC 10 is busy. In response thereto, the output of gate 414 transitions to a logic 1 level as illustrated by a logic 1 pulse 510a to load a dummy byte into the FIFO 411. Upon receiving the bus cycle request from the MPDC 10, the main memory unit 12 acknowledges its acceptance of the request by issuing a logic 1 pulse 507a of waveform 507.

When the dummy byte is loaded into the FIFO 411, the waveform 511 transitions to a logic zero level as indicated at 511a. Since gate 416 will be disabled during the time period that waveform 511 remains at a logic zero level, no further bus cycle requests may be made until the waveform again transitions to a logic 1 level.

When the main memory unit 12 has retrieved a requested data word and placed it on the megabus 13, the memory unit issues a logic 1 pulse 509a to indicate that the data is available. Further, the memory unit issues a logic 1 pulse 505b. Upon receiving the pulses 505b and 509a, the bus logic unit 128 issues an acknowledgement logic 1 pulse 508a which appears on the megabus 13 as logic 1 pulse 507b. Upon receiving the pulse 507b, the main memory unit releases the megabus 13 to accommodate another bus cycle request. Upon issuing the pulse 508a, the MPDC 10 is no longer in a bus cycle active state as indicated at 506c. Since the output of the input register of the FIFO 411 is again empty as indicated at 511b, a logic 1 pulse 502b is supplied at the Q output of flip-flop 418 to initiate a next bus cycle request operation.

FIG. 10

Figure 10:
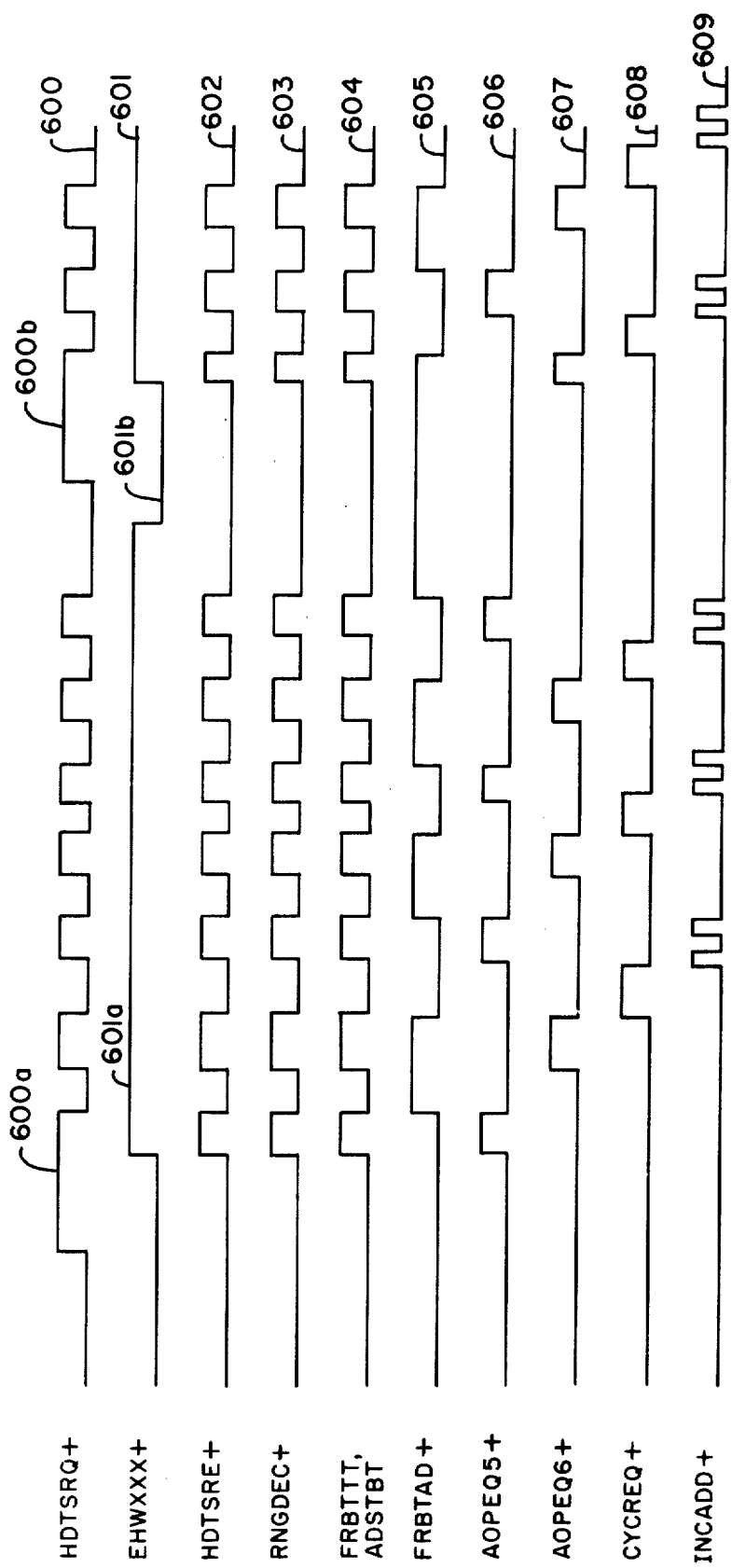
FIG. 10 is a timing diagram of the operation of the system of FIGS. 4-8 during a data transfer from a disk device to the common communication bus.

FIG. 10 is a timing diagram illustrating the operation of the system of FIGS. 4-8 during a data transfer from a disk device to megabus 13.

A waveform 600 illustrates the hardware data service request signal issued by the device adapter 14 to control line 110 of FIG. 4, and a waveform 601 illustrates the hardware enable signal issued by firmware in response to the waveform 600. A waveform 602 illustrates a hardware data service enable signal which is a logical AND of waveforms 600 and 601. Waveform 602 illustrates the enable signal applied by firmware to the EN2 enable input of range clock logic unit 316 of FIG. 7 during diagnostic tests.

A waveform 603 illustrates the output of range clock logic unit 316 in response to the enable signal illustrated by waveform 602. A waveform 604 illustrates the output of gate 403 of FIG. 8, and the output of the adapter logic unit 29 of FIG. 4. A waveform 605 illustrates the inverse to the Q output of flip-flop 407 of FIG. 8.

Waveforms 606 and 607 each are formed from waveforms 604 and 605, and indicate the output states of the flip-flop 407. A waveform 608 illustrates the bus cycle request signals issued at the Q output of flip-flop 418 of FIG. 8, and a waveform 609 illustrates the pulse pairs generated by the address clock logic unit 304 each time a cycle request is made as illustrated by waveform 608.

When data is to be read from a disk device, the device adapter 14 of FIG. 4 issues a logic 1 pulse 600a to control line 110 to indicate that a data byte is available for transfer to the MPDC 10. In response thereto, the firmware control system of FIG. 6 issues an enable hardware pulse 601a to the control line 109 of FIG. 4 leading to the hardware control unit 108. As the data byte is transferred from the device adapter 14 to the MPDC 10, the timing signal illustrated by waveform 602 is applied to the range clock logic unit 316 of FIG. 7. In response thereto, the offset range counters 308 and 309 are decremented until the offset range count is exhausted. The range counters 306 and 307 thereafter are decremented as illustrated by the logic 1 pulses of waveform 603.

Each time data bytes are transferred from the device adapter 14 to the MPDC 10, the output of gate 403 as illustrated by the waveform 604 triggers the flip-flop 407. When the Q output of flip-flop 407 is at a logic 1 level, flip-flop 405 is triggered to load a left byte in bus data register 100 for transfer to the megabus 13. This condition is illustrated by the logic 1 levels of waveform 605 and waveform 607. When the Q output of the flip-flop 407 transitions to a logic 1 level, the flip-flop 406 is triggered to load a right byte in register 100 for transfer to the megabus 13. This condition is illustrated by the logic zero levels of waveform 605 and the logic 1 levels of waveform 606.

When a data word comprising a left and a right data byte have been formed in the register 100, the bus logic unit 128 under firmware control issues a bus cycle active signal to control line 416a of FIG. 8 to trigger the flip-flop 418. A bus cycle request thereby is generated as illustrated by the logic 1 levels of waveform 608. Each time a busy cycle request is generated, the bus logic unit 128 enables the address clock logic unit 304 to issue logic 1 pulse pairs as illustrated by waveform 609. The main memory address stored in the bus address counters 300, 302 and 303 thereupon is incremented by two.

Should an interim condition arise wherein data is not available for transfer to the MPDC 10 before the range count has been exhausted, the device adapter issues an interrupt to line 125 of FIG. 4 to return control from the system hardware system to the firmware. In that event, the enable hardware signal of waveform 601 transitions to a logic zero level as indicated at 601b. No further MPDC activity occurs until the device adapter 14 indicates that data again is available for transfer by issuing a logic 1 pulse 600b to line 110 of FIG. 4. The data transfer thereafter continues as before described until the range counter is exhausted.

FIG. 11

FIG. 11 is a timing diagram illustrating the operation of the system of FIGS. 4–8 during a write operation.

A waveform 700 illustrates the hardware data service request signal issued by the device adapter 14 to the control line 110 of FIG. 4, and a waveform 701 illustrates a strobe signal issued by the adapter logic unit 29 to control lines 29a and 118b of FIG. 4. A waveform 702 illustrates the output of gate 403 of FIG. 8, and a waveform 703 illustrates the logic inverse of the Q output of the flip-flop 407. A waveform 704 illustrates the logic inverse of the Q of flip-flop 405, and a waveform 705 illustrates the output register (OPR) output of FIFO 408.

A waveform 706 illustrates the logic inverse of the Q output of flip-flop 406, and a waveform 707 illustrates the OPR output of flip-flop 410. A waveform 708 illustrates the OPR output of FIFO 411, and a waveform 709 illustrates the logic inverse of the IPR output of FIFO 411. A waveform 710 illustrates the Q output of flip-flop 418, and a waveform 711 illustrates a bus cycle request signal generated by the bus logic unit 128 in response to the waveform 710.

A waveform 712 illustrates a bus cycle active signal placing the MPDC 10 in a busy state in response to the bus cycle request pulses of waveform 711. A waveform 713 illustrates a data cycle signal issued by the bus logic unit 128 to indicate a time period in which the main memory unit 12 must acknowledge a data request from the MPDC 10. A waveform 714 illustrates the bus request and acknowledgement pulses occurring on the megabus 13 as a result of the handshaking between the MPDC and the main memory. A waveform 715 illustrates the bus acknowledgement pulses issued by a slave system device in response to a bus request from a master system device, and a waveform 716 illustrates MPDC acknowledgement pulses which are reflected in the pulses of waveform 715. A waveform 717 and a waveform 718 respectively illustrate address increment pulses and range decrement pulses generated during the transfer of data from main memory unit 12 to the device adapter 14.

Prior to the transfer of data from main memory, the device adapter 14 positions the write heads of a disk device at a designated record. After the disk device is prepared for a write operation, the adapter 14 issues a hardware service request signal as illustrated by pulse 700a to the control line 110. The bus logic unit 128 thereupon requests data from the main memory unit 12. The main memory unit 12 in response thereto, supplies data to the data register 82 of FIG. 4. Under control of the data control unit 113, the data is transferred from data register 82 into the data FIFOs 408 and 410. When the data FIFOs are filled, the hardware control unit 108 signals the adapter logic unit 29. The logic unit 29 in turn issues a strobe pulse 701a to the device adapter 14 to indicate that a data byte is being transferred. Concurrently, gate 403 of FIG. 8 issues a pulse 702a to select a data byte from one of the FIFOs 408 and 410 for transfer to the device adapter 14. In response to the gate 403 output, flip-flop 407 of FIG. 8 issues a pulse 703a to trigger the flip-flop 405. Flip-flop 405 in turn issues a pulse 704a to select a data byte from the FIFO 408.

When the data byte is taken from the output register of the FIFO 408, the OPR output of the FIFO transitions to a logic zero level as indicated at 705a. The OPR output further resets the FIFO 405 as indicated at 704b of waveform 704. When the data byte has been taken by the device adapter 14, the adapter issues a second hardware data service request pulse 700b. In response thereto, the adapter logic 29 pulse 701b and the gate 403 pulse 702b are generated as before described. Upon the occurrence of pulse 702b, the Q output of the flip-flop 407 triggers the flip-flop 406 as indicated at 703b of waveform 703. The Q output of flip-flop 406 thereupon issues a logic 1 pulse 706a to unload the output register of the FIFO 410. When the data byte is transferred out of the output register, the OPR output of the FIFO 410 transitions to a logic zero as indicated at 707a of waveform 707. In response to the logic transition of the OPR output, the flip-flop 406 is reset as indicated at 706b.

As before described, the FIFO 411 is unloaded at the same time the FIFO 410 is unloaded. Thus, when the OPR output of FIFO 410 transitions to a logic zero, the OPR output of FIFO 411 also transitions to a logic zero as indicated at 708a of waveform 708. When an additional dummy byte enters the output register of FIFO 411, the OPR output transitions to a logic 1 as indicated at 708b. In addition, the input register output IPR changes state as indicated at 709a. A bus cycle request on control line 419 thereby is initiated as indicated by logic one pulse 710a. In response to pulse 710a, the bus logic unit 128 of FIG. 5 issues a strobe pulse 713a to place the cycle request pulse 710a onto the megabus 13 as indicated by pulse 711a. Upon the occurrence of the strobe 713a and the pulse 711a, a pulse 714a is carried by the megabus 13 to the main memory unit 12.

When the cycle request pulse 710a is generated, the bus logic unit 128 places the MPDC 10 in a busy state as indicated by the logic 1 pulse 712a. During the time period of the pulse 712a, the MPDC 10 issues a data request to the main memory unit 12 as indicated by pulse 714a and awaits a response.

If the memory unit 12 accepts the bus cycle request and the main memory address supplied by MPDC 10, the main memory unit issues a pulse 715a. In response thereto, the bus logic unit 128 of FIG. 5 transitions the bus cycle request signal illustrated by waveform 711 to a logic zero level as indicated at 711b. During a time period not exceeding that indicated by the logic 1 pulse 712a, the main memory unit retrieves the contents at the indicated main memory address and supplies the data to the megabus 13. In addition, the main memory unit issues a pulse 714b to notify the MPDC 10 that data at the indicated main memory address is forthcoming. In response thereto, the bus logic unit 128 issues a strobe 716a to place an acknowledgement pulse 715b on the megabus 13. Concurrently therewith, the bus logic unit removes the MPDC 10 from the busy state as indicated by the logic zero level 712b of waveform 712.

The above-described process is repeated until the total number of data bytes indicated by the range count has been transferred from the main memory unit 12 to the device adapter 14.

During the data transfer process, the bus address counters 300, 302 and 303 are incremented and the range counters 306-309 are decremented. More particularly, the address counters are incremented twice as indicated by pulses 717a and 717b each time a data request is made to the main memory unit 12 as indicated by pulse 715a. Further, the range counters are decremented each time a data byte is requested by the MPDC 10 from the main memory unit 12. One decrement command as illustrated by pulse 718a is issued when a request 710a for a data word is issued. A second decrement command as illustrated by pulse 718b is issued by the main memory unit 12.

```
MODEL: MPDC-REV3D                               RTL/6000 FILE EDIT           08/01/77    12.605  PAGE:   1
REVISION: 000.00                                PARAMETER SECTION            DOC.#1

LINE #
   1000 PARAMETERS:
   2000 MODEL MPDC-REV3D:
   3000 SPACE 1
   4000
   5000    \     **       **    *******    *****    *******
   6000          * *     * *    *     *    *   *    *
   7000          * * *   * *    *     *    *   *    *
   8000          *   *   * *    *******    *   *    *
   9000          *   *   * *    *          *   *    *
  10000          *     * * *    *          *   *    *
  11000          *       * *    *          *****    *******
  12000                                                                 \
  13000    \
  14000          THE MPDC IS A VERTICAL MICROPROCESSOR.  EACH WORD
  15000          IS SIXTEEN BITS WIDE WITH THE LEFTMOST THREE BITS
  16000          AN EFFECTIVE OP-CODE.  THE FIELD USAGE FOR THE
  17000          SEVERAL MICRO-INSTRUCTION TYPES IS-
  18000                                                                 \
  19000    .
  20000          COMMAND TYPE    OP-CODE
  21000          ------------    -------
  22000                                                                 \
  23000    \     MISCELLANEOUS   000      COMMAND 3-13                  \
  24000    \     RFU             001      COMMAND 3-13                  \
  25000    \     BUS LOGIC       010      COMMAND 3-13                  \
  26000    \     ALU             011      AOP 3-3,15-1,BOP 6-2,CMD 8-8  \
  27000    \     CONSTANT        100      AOP 3-3, COMMAND 11&13        \
  28000    \     SCRATCHPAD      101      COMMAND 3-13                  \
  29000    \     TEST            110      COMMAND 6-4, CONDITION 10-6   \
  30000    \     BRANCH          111      COMMAND 3, ADDRESS 4-12       \
  31000
  32000 SKIP HOF                                                        !

MODEL: MPDC-REV3D                               RTL/6000 FILE EDIT           08/01/77    12.605  PAGE:   2
REVISION: 000.00                                PARAMETER SECTION            DOC.#1

LINE #
  33000
  34000
  35000    \ PARAMETERS                                             \;
  36000
  37000
  38000 ROMDEF  :AIN,16,4096,0000#,;$UPC5                           !
  39000
  40000
  41000
  42000 BRCHFLD  BAD,ABS,4/12       \  BRANCH-ADDRESS FIELD DEFINITION  \;
  43000
  44000
  45000
  46000 CNSTFLD  OPC,0/3            \     OP-CODE FIELD DEFINITION      \;
  47000
  48000
  49000 CNSTFLD  COM,3/13           \  GENERAL COMMAND FIELD DEFINITION \;
  50000
  51000
```

```
MODEL: MPDC-REV30                           RTL/6000 FILE EDIT
REVISION: 000.00                            PARAMETER SECTION
                                                -continued
LINE #
  52000 CNSTFLD  AOP,3/3        \   COMMON A-OP FIELD DEFINITION    \!
  53000
  54000
  55000 CNSTFLD  AOP0,15/1      \ AOP BIT 0                         \!
  56000
  57000
  58000 CNSTFLD  BOP,6/2        \ BOP FIELD DEFINITION FOR ALU U-OPS \!
  59000
  60000
  61000 CNSTFLD  CON,6/5,12/1,14/2  \  CONSTANT FIELD DEFINITION    \!
  62000
  63000
  64000 CNSTFLD  CSWORD,0/16    \ FULL WORD FIELD FOR HALTS FILL    \!
  65000
  66000
  67000 CNSTFLD  SCOM,6/8       \ SCRATCH-PAD COMMAND DEF. WITH A-OP \!
  68000
  69000
  70000 CNSTFLD  TCOM,10/5      \ TEST-SKIP-MUX INPUT SELECT FIELD  \!
  71000
  72000
  73000 CNSTFLD  TST,6/4        \    TEST-COMMAND TYPE SELECTOR     \!
  74000
  75000
  76000 CNSTFLD  XCOM,6/10      \ GENERAL COMMAND FIELD, A-OP CASE  \!
  77000
  78000
  79000 CNSTFLD  R,3/1          \ UPAC-SRAR LOAD CONTROL FOR GTO-LRA \!
  80000
  81000
  82000 CNSTFLD  W,8/1          \ COMMAND FIELD FOR ALU PREVIOUS C-O \!
  83000
  84000
  85000 CNSTFLD  L,9/1          \ COMMAND FIELD FOR A-OP DESTINATION \!
  86000
  87000
  88000 CNSTFLD  ALU,10/5       \ ALU MODE, CE*, AND CI* FOR ALU OPS \!

MODEL: MPDC-REV30                           RTL/6000 FILE EDIT
REVISION: 000.00                            PARAMETER SECTION

LINE #
  89000
  90000
  91000 CNSTFLD  E,11/1         \   COMMAND BIT FOR CONSTANT MICRO  \!
  92000
  93000
  94000 CNSTFLD  T,13/1         \   COMMAND BIT FOR CONSTANT MICRO  \!
  95000
  96000 SKIP HOF                                                     ;

MODEL: MPDC-REV30                           RTL/6000 FILE EDIT
REVISION: 000.00                            PARAMETER SECTION

LINE #
  97000
  98000
  99000 CNSTFLD  UPCS00,0/1     \ MICRO-PROGRAM CONTROL-STORE BIT 00 \!
 100000
 101000
 102000 CNSTFLD  UPCS01,1/1     \ MICRO-PROGRAM CONTROL-STORE BIT 01 \!
 103000
 104000
 105000 CNSTFLD  UPCS02,2/1     \ MICRO-PROGRAM CONTROL-STORE BIT 02 \!
 106000
 107000
 108000 CNSTFLD  UPCS03,3/1     \ MICRO-PROGRAM CONTROL-STORE BIT 03 \!
 109000
 110000
 111000 CNSTFLD  UPCS04,4/1     \ MICRO-PROGRAM CONTROL-STORE BIT 04 \!
 112000
 113000
 114000 CNSTFLD  UPCS05,5/1     \ MICRO-PROGRAM CONTROL-STORE BIT 05 \!
 115000
 116000
 117000 CNSTFLD  UPCS06,6/1     \ MICRO-PROGRAM CONTROL-STORE BIT 06 \!
 118000
 119000
 120000 CNSTFLD  UPCS07,7/1     \ MICRO-PROGRAM CONTROL-STORE BIT 07 \!
 121000
 122000
 123000 CNSTFLD  UPCS08,8/1     \ MICRO-PROGRAM CONTROL-STORE BIT 08 \!
 124000
 125000
 126000 CNSTFLD  UPCS09,9/1     \ MICRO-PROGRAM CONTROL-STORE BIT 09 \!
 127000
 128000
 129000 CNSTFLD  UPCS10,10/1    \ MICRO-PROGRAM CONTROL-STORE BIT 10 \!
 130000
 131000
 132000 CNSTFLD  UPCS11,11/1    \ MICRO-PROGRAM CONTROL-STORE BIT 11 \!
 133000
 134000
 135000 CNSTFLD  UPCS12,12/1    \ MICRO-PROGRAM CONTROL-STORE BIT 12 \!
 136000
 137000
 138000 CNSTFLD  UPCS13,13/1    \ MICRO-PROGRAM CONTROL-STORE BIT 13 \!
 139000
 140000
 141000 CNSTFLD  UPCS14,14/1    \ MICRO-PROGRAM CONTROL-STORE BIT 14 \!
 142000
 143000
 144000 CNSTFLD  UPCS15,15/1    \ MICRO-PROGRAM CONTROL-STORE BIT 15 \!
 145000
 146000 SKIP HOF                                                     ;
```

```
MODEL: MPDC-REV3D                                    RTL/6000 FILE EDIT                08/01/77   12.605  PAGE:  5
REVISION: 000.00                                      PARAMETER SECTION                 DOC.#:

LINE #
 147000
 148000
 149000   \ SCRATCH-PAD SYMBOLIC-ADDRESS TO RELATIVE-ADDRESS CONVER-   \:
 150000   \ SION TABLE (NOTE THAT INDICATED ADDRESSES ARE RELATIVE TO  \:
 151000   \ THE BASE ADDRESS OF THE SEGMENT SELECTED BY THE SPMIR)-    \:
 152000
 153000 ARGDEF SPA (6/5,12/1,14/2)
 154000     CWD1/00#    RNG2/0D#    ST53/1A#    DID2/27#    WL07/34#
 155000     CWD2/01#    DFR1/0E#    ST54/1B#    CHN1/28#    WL08/35#
 156000     ILC1/02#    DFR2/0F#                CHN2/29#    WL09/36#
 157000     ILC2/03#    CNF1/10#                CPC1/2A#    WL10/37#
 158000                 CNF2/11#                CPC2/2B#    WL11/38#
 159000     DATL/05#    CNF3/12#                IDF1/2C#    WL12/39#
 160000     TSK1/06#    CNF4/13#    DTA1/20#    IDF2/2D#    LSTRW/FD#
 161000     TSK2/07#                DTA2/21#    WL01/2E#    SKSTK/FE#
 162000     ADR1/08#                            WL02/2F#    RWSTK/FF#
 163000     ADR2/09#                            WL03/30#    FWRV/3D#
 164000                             MON1/24#    WL04/31#    DEVST/3E#
 165000     MOD1/0B#    ST51/18#    DMA1/25#    WL05/32#    UNSEL/3F#
 166000     RNG1/0C#    ST52/19#    DID1/26#    WL06/33#                 ;
 167000
 168000 SKIP HOF                                                           ;

MODEL: MPDC-REV3D                                    RTL/6000 FILE EDIT                08/01/77   12.605  PAGE:  6
REVISION: 000.00                                      DICTIONARY SECTION                DOC.#:

LINE #
 169000   DICTIONARY                                                         ;
 170000
 171000   \ FOLLOWING ARE THE MICRO DEFINITIONS.  THESE ARE ARTIFIC-   \:
 172000   \ IALLY MAINTAINED IN ALPHABETICAL ORDER TO FACILITATE RE-   \:
 173000   \ TRIEVAL.                                                   \:
 174000
 175000
 176000
 177000 MICRO AACU (AOP/0#)              \ AOP= ACCUMULATOR (ACU) REG  \:
 178000
 179000
 180000 MICRO AAD0 (AOP/4#)              \ AOP= ADAPTER DATA-REGISTER  \:
 181000
 182000
 183000 MICRO AAD1 (AOP/5#)              \ AOP= ADAPTER IDENTITY BYTE  \:
 184000
 185000
 186000 MICRO AAD2 (AOP/6#)              \ AOP= ADAPTER STATUS REG. 1  \:
 187000
 188000
 189000 MICRO AAD3 (AOP/7#)              \ AOP= ADAPTER STATUS REG. 2  \:
 190000
 191000
 192000 MICRO AAD4 (AOP/4#,AOPO/1#)      \ AOP= ADAPTER STROBE          \:
 193000
 194000
 195000 MICRO AAD5 (AOP/5#,AOPO/1#)      \ AOP= ADAPTER STROBE          \:
 196000
 197000
 198000 MICRO AAD6 (AOP/6#,AOPO/1#)      \AOP= ADAPTER STROBE           \:
 199000
 200000
 201000 MICRO AAD7 (AOP/7#,AOPO/1#)      \AOP= ADAPTER STROBE           \:
 202000
 203000
 204000 SKIP HOF                                                             ;

MODEL: MPDC-REV3D                                    RTL/6000 FILE EDIT                08/01/77   12.605  PAGE:  7
REVISION: 000.00                                      DICTIONARY SECTION                DOC.#:

LINE #
 205000
 206000   \ THE FOLLOWING COMMANDS ARE USED FOR TRANSFERING DATA
 207000     EITHER TO OR FROM THE BUS INTERFACE LOGIC.
 208000     THE MEANING OF EACH CODE IS AS FOLLOWS-
 209000
 210000        SRIA BIT NOT SET         SRIA BIT SET
 211000     ABUS1=BUS ADD OUT         ABUS1=BUS DATA REG
 212000     ABUS2=BUS DATA OUT 1      ABUS2=BUS DATA IN 1
 213000     ABUS3=BUS DATA OUT 2      ABUS3=BUS DATA IN 2
 214000     ABUS4=BUS RANGE OUT       ABUS4=BUS ADD IN                 \:
 215000
 216000
 217000 MICRO ABUS1 (AOP/0#,AOPO/1#)     \AOP= BUS 1                    \:
 218000
 219000
 220000 MICRO ABUS2 (AOP/1#,AOPO/1#)     \AOP=BUS 2                     \:
 221000
 222000
 223000 MICRO ABUS3 (AOP/2#,AOPO/1#)     \AOP=BUS 3                     \:
 224000
 225000
 226000 MICRO ABUS4 (AOP/3#,AOPO/1#)     \AOP=BUS 4                     \:
 227000
 228000
 229000 MICRO ACN  (OPC/4#,E/0#,T/1#)    \    AOP = AOP AND CONSTANT    \:
 230000
 231000
 232000 MICRO ADD  (OPC/3#,ALU/12#)      \     ALU = AOP/ADD/BOP        \:
 233000
 234000
 235000 MICRO AIDX (AOP/3#)              \ AOP = INDEX REG              \:
 236000
 237000
 238000 MICRO AND  (OPC/3#,ALU/17#)      \     ALU = AOP/AND/BOP        \:
 239000
 240000
 241000 MICRO ANT  (OPC/3#,ALU/01#)      \ XFER A-OP* TO ALU OUTPUTS    \:
 242000
 243000
 244000 MICRO ASPA (AOP/2#)              \ AOP = SCRATCH-PAD ADD-REG.   \:
 245000
 246000
 247000 MICRO ASPAI (AOP/3#)             \AOP= S.P. ADD REG INDEXED     \:
 248000
 249000
 250000 MICRO ASPM (AOP/1#)              \ AOP = SCRATCH-PAD CONTENTS   \:
 251000
 252000
 253000 SKIP HOF                                                             ;
```

```
MODEL: MPDC-REV30                           RTL/6000 FILE EDIT
REVISION: 000.00                            DICTIONARY SECTION

LINE #
 254000
 255000 MICRO BACU  (BOP/0#)           \ BOP= ACCUMULATOR (ACU) REG \;
 256000
 257000
 258000 MICRO BNT   (OPC/3#,ALU/08#)   \ XFER B-OP# TO ALU OUTPUTS \;
 259000
 260000
 261000 MICRO BUST  (BOP/2#)           \ BOP = BUS STATUS          \;
 262000
 263000
 264000  \    THE FOLLOWING BITS ARE STORED WHEN BOP#2 IS SPECIFIED
 265000              BIT 0 - 0
 266000              BIT 1 - 0
 267000              BIT 2 - 0
 268000              BIT 3 - 0
 269000              BIT 4 - BUS YELLOW INDICATOR
 270000              BIT 5 - BUS NAK
 271000              BIT 6 - BUS PARITY ERROR
 272000              BIT 7 - BUS RED INDICATOR                     \;
 273000
 274000
 275000 MICRO BSPM  (BOP/1#)           \ BOP = SCRATCH-PAD CONTENTS \;
 276000
 277000
 278000 MICRO CLR   (OPC/0#,COM/1000#) \ CLEAR, INITIATES PROM SCAN \;
 279000
 280000
 281000 MICRO CLB   (OPC/2#,COM/0086#) \CLEAR BUS                  \;
 282000
 283000
 284000 MICRO CNST  (CON)              \ FIELD FOR CONSTANT IN UPIR \;
 285000
 286000
 287000 MICRO COTI  (W/1#)             \    ALU CI = PREVIOUS CO   \;
 288000
 289000
 290000 MICRO CRF   (OPC/0#,COM/0010#) \    CLEAR REGISTERS, FLOPS \;
 291000
 292000
 293000 MICRO CSHF  (CSWORD/0040#)     \ CONTROL-STORE HALTS FILLER \;
 294000
 295000
 296000 MICRO CSNF  (CSWORD/0000#)     \CONTROL STORE NOOP FILLER  \;
 297000
 298000
 299000 SKIP HOF                                                    ;

MODEL: MPDC-REV30                           RTL/6000 FILE EDIT
REVISION: 000.00                            DICTIONARY SECTION

LINE #
 300000
 301000 MICRO CYC   (OPC/2#,XCOM/020#) \ CYCLE BUS AS AOP DEFINES  \;
 302000
 303000
 304000  \    NOTE THAT THE "CYC" U-INSTRUCTION USES BITS
 305000       OF A SPECIFIED AOP FOR CONTROL OF THE BUS AS
 306000       FOLLOWS-
 307000              BIT 0    CYCLE
 308000              BIT 1    MEMORY REFERENCE
 309000              BIT 2    RESPONSE REQUIRED
 310000              BIT 3    SECOND HALF READ
 311000              BIT 4    BYTE MODE
 312000              BIT 5    READ
 313000              BIT 6    WRITE
 314000              BIT 7    RFU
 315000                                                             \;
 316000
 317000 MICRO DEC   (OPC/3#,ALU/1E#)   \    ALU = AOP/MINUS/ONE    \;
 318000
 319000
 320000 MICRO DHP   (OPC/0#,COM/0200#) \ DISABLE HARD DATA PATH    \;
 321000
 322000
 323000 MICRO DMA   (OPC/5#,COM/0008#) \DECREMENT S. P. ADDRESS    \;
 324000
 325000
 326000 MICRO DRC   (OPC/2#,XCOM/040#) \DECREMENT RANGE COUNTER    \;
 327000
 328000
 329000 MICRO ERP   (OPC/0#,COM/0600#) \ ENABLE HARD DATA PATH READS\;
 330000
 331000
 332000 MICRO EWP   (OPC/0#,COM/0601#) \ENABLE WRITE HARD PATH     \;
 333000
 334000
 335000 MICRO GTO (BAD) (OPC/7#,R/1#)  \    UNCONDITIONAL BRANCH   \;
 336000
 337000
 338000 MICRO HLT   (OPC/0#,COM/0040#) \    HALT MICROPROCESSOR    \;
 339000
 340000
 341000 MICRO IAC   (OPC/2#,XCOM/100#) \ INCREMENT ADD BUS COUNTER \;
 342000
 343000
 344000 MICRO IMA   (OPC/5#,COM/0100#) \ SPAC INCREMENT BY +1      \;
 345000
 346000
 347000 MICRO INC   (OPC/3#,ALU/0#)    \    ALU = AOP/PLUS/ONE     \;
 348000
 349000
 350000 MICRO INI   (OPC/0#,COM/0098#) \ INITIALIZE, ALL BUT UPAC  \;
 351000
 352000
 353000 MICRO LCN   (OPC/4#,E/0#,T/0#) \    LOAD CONSTANT TO A-OP  \;
 354000
 355000
```

```
MODEL: MPDC-REV3D                                   RTL/6000 FILE EDIT
REVISION: 000.00                                    DICTIONARY SECTION

LINE #
 356000 MICRO LIR   (OPC/5#,SCOM/OC#)     \LOAD INDEX REG FROM AOP       \;
 357000
 358000
 359000 MICRO LJC   (SPA)                 \ SPA LOAD VIA SYMBOLIC-REF.   \;
 360000
 361000
 362000 MICRO LRA   (BAD) (OPC/7#,R/O#)   \ LOAD RETURN REGISTER         \;
 363000
 364000
 365000 MICRO LRC   (OPC/5#,COM/0020#)    \ LOAD REQUESTING CHANNEL      \;
 366000
 367000
 368000 MICRO LSH   (OPC/3#,ALU/18#)      \    ALU = AOP LEFT-SHIFTED    \;
 369000
 370000
 371000 MICRO MBP   (OPC/5#,COM/0024#)    \ SET MODULE BAD PARITY        \;
 372000
 373000
 374000 MICRO MWT   (OPC/5#,SCOM/80#)     \ SCRATCH-PAD WRITE FROM AOP   \;
 375000
 376000
 377000 MICRO NND   (OPC/3#,ALU/09#)      \       ALU = (AOP/AND/BOP)*   \;
 378000
 379000
 380000 MICRO NOP   (OPC/0#,COM/0000#)    \          NO-OPERATION        \;
 381000
 382000
 383000 MICRO NOR   (OPC/3#,ALU/03#)      \       ALU = AOP/NOR/BOP      \;
 384000
 385000
 386000 MICRO OCN   (OPC/4#,E/1#,T/0#)    \     AOP = AOP/OR/CONSTANT    \;
 387000
 388000
 389000 MICRO ORR   (OPC/3#,ALU/1D#)      \       ALU = AOP/OR/BOP       \;
 390000
 391000
 392000 MICRO QLT   (OPC/0#,COM/0004#)    \ SET THE QLT FLOP (READY)     \;
 393000
 394000
 395000 MICRO RCR   (OPC/2#,XCOM/010#)    \ RESET CHANNEL-READY FLOP     \;
 396000
 397000
 398000 MICRO RDA   (OPC/0#,COM/0088#)    \ RESET DEVICE ADAPTER         \;
 399000
 400000
 401000 MICRO RIL   (OPC/2#,XCOM/001#)    \   RESET INTERRUPT LATCH      \;
 402000
 403000
 404000 MICRO RPC   (OPC/5#,XCOM/002#)    \   READ-ONLY PARITY CHECK     \;
 405000
 406000
 407000 MICRO RRB   (OPC/2#,XCOM/002#)    \ RESET REGISTER BUSY          \;
 408000
 409000
 410000 MICRO RSD   (OPC/0#,COM/0080#)    \   RESET DIAGNOSTIC MODE      \;
 411000

MODEL: MPDC-REV3D                                   RTL/6000 FILE EDIT
REVISION: 000.00                                    DICTIONARY SECTION

LINE #
 412000
 413000 MICRO RST   (OPC/2#,XCOM/084#)    \ RESET BUS STATUS             \;
 414000
 415000
 416000 MICRO RTN   (OPC/6#,TST/8#)       \ GO TO RETURN REGISTER        \;
 417000
 418000
 419000 MICRO SBA   (OPC/0#,COM/0002#)    \ SET BUS ACK                  \;
 420000
 421000
 422000 MICRO SCR   (OPC/2#,COM/0018#)    \   SET CHANNEL READY FLOP     \;
 423000
 424000
 425000 MICRO SEF   (OPC/0#,COM/0800#)    \ SET ERROR AND STATUS FLOPS   \;
 426000
 427000
 428000 MICRO SPT   (OPC/5#,COM/0080#)    \SET S. P. TEST MODE           \;
 429000
 430000
 431000 MICRO SRB   (OPC/2#,XCOM/004#)    \ SET REGISTER-BUSY FLOP       \;
 432000
 433000
 434000 MICRO SRIA  (L/1#)                \ DELIVER ALU RESULT TO A-OP   \;
 435000
 436000
 437000 MICRO SSPA  (OPC/4#,AOP/2#,E/0#,T/0#)      \ SET S-P ADDRESS OP  \;
 438000
 439000
 440000 MICRO SSPAI (OPC/4#,AOP/3#,E/0#,T/0#)      \SET INDEXED S.P. ADD \;
 441000
 442000
 443000 MICRO STD   (OPC/0#,COM/0180#)    \   SET DIAGNOSTIC MODE        \;
 444000
 445000
 446000 MICRO SUB   (OPC/3#,ALU/0C#)      \       ALU = AOP MINUS BOP    \;
 447000
 448000
 449000 MICRO TACK  (TCOM/07#)     \ TEST ACKRSP+00, BUS ACK RESPONSE    \;
 450000
 451000
 452000 MICRO TADB  (TCOM/14#)     \TEST BUSYXX+00,ADAPTER BUSY          \;
 453000
 454000
 455000 MICRO TAHR  (TCOM/00#)     \TEST HDTSRQ+00,ADAP HARD REQ         \;
 456000
 457000
 458000 MICRO TAX0  (TCOM/08#)     \ TEST ALUAX0-00, A-OP MUX BIT 0 OUT  \;
 459000
 460000
 461000 MICRO TAX1  (TCOM/09#)     \ TEST ALUAX1-00, A-OP MUX BIT 1 OUT  \;
 462000
 463000
 464000 MICRO TAX2  (TCOM/0A#)     \ TEST ALUAX2-00, A-OP MUX BIT 2 OUT  \;
 465000
 466000
 467000 MICRO TAX3  (TCOM/0B#)     \ TEST ALUAX3-00, A-OP MUX BIT 3 OUT  \;
```

```
MODEL: MPDC-REV3D                        RTL/6000 FILE EDIT              08/01/77   12.605  PAGE:  12
REVISION: 000.00                         DICTIONARY SECTION              DOC.#:

LINE #
  468000
  469000
  470000 MICRO TAX4  (TCOM/OC#)    \ TEST ALUAX4+00, A-OP MUX BIT 4 OUT \#
  471000
  472000
  473000 MICRO TAX5  (TCOM/OD#)    \ TEST ALUAX5+00, A-OP MUX BIT 5 OUT \#
  474000
  475000
  476000 MICRO TAX6  (TCOM/OE#)    \ TEST ALUAX6+00, A-OP MUX BIT 6 OUT \#
  477000
  478000
  479000 MICRO TAX7  (TCOM/OF#)    \ TEST ALUAX7+00, A-OP MUX BIT 7 OUT \#
  480000
  481000
  482000 MICRO TBCA  (TCOM/01#)    \TEST SHRCOM+00,BUS CYCLE ACTIVE       \#
  483000
  484000
  485000 MICRO TBSY  (TCOM/1B#)    \ TEST BDRBSY+00, BDR BUSY INDICATOR  \#
  486000
  487000
  488000 MICRO TBYT  (TCOM/1C#)    \TEST BBAD23+00,BYTE MODE              \#
  489000
  490000
  491000 MICRO TCOT  (TCOM/05#)    \ TEST ALUCOT+00, ALU CARRY-OUT LINE  \#
  492000
  493000
  494000 MICRO TDCN  (TCOM/17#)    \TEST MYDCNN+00, MY DCN                \#
  495000
  496000
  497000 MICRO TEQF  (TCOM/04#)    \ TEST ALUEQF+00, ALU OUTPUTS ARE FF  \#
  498000
  499000
  500000 MICRO TEQZ  (TCOM/03#)    \TEST ALUEQZ+00 ALU EQUALS 00          \#
  501000
  502000
  503000 MICRO TERR  (TCOM/16#)    \ TEST MEMERR-00, DMA-CYCLE ERR FLAG  \#
  504000
  505000
  506000 MICRO TFO   (OPC/6#,TST/2#)    \ IF TEST=1, SKIP NEXT WORD  \#
  507000
  508000
  509000 MICRO TFZ   (OPC/6#,TST/1#)    \ IF TEST=0, SKIP NEXT WORD  \#
  510000
  511000
  512000 MICRO TINT  (TCOM/1A#)    \ TEST RESINT+00, RESUME INTERRUPT   \#
  513000
  514000
  515000 MICRO TNAK  (TCOM/1B#)    \ TEST NAKRSP+00, NAK INDICATOR LINE \#
  516000
  517000
  518000 MICRO TNDR  (TCOM/15#)    \TEST NDTSRQ+00,NON-DATA REQUEST      \#
  519000
  520000
  521000 MICRO TNBR  (TCOM/1E#)    \ TEST NORQT3+00, NO BUFFER REQUEST  \#
  522000
  523000

MODEL: MPDC-REV3D                        RTL/6000 FILE EDIT              08/01/77   12.605  PAGE:  13
REVISION: 000.00                         DICTIONARY SECTION              DOC.#:

LINE #
  524000 MICRO TORH  (TCOM/16#)    \TEST OFRNGZ-00, OFFSET RANGE HISTORY\#
  525000
  526000
  527000 MICRO TORZ  (TCOM/10#)    \ TEST OFRGVL-00, OFFSET RANGE ZERO  \#
  528000
  529000
  530000 MICRO TPTY  (TCOM/1D#)    \ TEST BSPYCK+00, BUS PARITY CHECK   \#
  531000
  532000
  533000 MICRO TQLT  (TCOM/17#)    \ TEST BSQLTO-00, QLT OUTPUT LINE    \#
  534000
  535000
  536000 MICRO TREQ  (TCOM/06#)    \ TEST CREREQ+00, CHANNEL REQUEST    \#
  537000
  538000
  539000 MICRO TRGZ  (TCOM/11#)    \ TEST EQRXXX+00, RANGE EQUALS ZERO  \#
  540000
  541000
  542000 MICRO TRSP  (TCOM/02#)    \ TEST BSRSVP+30, BUS RESPONSE REQU. \#
  543000
  544000
  545000 MICRO TSAW  (TCOM/13#)    \TEST SPAWRP+00,SPA WRAPAROUND        \#
  546000
  547000
  548000 MICRO TSBS  (TCOM/12#)    \ TEST SBSOBS+00, SING BYTE STORED   \#
  549000
  550000
  551000 MICRO TUBR  (TCOM/19#)    \ TEST UBRQXX+00, UNSOLICTED BUS REQ \#
  552000
  553000
  554000 MICRO UPIR00     (UPCS00/1#)   \ SET UPCS WORD BIT 00 FOR LRC  \#
  555000
  556000
  557000 MICRO UPIR01     (UPCS01/1#)   \ SET UPCS WORD BIT 01 FOR LRC  \#
  558000
  559000
  560000 MICRO UPIR02     (UPCS02/1#)   \ SET UPCS WORD BIT 02 FOR LRC  \#
  561000
  562000
  563000 MICRO UPIR03     (UPCS03/1#)   \ SET UPCS WORD BIT 03 FOR LRC  \#
  564000
  565000
  566000 MICRO UPIR04     (UPCS04/1#)   \ SET UPCS WORD BIT 04 FOR LRC  \#
  567000
  568000
  569000 MICRO UPIR05     (UPCS05/1#)   \ SET UPCS WORD BIT 05 FOR LRC  \#
  570000
  571000
  572000 MICRO UPIR06     (UPCS06/1#)   \ SET UPCS WORD BIT 06 FOR LRC  \#
  573000
  574000
  575000 MICRO UPIR07     (UPCS07/1#)   \ SET UPCS WORD BIT 07 FOR LRC  \#
  576000
  577000
  578000 MICRO UPIR08     (UPCS08/1#)   \ SET UPCS WORD BIT 08 FOR LRC  \#
  579000
```

```
LINE #
580000
581000 MICRO UPIR09   (UPCS09/1#)   \ SET UPCS WORD BIT 09 FOR LRC  \!
582000
583000
584000 MICRO UPIR10   (UPCS10/1#)   \ SET UPCS WORD BIT 10 FOR LRC  \!
585000
586000
587000 MICRO UPIR11   (UPCS11/1#)   \ SET UPCS WORD BIT 11 FOR LRC  \!
588000
589000
590000 MICRO UPIR12   (UPCS12/1#)   \ SET UPCS WORD BIT 12 FOR LRC  \!
591000
592000
593000 MICRO UPIR13   (UPCS13/1#)   \ SET UPCS WORD BIT 13 FOR LRC  \!
594000
595000
596000 MICRO UPIR14   (UPCS14/1#)   \ SET UPCS WORD BIT 14 FOR LRC  \!
597000
598000
599000 MICRO UPIR15   (UPCS15/1#)   \ SET UPCS WORD BIT 15 FOR LRC  \!
600000
601000
602000 MICRO WDA   (OPC/5#,SCOM/B2#)    \COMBINED MWT & DMA DELAYED    \!
603000
604000
605000 MICRO WIA   (OPC/5#,SCOM/C0#)    \ COMBINED MWT & IMA DELAYED \!
606000
607000
608000 MICRO XFA   (OPC/3#,ALU/1F#)     \ XFER A-OP TO ALU OUTPUTS   \!
609000
610000
611000 MICRO XFB   (OPC/3#,ALU/15#)     \ XFER B-OP TO ALU OUTPUTS   \!
612000
613000
614000 MICRO XNR   (OPC/3#,ALU/13#)     \    ALU = AOP/XNOR/BOP      \!
615000
616000
617000 MICRO XOR   (OPC/3#,ALU/0D#)     \    ALU = AOP/XOR/BOP       \!
618000
619000
620000 MICRO ZER   (OPC/3#,ALU/07#)     \       ALU = ZERO           \!
621000
622000 SKIP HOF                                                      ;
```

```
LINE #
623000
624000
625000   \              HARDWARE TEST POINTS                          \
626000   \                                                            \
627000   \  THE FOLLOWING LIST GIVES TEST POINTS FOR SIGNIFICANT      \
628000   \  REGISTER OUTPUTS-                                         \
629000   \                                                            \
630000   \                    ACUMULATOR                              \
631000   \                                                            \
632000   \                                                            \
633000   \                 ALUAC0+00                                   \
634000   \                 ALUAC1+00                                   \
635000   \                 ALUAC2+00                                   \
636000   \                 ALUAC3+00                                   \
637000   \                 ALUAC4+00                                   \
638000   \                 ALUAC5+00                                   \
639000   \                 ALUAC6+00                                   \
640000   \                 ALUAC7+00                                   \
641000   \                                                            \
642000   \                                                            \
643000   \              SCRATCH PAD MEMORY                             \
644000   \                                                            \
645000   \  (INDEX MODE)    SPMICF+00                                  \
646000   \                                                            \
647000   \  (ADDRESS        SPMAS0+00                                  \
648000   \   SELECTOR)      SPMAS1+00                                  \
649000   \                                                            \
650000   \  (ADDRESS        SPMAC0+00                                  \
651000   \   COUNTER)       SPMAC1+00                                  \
652000   \                 SPMAC2+00                                   \
653000   \                 SPMAC3+00                                   \
654000   \                 SPMAC4+00                                   \
655000   \                 SPMAC5+00                                   \
656000   \                 SPMAC6+00                                   \
657000   \                 SPMAC7+00                                   \
658000   \                                                            \
659000   \                                                            \
660000   \  (MEMORY         SPMOT0+10                                  \
661000   \   OUTPUT)        SPMOT1+10                                  \
662000   \                 SPMOT2+10                                   \
663000   \                 SPMOT3+10                                   \
664000   \                 SPMOT4+10                                   \
665000   \                 SPMOT5+10                                   \
666000   \                 SPMOT6+10                                   \
667000   \                 SPMOT7+10                                   \
668000   \                                                            \
669000   \                                                            \
670000                                                                ;
671000 SKIP HOF
```

```
LINE #
672000
673000
674000   \           HARDWARE TEST POINTS (CONT.)                     \
675000
676000   \              BUS DATA REGISTER                             \
677000
678000   \                 MYAD16+00                                  \
679000   \                 MYAD17+00                                  \
680000   \                 MYAD18+00                                  \
681000   \                 MYAD19+00                                  \
```

```
MODEL: MPDC-REV3D                              RTL/6000 FILE EDIT
REVISION: 000.00                               DICTIONARY SECTION
                                                  -continued
LINE #
682000    \              MYAD20.00                            \
683000    \              MYAD21.00                            \
684000    \              MYAD22.00                            \
685000    \              MYAD23.00                            \
686000
687000
688000
689000
690000
691000
692000    \              BDC CHANNEL NUMBER                   \
693000    \              ------------------                   \
694000
695000    \ BUS ADDRESS BIT                                   \
696000
697000    \        08    BSASW1.00 HEX ROTARY SWITCH          \
698000    \        09    BSASW2.00 HEX ROTARY SWITCH          \
699000    \        10    BSASW3.00 HEX ROTARY SWITCH          \
700000    \        11    BSASW4.00 HEX ROTARY SWITCH          \
701000    \        12    BSASW5.00 HEX ROTARY SWITCH          \
702000    \        13    BSASW6.00 HEX ROTARY SWITCH          \
703000    \        14    BSASW7.00 HEX ROTARY SWITCH          \
704000    \        15    MSB OF ADAPTER PORT NUMBER           \
705000    \        16    LSB OF ADAPTER PORT NUMBER           \
706000    \        17    DIRECTION OF DATA TRANSFER, 0 = INPUT \
707000
708000 SKIP HOF                                               ;

MODEL: MPDC-REV3D                              RTL/6000 FILE EDIT
REVISION: 000.00                               DICTIONARY SECTION

LINE #
709000
710000
711000
712000   \  DEFINITION OF CONTROL-BYTES MAINTAINED FOR EACH OF  \
713000   \  THE ACTIVE CHANNELS.                                \
714000   \                                                      \
715000   \                                                      \
716000   \                                                      \
717000   \              DMA FLAG BYTE                           \
718000   \                 (DMA1)                               \
719000   \                                                      \
720000
721000   \DEFINITON-                                            \
722000
723000   \     BIT 0 - RESPONSE REQUIRED . IS SET OR RESET BY THE  \
724000   \             BUS REQUEST ROUTINE ACCORDING TO THE        \
725000   \             DIRECTION BIT.                              \
726000
727000   \     BIT 1 - UNUSED                                   \
728000
729000   \     BIT 2 - IMPLIED SEEK BIT, SET WHEN PERFORMING A  \
730000   \             TRACK OR CYLINDER LINK ON A SEARCH OPERATION \
731000
732000   \     BIT 3 - IGNORE READ ERRORS. THIS BIT IS SET IN ORDER \
733000   \             TO READ PACKS FORMATED WITH THE H-716 FORMAT \
734000
735000   \     BIT 4 - UNUSED                                   \
736000
737000   \     BIT 5 - UNUSED                                   \
738000
739000   \     BIT 6 - UNUSED                                   \
740000
741000   \     BIT 7 - UNUSED                                   \
742000
743000 SKIP HOF                                                 ;

MODEL: MPDC-REV3D                              RTL/6000 FILE EDIT
REVISION: 000.00                               DICTIONARY SECTION

LINE #
744000
745000
746000
747000   \              CHANNEL MONITOR FLAGS                   \
748000   \                  (MON1)                              \
749000
750000   \DEFINITION-                                           \
751000
752000   \     BIT 0 - INTERRUPT PENDING. IS SET BY THE INTERRUPT \
753000   \             SUBROUTINE WHEN AN INTERRUPT IS NAK'D.     \
754000
755000   \             THIS BIT IS RESET BY THE RESUME INTERRUPT  \
756000   \             SUBROUTINE WHEN THE INTERRUPT IS ACK'D     \
757000
758000   \             THIS BIT IS ALSO RESET WHEN EXECUTING A STOP \
759000   \             I/O OR WHEN INITIALIZING.                    \
760000
761000   \     BIT 1 - CHANNEL BUSY. IS SET BY THE BUS REQUEST   \
762000   \             ROUTINE WHEN A START-UP FUNCTION CODE     \
763000   \             (TASK)IS DETECTED.                        \
764000
765000   \             THIS BIT IS RESET BY THE INTERRUPT OR RESUME \
766000   \             INTERRUPT SUBROUTINES.                       \
767000
768000   \             THIS BIT IS ALSO RESET WHEN EXECUTING A STOP \
769000   \             I/O OR WHEN INITIALIZING.                    \
770000
771000   \     BIT 2 - STOP I/O. IS SET BY THE BUS REQUEST ROUTINE \
772000   \             WHEN A STOP I/O COMMAND IS DETECTED.         \
773000
774000   \             THIS BIT IS RESET BY THE INTERRUPT ROUTINE  \
775000   \             OR BY THE RESUME INTERRUPT SUBROUTINE WHEN  \
776000   \             THE INTERRUPT IS ACK'D. IT IS RESET BY THE  \
777000   \             INTERRUPT ROUTINE  IF THE INTERRUPT LEVEL IS \
778000   \             ZERO.                                        \
779000
780000   \             THIS BIT IS ALSO RESET WHEN INITIALIZING     \
781000
782000 SKIP HOF                                                 ;
```

```
LINE #
783000
784000
785000
786000   \   CHANNEL MONITOR (MON1) DEFINITION (CON'T.)-            \
787000   \                                                          \
788000   \                                                          \
789000   \     BIT 3 - SEEK ACTIVE BIT. IT IS SET BY THE SEEK
790000             ROUTINE AND IS USED BY THE POLLING LOOP
791000             IN ORDER TO DETERMINE WHEN TO SEND AN
792000             INTERRUPT AT THE COMPLETION OF A SEEK.           \
793000
794000   \     BIT 4 - INTERRUPT STORED. IS SET WHEN AN INTERRUPT
795000             CAN NOT BE SENT BECAUSE THE INTERFACE LOGIC
796000             IS LOADED TO EXECUTE A READ OR WRITE OPER-
797000             ATION . THE BIT IS RESET WHEN THE INTERRUPT
798000             IS SENT AFTER THE INTERFACE BECOMES NON BUSY     \
799000
800000   \     BIT 5 - RECALIBRATE OPERATION. IS SET IN ORDER TO    \
801000   \             SELECT PLATTER ZERO TRACK ZERO AT THE        \
802000   \             COMPLETION OF A RECALIBRATE OPERATION        \
803000
804000   \     BIT 6 - UNUSED                                       \
805000
806000   \     BIT 7 - UNUSED                                       \
807000
808000 SKIP HOF                                                     ;
```

```
LINE #
809000   \    AOPS
810000        ----
811000
812000   A0 A1 A2 A3   SRIA*       NMN        SRIA               NMN
813000
814000   0  0  0  0  ACCUMULATOR   AACU   - ACCUMULATOR           AACU
815000   0  0  0  1  S.P. MEMORY   ASPM   - S.P.MEMORY            ASPM
816000   0  0  1  0  S.P. ADDRESS  ASPA   - S.P.ADRS(INDEXED)*    ASPA
817000   0  0  1  1  INDEX REG.    AIDX   - S.P.ADRS(INDEXED)     ASPAI
818000   0  1  0  0  ADAP DATA REG AAD0   - ADAP DATA REG.        AAD0
819000   0  1  0  1  ADAP DEV. ID  AAD1   - ADAP DATA CNTR        AAD1
820000   0  1  1  0  ADAP STATS I  AAD2   - ADAP COMMAND REG.     AAD2 \
821000 \ 0  1  1  1  ADAP STATS II AAD3   - ADAP UNIT SELECT      AAD3
822000   1  0  0  0  BUS ADRS OUT  ABUS1  - BUS REG. IN           ABUS1
823000   1  0  0  1  BUS DATA OUT1 ABUS2  - BUS DATA IN 1         ABUS2
824000   1  0  1  0  BUS DATA OUT2 ABUS3  - BUS DATA IN 2         ABUS3
825000   1  0  1  1  BUS RNG OUT   ABUS4  - BUS ADDRESS IN        ABUS4
826000   1  1  0  0  ADAPTER RFU   AAD4   - ADAPTER RFU           AAD4
827000   1  1  0  1  ADAPTER RFU   AAD5   - ADAP STS+FIFO CLR     AAD5
828000   1  1  1  0  ADAPTER RFU   AAD6   - ADAP SEEK PULSE       AAD6
829000   1  1  1  1  ADAPTER RFU   AAD7   - ADAP DATA BYTE TKN    AAD7 \
830000
831000
832000   \    BOPS
833000        ----
834000
835000   B0 B1
836000
837000   0  0   ACCUMULATOR                                 BACU
838000   0  1   S.P. MEMORY                                 BSPM
839000   1  0   BUS STATUS                                  BBST
840000   1  1   USED TO DEFINE A CONSTANT FOR BOP                      \
841000
842000
843000   \ CYCLE                                   EOR READ   INPUT RNG
844000     BYTE         WRT  WRT  READ READ W/SINGLE   ADD
845000     DEFINITION   FLD1 FLDN FLD1 FLDN BYTE STORD ETC.
846000
847000   0 - CYCLE         0    0    0    0    1         1
848000   1 - MEMORY REF.   1    1    1    1    1         0
849000   2 - RESPONSE REQ. 1    1    0    0    0         0
850000   3 - 2ND HALF READ 0    0    0    0    0         1
851000   4 - BYTE MODE     X    0    X    0    1         0
852000   5 - READ          0    0    1    1    0         0
853000   6 - WRITE         1    1    0    0    0         0
854000   7 - RFU           0    0    0    0    0         0         \
855000
856000
857000 SKIP HOF                                                     ;
```

```
LINE #
858000   \    0 - MISCELLANEOUS
859000
860000        OPERATION              UPIR, BITS 00 - 15
861000
862000                        0 1 2 3 4 5 6 7 8 9 10 11 12 13 14 15 NMN
863000
864000
865000   NO OPERATION         0 0 0 0 0 0 0 0 0  0  0  0  0  0  0 NOP
866000   CLEAR COMMAND        0 0 0 1 0 0 0 0 0  0  0  0  0  0  0 CLK
867000   SET ERROR FLOPS      0 0 0 0 1 0 0 0 0  0  0  0  0  0  0 SEF
868000   ENABLE READ PATH     0 0 0 0 0 1 1 0 0  0  0  0  0  0  0 ERF
869000   ENABLE WRT PATH      0 0 0 0 0 1 1 0 0  0  0  0  0  0  1 EWF
870000   DSBL HDWR DATA PATH  0 0 0 0 0 0 1 0 0  0  0  0  0  0  0 DHF
871000   RESET DIAG. MODE     0 0 0 0 0 0 1 0 0  0  0  0  0  0  0 RSD
872000   SFT DIAG. MODE       0 0 0 0 0 1 1 0 0  0  0  0  0  0  0 STD
873000   HALT                 0 0 0 0 0 0 0 0 1  0  0  0  0  0  0 HLT \
874000   \
875000                        0 0 0 0 0 0 0 0 0  1  0  0  0  0  0
876000   CLEAR FLOP + REG.    0 0 0 0 0 0 0 0 0  0  1  0  0  0  0 CRF
877000   RESET DEV. ADAP      0 0 0 0 0 0 0 0 0  0  0  1  0  0  0 RDA
878000   SET QLT(BLT)DONE     0 0 0 0 0 0 0 0 0  0  0  0  1  0  0 JLT
879000   SET BUS ACK          0 0 0 0 0 0 0 0 0  0  0  0  0  1  0 SBA
880000                        0 0 0 0 0 0 0 0 0  0  0  0  0  0  1
881000   INITIALIZE           0 0 0 0 0 0 0 1 0  0  1  1  0  0  0 INI \
882000
883000
```

```
MODEL: MPDC-REV3D                              RTL/6000 FILE EDIT
REVISION: 000.00                               DICTIONARY SECTION
                                                  -continued
LINE #
 884000    \   1 - RESERVED                                              \
 885000
 886000
 887000    \   2 - BUS LOGIC                                             \
 888000    \
 889000        OPERATION               UPIR, BITS 00 - 15
 890000                          0 1 2 3 4 5 6 7 8 9 10 11 12 13 14 15 NMN
 891000
 892000    INC.ADDR CNTR         0 1 0 0 0 0 0 1 0 0 0 0 0 0 0 0 IAC
 893000    RESET STATUS          0 1 0 0 0 0 0 0 1 0 0 0 0 0 0 0 RST
 894000    DECR. RNG CNTR        0 1 0 0 0 0 0 0 0 1 0 0 0 0 0 0 DRC
 895000    CYCLE                 0 1 0 0 0 0 0 0 0 0 1 0 0 0 0 0 CYC
 896000    SET CHNL RDY          0 1 0 0 0 0 0 0 0 0 0 1 1 0 0 0 0 SCH
 897000    RESET CHNL RDY        0 1 0 0 0 0 0 0 0 0 0 1 0 0 0 0 RCH
 898000    SET REG. BUSY         0 1 0 0 0 0 0 0 0 0 0 0 0 1 0 0 0 SRB
 899000    RESET REG BSY         0 1 0 0 0 0 0 0 0 0 0 0 0 0 1 0 RRB
 900000    RST INTRPT LTCH       0 1 0 0 0 0 0 0 0 0 0 0 0 0 0 1 RIL
 901000    CLEAR BUS             0 1 0 0 0 0 0 1 0 0 0 0 1 1 0 CLB  \
 902000                                                                  !
 903000 SKIP HOF MODEL: MPDC-REV3D                              RTL/6000 FILE EDIT
REVISION: 000.00                               DICTIONARY SECTION LINE #
 904000    \                                                             \
 905000    \   3 - ALU
 906000
 907000        OPERATION               UPIR, BITS 00 - 15
 908000                          0 1 2 3 4 5 6 7 8 9 10 11 12 13 14 15 NMN
 909000
 910000    AOP NOT               0 1 1 A1 A2 A3 B0 B1 C S 0 0 0 0 1 A0 ANT
 911000    BOP NOT               0 1 1 A1 A2 A3 B0 B1 C S 0 1 0 1 1 A0 BNT
 912000    ZERO                  0 1 1 A1 A2 A3 B0 B1 C S 0 0 1 1 1 A0 ZER
 913000    AOP                   0 1 1 A1 A2 A3 B0 B1 C S 1 1 1 1 1 A0 XFA
 914000    BOP                   0 1 1 A1 A2 A3 B0 B1 C S 1 0 1 0 1 A0 XFB
 915000    NOR                   0 1 1 A1 A2 A3 B0 B1 C S 0 0 0 1 1 A0 NOR
 916000    NAND                  0 1 1 A1 A2 A3 B0 B1 C S 0 1 0 0 1 A0 NND
 917000    EX OR                 0 1 1 A1 A2 A3 B0 B1 C S 0 1 1 0 1 A0 XOR
 918000    EX NOR                0 1 1 A1 A2 A3 B0 B1 C S 1 0 0 1 1 A0 XNR  \
 919000    \
 920000    AND                   0 1 1 A1 A2 A3 B0 B1 C S 1 0 1 1 1 A0 AND
 921000    OR                    0 1 1 A1 A2 A3 B0 B1 C S 1 1 1 0 1 A0 ORR
 922000    INCR AOP              0 1 1 A1 A2 A3 B0 B1 C S 0 0 0 0 0 A0 INC
 923000    DECR AOP              0 1 1 A1 A2 A3 B0 B1 C S 1 1 1 1 0 A0 DEC
 924000    AOP MIN BOP           0 1 1 A1 A2 A3 B0 B1 C S 0 1 1 0 0 A0 SUB
 925000    AOP PLS BOP           0 1 1 A1 A2 A3 B0 B1 C S 1 0 0 1 0 A0 ADD
 926000    LFT SHIFT AOP         0 1 1 A1 A2 A3 B0 B1 C S 1 1 0 0 0 A0 LSH
 927000    CARRY OUT IN          0 1 1 A1 A2 A3 B0 B1 1 S X X X X X A0 COTI
 928000    STR RSLT AOP          0 1 1 A1 A2 A3 B0 B1 C 1 X X X X X A0 SRIA
 929000    \
 930000
 931000 SKIP HOF                                                          !

MODEL: MPDC-REV3D                              RTL/6000 FILE EDIT
REVISION: 000.00                               DICTIONARY SECTION

LINE #
 932000
 933000    \   4 - CONSTANT
 934000
 935000        OPERATION               UPIR, BITS 00 - 15
 936000                          0 1 2 3 4 5 6 7 8 9 10 11 12 13 14 15 NMN
 937000
 938000    LOAD CONSTANT         1 0 0 A1 A2 A3 C C C C C 0 C 0 C C LCA
 939000    AND CONSTANT          1 0 0 A1 A2 A3 C C C C C 0 C 1 C C ACA
 940000    OR CONSTANT           1 0 0 A1 A2 A3 C C C C C 1 C 0 C C OCA  \
 941000
 942000
 943000    \   5 - MEMORY
 944000
 945000        OPERATION               UPIR, BITS 00 - 15
 946000                          0 1 2 3 4 5 6 7 8 9 10 11 12 13 14 15 NMN
 947000
 948000    MEMORY WRITE          1 0 1 A1 A2 A3 1 0 0 0 0 0 0 0 A0 MWT
 949000    INCR SP ADDR          1 0 1 0 0 0 0 0 1 0 0 0 0 0 0 0 IMA
 950000    DECR SP ADDR          1 0 1 0 0 0 0 0 0 0 0 0 1 0 0 0 DMA
 951000    MEM WRT & INCR        1 0 1 A1 A2 A3 1 1 0 0 0 0 0 0 A0 WIA
 952000    MEM WRT & DECR        1 0 1 A1 A2 A3 1 0 0 0 0 0 0 0 A0 WDA
 953000    SET SP TST MODE       1 0 1 0 0 0 0 0 1 0 0 0 0 0 0 0 SPT  \
 954000    \
 955000                          1 0 1 0 0 0 0 0 0 1 0 0 0 0 0 0
 956000    LD REQ'G CHNL         1 0 1 0 0 0 0 0 0 0 1 0 0 0 0 0 LRC
 957000    LD IR W/AOP           1 0 1 A1 A2 A3 0 0 0 0 1 1 0 0 A0 LIR
 958000    SET MOD BAD PAR       1 0 1 0 0 0 0 0 0 0 1 0 0 1 0 0 MBP
 959000                          1 0 1 0 0 0 0 0 0 0 0 0 0 1 0   \
 960000
 961000 SKIP HOF                                                          !

MODEL: MPDC-REV3D                              RTL/6000 FILE EDIT
REVISION: 000.00                               DICTIONARY SECTION

LINE #
 962000
 963000    \   6 - TEST
 964000
 965000        OPERATION               UPIR, BITS 00 - 15
 966000                          0 1 2 3 4 5 6 7 8 9 10 11 12 13 14 15 NMN
 967000
 968000    TEST FOR ZERO         1 1 0 A1 A2 A3 0 0 0 1 T T T T T A0 TFZ
 969000    TEST FOR ONE          1 1 0 A1 A2 A3 0 0 1 0 T T T T T A0 TFO
 970000    RETURN                1 1 0 0 0 0 1 0 0 0 0 0 0 0 0 0 RTN  \
 971000
 972000
 973000    \  TEST CONDITIONS
 974000       ----------------
 975000
 976000    MNEMONIC  HEX  DESCRIPTION
 977000
 978000      TAHR    00   ADAPTER HARDWARE REQUEST
```

MODEL: MPDC-REV3D
REVISION: 000.00

RTL/6000 FILE EDIT
DICTIONARY SECTION

```
LINE #
 979000      TBCA    01 BUS CYCLE ACTIVE
 980000      TRSP    02 BUS REQUEST REQUIRED
 981000      TEQZ    03 ALU OUTPUT EQUALS 00
 982000      TEQF    04 ALU OUTPUT EQUALS FF
 983000      TCOT    05 ALU CARRY OUT
 984000      TREQ    06 CHANNEL REQUEST
 985000      TACK    07 BUS ACK RESPONSE
 986000    \ TAX0    08 ADP MULTIPLEXOR, BIT 0
 987000      TAX1    08 ADP MULTIPLEXOR, BIT 1
 988000      TAX2    0A ADP MULTIPLEXOR, BIT 2
 989000      TAX3    0B ADP MULTIPLEXOR, BIT 3
 990000      TAX4    0C ADP MULTIPLEXOR, BIT 4
 991000      TAX5    0D ADP MULTIPLEXOR, BOT 5
 992000      TAX6    0E ADP MULTIPLEXOR, BIT 6
 993000      TAX7    0F ADP MULTIPLEXOR, BIT 7
 994000      TOHZ    10 OFFSET RANGE ZERO
 995000      TRGZ    11 RANGE ZERO
 996000      TSBS    12 SINGLE BYTE STORED
 997000      TSAW    13 S. P. ADDRESS WRAPAROUND
 998000      TADB    14 ADAPTER BUSY
 999000    \ TNDR    15 NON-DATA SERVICE REQUEST
1000000      TORH    16 OFFSET RANGE HISTORY
1001000      TDCN    17 MYDCNN+00
1002000      TBSY    18 BUS DATA REGISTER BUSY
1003000      TUBR    19 UNSOLICITED BUS REQUEST
1004000      TINT    1A RESUME INTERRUPT
1005000      TNAK    1B NAK RESPONSE
1006000      TBYT    1C BYTE MODE
1007000      TPTY    1D BUS PARITY CHECK
1008000      TNBR    1E NO BUFFER REQUEST
1009000      TFDR    1F FIRMWARE DATA SERVICE REQUEST    \
1010000 SKIP HOF                                          ;
```

MODEL: MPDC-REV3D
REVISION: 000.00

RTL/6000 FILE EDIT
DICTIONARY SECTION

```
LINE #
1011000    \   7 - BRANCH
1012000
1013000        OPERATION              UPIR, BITS 00 , 15
1014000                   0 1 3 4 5 6 7 8 9 10 11 12 13 14 15  NMN
1015000
1016000        GO TO      1 1 1 1 A A A A A A A  A  A  A  A  A  GTO
1017000        LOAD RETURN 1 1 1 0 A A A A A A A  A  A  A  A  A  LRA  \
1018000                                                                  ;
1019000 SKIP HOF
```

MODEL: MPDC-REV3D
REVISION: 000.00

RTL/6000 FILE EDIT
MICROPROGRAM SECTION

ADDRESS  IMAGE
(HEX)    (HEX)

```
LINE #                             SEQUENCE: SSUPCS
1020000 MICROPROGRAM
1021000
1022000 SSUPCS                                                  ;
1023000
1024000  $          \ NOP FOR PROM SCAN RECOVERY     \       000   0000
1025000            NOP                                ;
1026000
1027000
1028000 SSTART-BLT   \START OF BASIC LOGIC TEST       \       001   0098
1029000            INI                                 ;
1030000
1031000  $          \CLEAR BUS                        \       002   4086
1032000            CLB                                 ;
1033000
1034000
1035000
1036000    \ BLT BRANCH TEST EXERCISES THE FOLLOWING COMMANDS  \
1037000    \    - TEST AND SKIP                                \
1038000    \    - GO TO COMMAND                                \
1039000
1040000
1041000 SBLT-NEXT01  \SKIP IF CARRY OUT IS 1          \       003   C08A
1042000            TFO TCOT                           ;
1043000
1044000  $          \SKIP IF CARRY OUT IS 0           \       004   C04A
1045000            TFZ TCOT                           ;
1046000
1047000
1048000 SBLT-HALT01  HLT            \HALT IF TEST FAILS  \;   005   0040
1049000
1050000  $          \GO TO START OF TEST              \       006   F009
1051000            GTO (SBLT-NEXT02)                  ;
1052000
1053000  $          HLT            \HALT IF GO TO FAILS   \;  007   0040
1054000
1055000  $          HLT            \HALT IF GO TO ONLY NOPS \; 008   0040
1056000
1057000   \ END OF BRANCH TEST                              \
1058000
1059000 SKIP HOF                                           ;
```

MODEL: MPDC-REV3D
REVISION: 000.00

RTL/6000 FILE EDIT
MICROPROGRAM SECTION

ADDRESS  IMAGE
(HEX)    (HEX)

```
LINE #                             SEQUENCE: SSUPCS
1060000
1061000
1062000    \ BLT STATUS TEST ASSURES THAT CERTAIN STATUS FLOPS ARE  \;
1063000    \NOT STUCK AT ONE OR STUCK AT ZERO.                      \;
1064000
1065000 SBLT-NEXT02  TFO TEQZ       \SKIP IF EQZ SET        \;   009   C086
1066000
1067000  $          TFZ TEQF        \SKIP IF EQF RESET      \;   00A   C048
1068000
1069000  $          HLT             \HALT- EQZ OR EQF FAILURE \; 00B   0040
1070000
1071000  $          TFO TCOT        \SKIP IF CARRY OUT SET    \; 00C   C08A
1072000
1073000  $          TFZ TACK        \SKIP IF ACK RESET        \; 00D   C04E
1074000
1075000  $          HLT             \HALT- CARRY OUT OR ACK FAIL \; 00E 0040
1076000
```

```
MODEL: MPDC-REV3D                         RTL/6000 FILE EDIT                           08/01/77    12.605  PAGE:  27
REVISION: 000.00                          MICROPROGRAM SECTION                         DOC.#:
                                                                         ADDRESS  IMAGE
LINE #                                  SEQUENCE: SSUPCS                  (HEX)   (HEX)
                                                   -continued
1077000  S        TFZ TNAK        \SKIP IF NAK RESET          \;          00F    C076
1078000
1079000  S        HLT             \HALT- NAK FAILURE          \;          010    0040
1080000
1081000
1082000  SKIP HOF                                              ;

MODEL: MPDC-REV3D                         RTL/6000 FILE EDIT                           08/01/77    12.605  PAGE:  28
REVISION: 000.00                          MICROPROGRAM SECTION                         DOC.#:
                                                                         ADDRESS  IMAGE
LINE #                                  SEQUENCE: SSUPCS                  (HEX)   (HEX)
1083000
1084000  S        SEF             \SET STATUS FLOPS           \;          011    0800
1085000
1086000  S        TFZ TEQZ        \SKIP IF EQZ RESET          \;          012    C046
1087000
1088000  S        TFO TEQF        \SKIP IF EQF SET            \;          013    C088
1089000
1090000  S        HLT             \HALT- EQZ OR EQF FAILURE   \;          014    0040
1091000
1092000  S        TFZ TCOT        \SKIP IF CARRY OUT RESET    \;          015    C04A
1093000
1094000  S        TFO TACK        \SKIP IF ACK SET            \;          016    C08E
1095000
1096000  S        HLT             \HALT- CARRY OUT OR ACK FAIL \;         017    0040
1097000
1098000  S        TFZ TNAK        \SKIP IF NAK RESET          \;          018    C076
1099000
1100000  S        TFO TBSY        \SKIP IF BUSY SET           \;          019    C080
1101000
1102000  S        HLT             \HALT- NAK OR BUSY FAILURE  \;          01A    0040
1103000
1104000  S        CRF             \ CLEAR ALL STATUS FLOPS    \;          01B    0010
1105000
1106000  S        CLB             \CLEAR BUS                  \;          01C    4086
1107000
1108000     \ END OF STATUS TEST                               \;
1109000
1110000  SKIP HOF                                              ;

MODEL: MPDC-REV3D                         RTL/6000 FILE EDIT                           08/01/77    12.605  PAGE:  29
REVISION: 000.00                          MICROPROGRAM SECTION                         DOC.#:
                                                                         ADDRESS  IMAGE
LINE #                                  SEQUENCE: SSUPCS                  (HEX)   (HEX)
1111000
1112000
1113000   \BLT ALU TEST PERFORMS BASIC OPERATIONS ON THE ACUMULATOR  \;
1114000   \TO TEST THE ALU MODE BITS FOR STUCK AT ONE OR STUCK AT    \;
1115000   \ZERO CONDITIONS.                                          \;
1116000                                                              \;
1117000  SBLT-NEXT03  SRB         \INHIBIT CLEAR TO BIR       \;          01D    4004
1118000
1119000  S        XFA AACU BACU   \   M0,M3, CE STUCK AT 0    \;          01E    603E
1120000
1121000  S        TFO TEQZ        \SKIP IF ACU=00             \;          01F    C086
1122000
1123000  S        HLT             \ALU MODE FAILURE           \;          020    0040
1124000
1125000  S        ANT AACU BACU   \    M0,M3 STUCK AT ONE     \;          021    6002
1126000
1127000  S        TFO TEQF        \SKIP IF ACU NEQ FF         \;          022    C088
1128000
1129000  S        HLT             \ALU MODE FAILURE           \;          023    0040
1130000
1131000  S        INC AACU BACU   \ M0,M3,CE,CI STUCK AT 0    \;          024    6000
1132000
1133000  S        TFZ TEQZ        \SKIP IF ACU NEQ 00         \;          025    C046
1134000
1135000  S        TFO TCOT        \SKIP IF CARRY              \;          026    C08A
1136000
1137000  S        HLT             \ALU MODE FAILURE           \;          027    0040
1138000
1139000  S        AACU DEC BACU   \M0,M3,CI STUCK AT 0        \;          028    603C
1140000
1141000  S        TFO TEQF        \SKIP IF ACU NEQ FF         \;          029    C088
1142000
1143000  S        HLT             \ALU MODE FAILURE           \;          02A    0040
1144000
1145000     \END OF ALU TEST                                   \;
1146000
1147000  SKIP HOF                                              ;

MODEL: MPDC-REV3D                         RTL/6000 FILE EDIT                           08/01/77    12.605  PAGE:  30
REVISION: 000.00                          MICROPROGRAM SECTION                         DOC.#:
                                                                         ADDRESS  IMAGE
LINE #                                  SEQUENCE: SSUPCS                  (HEX)   (HEX)
1148000
1149000
1150000   \ BLT REGISTER TEST USES A SHIFTED ONES PATTERN TO TEST    \
1151000   \THE ACUMULATOR, BUS INTERFACE REGISTER, AND SCRATCH PAD   \
1152000   \ADDRESS COUNTER FOR STORAGE AND SELECTION CAPABILITY.     \
1153000
1154000  SBLT-NEXT04   \SET SPA TO ZERO
1155000                LCN ASPA CNST (00#)                      ;          02B    8800
1156000
1157000  S            \LOAD STARTING DATA PATTERN IN ACU        \
1158000               LCN AACU CNST (01#)                       ;          02C    8001
1159000
1160000  SBLT-REGTST  \SFT BUS REG 7 TIMES TO LOAD DATA PATTERN \
1161000               XFB ABUS4 BACU SRIA                                  02D    6C6B
1162000
1163000  S            XFB ABUS4 BACU SRIA                       ;          02E    6C6B
1164000
1165000  S            XFB ABUS4 BACU SRIA                       ;          02F    6C6B
1166000
1167000  S            XFB ABUS4 BACU SRIA                       ;          030    6C6B
1168000
1169000  S            XFB ABUS4 BACU SRIA                       ;          031    6C6B
1170000
1171000  S            XFB ABUS4 BACU SRIA                       ;          032    6C6B
```

```
MODEL: MPDC-REV3D                          RTL/6000 FILE EDIT                               08/01/77    12.605  PAGE:  30
REVISION: 000.00                           MICROPROGRAM SECTION                             DOC.#:

LINE #                                     SEQUENCE: SSUPCS                    ADDRESS  IMAGE
                                                  -continued                   (HEX)    (HEX)
1172000
1173000   $        XFB ABUS4 BACU SRIA                              \           033     6C6B
1174000
1175000   $        \XFER SPA THRU ALU TO VALIDATE EQZ               \
1176000            XFA ASPA SRIA                                    ;           034     687E
1177000
1178000   $        \SKIP IF EQZ FLOP SET ON PREVIOUS TRANSFER       \
1179000            TFO TEQZ                                         ;           035     C086
1180000
1181000   $        \HALT- SPA FAILURE                               \
1182000            HLT                                              ;           036     0040
1183000
1184000   $        \MOVE ACU TO SPA                                 \
1185000            XFB ASPA BACU SRIA                               ;           037     686A
1186000
1187000   $        \NO OP FOR TIMING                                \
1188000            NOP                                              ;           038     0000
1189000
1190000 SKIP HOF                                                    ;

MODEL: MPDC-REV3D                          RTL/6000 FILE EDIT                               08/01/77    12.605  PAGE:  31
REVISION: 000.00                           MICROPROGRAM SECTION                             DOC.#:

LINE #                                     SEQUENCE: SSUPCS                    ADDRESS  IMAGE
1191000   $        \CLEAR ACU                                       \          (HEX)    (HEX)
1192000            ASPA XOR BACU                                    ;           039     681A
1193000
1194000   $        \XFER ACU THRU ALU TO ACU TO VALIDATE EQZ        \
1195000            XFB BACU                                         ;           03A     602A
1196000
1197000   $        \SKIP IF EQZ FLOP SET ON PREVIOUS TRANSFER       \
1198000            TFO TEQZ                                         ;           03B     C086
1199000
1200000   $        \HALT- ACU FAILURE                               \
1201000            HLT                                              ;           03C     0040
1202000
1203000   $        \MOVE SPA TO ACU                                 \
1204000            ASPA XFA BACU                                    ;           03D     683E
1205000
1206000   $        \SET SPA EQUAL TO FF                             \
1207000            XNR ASPA BACU SRIA                               ;           03E     6866
1208000
1209000   $        \NO OP FOR TIMING                                \
1210000            NOP                                              ;           03F     0000
1211000
1212000   $        \XFER SPA THRU ALU TO SPA TO VALIDATE EQF        \
1213000            XFA ASPA BACU SRIA                               ;           040     687E
1214000
1215000   $        \SKIP IF SPA EQUAL FF                            \
1216000            TFO TEQF                                         ;           041     C088
1217000
1218000   $        \HALT- SPA FAILURE                               \
1219000            HLT                                              ;           042     0040
1220000
1221000   $        \SET SPA EQUAL TO DATA PATTERN                   \
1222000            XFB ASPA BACU SRIA                               ;           043     686A
1223000
1224000   $        \NO OP FOR TIMING                                \
1225000            NOP                                              ;           044     0000
1226000
1227000   $        \SET ACU EQUAL TO FF                             \
1228000            ASPA XNR BACU                                    ;           045     6826
1229000
1230000   $        \XFER ACU THRU ALU TO ACU TO VALIDATE EQF        \
1231000            XFB BACU                                         ;           046     602A
1232000
1233000   $        \SKIP IF ACU EQUAL FF                            \
1234000            TFO TEQF                                         ;           047     C088
1235000
1236000 SKIP HOF

MODEL: MPDC-REV3D                          RTL/6000 FILE EDIT                               08/01/77    12.605  PAGE:  32
REVISION: 000.00                           MICROPROGRAM SECTION                             DOC.#:

LINE #                                     SEQUENCE: SSUPCS                    ADDRESS  IMAGE
1237000                                                                         (HEX)    (HEX)
1238000   $        \HALT- ACU FAILURE                               \
1239000            HLT                                              ;           048     0040
1240000
1241000   $        \SET ACU EQUAL TO DATA PATTERN                   \
1242000            ASPA XFA BACU                                    ;           049     683E
1243000
1244000   $        \SET SPA TO 00                                   \
1245000            XOR ASPA BACU SRIA                               ;           04A     685A
1246000
1247000   $        \COMPARE ACU WITH STORED DATA PATTERN            \
1248000            ABUS4 XOR BACU SRIA                              ;           04B     6C5B
1249000
1250000   $        \SKIP IF DATA IS THE SAME                        \
1251000            TFO TEQZ                                         ;           04C     C086
1252000
1253000   $        \HALT- BUS REG FAILURE                           \
1254000            HLT                                              ;           04D     0040
1255000
1256000   $        \SHIFT ACU TO NEXT DATA PATTERN                  \
1257000            LSH AACU BACU                                    ;           04E     6030
1258000
1259000   $        \SKIP IF DATA PATTERN IS NOW ZERO                \
1260000            TFO TEQZ                                         ;           04F     C086
1261000
1262000   $        GTO (SBLT-REGTST)                                ;           050     F02D
1263000
1264000   $        \SKIP IF TEST IS REALLY OVER                     \
1265000            TFO TAX0 ABUS4                                   ;           051     CC91
1266000
1267000   $        \HALT- BUS REG FAILURE                           \
1268000            HLT                                              ;           052     0040
1269000
1270000            \ END OF REGISTER TEST                           \
1271000
1272000 SKIP HOF                                                    ;
```

```
MODEL: MPDC-REV3D                           RTL/6000 FILE EDIT                          08/01/77   12.605  PAGE: 33
REVISION: 000.00                            MICROPROGRAM SECTION                         DOC.#:
                                                                                 ADDRESS  IMAGE
                                            SEQUENCE: $$UPCS                     (HEX)    (HEX)
LINE #
1273000
1274000        \ THE FOLLOWING TEST IS USED TO VERIFY THE ABILITY TO    \
1275000        \LOAD A RETURN ADDRESS AS WELL AS PROPERLY RETURN.       \
1276000                                                                           053    800B
1277000 $BLT-NEXT05  \LOAD STARTING COUNT                                \
1278000              LCN AACU CNST (07#)                                 ;
1279000
1280000 $            \SET RETURN ADDRESS                                 \          054    E05B
1281000              LRA ($BLT-LRA005)                                   ;
1282000
1283000 $            \SET RETURN ADDRESS                                 \          055    E5FD
1284000              LRA ($BLT-LRA004)                                   ;
1285000
1286000 $            \SET RETURN ADDRESS                                 \          056    E5FC
1287000              LRA ($BLT-LRA003)                                   ;
1288000
1289000 $            \SET RETURN ADDRESS                                 \          057    E5FB
1290000              LRA ($BLT-LRA002)                                   ;
1291000
1292000 $BLT-LRA001  \RETURN VIA RETURN STACK                            \          058    C200
1293000              RTN                                                 ;
1294000
1295000 $            \HALT IF RETURN FAILS                               \          059    0040
1296000              HLT                                                 ;
1297000
1298000 $            \HALT IF RETURN ONLY NOPS                           \          05A    0040
1299000              HLT                                                 ;
1300000
1301000 $BLT-LRA005  \DECREMENT ACU                                      \          05B    607C
1302000              DEC AACU SRIA                                       ;
1303000
1304000 $            \SKIP IF ACU = 0                                    \          05C    C086
1305000              TFO TEQZ                                            ;
1306000
1307000 $            \HALT IF RET. REG. ADD FAILURE                      \          05D    0040
1308000              HLT                                                 ;
1309000
1310000       \ END OF RETURN REGISTER TEST.                             \
1311000
1312000 SKIP HOF                                                         ;

MODEL: MPDC-REV3D                           RTL/6000 FILE EDIT                          08/01/77   12.605  PAGE: 34
REVISION: 000.00                            MICROPROGRAM SECTION                         DOC.#:
                                                                                 ADDRESS  IMAGE
                                            SEQUENCE: $$UPCS                     (HEX)    (HEX)
LINE #
1313000
1314000        \ THE FOLLOWING TEST IS USED TO VERIFY THE PROPER         \
1315000        \OPERATION OF THE OFFSET RANGE COUNTER, RANGE COUNTER     \
1316000        \AND ADDRESS COUNTER. THIS TEST ALSO CHECKS FOR           \
1317000        \PROPER RESETTING OF THE OFFSET RANGE FLOP AND THE        \
1318000        \CORRECT OPERATION OF THE BYTE FLOP .                     \
1319000
1320000 $BLT-NEXT06  \HEX FF TO ACU                                      \          05E    83EB
1321000              LCN AACU CNST (FF#)                                 ;
1322000
1323000 $            \LOAD OFF RANGE LOW                                 \          05F    6C6B
1324000              XFB ABUS4 BACU SRIA                                 ;
1325000
1326000 $            \LOAD OFF RANGE HI                                  \          060    6C6B
1327000              XFB ABUS4 BACU SRIA                                 ;
1328000
1329000 $            \LOAD RANGE LOW                                     \          061    6C6B
1330000              XFB ABUS4 BACU SRIA                                 ;
1331000
1332000 $            \LOAD RANGE HI                                      \          062    6C6B
1333000              XFB ABUS4 BACU SRIA                                 ;
1334000
1335000 $            \HEX FD TO ACU                                      \          063    83E9
1336000              LCN AACU CNST (FD#)                                 ;
1337000
1338000 $            \LOAD ADDRESS LOW                                   \          064    6C6B
1339000              XFB ABUS4 BACU SRIA                                 ;
1340000
1341000 $            \HEX FF TO ACU                                      \         065    83EB
1342000              LCN AACU CNST (FF#)                                 ;
1343000
1344000 $            \LOAD ADDRESS MID                                   \          066    6C6B
1345000              XFB ABUS4 BACU SRIA                                 ;
1346000
1347000 $            \LOAD ADDRESS HI                                    \          067    6C6B
1348000              XFB ABUS4 BACU SRIA                                 ;
1349000
1350000 $            \SET OFFSET RNG CONST AND BYTE MODE                 \          068    8020
1351000              LCN AACU CNST (08#)                                 ;
1352000
1353000 $            \LOAD CYCLE ON BUS INTERFACE                        \          069    4020
1354000              CYC                                                 ;
1355000
1356000 $            \HEX FD TO SPA                                      \          06A    8BE9
1357000              LCN ASPA CNST (FD#)                                 ;
1358000
1359000 $            \HEX FF TO ACU                                      \          06B    83EB
1360000              LCN CNST (FF#)                                      ;
1361000
1362000 SKIP HOF                                                         ;

MODEL: MPDC-REV3D                           RTL/6000 FILE EDIT                          08/01/77   12.605  PAGE: 35
REVISION: 000.00                            MICROPROGRAM SECTION                         DOC.#:
                                                                                 ADDRESS  IMAGE
                                            SEQUENCE: $$UPCS                     (HEX)    (HEX)
LINE #
1363000
1364000 $BLT-RANG01  \DECREMENT OFFSET RANGE                             \          06C    4040
1365000              DRC                                                 ;
1366000
1367000 $            \DECREMENT FIRMWARE COUNT                           \          06D    687C
1368000              DEC ASPA SRIA                                       ;
1369000
1370000 $            \PROPAGATE CARRY                                    \          06E    60FC
1371000              DEC AACU SRIA CDTI                                  ;
1372000
1373000 $            \SKIP IF FIRMWARE COUNT ZERO                        \          06F    C04A
1374000              TFZ TCOT                                            ;
1375000
```

MODEL: MPDC-REV3D  
REVISION: 000.00

RTL/6000 FILE EDIT  
MICROPROGRAM SECTION

08/01/77  12.605  PAGE: 35  
DOC.#:

SEQUENCE: SSUPC5  
-continued

| LINE # | | | ADDRESS (HEX) | IMAGE (HEX) |
|---|---|---|---|---|
| 1376000 | S | GTO (SBLT-RANGO1) | 070 | F06C |
| 1377000 | | | | |
| 1378000 | S | \SKIP IF OFFSET RANGE NON-ZERO | 071 | C060 |
| 1379000 | | TFZ TORZ | | |
| 1380000 | | | | |
| 1381000 | S | \HALT-OFF RANGE COUNT INCORRECT | 072 | 0040 |
| 1382000 | | HLT | | |
| 1383000 | | | | |
| 1384000 | S | \DECREMENT OFFSET RANGE | 073 | 4040 |
| 1385000 | | DRC | | |
| 1386000 | | | | |
| 1387000 | S | \SKIP IF OFFSET RANGE ZERO | 074 | C0A0 |
| 1388000 | | TFO TORZ | | |
| 1389000 | | | | |
| 1390000 | S | \HALT - OFF RANGE COUNT INCORRECT | 075 | 0040 |
| 1391000 | | HLT | | |
| 1392000 | | | | |
| 1393000 | SKIP HOF | | | |

MODEL: MPDC-REV3D  
REVISION: 000.00

RTL/6000 FILE EDIT  
MICROPROGRAM SECTION

08/01/77  12.605  PAGE: 36  
DOC.#:

SEQUENCE: SSUPC5

| LINE # | | | ADDRESS (HEX) | IMAGE (HEX) |
|---|---|---|---|---|
| 1394000 | | | | |
| 1395000 | S | \HEX FF TO ACU | 076 | 83EB |
| 1396000 | | LCN AACU CNST (FF#) | | |
| 1397000 | | | | |
| 1398000 | S | \HEX FD TO SPA | 077 | 8BE9 |
| 1399000 | | LCN ASPA CNST (FD#) | | |
| 1400000 | | | | |
| 1401000 | SBLT-RANGO2 | \DECREMENT RANGE | 078 | 4040 |
| 1402000 | | DRC | | |
| 1403000 | | | | |
| 1404000 | S | \DECREMENT FIRMWARE COUNT | 079 | 6B7C |
| 1405000 | | DEC ASPA SRIA | | |
| 1406000 | | | | |
| 1407000 | S | \PROPAGATE CARRY | 07A | 60FC |
| 1408000 | | DEC AACU SRIA COTI | | |
| 1409000 | | | | |
| 1410000 | S | \SKIP IF RANGE NON-ZERO | 07B | C062 |
| 1411000 | | TFZ TRGZ | | |
| 1412000 | | | | |
| 1413000 | S | \HALT - RANGE COUNT INCORRECT | 07C | 0040 |
| 1414000 | | HLT | | |
| 1415000 | | | | |
| 1416000 | S | \SKIP IF FIRMWARE COUNT ZERO | 07D | C04A |
| 1417000 | | TFZ TCOT | | |
| 1418000 | | | | |
| 1419000 | S | GTO (SBLT-RANGO2) | 07E | F078 |
| 1420000 | | | | |
| 1421000 | S | \DECREMENT RANGE | 07F | 4040 |
| 1422000 | | DRC | | |
| 1423000 | | | | |
| 1424000 | S | \NO OP FOR TIMING | 080 | 0000 |
| 1425000 | | NOP | | |
| 1426000 | | | | |
| 1427000 | S | \SKIP IF RANGE ZERO | 081 | C0A2 |
| 1428000 | | TFO TRGZ | | |
| 1429000 | | | | |
| 1430000 | S | \HALT - RANGE COUNT INCORRECT | 082 | 0040 |
| 1431000 | | HLT | | |
| 1432000 | | | | |
| 1433000 | SKIP HOF | | | |

MODEL: MPDC-REV3D  
REVISION: 000.00

RTL/6000 FILE EDIT  
MICROPROGRAM SECTION

08/01/77  12.605  PAGE: 37  
DOC.#:

SEQUENCE: SSUPC5

| LINE # | | | ADDRESS (HEX) | IMAGE (HEX) |
|---|---|---|---|---|
| 1434000 | | | | |
| 1435000 | S | \INCREMENT ADDRESS COUNTER | 083 | 4100 |
| 1436000 | | IAC | | |
| 1437000 | | | | |
| 1438000 | S | \ NOOP FOR TIMING | 084 | 0000 |
| 1439000 | | NOP | | |
| 1440000 | | | | |
| 1441000 | S | \SKIP IF BYTE MODE RESET | 085 | C078 |
| 1442000 | | TFZ TBYT | | |
| 1443000 | | | | |
| 1444000 | S | \HALT - BYTE MODE NOT WORKING | 086 | 0040 |
| 1445000 | | HLT | | |
| 1446000 | | | | |
| 1447000 | S | \INCREMENT ADDRESS COUNTER | 087 | 4100 |
| 1448000 | | IAC | | |
| 1449000 | | | | |
| 1450000 | S | \ NO OP FOR TIMING | 088 | 0000 |
| 1451000 | | NOP | | |
| 1452000 | | | | |
| 1453000 | S | \SHIFT ADDRESS | 089 | 6C3F |
| 1454000 | | XFA ABUS4 BACU | | |
| 1455000 | | | | |
| 1456000 | S | \SHIFT ADDRESS | 08A | 6C3F |
| 1457000 | | XFA ABUS4 BACU | | |
| 1458000 | | | | |
| 1459000 | S | \SHIFT ADDRESS | 08B | 6C3F |
| 1460000 | | XFA ABUS4 BACU | | |
| 1461000 | | | | |
| 1462000 | S | \SHIFT ADDRESS | 08C | 6C3F |
| 1463000 | | XFA ABUS4 BACU | | |
| 1464000 | | | | |
| 1465000 | S | \LOW ADDRESS BYTE TO ACU | 08D | 6C3F |
| 1466000 | | XFA ABUS4 BACU | | |
| 1467000 | | | | |
| 1468000 | S | \OR MID ADDR BYTE WITH ACU | 08E | 6C3B |
| 1469000 | | ORR ABUS4 BACU | | |
| 1470000 | | | | |
| 1471000 | S | \OR HI ADDR BYTE WITH ACU | 08F | 6C3B |
| 1472000 | | ORR ABUS4 BACU | | |
| 1473000 | | | | |
| 1474000 | S | \SKIP IF ACU EQUAL TO 00 | 090 | C086 |
| 1475000 | | TFO TEQZ | | |
| 1476000 | | | | |
| 1477000 | S | \HALT ADDRESS COUNTER NOT WORKING | 091 | 0040 |
| 1478000 | | HLT | | |
| 1479000 | | | | |
| 1480000 | | \END OF BUS INTERFACE REGISTER TEST | | |

| | | | | ADDRESS | IMAGE |
|---|---|---|---|---|---|
| MODEL: MPDC-REV3D | | RTL/6000 FILE EDIT | | (HEX) | (HEX) |
| REVISION: 000.00 | | MICROPROGRAM SECTION | | | |

LINE #   SEQUENCE: SSUPCS

```
1483000
1484000         \THE FOLLOWING TEST VERIFIES THE OPERATION OF THE    \
1485000         \INDEX REGISTER.                                     \
1486000
1487000 SBLT-NEXT07   \HEX 00 TO SPA                                 \      092  8800
1488000               LCN ASPA CNST (00#)                            ;
1489000
1490000 S             \HEX 00 TO ACU                                 \      093  8000
1491000               LCN AACU CNST (00#)                            ;
1492000
1493000 SBLT-INDEX    \SET INDEX REG FOR LCN                         \      094  A030
1494000               LIR AACU                                       ;
1495000
1496000 S             \COMPARE ACU WITH INDEX REGISTER               \      095  6C5A
1497000               XOR AIDX BACU SRIA                             ;
1498000
1499000 S             \SKIP IF ACU EQUALS INDEXED SPA                \      096  C086
1500000               TFO TEQZ                                       ;
1501000
1502000 S             \HALT - INDEX REG. BITS STUCK                  \      097  0040
1503000               HLT                                            ;
1504000
1505000 S             \INCREMENT ACU                                 \      098  6000
1506000               INC                                            ;
1507000
1508000 S             \SKIP IF ALL CHANNELS CHECKED                  \      099  C09A
1509000               TFO TAX5 AACU                                  ;
1510000
1511000 S             \GO TO CHECK NEXT CHANNEL                      \      09A  F094
1512000               GTO ($BLT-INDEX)                               ;
1513000
1514000 SKIP HOF                                                     ;
```

| | | | | ADDRESS | IMAGE |
|---|---|---|---|---|---|
| MODEL: MPDC-REV3D | | RTL/6000 FILE EDIT | | (HEX) | (HEX) |
| REVISION: 000.00 | | MICROPROGRAM SECTION | | | |

LINE #   SEQUENCE: SSUPCS

```
1515000  \THE FOLLOWING PORTION OF THE INDEX REGISTER TEST CHECKS
1516000   THE ABILITY TO CORRECTLY ADDRESS INDEXED SPM.               \
1517000
1518000 S             \CLEAR ACU                                      \      09B  0010
1519000               CRF                                             ;
1520000
1521000 S             \CLEAR SPA                                      \      09C  8800
1522000               LCN ASPA CNST (00#)                             ;
1523000
1524000 S             \LOAD INDEX REGISTER                            \      09D  A030
1525000               LIR                                             ;
1526000
1527000 S             \SET SPA FOR INDEXED MODE                       \      09E  8C00
1528000               LCN ASPAI CNST (00#)                            ;
1529000
1530000 SBLT-IDX1     \WRITE MEMORY FROM INDEX REGISTER               \      09F  AE00
1531000               MWT AIDX                                        ;
1532000
1533000 S             \INCREMENT INDEX REGISTER                       \      0A0  6C00
1534000               INC AIDX                                        ;
1535000
1536000 S             \LOAD INDEX REGISTER                            \      0A1  A030
1537000               LIR                                             ;
1538000
1539000 S             \SKIP IF ALL CHANNELS DONE                      \      0A2  C09A
1540000               TFO TAX5                                        ;
1541000
1542000 S             GTO ($BLT-IDX1)                                 ;      0A3  F09F
1543000
1544000 SBLT-IDX2     \COMPARE INDEX REG WITH SPM                     \      0A4  6D1A
1545000               XOR AIDX BSPM                                   ;
1546000
1547000 S             \SKIP IF EQUAL                                  \      0A5  C086
1548000               TFO TEQZ                                        ;
1549000
1550000 S             \INDEX REG OR SPM FAILURE                       \      0A6  0040
1551000               HLT                                             ;
1552000
1553000 S             \DECREMENT INDEX REG                            \      0A7  6C3C
1554000               DEC AIDX                                        ;
1555000
1556000 S             \LOAD INDEX REG                                 \      0A8  A030
1557000               LIR                                             ;
1558000
1559000 S             \SKIP IF ALL CHANNELS CHECKED                   \      0A9  C09A
1560000               TFO TAX5                                        ;
1561000
1562000 S             GTO ($BLT-IDX2)                                 ;      0AA  F0A4
1563000
1564000  \END OF INDEX REGISTER TEST.                                 \
1565000 SKIP HOF                                                      ;
```

| | | | | ADDRESS | IMAGE |
|---|---|---|---|---|---|
| MODEL: MPDC-REV3D | | RTL/6000 FILE EDIT | | (HEX) | (HEX) |
| REVISION: 000.00 | | MICROPROGRAM SECTION | | | |

LINE #   SEQUENCE: SSUPCS

```
1566000  \ BLT SCRATCH PAD ROW TEST USES ALL ONES DATA PATTERN TO     \
1567000  \CHECK SCRATCH PAD MEMORY FOR ADJACENT ROW INTERFERENCE.     \
1568000
1569000
1570000 SBLT-NEXT08   \LOAD RETURN ADDRESS                            \      0AB  E0AD
1571000               LRA ($BLT-SPMROW)                               ;
1572000
1573000 S             \GO TO CLEAR SCRATCH PAD                        \      0AC  F1F1
1574000               GTO ($CLEARSPM00)                               ;
1575000
1576000 SBLT-SPMROW   \CLEAR ACU                                      \      0AD  0010
1577000               CRF                                             ;
1578000
1579000 S             \CLEAR SPA                                      \      0AE  8800
1580000               LCN ASPA CNST (00#)                             ;
1581000
1582000 S             \SET S. P. TEST MODE                            \      0AF  A080
1583000               SPT                                             ;
1584000
1585000 S             \SET RETURN REG. FOR TEST DONE                  \      0B0  E0C6
1586000               LRA ($BLT-SPDONE)                               ;
```

MODEL: MPDC-REV3D  
REVISION: 000.00

RTL/6000 FILE EDIT  
MICROPROGRAM SECTION

08/01/77   12.605  PAGE:  40  
DOC.#:

| LINE # | | | SEQUENCE: $SUPCS -continued | ADDRESS (HEX) | IMAGE (HEX) |
|---|---|---|---|---|---|
| 1587000 | | | | | |
| 1588000 | S | | \SET RETURN REG. FOR TESTING 256 LOCATIONS \ | 081 | E084 |
| 1589000 | | | LRA ($BLT-ROWWRT) ; | | |
| 1590000 | | | | | |
| 1591000 | S | | \SET RETURN REG. FOR TESTING 256 LOCATIONS \ | 082 | E084 |
| 1592000 | | | LRA ($BLT-ROWWRT) ; | | |
| 1593000 | | | | | |
| 1594000 | S | | \SET RETURN REG. FOR TESTING 256 LOCATIONS \ | 083 | E084 |
| 1595000 | | | LRA ($BLT-ROWWRT) ; | | |
| 1596000 | | | | | |
| 1597000 | $BLT-ROWWRT | \LOAD ACU WITH ALL ONES \ | 084 | 83EB |
| 1598000 | | | LCN AACU  CNST(FF#) ; | | |
| 1599000 | | | | | |
| 1600000 | S | | \STORE ALL ONES \ | 085 | A200 |
| 1601000 | | | MWT AACU ; | | |
| 1602000 | | | | | |
| 1603000 | S | | \COPY SCRATCH PAD ADDRESS \ | 086 | 683E |
| 1604000 | | | ASPA XFA BACU ; | | |
| 1605000 | | | | | |
| 1606000 | SKIP HOF | | | | |

MODEL: MPDC-REV3D  
REVISION: 000.00

RTL/6000 FILE EDIT  
MICROPROGRAM SECTION

08/01/77   12.605  PAGE:  41  
DOC.#:

| LINE # | | | SEQUENCE: $SUPCS | ADDRESS (HEX) | IMAGE (HEX) |
|---|---|---|---|---|---|
| 1607000 | | | | | |
| 1608000 | $BLT-ROWADD | \INCREMENT ADDRESS \ | 087 | A100 |
| 1609000 | | | IMA ; | | |
| 1610000 | | | | | |
| 1611000 | S | | \ XFER S.P CONTENTS THRU ALU TO VALIDATE EQZ \ | 088 | 612A |
| 1612000 | | | XFB BSPM ; | | |
| 1613000 | | | | | |
| 1614000 | S | | \SKIP IF SCRATCH PAD NOT ALL ZERO \ | 089 | C046 |
| 1615000 | | | TFZ TEQZ ; | | |
| 1616000 | | | | | |
| 1617000 | S | | \GO TEST NEXT ADDRESS \ | 08A | F087 |
| 1618000 | | | GTO ($BLT-ROWADD) ; | | |
| 1619000 | | | | | |
| 1620000 | S | | \SKIP IF SCRATCH PAD IS ALL ONES \ | 08B | C08B |
| 1621000 | | | TFO TEOF ; | | |
| 1622000 | | | | | |
| 1623000 | S | | HLT   \HALT- SPM FAILURE \; | 08C | 0040 |
| 1624000 | | | | | |
| 1625000 | S | | \CHECK IF RIGHT ADDRESS \ | 08D | 681A |
| 1626000 | | | ASPA XOR BACU ; | | |
| 1627000 | | | | | |
| 1628000 | S | | \SKIP IF RIGHT ADDRESS \ | 08E | C086 |
| 1629000 | | | TFO TEQZ ; | | |
| 1630000 | | | | | |
| 1631000 | S | | HLT   \HALT- SPM FAILURE \; | 08F | 0040 |
| 1632000 | | | | | |
| 1633000 | S | | \REPLACE ALL ONES WITH ALL ZEROS \ | 0C0 | A300 |
| 1634000 | | | WIA AACU ; | | |
| 1635000 | | | | | |
| 1636000 | S | | \ NO OP FOR TIMING \ | 0C1 | 0000 |
| 1637000 | | | NOP ; | | |
| 1638000 | | | | | |
| 1639000 | S | | \CHECK FOR 256 BOUNDARY \ | 0C2 | 687E |
| 1640000 | | | XFA ASPA SRIA ; | | |
| 1641000 | | | | | |
| 1642000 | S | | \SKIP IF ADDRESS IS ZERO \ | 0C3 | C086 |
| 1643000 | | | TFO TEQZ ; | | |
| 1644000 | | | | | |
| 1645000 | S | | \GO TO TEST NEXT ROW \ | 0C4 | F084 |
| 1646000 | | | GTO ($BLT-ROWWRT) ; | | |
| 1647000 | | | | | |
| 1648000 | S | | \256 BOUNDARY COMPLETE \ | 0C5 | C200 |
| 1649000 | | | RTN ; | | |
| 1650000 | | | | | |
| 1651000 | $BLT-SPDONE | \RESET S. P. TEST MODE \ | 0C6 | 0010 |
| 1652000 | | | CRF ; | | |
| 1653000 | | | | | |
| 1654000 | \END OF SCRATCH PAD MEMORY ROW CHECK \ | | | |
| 1655000 | SKIP HOF | | ; | | |

MODEL: MPDC-REV3D  
REVISION: 000.00

RTL/6000 FILE EDIT  
MICROPROGRAM SECTION

08/01/77   12.605  PAGE:  42  
DOC.#:

| LINE # | | | SEQUENCE: $SUPCS | ADDRESS (HEX) | IMAGE (HEX) |
|---|---|---|---|---|---|
| 1656000 | \THE FOLLOWING ROUTINE IS USED TO TEST THE SCRATCH \ | | | | |
| 1657000 | \PAD ADDRESS REGISTER AND MEMORY. THE TEST WRITES \ | | | | |
| 1658000 | \LOC 00=00#, LOC 01=01#, LOC 02=02#, LOC 03=03#, ETC \ | | | | |
| 1659000 | \THEN EACH LOC IS VERIFIED FOR THE PROPER CONTENTS. \ | | | | |
| 1660000 | \NOTE- FURTHER TESTS USE SPM BASED ON THESE CONTENTS. \ | | | | |
| 1661000 | | | | | |
| 1662000 | $BLT-NEXTO9 | \CLEAR ACU \ | 0C7 | 0010 |
| 1663000 | | | CRF ; | | |
| 1664000 | | | | | |
| 1665000 | S | | \CLEAR SPA \ | 0C8 | 8800 |
| 1666000 | | | LCN ASPA CNST (00#) ; | | |
| 1667000 | | | | | |
| 1668000 | S | | \SET S. P. TEST MODE \ | 0C9 | A080 |
| 1669000 | | | SPT ; | | |
| 1670000 | | | | | |
| 1671000 | $BLT-SPM101 | \WRITE SPM FROM SPA \ | 0CA | AA00 |
| 1672000 | | | MWT ASPA ; | | |
| 1673000 | | | | | |
| 1674000 | S | | \COMPARE ACU TO SPM \ | 0CB | 611A |
| 1675000 | | | XOR AACU BSPM ; | | |
| 1676000 | | | | | |
| 1677000 | S | | \ SKIP IF VALID COMPARISON \ | 0CC | C086 |
| 1678000 | | | TFO TEQZ ; | | |
| 1679000 | | | | | |
| 1680000 | S | | \HALT - SPA OR SPM ERROR \ | 0CD | 0040 |
| 1681000 | | | HLT ; | | |
| 1682000 | | | | | |
| 1683000 | S | | \INCREMENT SPA \ | 0CE | A100 |
| 1684000 | | | IMA ; | | |
| 1685000 | | | | | |
| 1686000 | S | | \INCREMENT ACU \ | 0CF | 6040 |
| 1687000 | | | INC AACU SRIA ; | | |
| 1688000 | | | | | |
| 1689000 | S | | \SKIP IF LAST ADDRESS CHECKED \ | 0D0 | C0A6 |
| 1690000 | | | TFO TSAW ; | | |
| 1691000 | | | | | |
| 1692000 | S | | GTO ($BLT-SPM101) ; | 0D1 | F0CA |
| 1693000 | | | | | |
| 1694000 | SKIP HOF | | | | |

```
MODEL: MPDC-REV3D                        RTL/6000 FILE EDIT                         08/01/77    12.605  PAGE:  43
REVISION: 000.00                         MICROPROGRAM SECTION                       DOC.#:
                                                                          ADDRESS   IMAGE
LINE #                          SEQUENCE: SSUPCS                          (HEX)     (HEX)
1695000      \ THE FOLLOWING TEST IS USED TO TEST THE SPA REG. IT
1696000        STARTS WITH THE SPA = 400# AND DECREMENTS UNTIL ALL
1697000        ZEROS ARE REACHED.                                     \
1698000
1699000  $BLT-SPMD01   \DECREMENT SPA                                 \    0D2      A008
1700000                DMA                                            ;
1701000
1702000    $           \DECREMENT ACU                                 \    0D3      603C
1703000                DEC                                            ;
1704000
1705000    $           \COMPARE ACU TO SPM                            \    0D4      611A
1706000                XOR AACU BSPM                                  ;
1707000
1708000    $           \SKIP IF VALID COMPARISON                      \    0D5      C086
1709000                TFO TEQZ                                       ;
1710000
1711000    $           \HALT - SPA OR SPM ERROR                       \    0D6      0040
1712000                HLT                                            ;
1713000
1714000    $           \SKIP IF LAST ADDRESS CHECKED                  \    0D7      C0A6
1715000                TFO TSAW                                       ;
1716000
1717000    $           GTO ($BLT-SPMD01)                              ;    0D8      F0D2
1718000
1719000      \END OF SPA AND SPM TEST                                 \
1720000
1721000  SKIP HOF                                                     ;

MODEL: MPDC-REV3D                        RTL/6000 FILE EDIT                         08/01/77    12.605  PAGE:  44
REVISION: 000.00                         MICROPROGRAM SECTION                       DOC.#:
                                                                          ADDRESS   IMAGE
LINE #                          SEQUENCE: SSUPCS                          (HEX)     (HEX)
1722000      \THE FOLLOWING TEST IS USED TO VERIFY THE LOAD CAPABILITY
1723000        OF THE BUS INTERFACE SHIFT REGISTER. THE TEST LOADS THE
1724000        BUS REG FROM SPM WHICH WAS PREVIOUSLY LOADED BY THE
1725000        $BLT-NEX109 ROUTINE.                                   \
1726000
1727000  $BLT-NEXT10   \CLEAR ACU                                     \    0D9      0010
1728000                CRF                                            ;
1729000
1730000    $           \CLEAR SPA                                     \    0DA      8800
1731000                LCN ASPA CNST (00#)                            ;
1732000
1733000    $           \SET S.P. TEST MODE                            \    0DB      A080
1734000                SPT                                            ;
1735000
1736000    $           \HEX FF TO ACU                                 \    0DC      83EB
1737000                LCN CNST (FF#)                                 ;
1738000
1739000    $           \ACU TO SPA                                    \    0DD      686A
1740000                XFB ASPA SRIA                                  ;
1741000
1742000  $BLT-BUSSR1   \SPM TO BUS INTERFACE REGISTER                 \    0DE      6D6B
1743000                XFB ABUS4 BSPM SRIA                            ;
1744000
1745000    $           \DECREMENT SPA                                 \    0DF      A008
1746000                DMA                                            ;
1747000
1748000    $           \SPM TO BUS INTERFACE REGISTER                 \    0E0      6D6B
1749000                XFB ABUS4 BSPM SRIA                            ;
1750000
1751000    $           \DECREMENT SPA                                 \    0E1      A008
1752000                DMA                                            ;
1753000
1754000    $           \SPM TO BUS INTERFACE REGISTER                 \    0E2      6D6B
1755000                XFB ABUS4 BSPM SRIA                            ;
1756000
1757000    $           \DECREMENT SPA                                 \    0E3      A008
1758000                DMA                                            ;
1759000
1760000    $           \SPM TO BUS INTERFACE REGISTER                 \    0E4      6D6B
1761000                XFB ABUS4 BSPM SRIA                            ;
1762000
1763000    $           \DECREMENT SPA                                 \    0E5      A008
1764000                DMA                                            ;
1765000
1766000  SKIP HOF                                                     ;

MODEL: MPDC-REV3D                        RTL/6000 FILE EDIT                         08/01/77    12.605  PAGE:  45
REVISION: 000.00                         MICROPROGRAM SECTION                       DOC.#:
                                                                          ADDRESS   IMAGE
LINE #                          SEQUENCE: SSUPCS                          (HEX)     (HEX)
1767000    $           \SPM TO BUS INTERFACE REGISTER                 \    0E6      6D6B
1768000                XFB ABUS4 BSPM SRIA                            ;
1769000
1770000    $           \DECREMENT SPA                                 \    0E7      A008
1771000                DMA                                            ;
1772000
1773000    $           \SPM TO BUS INTERFACE REGISTER                 \    0E8      6D6B
1774000                XFB ABUS4 BSPM SRIA                            ;
1775000
1776000    $           \DECREMENT SPA                                 \    0E9      A008
1777000                DMA                                            ;
1778000
1779000    $           \SPM TO BUS INTERFACE REGISTER                 \    0EA      6D6B
1780000                XFB ABUS4 BSPM SRIA                            ;
1781000
1782000    $           \DECREMENT SPA                                 \    0EB      A008
1783000                DMA                                            ;
1784000
1785000  $BLT-BUSSR2   \COMPARE ACU TO BUS INTERFACE REG              \    0EC      6C5B
1786000                XOR ABUS4 BACU SRIA                            ;
1787000
1788000    $           \SKIP IF EQUAL                                 \    0ED      C086
1789000                TFO TEQZ                                       ;
1790000
1791000    $           \HALT- BUS INTERFACE REG FAILURE               \    0EE      0040
1792000                HLT                                            ;
1793000
1794000    $           \DECREMENT ACU                                 \    0EF      603C
1795000                DEC                                            ;
1796000
1797000    $           \COMPARE ACU TO SPM                            \    0F0      611A
1798000                XOR AACU BSPM                                  ;
```

```
MODEL: MPDC-REV3D                          RTL/6000 FILE EDIT
REVISION: 000.00                           MICROPROGRAM SECTION
                                                                      ADDRESS  IMAGE
  LINE #                         SEQUENCE: SSUPCS                     (HEX)    (HEX)
                                   -continued
1799000
1800000  S        \SKIP IF EQUAL                          \             0F1    C086
1801000           TFO TEQZ                                ;
1802000
1803000  S        GTO ($BLT-BUSSR2)                       ;             0F2    F0EC
1804000
1805000  S        \SKIP IF SPA WRAPAROUND(TEST DONE)      \             0F3    C0A6
1806000           TFO TSAW                                ;
1807000
1808000  S        GTO ($BLT-BUSSR1)                       ;             0F4    F0DE
1809000
1810000           \END OF BUS INTERFACE REGISTER TEST     \
1811000
1812000  SKIP HOF                                         ;

MODEL: MPDC-REV3D                          RTL/6000 FILE EDIT
REVISION: 000.00                           MICROPROGRAM SECTION
                                                                      ADDRESS  IMAGE
  LINE #                         SEQUENCE: SSUPCS                     (HEX)    (HEX)
1813000           \THE FOLLOWING TEST IS USED TO VERIFY THE LOAD CAPABILITY
1814000           OF THE ADAPTER FIFO. THE TEST LOADS THE ADAPTER FIFO
1815000           FROM SPM WHICH WAS PREVIOUSLY LOADED BY THE $BLT-NEXT09
1816000           ROUTINE.                                \
1817000
1818000  $BLT-NEXT11  \CLEAR ACU                          \             0F5    0010
1819000           CRF                                     ;
1820000
1821000  S        \RESET ENABLE HARDWARE                  \             0F6    C050
1822000           TFZ TAX0 AACU                           ;
1823000
1824000  S        TFO TAX0 AACU                           ;             0F7    C090
1825000
1826000  S        \NO OP                                  \             0F8    0000
1827000           NOP                                     ;
1828000
1829000  S        \CLEAR SPA                              \             0F9    8800
1830000           LCN ASPA CNST (00#)                     ;
1831000
1832000  S        \CLEAR ADAPTER COMMAND REGISTER         \             0FA    9800
1833000           LCN AAD2 CNST (00#)                     ;
1834000
1835000  S        \CLEAR ADAPTER FIFO                     \             0FB    746B
1836000           XFB AAD5 SRIA                           ;
1837000
1838000  S        \SET S.P. TEST MODE                     \             0FC    A080
1839000           SPT                                     ;
1840000
1841000  S        \RESET ADAPTER                          \             0FD    0088
1842000           RDA                                     ;
1843000
1844000  S        \SET RANGE COUNTER TO NON ZERO          \             0FE    4040
1845000           DRC                                     ;
1846000
1847000  S        \HEX FF TO ACU                          \             0FF    83EB
1848000           LCN CNST (FF#)                          ;
1849000
1850000  S        \ACU TO SPA                             \             100    686A
1851000           XFB ASPA SRIA                           ;
1852000
1853000  SKIP HOF                                         ;

MODEL: MPDC-REV3D                          RTL/6000 FILE EDIT
REVISION: 000.00                           MICROPROGRAM SECTION
                                                                      ADDRESS  IMAGE
  LINE #                         SEQUENCE: SSUPCS                     (HEX)    (HEX)
1854000  $BLT-ADFIFO  \SPM TO ADAPTER FIFO                \             101    716A
1855000           XFB AAD0 BSPM SRIA                      ;
1856000
1857000  S        \DECREMENT SPA                          \             102    A008
1858000           DMA                                     ;
1859000
1860000  S        \SPM TO ADAPTER FIFO                    \             103    716A
1861000           XFB AAD0 BSPM SRIA                      ;
1862000
1863000  S        \INCREMENT SPA                          \             104    A100
1864000           IMA                                     ;
1865000
1866000  S        \LOAD ADAPTER COMMAND                   \             105    9802
1867000           LCN AAD2 CNST (C2#)                     ;
1868000
1869000  S        \ENABLE READ HARDWARE PATH              \             106    0600
1870000           ERP                                     ;
1871000
1872000  S        \TRANSFER ADAPTER FIFO TO ACU           \             107    603E
1873000           XFA                                     ;
1874000
1875000  S        \UNLOAD BYTE FROM ADAPTER FIFO          \             108    7C7F
1876000           XFA AAD7 SRIA                           ;
1877000
1878000  SKIP HOF                                         ;

MODEL: MPDC-REV3D                          RTL/6000 FILE EDIT
REVISION: 000.00                           MICROPROGRAM SECTION
                                                                      ADDRESS  IMAGE
  LINE #                         SEQUENCE: SSUPCS                     (HEX)    (HEX)
1879000  S        \NO OP FOR TIMING                       \             109    0000
1880000           NOP                                     ;
1881000
1882000  S        \SKIP IF ADAPTER HARDWARE REQUEST       \             10A    C0B0
1883000           TFO TAHR                                ;
1884000
1885000  S        \HALT- ADAPTER FAILURE                  \             10B    0040
1886000           HLT                                     ;
1887000
1888000  S        \COMPARE ACU TO SPA                     \             10C    681A
1889000           XOR ASPA                                ;
1890000
1891000  S        \SKIP IF EQUAL                          \             10D    C086
1892000           TFO TEQZ                                ;
1893000
```

MODEL: MPDC-REV3D
REVISION: 000.00

RTL/6000 FILE EDIT
MICROPROGRAM SECTION

08/01/77    12.605   PAGE: 48
DOC.#:

| LINE # | | | SEQUENCE: SSUPCS -continued | ADDRESS (HEX) | IMAGE (HEX) |
|---|---|---|---|---|---|
| 1894000 | S | | \HALT- ADAPTER FIFO ERROR | 10E | 0040 |
| 1895000 | | | HLT | | |
| 1896000 | | | | | |
| 1897000 | S | | \DECREMENT SPA | 10F | A008 |
| 1898000 | | | DMA | | |
| 1899000 | | | | | |
| 1900000 | S | | \LOAD ADAPTER COMMAND | 110 | 9802 |
| 1901000 | | | LCN AAD2 CNST (C2#) | | |
| 1902000 | | | | | |
| 1903000 | S | | \ENABLE HEAD HARDWARE PATH | 111 | 0600 |
| 1904000 | | | ERP | | |
| 1905000 | | | | | |
| 1906000 | S | | \TRANSFER ADAPTER FIFO TO ACU | 112 | 603E |
| 1907000 | | | XFA | | |
| 1908000 | | | | | |
| 1909000 | S | | \UNLOAD BYTE FROM ADAPTER FIFO | 113 | 7C7F |
| 1910000 | | | XFA AAD7 SRIA | | |
| 1911000 | | | | | |
| 1912000 | S | | \NO OP FOR TIMING | 114 | 0000 |
| 1913000 | | | NOP | | |
| 1914000 | | | | | |
| 1915000 | S | | \SKIP IF ADAPTER HARDWARE REQ RESET | 115 | C040 |
| 1916000 | | | TFZ TAHR | | |
| 1917000 | | | | | |
| 1918000 | S | | \HALT- ADAPTER FAILURE | 116 | 0040 |
| 1919000 | | | HLT | | |
| 1920000 | | | | | |
| 1921000 | SKIP HOF | | | | |

MODEL: MPDC-REV3D
REVISION: 000.00

RTL/6000 FILE EDIT
MICROPROGRAM SECTION

08/01/77    12.605   PAGE: 49
DOC.#:

| LINE # | | | SEQUENCE: SSUPCS | ADDRESS (HEX) | IMAGE (HEX) |
|---|---|---|---|---|---|
| 1922000 | S | | \COMPARE ACU TO SPA | 117 | 681A |
| 1923000 | | | XOR ASPA | | |
| 1924000 | | | | | |
| 1925000 | S | | \SKIP IF EQUAL | 118 | C086 |
| 1926000 | | | TFO TEQZ | | |
| 1927000 | | | | | |
| 1928000 | S | | \HALT- ADAPTER FIFO ERROR | 119 | 0040 |
| 1929000 | | | HLT | | |
| 1930000 | | | | | |
| 1931000 | S | | \DECREMENT SPA | 11A | A008 |
| 1932000 | | | DMA | | |
| 1933000 | | | | | |
| 1934000 | S | | \CLEAR ADAPTER COMMAND | 11B | 784E |
| 1935000 | | | ZER AAD2 SRIA | | |
| 1936000 | | | | | |
| 1937000 | S | | \SKIP IF TEST DONE | 11C | C0A6 |
| 1938000 | | | TFO TSAW | | |
| 1939000 | | | | | |
| 1940000 | S | | GTO ($BLT-ADFIFO) | 11D | F101 |
| 1941000 | | | | | |
| 1942000 | S | | \CLEAR ADAPTER COMMAND | 11E | 9800 |
| 1943000 | | | LCN AAD2 CNST (00#) | | |
| 1944000 | | | | | |
| 1945000 | | | \END OF ADAPTER WRAPAROUND TEST | | |
| 1946000 | | | | | |
| 1947000 | SKIP HOF | | | | |

MODEL: MPDC-REV3D
REVISION: 000.00

RTL/6000 FILE EDIT
MICROPROGRAM SECTION

08/01/77    12.605   PAGE: 50
DOC.#:

| LINE # | | | SEQUENCE: SSUPCS | ADDRESS (HEX) | IMAGE (HEX) |
|---|---|---|---|---|---|
| 1948000 | | | \THE FOLLOWING ROUTINE IS USED TO WRAP THE BUS LOGIC TO | | |
| 1949000 | | | VERIFY THE DRIVERS AND RECEIVERS AS WELL AS THE BUS | | |
| 1950000 | | | ADDRESS AND DATA REGISTERS. THE TEST SENDS BAD MODULE | | |
| 1951000 | | | ADDRESS PARITY IN ORDER TO CYCLE THE BUS WITHOUT A | | |
| 1952000 | | | RESPONSE FROM MEMORY. THERE ARE FOUR PORTIONS OF THIS | | |
| 1953000 | | | TEST DEFINED AS FOLLOWS- | | |
| 1954000 | | | | | |
| 1955000 | | | 1. CYCLE THE BUS WITH ALL ZEROS PATTERN USING THE | | |
| 1956000 | | | HARDWARE DATA TRANSFER REGISTERS. | | |
| 1957000 | | | 2. CYCLE THE BUS WITH ALL ONES PATTERN USING THE | | |
| 1958000 | | | HARDWARE DATA TRANSFER REGISTERS. | | |
| 1959000 | | | 3. CYCLE THE BUS WITH ALL ZEROS PATTERN USING THE | | |
| 1960000 | | | SECOND HALF READ REGISTERS. | | |
| 1961000 | | | 4. CYCLE THE BUS WITH ALL ONES PATTERN USING THE | | |
| 1962000 | | | SECOND HALF READ REGISTERS. | | |
| 1963000 | | | | | |
| 1964000 | SBLT-NEXT12 | | \CLEAR ACU | 11F | 0010 |
| 1965000 | | | CRF | | |
| 1966000 | | | | | |
| 1967000 | S | | \CLEAR CYCLE BYTE | 120 | 4020 |
| 1968000 | | | CYC | | |
| 1969000 | | | | | |
| 1970000 | S | | \CLEAR SPA | 121 | 8800 |
| 1971000 | | | LCN ASPA CNST (00#) | | |
| 1972000 | | | | | |
| 1973000 | S | | \SET MODULE BAD PARITY | 122 | A024 |
| 1974000 | | | MBP | | |
| 1975000 | | | | | |
| 1976000 | S | | \SET RETURN FROM BUS LOAD | 123 | E131 |
| 1977000 | | | LRA ($BLTBUSWR1) | | |
| 1978000 | | | | | |
| 1979000 | SBLTBUSLD1 | | \RESET BUS | 124 | 4084 |
| 1980000 | | | RST | | |
| 1981000 | | | | | |
| 1982000 | S | | \LOAD MSB DATA | 125 | 646B |
| 1983000 | | | XFB ABUS2 SRIA | | |
| 1984000 | | | | | |
| 1985000 | S | | \LOAD LSB DATA | 126 | 686B |
| 1986000 | | | XFB ABUS3 SRIA | | |
| 1987000 | | | | | |
| 1988000 | SKIP HOF | | | | |

MODEL: MPDC-REV3D  
REVISION: 000.00

RTL/6000 FILE EDIT  
MICROPROGRAM SECTION

08/01/77  12.605  PAGE: 51  
DOC.#:

| LINE # | | | SEQUENCE: SSUPCS | ADDRESS (HEX) | IMAGE (HEX) |
|---|---|---|---|---|---|
| 1989000 | SBLTBUSLD1A | \LOAD ADDRESS LOW | \ | 127 | 6C6B |
| 1990000 | | XFB ABUS4 SRIA | ; | | |
| 1991000 | | | | | |
| 1992000 | $ | \LOAD ADDRESS MID | \ | 128 | 6C6B |
| 1993000 | | XFB ABUS4 SRIA | ; | | |
| 1994000 | | | | | |
| 1995000 | $ | \LOAD ADDRESS HI | \ | 129 | 6C6B |
| 1996000 | | XFB ABUS4 SRIA | ; | | |
| 1997000 | | | | | |
| 1998000 | $ | \CYCLE CONSTANT TO ACU | \ | 12A | 8300 |
| 1999000 | | LCN CNST (CO#) | ; | | |
| 2000000 | | | | | |
| 2001000 | $ | \SET BUS CYCLE | \ | 12B | 4020 |
| 2002000 | | CYC | ; | | |
| 2003000 | | | | | |
| 2004000 | SBLTBUSLD2 | \SKIP IF MYDCNN SET | \ | 12C | C0AE |
| 2005000 | | TFO TDCN | ; | | |
| 2006000 | | | | | |
| 2007000 | $ | GTO (SBLTBUSLD2) | ; | 12D | F12C |
| 2008000 | | | | | |
| 2009000 | $ | \SET FIRMWARE BUS ACK | \ | 12E | 0002 |
| 2010000 | | SBA | ; | | |
| 2011000 | | | | | |
| 2012000 | $ | \MSB OF DATA REG TO ACU | \ | 12F | 643F |
| 2013000 | | XFA ABUS2 | ; | | |
| 2014000 | | | | | |
| 2015000 | $ | RTN | ; | 130 | C200 |
| 2016000 | | | | | |
| 2017000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 52  
DOC.#:

| LINE # | | | SEQUENCE: SSUPCS | ADDRESS (HEX) | IMAGE (HEX) |
|---|---|---|---|---|---|
| 2018000 | SBLTBUSWR1 | \OR LSB OF DATA WITH ACU | \ | 131 | 683B |
| 2019000 | | ORR ABUS3 | ; | | |
| 2020000 | | | | | |
| 2021000 | $ | \OR LOW ADDRESS WITH ACU | \ | 132 | 603B |
| 2022000 | | ORR ABUS1 | ; | | |
| 2023000 | | | | | |
| 2024000 | $ | \OR MID ADDRESS WITH ACU | \ | 133 | 603B |
| 2025000 | | ORR ABUS1 | ; | | |
| 2026000 | | | | | |
| 2027000 | $ | \OR HI ADDRESS WITH ACU | \ | 134 | 603B |
| 2028000 | | ORR ABUS1 | ; | | |
| 2029000 | | | | | |
| 2030000 | $ | \CHECK ACU FOR ALL ZEROS | \ | 135 | 602A |
| 2031000 | | XFB BACU | ; | | |
| 2032000 | | | | | |
| 2033000 | $ | \SKIP IF ACU EQUAL TO ZERO | \ | 136 | C086 |
| 2034000 | | TFO TEQZ | ; | | |
| 2035000 | | | | | |
| 2036000 | $ | \HALT- BUS WRAPAROUND FAILURE | \ | 137 | 0040 |
| 2037000 | | HLT | ; | | |
| 2038000 | | | | | |
| 2039000 | $ | \HEX FF TO ACU | \ | 138 | 83EB |
| 2040000 | | LCN CNST (FF#) | ; | | |
| 2041000 | | | | | |
| 2042000 | $ | \SET RETURN FROM BUS LOAD | \ | 139 | E13B |
| 2043000 | | LRA (SBLTBUSWR2) | ; | | |
| 2044000 | | | | | |
| 2045000 | $ | GTO (SBLTBUSLD1) | ; | 13A | F124 |
| 2046000 | | | | | |
| 2047000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 53  
DOC.#:

| LINE # | | | SEQUENCE: SSUPCS | ADDRESS (HEX) | IMAGE (HEX) |
|---|---|---|---|---|---|
| 2048000 | SBLTBUSWR2 | \AND LSB OF DATA WITH ACU | \ | 13B | 682F |
| 2049000 | | AND ABUS3 | ; | | |
| 2050000 | | | | | |
| 2051000 | $ | \AND LOW ADDRESS WITH ACU | \ | 13C | 602F |
| 2052000 | | AND ABUS1 | ; | | |
| 2053000 | | | | | |
| 2054000 | $ | \AND MID ADDRESS WITH ACU | \ | 13D | 602F |
| 2055000 | | AND ABUS1 | ; | | |
| 2056000 | | | | | |
| 2057000 | $ | \AND HI ADDRESS WITH ACU | \ | 13E | 602F |
| 2058000 | | AND ABUS1 | ; | | |
| 2059000 | | | | | |
| 2060000 | $ | \CHECK ACU FOR ALL ONES | \ | 13F | 602A |
| 2061000 | | XFB BACU | ; | | |
| 2062000 | | | | | |
| 2063000 | $ | \SKIP IF ACU EQUAL TO ONES | \ | 140 | C088 |
| 2064000 | | TFO TEQF | ; | | |
| 2065000 | | | | | |
| 2066000 | $ | \HALT- BUS WRAPAROUND FAILURE | \ | 141 | 0040 |
| 2067000 | | HLT | ; | | |
| 2068000 | | | | | |
| 2069000 | $ | \CLEAR ACU | \ | 142 | 600E |
| 2070000 | | ZER | ; | | |
| 2071000 | | | | | |
| 2072000 | $ | \RESET BUS | \ | 143 | 4084 |
| 2073000 | | RST | ; | | |
| 2074000 | | | | | |
| 2075000 | $ | \ONES TO MSB OF DATA | \ | 144 | 6457 |
| 2076000 | | BNT ABUS2 SRIA | ; | | |
| 2077000 | | | | | |
| 2078000 | $ | \ONES TO LSB OF DATA | \ | 145 | 6857 |
| 2079000 | | BNT ABUS3 SRIA | ; | | |
| 2080000 | | | | | |
| 2081000 | $ | \SET RETURN | \ | 146 | E148 |
| 2082000 | | LRA (SBLTBUSWR2A) | ; | | |
| 2083000 | | | | | |
| 2084000 | $ | GTO (SBLTBUSLD1A) | ; | 147 | F127 |
| 2085000 | | | | | |
| 2086000 | SBLTBUSWR2A | \SET RETURN FROM BUS LOAD | \ | 148 | E15B |
| 2087000 | | LRA (SBLTBUSWR3) | ; | | |
| 2088000 | | | | | |
| 2089000 | $ | \CLEAR ACU | \ | 149 | 600E |
| 2090000 | | ZER | ; | | |
| 2091000 | | | | | |
| 2092000 | SKIP HOF | | ; | | |

```
MODEL: MPDC-REV30                              RTL/6000 FILE EDIT                    08/01/77   12.605  PAGE:  54
REVISION: 000.00                               MICROPROGRAM SECTION                  DOC.#:
                                                                          ADDRESS   IMAGE
LINE #                                SEQUENCE: $$UPCS                     (HEX)    (HEX)
2093000 SBLTBUSLD3    \ LOAD H.W. ADDRESS REG LOW       \                   14A     6C6B
2094000               XFB ABUS4 SRIA                    ;
2095000
2096000  S            \ LOAD H.W. ADDRESS REG MID       \                   14B     6C6B
2097000               XFB ABUS4 SRIA                    ;
2098000
2099000  S            \ LOAD H.W. ADDRESS HI            \                   14C     6C6B
2100000               XFB ABUS4 SRIA                    ;
2101000
2102000  S            \LOAD MSB OF DATA REG             \                   14D     646B
2103000               XFB ABUS2 SRIA                    ;
2104000
2105000  S            \LOAD LSB OF DATA REG             \                   14E     686B
2106000               XFB ABUS3 SRIA                    ;
2107000
2108000  S            \LOAD MSB OF SHR REG              \                   14F     6057
2109000               BNT ABUS1 SRIA                    ;
2110000
2111000  S            \LOAD LSB OF SHR REG              \                   150     6057
2112000               BNT ABUS1 SRIA                    ;
2113000
2114000  S            \CYCLE CONSTANT TO ACU            \                   151     8340
2115000               LCN CNST (00#)                    ;
2116000
2117000  S            \SET BUS CYCLE                    \                   152     4020
2118000               CYC                               ;
2119000
2120000 SBLTBUSLD4    \SKIP IF MYDCNN SET               \                   153     C0AE
2121000               TFO TDCN                          ;
2122000
2123000  S            GTO (SBLTBUSLD4)                  ;                   154     F153
2124000
2125000  S            \SET FIRMWARE BUS ACK             \                   155     0002
2126000               SBA                               ;
2127000
2128000  S            \MSB OF DATA REG TO ACU           \                   156     643F
2129000               XFA ABUS2                         ;
2130000
2131000  S            RTN                               ;                   157     C200
2132000
2133000 SKIP HOF                                        ;

MODEL: MPDC-REV30                              RTL/6000 FILE EDIT                    08/01/77   12.605  PAGE:  55
REVISION: 000.00                               MICROPROGRAM SECTION                  DOC.#:
                                                                          ADDRESS   IMAGE
LINE #                                SEQUENCE: $$UPCS                     (HEX)    (HEX)
2134000 SBLTBUSWR3    \NOR LSB OF DATA WITH ACU         \                   158     682F
2135000               AND ABUS3                         ;
2136000
2137000  S            \AND LOW ADDRESS WITH ACU         \                   159     602F
2138000               AND ABUS1                         ;
2139000
2140000  S            \AND MID ADDRESS WITH ACU         \                   15A     602F
2141000               AND ABUS1                         ;
2142000
2143000  S            \AND HI ADDRESS WITH ACU          \                   15B     601B
2144000               XOR ABUS1                         ;
2145000
2146000  S            \CHECK ACU FOR ALL ONES           \                   15C     602A
2147000               XFB BACU                          ;
2148000
2149000  S            \SKIP IF ACU EQUAL TO ONES        \                   15D     C088
2150000               TFO TEQF                          ;
2151000
2152000  S            \HALT- BUS SHR WRAPAROUND FAILURE \                   15E     0040
2153000               HLT                               ;
2154000
2155000  S            \HEX FF TO ACU                    \                   15F     83EB
2156000               LCN CNST (FF#)                    ;
2157000
2158000  S            \RESET BUS                        \                   160     4084
2159000               RST                               ;
2160000
2161000  S            \SET RETURN FROM BUS LOAD         \                   161     E163
2162000               LRA (SBLTBUSWR4)                  ;
2163000
2164000  S            GTO (SBLTBUSLD3)                  ;                   162     F14A
2165000
2166000 SKIP HOF                                        ;

MODEL: MPDC-REV30                              RTL/6000 FILE EDIT                    08/01/77   12.605  PAGE:  56
REVISION: 000.00                               MICROPROGRAM SECTION                  DOC.#:
                                                                          ADDRESS   IMAGE
LINE #                                SEQUENCE: $$UPCS                     (HEX)    (HEX)
2167000 SBLTBUSWR4    \NAND LSB OF DATA WITH ACU        \                   163     683B
2168000               ORR ABUS3                         ;
2169000
2170000  S            \OR LOW ADDRESS WITH ACU          \                   164     603B
2171000               ORR ABUS1                         ;
2172000
2173000  S            \OR MID ADDRESS WITH ACU          \                   165     603B
2174000               ORR ABUS1                         ;
2175000
2176000  S            \OR HI ADDRESS WITH ACU           \                   166     6027
2177000               XNR ABUS1                         ;
2178000
2179000  S            \CHECK ACU FOR ALL ZEROS          \                   167     602A
2180000               XFB BACU                          ;
2181000
2182000  S            \SKIP IF ACU EQUAL TO ZERO        \                   168     C086
2183000               TFO TEQZ                          ;
2184000
2185000  S            \HALT- BUS SHR WRAPAROUND FAILURE \                   169     0040
2186000               HLT                               ;
2187000
2188000 SKIP HOF                                        ;
```

```
MODEL: MPDC-REV3D                              RTL/6000 FILE EDIT                    08/01/77     12.605  PAGE:  57
REVISION: 000.00                               MICROPROGRAM SECTION                     DOC.#:
                                                                              ADDRESS  IMAGE
 LINE #                                 SEQUENCE: SSUPCS                       (HEX)   (HEX)
 2189000         \THE FOLLOWING ROUTINE IS USED TO WRAP THE MOTHER BOARD
 2190000         \FIFO THRU THE ADAPTER TO CHECK THE READ AND WRITE CYCLE
 2191000         LOGIC.                                                  \
 2192000
 2193000 SBLT-NEXTL3     \CLEAR ACU                                      \        16A   0010
 2194000                 CRF                                             ;
 2195000
 2196000    S            \RESET ENABLE HARDWARE                          \        16B   C050
 2197000                 TFZ TAX0 AACU                                   ;
 2198000
 2199000    S            TFO TAX0 AACU                                   ;        16C   C090
 2200000
 2201000    S            NOP                                             ;        16D   0000
 2202000
 2203000    S            \CLEAR CYCLE REGISTER                           \        16E   4020
 2204000                 CYC                                             ;
 2205000
 2206000    S            \CLEAR ADAPTER COMMAND                          \        16F   9800
 2207000                 LCN AAD2 CNST (00#)                             ;
 2208000
 2209000    S            \RESET BUS STATUS                               \        170   4084
 2210000                 RST                                             ;
 2211000
 2212000    S            \CLEAR SPA                                      \        171   8800
 2213000                 LCN ASPA CNST (00#)                             ;
 2214000
 2215000    S            \CLEAR MOTHER BOARD FIFO                        \        172   0088
 2216000                 RDA                                             ;
 2217000
 2218000    S            \CLEAR ADAPTER FIFO                             \        173   744F
 2219000                 ZER AAD5 SRIA                                   ;
 2220000
 2221000    S            \SET MODULE BAD PARITY                          \        174   A024
 2222000                 MBP                                             ;
 2223000
 2224000    S            \SET S.P. TEST MODE                             \        175   A080
 2225000                 SPT                                             ;
 2226000
 2227000 SKIP HOF                                                        ;

MODEL: MPDC-REV3D                              RTL/6000 FILE EDIT                    08/01/77     12.605  PAGE:  58
REVISION: 000.00                               MICROPROGRAM SECTION                     DOC.#:
                                                                              ADDRESS  IMAGE
 LINE #                                 SEQUENCE: SSUPCS                       (HEX)   (HEX)
 2228000    S            \HEX FF TO SPA                                  \        176   88EB
 2229000                 LCN ASPA CNST (FF#)                             ;
 2230000
 2231000    S            \CLEAR OFFSET RANGE LOWER                       \        177   6C6B
 2232000                 XFB ABUS4 SRIA                                  ;
 2233000
 2234000    S            \CLEAR OFFSET RANGE HI                          \        178   6C6B
 2235000                 XFB ABUS4 SRIA                                  ;
 2236000
 2237000    S            \CLEAR RANGE LOW                                \        179   6C6B
 2238000                 XFB ABUS4 SRIA                                  ;
 2239000
 2240000    S            \CLEAR RANGE HI                                 \        17A   6C6B
 2241000                 XFB ABUS4 SRIA                                  ;
 2242000
 2243000    S            \CLEAR ADDRESS LOW                              \        17B   6C6B
 2244000                 XFB ABUS4 SRIA                                  ;
 2245000
 2246000    S            \CLEAR ADDRESS MID                              \        17C   6C6B
 2247000                 XFB ABUS4 SRIA                                  ;
 2248000
 2249000    S            \CLEAR ADDRESS HI                               \        17D   6C6B
 2250000                 XFB ABUS4 SRIA                                  ;
 2251000
 2252000    S            \SET RANGE TO NON ZERO                          \        17E   4040
 2253000                 DRC                                             ;
 2254000
 2255000 SKIP HOF                                                        ;

MODEL: MPDC-REV3D                              RTL/6000 FILE EDIT                    08/01/77     12.605  PAGE:  59
REVISION: 000.00                               MICROPROGRAM SECTION                     DOC.#:
                                                                              ADDRESS  IMAGE
 LINE #                                 SEQUENCE: SSUPCS                       (HEX)   (HEX)
 2256000 SBUSCYWRT1      \CYCLE CONSTANT TO ACU                          \        17F   8182
 2257000                 LCN CNST (62#)                                  ;
 2258000
 2259000    S            \RESET BUS                                      \        180   4084
 2260000                 RST                                             ;
 2261000
 2262000    S            \SET BUS CYCLE                                  \        181   4020
 2263000                 CYC                                             ;
 2264000
 2265000 SBUSCYWRT2      \SKIP IF MYDCNN SET                             \        182   C0AE
 2266000                 TFO TDCN                                        ;
 2267000
 2268000    S            GTO (SBUSCYWRT2)                                ;        183   F182
 2269000
 2270000    S            \SET BUS ACK                                    \        184   0002
 2271000                 SBA                                             ;
 2272000
 2273000    S            \LOAD DATA HI                                   \        185   656B
 2274000                 XFB ABUS2 BSPM SRIA                             ;
 2275000
 2276000    S            \DECREMENT SPA                                  \        186   A008
 2277000                 DMA                                             ;
 2278000
 2279000    S            \LOAD DATA LOW                                  \        187   696B
 2280000                 XFB ABUS3 BSPM SRIA                             ;
 2281000
 2282000    S            \DECREMENT SPA                                  \        188   A008
 2283000                 DMA                                             ;
 2284000
 2285000 SKIP HOF                                                        ;
```

MODEL: MPDC-REV3D                    RTL/6000 FILE EDIT                 08/01/77    12.605  PAGE:  60
REVISION: 000.00                     MICROPROGRAM SECTION                DOC.#:

ADDRESS  IMAGE
LINE #                                 SEQUENCE: SSUPC5                  (HEX)   (HEX)
2286000  SBUSCYWRT3    \SKIP IF MYDCNN SET                  \             189    C0AE
2287000                TFO TDCN                             ;
2288000
2289000  $             GTO (SBUSCYWRT3)                     ;            18A    F189
2290000
2291000  $             \SET FIRMWARE BUS ACK                \            18B    0002
2292000                SBA                                  ;
2293000
2294000  $             \CLEAR ACU                           \            18C    600E
2295000                ZER                                  ;
2296000
2297000  $             \SKIP IF MOTHER BOARD FIFO FULL      \            18D    C042
2298000                TFZ TBCA                             ;
2299000
2300000  $             GTO (SBUSCYWRT2)                     ;            18E    F182
2301000
2302000  $             \CLEAR ADAPTER FIFO                  \            18F    746B
2303000                XFB AAD5 SRIA                        ;
2304000
2305000  $             \CLEAR CYCLE BYTE                    \            190    4020
2306000                CYC                                  ;
2307000
2308000  $             \SET DATA COUNTER TO 16              \            191    9408
2309000                LCN AAD1 CNST (04#)                  ;
2310000
2311000  $             \LOAD ADAPTER COMMAND                \            192    9808
2312000                LCN AAD2 CNST (C4#)                  ;
2313000
2314000  $             \CYCLE CONSTANT TO ACU               \            193    8182
2315000                LCN CNST (62#)                       ;
2316000
2317000  $             \ENABLE WRITE HARDWARE PATH          \            194    0601
2318000                EWP                                  ;
2319000
2320000  $             \SET CYCLE                           \            195    4020
2321000                CYC                                  ;
2322000
2323000  SKIP HOF                                           ;

MODEL: MPDC-REV3D                    RTL/6000 FILE EDIT                 08/01/77    12.605  PAGE:  61
REVISION: 000.00                     MICROPROGRAM SECTION                DOC.#:

ADDRESS  IMAGE
LINE #                                 SEQUENCE: SSUPC5                  (HEX)   (HEX)
2324000  SBUSCYWRTA1   \SKIP IF NO BUFFER REQUEST           \            196    C0BC
2325000                TFO TNBR                             ;
2326000
2327000  $             GTO (SBUSCYWRTA1)                    ;            197    F196
2328000
2329000  SBUSCYWRTA2   \WAIT FOR BUS NAK                    \            198    C0B6
2330000                TFO TNAK                             ;
2331000
2332000  $             GTO (SBUSCYWRTA2)                    ;            199    F198
2333000
2334000  $             \CLEAR ACU                           \            19A    600E
2335000                ZER                                  ;
2336000
2337000  $             \CLEAR ADAPTER COMMAND               \            19B    784E
2338000                ZER AAD2 SRIA                        ;
2339000
2340000  $             \RESET BUS                           \            19C    4084
2341000                RST                                  ;
2342000
2343000  $             \RESET CYCLE BYTE                    \            19D    4020
2344000                CYC                                  ;
2345000
2346000  $             \16 TO ACU                           \            19E    8040
2347000                LCN CNST (10#)                       ;
2348000
2349000  $             \SET SPA FOR STARTING ADDRESS OF COMPARE \        19F    6864
2350000                ADD ASPA BACU SRIA                   ;
2351000
2352000  $             \SET DATA COUNT TO 16                \            1A0    9420
2353000                LCN AAD1 CNST (08#)                  ;
2354000
2355000  $             \LOAD ADAPTER COMMAND                \            1A1    9802
2356000                LCN AAD2 CNST (C2#)                  ;
2357000
2358000  SKIP HOF                                           ;

MODEL: MPDC-REV3D                    RTL/6000 FILE EDIT                 08/01/77    12.605  PAGE:  62
REVISION: 000.00                     MICROPROGRAM SECTION                DOC.#:

ADDRESS  IMAGE
LINE #                                 SEQUENCE: SSUPC5                  (HEX)   (HEX)
2359000  SBUSCYRDA1    \CYCLE CONSTANT TO ACU               \            1A2    8108
2360000                LCN CNST (44#)                       ;
2361000
2362000  $             \ENABLE READ HARDWARE PATH           \            1A3    0600
2363000                ERP                                  ;
2364000
2365000  $             \SET CYCLE                           \            1A4    4020
2366000                CYC                                  ;
2367000
2368000  SBUSCYRDA2    \SKIP IF MYDCNN SET                  \            1A5    C0AE
2369000                TFO TDCN                             ;
2370000
2371000  $             GTO (SBUSCYRDA2)                     ;            1A6    F1A5
2372000
2373000  $             \SET FIRMWARE BUS ACK                \            1A7    0002
2374000                SBA                                  ;
2375000
2376000  $             \COMPARE DATA HI TO SPM              \            1A8    651B
2377000                XOR ABUS2 BSPM                       ;
2378000
2379000  $             \SKIP IF EQUAL                       \            1A9    C0B6
2380000                TFO TEQZ                             ;
2381000
2382000  $             \HALT- FIFO BUS WRAPAROUND FAILURE   \            1AA    0040
2383000                HLT                                  ;
2384000

| MODEL: MPDC-REV3D | | | | | |
|---|---|---|---|---|---|
| REVISION: 000.00 | | RTL/6000 FILE EDIT MICROPROGRAM SECTION | | 08/01/77 DOC.#: | 12.605 PAGE: 62 |
| LINE # | | SEQUENCE: $SUPCS -continued | | ADDRESS (HEX) | IMAGE (HEX) |
| 2385000 | S | \DECREMENT SPA | \ | | |
| 2386000 | | DMA | ; | 1AB | A008 |
| 2387000 | | | | | |
| 2388000 | S | \COMPARE DATA LOW TO SPM | \ | | |
| 2389000 | | XOR ABUS3 BSPM | ; | 1AC | 691B |
| 2390000 | | | | | |
| 2391000 | S | \SKIP IF EQUAL | \ | | |
| 2392000 | | TFO TEQZ | ; | 1AD | C086 |
| 2393000 | | | | | |
| 2394000 | S | \HALT- FIFO BUS WRAPAROUND FAILURE | \ | | |
| 2395000 | | HLT | ; | 1AE | 0040 |
| 2396000 | | | | | |
| 2397000 | SKIP HOF | | ; | | |

| MODEL: MPDC-REV3D | | | | | |
|---|---|---|---|---|---|
| REVISION: 000.00 | | RTL/6000 FILE EDIT MICROPROGRAM SECTION | | 08/01/77 DOC.#: | 12.605 PAGE: 63 |
| LINE # | | SEQUENCE: $SUPCS | | ADDRESS (HEX) | IMAGE (HEX) |
| 2398000 | S | \DECREMENT SPA | \ | | |
| 2399000 | | DMA | ; | 1AF | A008 |
| 2400000 | | | | | |
| 2401000 | S | \CLEAR ACU | \ | | |
| 2402000 | | ZER | ; | 1B0 | 600E |
| 2403000 | | | | | |
| 2404000 | S | \CLEAR CYCLE REGISTER | \ | | |
| 2405000 | | CYC | ; | 1B1 | 4020 |
| 2406000 | | | | | |
| 2407000 | S | \SKIP IF NO ADAPTER HARDWARE REQUEST | \ | | |
| 2408000 | | TFZ TAHR | ; | 1B2 | C040 |
| 2409000 | | | | | |
| 2410000 | S | GTO ($BUSCYRDA1) | ; | 1B3 | F1A2 |
| 2411000 | | | | | |
| 2412000 | S | \CLEAR ADAPTER COMMAND | \ | | |
| 2413000 | | LCN AAD2 CNST (00#) | ; | 1B4 | 9800 |
| 2414000 | | | | | |
| 2415000 | S | \CLEAR MOTHER BOARD FIFO | \ | | |
| 2416000 | | RDA | ; | 1B5 | 0088 |
| 2417000 | | | | | |
| 2418000 | S | \SKIP IF TEST DONE | \ | | |
| 2419000 | | TFO TSAW | ; | 1B6 | C0A6 |
| 2420000 | | | | | |
| 2421000 | S | GTO ($BUSCYWRT1) | ; | 1B7 | F17F |
| 2422000 | | | | | |
| 2423000 | S | \CLEAR MODULE BAD PARITY | \ | | |
| 2424000 | | LRC | ; | 1B8 | A020 |
| 2425000 | | | | | |
| 2426000 | S | \RESET BUS | \ | | |
| 2427000 | | RST | ; | 1B9 | 4084 |
| 2428000 | | | | | |
| 2429000 | | \END OF BUS WRAPAROUND TEST | \ | | |
| 2430000 | | | | | |
| 2431000 | SKIP HOF | | ; | | |

| MODEL: MPDC-REV3D | | | | | |
|---|---|---|---|---|---|
| REVISION: 000.00 | | RTL/6000 FILE EDIT MICROPROGRAM SECTION | | 08/01/77 DOC.#: | 12.605 PAGE: 64 |
| LINE # | | SEQUENCE: $SUPCS | | ADDRESS (HEX) | IMAGE (HEX) |
| 2432000 | | \THE FOLLOWING ROUTINE IS USED TO READ MEMORY LOC. 3E# | | | |
| 2433000 | | (MEMORY YELLOW COUNTER). THE TEST CYCLES USING ALL CHANNEL | | | |
| 2434000 | | NUMBERS. WHEN MY CHANNEL IS USED, THE MPDC WILL RESPOND | | | |
| 2435000 | | WITH AN ACK VERIFING THE CHANNEL COMPARE LOGIC AS WELL AS | | | |
| 2436000 | | THE BUS ACK LOGIC. | \ | | |
| 2437000 | | | | | |
| 2438000 | $BLT-NEXT14 | \CLEAR | \ | | |
| 2439000 | | CRF | ; | 1BA | 0010 |
| 2440000 | | | | | |
| 2441000 | S | \CLEAR CYCLE REGISTER | \ | | |
| 2442000 | | CYC | ; | 1BB | 4020 |
| 2443000 | | | | | |
| 2444000 | S | \RESET BUS STATUS | \ | | |
| 2445000 | | RST | ; | 1BC | 4084 |
| 2446000 | | | | | |
| 2447000 | S | \RESET MOTHER BOARD FIFO | \ | | |
| 2448000 | | RDA | ; | 1BD | 0088 |
| 2449000 | | | | | |
| 2450000 | S | \MEMORY YELLOW ADDRESS TO ACU | \ | | |
| 2451000 | | LCN CNST (3E#) | ; | 1BE | 80EA |
| 2452000 | | | | | |
| 2453C00 | S | \ACU TO ADDRESS REG LOW | \ | | |
| 2454000 | | XFB ABUS4 SRIA | ; | 1BF | 6C6B |
| 2455000 | | | | | |
| 2456000 | S | \CLEAR ACU | \ | | |
| 2457000 | | ZER | ; | 1C0 | 600E |
| 2458000 | | | | | |
| 2459000 | S | \LOAD ADDRESS MID | \ | | |
| 2460000 | | XFB ABUS4 SRIA | ; | 1C1 | 6C6B |
| 2461000 | | | | | |
| 2462000 | S | \LOAD ADDRESS HI | \ | | |
| 2463000 | | XFB ABUS4 SRIA | ; | 1C2 | 6C6B |
| 2464000 | | | | | |
| 2465000 | S | \SET SPA WORK LOC | \ | | |
| 2466000 | | LCN ASPA CNST (00#) | ; | 1C3 | 8800 |
| 2467000 | | | | | |
| 2468000 | S | \SET STARTING CHANNEL NUMBER | \ | | |
| 2469000 | | LCN CNST (04#) | ; | 1C4 | 8008 |
| 2470000 | | | | | |
| 2471000 | S | \WRITE IN SPM | \ | | |
| 2472000 | | WIA | ; | 1C5 | A300 |
| 2473000 | | | | | |
| 2474000 | S | \SET LSB OF STARTING CHANNEL NUMBER | \ | | |
| 2475000 | | ZER | ; | 1C6 | 600E |
| 2476000 | | | | | |
| 2477000 | S | \WRITE IN SPM | \ | | |
| 2478000 | | MWT | ; | 1C7 | A200 |
| 2479000 | | | | | |
| 2480000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 65  
DOC.#:

SEQUENCE: SSUPCS

| LINE # | | | | ADDRESS (HEX) | IMAGE (HEX) |
|---|---|---|---|---|---|
| 2481000 | $BUS-MEM1 | \SET SPA FOR CHANNEL NUMBER | \ | 1C8 | 8800 |
| 2482000 | | LCN ASPA CNST (00#) | ; | | |
| 2483000 | | | | | |
| 2484000 | s | \LOAD DATA MSB | \ | 1C9 | 656B |
| 2485000 | | XFB ABUS2 SRIA BSPM | ; | | |
| 2486000 | | | | | |
| 2487000 | s | \INCREMENT SPA | \ | 1CA | A100 |
| 2488000 | | IMA | ; | | |
| 2489000 | | | | | |
| 2490000 | s | \LOAD DATA LSB | \ | 1CB | 696B |
| 2491000 | | XFB ABUS3 SRIA BSPM | ; | | |
| 2492000 | | | | | |
| 2493000 | s | \RESET BUS | \ | 1CC | 4084 |
| 2494000 | | RST | ; | | |
| 2495000 | | | | | |
| 2496000 | s | \CYCLE CONSTANT TO ACU | \ | 1CD | 8380 |
| 2497000 | | LCN CNST (E0#) | ; | | |
| 2498000 | | | | | |
| 2499000 | s | \CYCLE BUS | \ | 1CE | 4020 |
| 2500000 | | CYC | ; | | |
| 2501000 | | | | | |
| 2502000 | s | \NO OP FOR TIMING | \ | 1CF | 0000 |
| 2503000 | | NOP | ; | | |
| 2504000 | | | | | |
| 2505000 | $BUS-MEM2 | \SKIP IF NO BUS CYCLE ACTIVE | \ | 1D0 | C042 |
| 2506000 | | TFZ TBCA | ; | | |
| 2507000 | | | | | |
| 2508000 | s | GTO ($BUS-MEM2) | ; | 1D1 | F1D0 |
| 2509000 | | | | | |
| 2510000 | s | \TIME OUT CONSTANT TO ACU | \ | 1D2 | 8028 |
| 2511000 | | LCN CNST (0C#) | ; | | |
| 2512000 | | | | | |
| 2513000 | $BUS-MEM2A | \DECREMENT ACU | \ | 1D3 | 603C |
| 2514000 | | DEC | ; | | |
| 2515000 | | | | | |
| 2516000 | s | \SKIP IF TIME OUT | \ | 1D4 | C086 |
| 2517000 | | TFO TEQZ | ; | | |
| 2518000 | | | | | |
| 2519000 | s | GTO ($BUS-MEM2A) | ; | 1D5 | F1D3 |
| 2520000 | | | | | |
| 2521000 | SKIP HOF | | | | |

MODEL: MPDC-REV3D  
REVISION: 000.00

RTL/6000 FILE EDIT  
MICROPROGRAM SECTION

08/01/77  12.605  PAGE: 66  
DOC.#:

SEQUENCE: SSUPCS

| LINE # | | | | ADDRESS (HEX) | IMAGE (HEX) |
|---|---|---|---|---|---|
| 2522000 | s | \SHIFT LOW ADDRESS BYTE | \ | 1D6 | 603F |
| 2523000 | | XFA ABUS1 | ; | | |
| 2524000 | | | | | |
| 2525000 | s | \MASK UNUSED BITS | \ | 1D7 | 8204 |
| 2526000 | | ACN CNST (80#) | ; | | |
| 2527000 | | | | | |
| 2528000 | s | \COMPARE CHANNEL NUMBER WITH SPM | \ | 1D8 | 611A |
| 2529000 | | XOR AACU BSPM | ; | | |
| 2530000 | | | | | |
| 2531000 | s | \SKIP IF EQUAL COMPARE | \ | 1D9 | C086 |
| 2532000 | | TFO TEQZ | ; | | |
| 2533000 | | | | | |
| 2534000 | s | GTO ($BUS-MEM2B) | ; | 1DA | F1E0 |
| 2535000 | | | | | |
| 2536000 | s | \DECREMENT MEMORY ADDRESS | \ | 1DB | A008 |
| 2537000 | | DMA | ; | | |
| 2538000 | | | | | |
| 2539000 | s | \CHANNEL NUMBER TO ACU | \ | 1DC | 603F |
| 2540000 | | XFA ABUS1 | ; | | |
| 2541000 | | | | | |
| 2542000 | s | \COMPARE CHANNEL NUMBER WITH SPM | \ | 1DD | 611A |
| 2543000 | | XOR AACU BSPM | ; | | |
| 2544000 | | | | | |
| 2545000 | s | \SKIP IF NOT MY CHANNEL NUMBER | \ | 1DE | C046 |
| 2546000 | | TFZ TEQZ | ; | | |
| 2547000 | | | | | |
| 2548000 | s | GTO ($BUS-MEM3) | ; | 1DF | F1E9 |
| 2549000 | | | | | |
| 2550000 | $BUS-MEM2B | \SET SPA FOR CHANNEL NUMBER | \ | 1E0 | 8801 |
| 2551000 | | LCN ASPA CNST (01#) | ; | | |
| 2552000 | | | | | |
| 2553000 | s | \INCREMENT CONSTANT TO ACU | \ | 1E1 | 8200 |
| 2554000 | | LCN CNST (80#) | ; | | |
| 2555000 | | | | | |
| 2556000 | s | \INCREMENT CHANNEL NUMBER | \ | 1E2 | 6164 |
| 2557000 | | ADD AACU BSPM SRIA | ; | | |
| 2558000 | | | | | |
| 2559000 | s | \WRITE AND DECREMENT SPA | \ | 1E3 | A208 |
| 2560000 | | WDA | ; | | |
| 2561000 | | | | | |
| 2562000 | s | \PROPAGATE CARRY | \ | 1E4 | 6480 |
| 2563000 | | INC ASPM COTI | ; | | |
| 2564000 | | | | | |
| 2565000 | s | \WRITE IN SPM | \ | 1E5 | A200 |
| 2566000 | | MWT | ; | | |
| 2567000 | | | | | |
| 2568000 | SKIP HOF | | | | |

MODEL: MPDC-REV3D  
REVISION: 000.00

RTL/6000 FILE EDIT  
MICROPROGRAM SECTION

08/01/77  12.605  PAGE: 67  
DOC.#:

SEQUENCE: SSUPCS

| LINE # | | | | ADDRESS (HEX) | IMAGE (HEX) |
|---|---|---|---|---|---|
| 2569000 | s | \SKIP IF NOT ALL CHANNELS CHECKED | \ | 1E6 | C046 |
| 2570000 | | TFZ TEQZ | ; | | |
| 2571000 | | | | | |
| 2572000 | s | \HALT- NO SUCESSFUL MEMORY READ | \ | 1E7 | 0040 |
| 2573000 | | HLT | ; | | |
| 2574000 | | | | | |
| 2575000 | s | GTO ($BUS-MEM1) | ; | 1E8 | F1C8 |
| 2576000 | | | | | |
| 2577000 | $BUS-MEM3 | \CLEAR ACU | \ | 1E9 | 0010 |
| 2578000 | | CRF | ; | | |
| 2579000 | | | | | |
| 2580000 | s | \CLEAR CYCLE REG | \ | 1EA | 4020 |
| 2581000 | | CYC | ; | | |
| 2582000 | | | | | |
| 2583000 | s | \RESET BUS | \ | 1EB | 4084 |
| 2584000 | | RST | ; | | |
| 2585000 | | | | | |
| 2586000 | s | \CLEAR MOTHER BOARD FIFO | \ | 1EC | 0088 |
| 2587000 | | RDA | ; | | |
| 2588000 | | | | | |
| 2589000 | \END OF MEMORY READ TEST | | \ | | |
| 2590000 | | | | | |

```
MODEL: MPDC-REV3D                         RTL/6000 FILE EDIT                    08/01/77   12.605  PAGE:  68
REVISION: 000.00                          MICROPROGRAM SECTION                  DOC.#:
                                                                      ADDRESS  IMAGE
  LINE #                          SEQUENCE: SSUPCS                     (HEX)   (HEX)
2592000
2593000   S          \RESET S. P. TEST MODE              \              1ED    0010
2594000              CRF                                 ;
2595000
2596000   S          \CLEAR REGISTERS                    \              1EE    0098
2597000              INI                                  ;
2598000
2599000
2600000
2601000
2602000
2603000              \END OF BASIC LOGIC TEST             \
2604000
2605000
2606000
2607000
2608000
2609000
2610000
2611000   \ BASIC LOGIC TEST HAS BEEN SUCCESSFULLY COMPLETED. SET   \
2612000   \ THE BLT DONE FLOP WHICH WILL EXTINGUISH THE LED.        \
2613000
2614000
2615000   $BLTSETDONE  \SET BLT DONE FLOP                 \              1EF    0004
2616000              BLT                                  ;
2617000
2618000   S          \SET RETURN FOR CLEAR SPM            \              1F0    E1FA
2619000              LRA (SSETUNITSEL)                    ;
2620000
2621000  SKIP HOF                                         ;
```

```
MODEL: MPDC-REV3D                         RTL/6000 FILE EDIT                    08/01/77   12.605  PAGE:  69
REVISION: 000.00                          MICROPROGRAM SECTION                  DOC.#:
                                                                      ADDRESS  IMAGE
  LINE #                          SEQUENCE: SSUPCS                     (HEX)   (HEX)
2622000
2623000
2624000   \ THE FOLLOWING SUBROUTINE IS USED FOR CLEARING      \
2625000   \ SCRATCH PAD MEMORY TO ZERO.                        \
2626000
2627000   $CLEARSPM00  \CLEAR ACU                         \              1F1    0010
2628000              CRF                                  ;
2629000
2630000   S          \CLEAR SPA                           \              1F2    8800
2631000              LCN ASPA CNST (00#)                  ;
2632000
2633000   S          \SET SCRATCH PAD TEST MODE           \              1F3    A080
2634000              SPT                                  ;
2635000
2636000   $CLEARSPM01  \WRITE MEMORY                      \              1F4    A300
2637000              WIA AACU                             ;
2638000
2639000   S          \NO OP FOR TIMING                    \              1F5    0000
2640000              NOP                                  ;
2641000
2642000   S          \SKIP IF SPA WRAPAROUND              \              1F6    C0A6
2643000              TFO TSAW                             ;
2644000
2645000   S          \CLEAR NEXT LOCATION                 \              1F7    F1F4
2646000              GTO ($CLEARSPM01)                    ;
2647000
2648000   S          \RESET S. P. TEST MODE               \              1F8    0010
2649000              CRF                                  ;
2650000
2651000   S          \RETURN TO CALLER                    \              1F9    C200
2652000              RTN                                  ;
2653000
2654000  SKIP HOF                                         ;
```

```
MODEL: MPDC-REV3D                         RTL/6000 FILE EDIT                    08/01/77   12.605  PAGE:  70
REVISION: 000.00                          MICROPROGRAM SECTION                  DOC.#:
                                                                      ADDRESS  IMAGE
  LINE #                          SEQUENCE: SSUPCS                     (HEX)   (HEX)
2655000
2656000   \    THE FOLLOWING ROUTINE IS USED TO LOAD THE
2657000        INITIALIZED UNIT SELECTION BYTES INTO SCRATCH
2658000        PAD MEMORY. ON ENTERING THIS ROUTINE BOTH THE
2659000        SCRATCH PAD MEMORY AND THE ACU HAVE BEEN
2660000        PREVIOUSLY CLEARED BY THE SCLEARSPM ROUTINE.   \
2661000
2662000
2663000  $SETUNITSEL  \ACU TO INDEX REGISTER              \              1FA    A030
2664000              LIR                                  ;
2665000
2666000   S          \SET SPA FOR UNIT SELECT LOCATION    \              1FB    8CEB
2667000              SSPAI LOC (UNSEL)                    ;
2668000
2669000   S          \INITIALIZE LOCATION - ACU TO SPM    \              1FC    A200
2670000              MWT                                  ;
2671000
2672000   S          \INCREMENT ACU                       \              1FD    6000
2673000              INC AACU                             ;
2674000
2675000   S          \SKIP IF ALL CHANNELS INITIALIZED    \              1FE    C09A
2676000              TFO TAX5                             ;
2677000
2678000   S          \INITIALIZE NEXT CHANNEL             \              1FF    F1FA
2679000              GTO ($SETUNITSEL)                    ;
2680000
2681000  SKIP HOF                                         ;
```

```
MODEL: MPDC-REV3D                          RTL/6000 FILE EDIT                    08/01/77    12.605  PAGE:  71
REVISION: 000.00                          MICROPROGRAM SECTION                   DOC.#:
 LINE #                               SEQUENCE: $$UPCS                      ADDRESS    IMAGE
 2682000                                                                     (HEX)     (HEX)
 2683000      \ THIS ROUTINE IS USED TO PERFORM THE FOLLOWING FUNCTIONS-
 2684000        . INITIALIZE THE DEVICE ADAPTER
 2685000        . LOG THE DEVICE I.D. CODE IN SCRATCH PAD.
 2686000        . SET THE INITIALIZE FLAG IN THE CHANNEL MONITOR BYTE.
 2687000        . LOAD THE START UP FUNCTION CODE IN SCRATCH PAD.
 2688000        . LOG THE STATE (READY OR NONREADY) IN SCRATCH PAD.
 2689000        . LOG THE CURRENT FIRMWARE REVISION.
 2690000        . LOAD WORKING PARAMETERS IN SCRATCH PAD.
 2691000        . UPDATE STATUS.
 2692000        . RECALIBRATES THE DEVICE.
 2693000        . GOES TO THE INTERRUPT SUBROUTINE.                    \
 2694000
 2695000
 2696000  $SETUP-ADP        \CLEAR ACU                                 \
 2697000                    ZER                                        ;        200   600E
 2698000
 2699000  $                 \GO TO SET UP CURRENT CHANNEL              \
 2700000                    GTO ($SETUP-DEV)                           ;        201   F205
 2701000
 2702000  $SETUP-LOOP       \INCREMENTED INDEX REGISTER TO ACU         \
 2703000                    INC AIDX                                   ;        202   6C00
 2704000
 2705000  $                 \SKIP IF NOT ALL CHANNELS INITIALIZED      \
 2706000                    TFZ TAX5 AACU                              ;        203   C05A
 2707000
 2708000  $                 \SET UP DONE. START POLLING                \
 2709000                    GTO ($START-WAIT)                          ;        204   F21D
 2710000
 2711000 SKIP HOF

MODEL: MPDC-REV3D                          RTL/6000 FILE EDIT                    08/01/77    12.605  PAGE:  72
REVISION: 000.00                          MICROPROGRAM SECTION                   DOC.#:
 LINE #                               SEQUENCE: $$UPCS                      ADDRESS    IMAGE
 2712000                                                                     (HEX)     (HEX)
 2713000  $SETUP-DEV        \ACU TO INDEX REGISTER                     \
 2714000                    LIR                                        ;        205   A030
 2715000
 2716000  $                 \RESET DEVICE ADAPTER                      \
 2717000                    RDA                                        ;        206   00BB
 2718000
 2719000  $                 \CLEAR ADAPTER STATUS                      \
 2720000                    XFB AAD5 SRIA                              ;        207   746B
 2721000
 2722000  $                 \CLEAR ADAPTER HARDWARE REQUEST            \
 2723000                    ZER AAD7 SRIA                              ;        208   7C4F
 2724000
 2725000  $                 \SET SPA FOR UNIT SELECT BYTE              \
 2726000                    SSPAI LOC (UNSEL)                          ;        209   8CE8
 2727000
 2728000  $                 \SELECT DEVICE                             \
 2729000                    XFB AAD3 BSPM SRIA                         ;        20A   7D6A
 2730000
 2731000  $                 \SET SPA FOR DEVICE I.D.                   \
 2732000                    SSPAI LOC (DID1)                           ;        20B   8CBA
 2733000
 2734000  $                 \LOAD ACU WITH MSB OF DEV. I.D.            \
 2735000                    LCN AACU CNST (23#)                        ;        20C   8083
 2736000
 2737000  $                 \STORE MSB OF DEVICE I.D.                  \
 2738000                    MIA                                        ;        20D   A300
 2739000
 2740000 SKIP HOF

MODEL: MPDC-REV3D                          RTL/6000 FILE EDIT                    08/01/77    12.605  PAGE:  73
REVISION: 000.00                          MICROPROGRAM SECTION                   DOC.#:
 LINE #                               SEQUENCE: $$UPCS                      ADDRESS    IMAGE
 2741000                                                                     (HEX)     (HEX)
 2742000  $                 \STORE LSB OF DEVICE I.D.                  \
 2743000                    MWT AAD1                                   ;        20E   B600
 2744000
 2745000  $                 \SET SPA FOR FIRMWARE REV                  \
 2746000                    SSPAI LOC (FWRV)                           ;        20F   8CE9
 2747000
 2748000  $                 \SET FIRMWARE REVISION IN ACU              \
 2749000                    LCN AACU CNST (3D#)                        ;        210   80F9
 2750000
 2751000  $                 \ STORE FIRMWARE REV FOR SOFTWARE USE      \
 2752000                    MWT                                        ;        211   A200
 2753000
 2754000  $                 \SET SPA FOR DEVICE STATUS                 \
 2755000                    SSPAI LOC (DEVST)                          ;        212   8CEA
 2756000
 2757000  $                 \ WRITE CURRENT DEVICE STATUS              \
 2758000                    MWT AAD2                                   ;        213   BA00
 2759000
 2760000  $                 \SKIP IF DEVICE READY                      \
 2761000                    TFO TAX0 ASPM                              ;        214   C490
 2762000
 2763000  $                 \GO TO NEXT CHANNEL                        \
 2764000                    GTO ($SETUP-DEV1)                          ;        215   F21B
 2765000
 2766000  $                 \SET SPA FOR STS1                          \
 2767000                    SSPAI LOC (STS1)                           ;        216   8C60
 2768000
 2769000  $                 \SET READY CONSTANT IN ACU                 \
 2770000                    LCN CNST (80#)                             ;        217   8200
 2771000
 2772000  $                 \UPDATE STS1                               \
 2773000                    MWT                                        ;        218   A200
 2774000
 2775000  $                 \SET RETURN FOR RECALIBRATE                \
 2776000                    LRA ($SETUP-LOOP)                          ;        219   E202
 2777000
 2778000  $                 \GO TO RECALIBRATE                         \
 2779000                    GTO ($RECAL)                               ;        21A   F3F1
 2780000
 2781000 $SETUP-DEV1        \SET CHANNEL READY                         \
 2782000                    SCR                                        ;        21B   401H
 2783000
 2784000  $                 \INITIALIZE NEXT CHANNEL                   \
 2785000                    GTO ($SETUP-LOOP)                          ;        21C   F202
 2786000
 2787000
 2788000 \B8 TO DATA HOF                                               ;
```

```
MODEL: MPDC-REV3D                           RTL/6000 FILE EDIT
REVISION: 000.00                            MICROPROGRAM SECTION                          08/01/77   12.605  PAGE: 74
                                                                                          DOC.#:
     LINE #                                 SEQUENCE: $$UPCS                      ADDRESS  IMAGE
     2789000                                                                       (HEX)   (HEX)
     2790000    \ THE WAIT ROUTINE PRIORITIZES THE EXECUTION OF CHANNEL
     2791000      ACTIVITIES IN THE FOLLOWING ORDER-
     2792000
     2793000       1. UNSOLICITED BUS TRANSFERS, INDICATING A TRANSFER
     2794000          FROM THE CP WITH THE DATA STORED IN THE BUS
     2795000          INTERFACE REGISTER.
     2796000
     2797000       2. DEVICE REQUESTS, INDICATING THAT THE ADAPTER HAS
     2798000          COMPLETED SEARCHING A FIELD AND REQUIRES SERVICING
     2799000          (RELOAD SEARCH  ARGUMENT, A HIT ON A SEARCH,
     2800000          OR AN ERROR.)
     2801000                                                                \
     2802000
     2803000    \ THE FOLLOWING ACTIVITIES ARE CHECKED FOR ONLY WHEN
     2804000      THE ADAPTER IS NOT BUSY, SINCE ONLY ONE CHANNEL
     2805000      CAN BE READ/WRITE/SEARCHING AT A TIME.
     2806000
     2807000       3. RESUME INTERRUPT, INDICATING THAT THE CP HAS
     2808000          RAISED THE RESUME INTERRUPT LINE.
     2809000
     2810000       4. SEEKS STACKED, INDICATING THAT A PREVIOUS SEEK
     2811000          OPERATION WAS STACKED.
     2812000                                                                \
     2813000    \  5. POLL DEVICES, WHICH CHECKS FOR ANY PREVIOUSLY
     2814000          INITIATED SEEKS BECOMING DONE OR ANY ASYCHRONOUS
     2815000          DEVICE STATE TRANSITIONS (OFF LINE TO READY,
     2816000          READY TO OFF LINE) WHICH MAY HAVE TAKEN PLACE.
     2817000
     2818000       6. READ/WRITES STACKED, INDICATING THAT A PREVIOUS
     2819000          READ OR WRITE OPERATION WAS STACKED.
     2820000                                                                \
     2821000
     2822000 SKIP HOF                                                       ;

MODEL: MPDC-REV3D                           RTL/6000 FILE EDIT
REVISION: 000.00                            MICROPROGRAM SECTION                          08/01/77   12.605  PAGE: 75
                                                                                          DOC.#:
     LINE #                                 SEQUENCE: $$UPCS                      ADDRESS  IMAGE
     2823000                                                                       (HEX)   (HEX)
     2824000
     2825000 $START-WAIT    \RESET BUS REGISTER BUSY
     2826000                RRB                                             \        21D   4002
     2827000                                                                ;
     2828000 $WAIT-LOOP     \SKIP IF REQUEST IS ON
     2829000                TFO TREQ                                        \        21E   C08C
     2830000                                                                ;
     2831000    $           \GO TO STACKED CHECK
     2832000                GTO ($WAIT-BUSY)                                \        21F   F227
     2833000                                                                ;
     2834000 $WAIT-LOOP1    \SET REGISTER BUSY
     2835000                SRB                                             \        220   4004
     2836000                                                                ;
     2837000    $           \LOAD REQUESTING CHANNEL
     2838000                LRC                                             \        221   A020
     2839000                                                                ;
     2840000    $           \SKIP IF NOT A BUS REQUEST
     2841000                TFZ TUBR                                        \        222   C072
     2842000                                                                ;
     2843000    $           \GO TO SERVICE UNSOLICITED BUS REQUEST
     2844000                GTO ($STARTBUSRQ)                               \        223   F2B7
     2845000                                                                ;
     2846000    $           \SET SPA FOR CURRENTLY ACTIVE R/W CHANNEL
     2847000                SSPA LOC(LSTRW)                                 \        224   8BE9
     2848000                                                                ;
     2849000    $           \LOAD INDEX REGISTER
     2850000                LIR ASPM                                        \        225   A430
     2851000                                                                ;
     2852000    $           \GO TO DEVICE SUPPORT ROUTINE
     2853000                RTN                                             \        226   C200
     2854000                                                                ;
     2855000    \  THE FOLLOWING IS A LIST OF POSSIBLE RETURNS
     2856000       DEPENDING ON THE OPERATION BEING PERFORMED-
     2857000          FWT-RET  - FORMAT WRITE ID
     2858000          SCH-RET  - SEARCH ID
     2859000          WRT-RET  - DATA XFER DURING WRITES
     2860000          READ-RET - DATA XFER DURING READS
     2861000          READ-AMK - FIRST TIME ON ALL READS
     2862000          FMT-READ - FORMAT READ ID ONLY AFTER
     2863000                       SPACING DATA FIELD
     2864000          DIAG-AMK - DIAGNOSTIC READ (FIRST RET ONLY)           \
     2865000
     2866000 SKIP HOF                                                       ;

MODEL: MPDC-REV3D                           RTL/6000 FILE EDIT
REVISION: 000.00                            MICROPROGRAM SECTION                          08/01/77   12.605  PAGE: 76
                                                                                          DOC.#:
     LINE #                                 SEQUENCE: $$UPCS                      ADDRESS  IMAGE
     2867000                                                                       (HEX)   (HEX)
     2868000 $WAIT-BUSY     \SKIP IF NO ADAPTER HARDWARE REQUEST
     2869000                TAHR TFZ                                        \        227   C040
     2870000                                                                ;
     2871000    $           \GO TO RETURN TO ADAPTER
     2872000                GTO ($WAIT-LOOP1)                               \        228   F220
     2873000                                                                ;
     2874000    $           \SKIP IF ADAPTER NOT BUSY
     2875000                TFZ TADB                                        \        229   C06B
     2876000                                                                ;
     2877000    $           \GO TO WAIT FOR A REQUEST
     2878000                GTO ($START-WAIT)                               \        22A   F21D
     2879000                                                                ;
     2880000 $POLL-PEND     \SKIP IF RESUME INTERRUPT NOT SET
     2881000                TINT TFZ                                        \        22B   C074
     2882000                                                                ;
     2883000    $           \GO TO RESUME INTERRUPT
     2884000                GTO ($STARTRESUM)                               \        22C   F25A
     2885000                                                                ;
     2886000 $POLLDEVST     \SET BUS REGISTER BUSY
     2887000                SRB                                             \        22D   4004
     2888000                                                                ;
     2889000    $           \CLEAR ACU
     2890000                LCN CNST (00#)                                  \        22E   8000
                                                                           ;
```

```
MODEL: MPDC-REV3D                                    RTL/6000 FILE EDIT                   08/01/77      12.605   PAGE:  76
REVISION: 000.00                                     MICROPROGRAM SECTION                 DOC.#:
                                                                                 ADDRESS   IMAGE
LINE #                                SEQUENCE: $$UPCS                            (HEX)    (HEX)
                                              -continued
2891000
2892000   $            \SKIP IF NO UNSOLICITED BUS REQUESTS       \       22F   C072
2893000                TUBR TFZ                                   ;
2894000
2895000   $            \GO TO SERVICE UNSOLICITED BUS REQUEST     \       230   F21E
2896000                GTO ($WAIT-LOOP)                           ;
2897000
2898000   $SEEKSTACK   \SET SPA TO SEEK STACKED COUNT             \       231   8BEA
2899000                SSPA LOC (SKSTK)                           ;
2900000
2901000   $            \SEEK COUNT TO ACU                         \       232   643E
2902000                XFA ASPM BACU                              ;
2903000
2904000   $            \SKIP IF NO SEEK STACKED                   \       233   C086
2905000                TFO TEQZ                                   ;
2906000
2907000   $            \GO TO UNSTACK SEEK                        \       234   F27D
2908000                GTO ($SEEKUNSTK1)                          ;
2909000
2910000  SKIP HOF                                                 ;

MODEL: MPDC-REV3D                                    RTL/6000 FILE EDIT                   08/01/77      12.605   PAGE:  77
REVISION: 000.00                                     MICROPROGRAM SECTION                 DOC.#:
                                                                                 ADDRESS   IMAGE
LINE #                                SEQUENCE: $$UPCS                            (HEX)    (HEX)
2911000
2912000   $POLL-LOOP   \LOAD INDEX REGISTER FROM ACU              \       235   A030
2913000                LIR AACU                                   ;
2914000
2915000   $            \SET SPA FOR UNIT SELECT BYTE              \       236   8CEB
2916000                SSPAI LOC(UNSEL)                           ;
2917000
2918000   $            \SELECT DEVICE                             \       237   7D6A
2919000                XFB AAD3 BSPM SRIA                         ;
2920000
2921000   $            \SET SPA FOR DEVICE STATUS                 \       238   8CEA
2922000                SSPAI LOC (DEVST)                          ;
2923000
2924000   $            \SAVE ONLY READY BIT                       \       239   8604
2925000                ACN ASPM CNST (80#)                        ;
2926000
2927000   $            \SET SPA FOR STS1                          \       23A   8C60
2928000                SSPAI LOC (STS1)                           ;
2929000
2930000   $            \ADD READY BIT                             \       23B   643A
2931000                ORR ASPM BACU                              ;
2932000
2933000   $            \RE-WRITE STS1                             \       23C   A200
2934000                MWT                                        ;
2935000
2936000   $            \SET SPA FOR PREVIOUS DEVICE STATUS        \       23D   8CEA
2937000                SSPAI LOC(DEVST)                           ;
2938000
2939000   $            \PREVIOUS DEVICE STATUS TO ACU             \       23E   643E
2940000                XFA ASPM BACU                              ;
2941000
2942000   $            \UPDATE DEVICE STATUS                      \       23F   BA00
2943000                MWT AAD2                                   ;
2944000
2945000   $            \COMPARE OLD STATUS TO NEW STATUS          \       240   611A
2946000                XDR AACU BSPM                              ;
2947000
2948000   $            \SKIP IF STATUS EQUAL                      \       241   C086
2949000                TFO TEQZ                                   ;
2950000
2951000   $            \GO TO ANALYZE STATUS CHANGE               \       242   F28A
2952000                GTO ($POLLSEEK)                            ;
2953000
2954000  SKIP HOF                                                 ;

MODEL: MPDC-REV3D                                    RTL/6000 FILE EDIT                   08/01/77      12.605   PAGE:  78
REVISION: 000.00                                     MICROPROGRAM SECTION                 DOC.#:
                                                                                 ADDRESS   IMAGE
LINE #                                SEQUENCE: $$UPCS                            (HEX)    (HEX)
2955000   $POLLNEXT    \INCREMENT INDEX REGISTER                  \       243   6C00
2956000                INC AIDX BACU                              ;
2957000
2958000   $            \SKIP IF ALL CHANNELS POLLED               \       244   C09A
2959000                TFO TAX5 AACU                              ;
2960000
2961000   $            \POLL NEXT CHANNEL                         \       245   F235
2962000                GTO ($POLL-LOOP)                           ;
2963000
2964000   $RDWRTSTACK  \SET SPA TO R/W STACKED COUNT              \       246   8BEB
2965000                SSPA LOC (RWSTK)                           ;
2966000
2967000   $            \R/W STACK COUNT TO ACU                    \       247   643E
2968000                XFA ASPM BACU                              ;
2969000
2970000   $            \SKIP IF NO R/W COMMANDS STACKED           \       248   C086
2971000                TFO TEQZ                                   ;
2972000
2973000   $            \GO TO UNSTACK R/W COMMAND                 \       249   F2AC
2974000                GTO ($RDWTUNSTK1)                          ;
2975000
2976000  SKIP HOF                                                 ;
```

```
MODEL: MPDC-REV3D                           RTL/6000 FILE EDIT              08/01/77    12.605   PAGE:  79
REVISION: 000.00                            MICROPROGRAM SECTION            DOC.#:
                                                                    ADDRESS   IMAGE
                          SEQUENCE: SSUPCS                          (HEX)    (HEX)
LINE #
2977000    \ THE FOLLOWING ROUTINE IS USED TO CHECK FOR AN
2978000      INTERRUPT STORED. THE INTERRUPT COULD BE STORED
2979000      FOR THE FOLLOWING REASONS-
2980000        . A BUS PARITY ERROR DURING AN UNSOLICITED
2981000          BUS REQUEST WHILE THE ADAPTER IS BUSY ON
2982000          ANOTHER CHANNEL
2983000        . A STOP I/O CONTROL WORD TO A NON-BUSY
2984000          CHANNEL WHILE EXECUTING A TASK TO A
2985000          SECOND CHANNEL                              \
2986000
2987000  SPOLLINTST    \CLEAR ACU                            \         24A   600E
2988000               ZER                                    ;
2989000
2990000  $            \SET SPA TO CHANNEL MONITOR            \         24B   8C88
2991000               SSPA: LOC (MON1)                       ;
2992000
2993000  SPOLLINTST1   \ACU TO INDEX REGISTER                \         24C   A030
2994000               LIR                                    ;
2995000
2996000  $            \SKIP IF NO INTERRUPT STORED           \         24D   C45B
2997000               TFZ TAX4 ASPM                          ;
2998000
2999000  $            \GO TO SEND INTERRUPT                  \         24E   F33F
3000000               GTO (SSTARTINTPT)                      ;
3001000
3002000 SKIP HOF                                             ;

MODEL: MPDC-REV3D                           RTL/6000 FILE EDIT              08/01/77    12.605   PAGE:  80
REVISION: 000.00                            MICROPROGRAM SECTION            DOC.#:
                                                                    ADDRESS   IMAGE
                          SEQUENCE: SSUPCS                          (HEX)    (HEX)
LINE #
3003000  $            \INCREMENT INDEX REGISTER              \         24F   6C00
3004000               INC AIDX BACU                          ;
3005000
3006000  $            \SKIP IF ALL CHANNELS CHECKED          \         250   C09A
3007000               TFO TAX5 AACU                          ;
3008000
3009000  $            \CHECK NEXT CHANNEL                    \         251   F24C
3010000               GTO (SPOLLINTST1)                      ;
3011000
3012000  $            \GO TO POLL INTERRUPTS PENDING         \         252   F21D
3013000               GTO (SSTART-WAIT)                      ;
3014000
3015000
3016000  SWAIT-CONTD  \SKIP IF NO ADAP HARDWARE REQUEST      \         253   C040
3017000               TAHR TFZ                               ;
3018000
3019000  $            \RETURN TO ADAPTER DATA TRANSFER       \         254   F257
3020000               GTO (SWAIT-CONT1)                      ;
3021000
3022000  $            \SKIP IF DEVICE REQUEST                \         255   C08C
3023000               TFO TREQ                               ;
3024000
3025000  $            \GO TO START WAIT                      \         256   F21D
3026000               GTO (SSTART-WAIT)                      ;
3027000
3028000  SWAIT-CONT1  \SET SPA FOR CURRENTLY ACTIVE R/W CHANNEL \      257   88E9
3029000               SSPA LOC (LSTRP)                       ;
3030000
3031000  $            \LOAD INDEX REGISTER                   \         258   A430
3032000               LIR ASPM                               ;
3033000
3034000  $            \GO TO DEVICE SUPPORT ROUTINE          \         259   C200
3035000               RTN                                    ;
3036000
3037000    \   THE FOLLOWING IS A LIST OF POSSIBLE RETURNS
3038000        DEPENDING ON THE OPERATION BEING PERFORMED-
3039000            FMT-RET  - FORMAT WRITE ID
3040000            SCH-RET  - SEARCH ID
3041000            WRT-RET  - DATA XFER DURING WRITES
3042000            READ-RET - DATA XFER DURING READS
3043000            READ-AMK - FIRST TIME ON ALL READS
3044000            FMT-READ - FORMAT READ ID ONLY AFTER
3045000                       SPACING DATA FIELD
3046000            DIAG-AMK - DIAGNOSTIC READ (FIRST RET ONLY) \
3047000
3048000 SKIP HOF                                             ;

MODEL: MPDC-REV3D                           RTL/6000 FILE EDIT              08/01/77    12.605   PAGE:  81
REVISION: 000.00                            MICROPROGRAM SECTION            DOC.#:
                                                                    ADDRESS   IMAGE
                          SEQUENCE: SSUPCS                          (HEX)    (HEX)
LINE #
3049000
3050000    \  THE RESUME INTERRUPT ROUTINE IS CALLED BY THE WAIT
3051000       ROUTINE WHEN THE RESUME INTERRUPT LATCH IS FOUND
3052000       SET AND A PREVIOUS INTERRUPT WAS STACKED.
3053000       THE RESUME INTERRUPT ROUTINE WILL
3054000       UNSTACK ALL INTERRUPTS WHICH ARE PENDING, I.E.
3055000       INTERRUPTS WHICH WERE PREVIOUSLY NAK'D WILL BE
3056000       REATTEMPTED. TO DO THIS THE ROUTINE WILL
3057000       SEQUENTIALLY EXAMINE ALL CHANNELS, STARTING WITH  \
3058000       CHANNEL ZERO. THE CHANNEL MONITOR BYTE (MON1) WILL
3059000       BE CHECKED FOR INTERRUPT PENDING (BIT 0). IF SET,
3060000       AN INTERRUPT BUS CYCLE IS ATTEMPTED. IF THE
3061000       INTERRUPT IS ACK'D BY THE CP, THE INTERRUPT
3062000       PENDING BIT IS RESET. OTHERWISE THE INTERRUPT
3063000       PENDING BIT REMAINS SET AND THE INTERRUPT WILL
3064000       HAVE TO AGAIN BE ATTEMPTED ON DETECTION OF ANOTHER
3065000       RESUME INTERRUPT PULSE.                         \
3066000
3067000
3068000 SSTARTRESUM   \SET BUS REGISTER BUSY                 \         25A   4004
3069000               SRB                                    ;
3070000
3071000  $            \CLEAR ACU                             \         25B   8000
3072000               LCN CNST(00#)                          ;
3073000
3074000  $            \SKIP IF NO UNSOLICITED BUS REQUESTS   \         25C   C072
3075000               TUBR TFZ                               ;
3076000
```

MODEL: MPDC-REV3D  
REVISION: 000.00

RTL/6000 FILE EDIT  
MICROPROGRAM SECTION

08/01/77  12.605  PAGE: 81  
DOC.#:

| LINE # | | SEQUENCE: $SUPCS -continued | | ADDRESS (HEX) | IMAGE (HEX) |
|---|---|---|---|---|---|
| 3077000 | $ | \GO TO SERVICE UNSOLICITED BUS REQUEST | \ | 25D | F21E |
| 3078000 | | GTO ($WAIT-LOOP) | ; | | |
| 3079000 | | | | | |
| 3080000 | $ | \RESET RESUME INTERRUPT LATCH | \ | 25E | 4001 |
| 3081000 | | RIL | ; | | |
| 3082000 | | | | | |
| 3083000 | $RESUM-LOOP | \LOAD INDEX REGISTER | \ | 25F | A030 |
| 3084000 | | LIR AACU | ; | | |
| 3085000 | | | | | |
| 3086000 | $ | \SET SPA FOR CHANNEL MONITOR BYTE | \ | 260 | 8C88 |
| 3087000 | | SSPAI LOC(MON1) | ; | | |
| 3088000 | | | | | |
| 3089000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 82  
DOC.#:

| LINE # | | SEQUENCE: $SUPCS | | ADDRESS (HEX) | IMAGE (HEX) |
|---|---|---|---|---|---|
| 3090000 | $ | \SKIP IF INTERRUPT PENDING | \ | 261 | C490 |
| 3091000 | | TFO TAX0 ASPM | ; | | |
| 3092000 | | | | | |
| 3093000 | $ | \NO INTERRUPT PENDING-GO TO NEXT CHANNEL | \ | 262 | F279 |
| 3094000 | | GTO ($RESUM-NEXT) | ; | | |
| 3095000 | | | | | |
| 3096000 | $ | \SET SPA FOR FIRST BYTE CP CHANNEL NUMBER | \ | 263 | 8C03 |
| 3097000 | | SSPAI LOC(ILC2) | ; | | |
| 3098000 | | | | | |
| 3099000 | $ | \CLEAR LOW ORDER BITS | \ | 264 | 8704 |
| 3100000 | | ACN CNST (C0#) ASPM | ; | | |
| 3101000 | | | | | |
| 3102000 | $ | \LOAD LSB OF BUS ADDRESS | \ | 265 | 6C6B |
| 3103000 | | XFB ABUS4 BACU SRIA | ; | | |
| 3104000 | | | | | |
| 3105000 | $ | \SET SPA FOR 2ND BYTE CP CHANNEL NUMBER | \ | 266 | 8C02 |
| 3106000 | | SSPAI LOC(ILC1) | ; | | |
| 3107000 | | | | | |
| 3108000 | $ | \LOAD MID OF BUS ADDRESS | \ | 267 | 6D6B |
| 3109000 | | XFB ABUS4 BSPM SRIA | ; | | |
| 3110000 | | | | | |
| 3111000 | $ | \LOAD MSB OF BUS ADDRESS | \ | 268 | 6C4F |
| 3112000 | | ZER ABUS4 SRIA | ; | | |
| 3113000 | | | | | |
| 3114000 | $ | \SET SPA FOR INTERRUPT VECTOR | \ | 269 | 8CAB |
| 3115000 | | SSPAI LOC(IDF1) | ; | | |
| 3116000 | | | | | |
| 3117000 | $ | \LOAD LSB OF DATA BUS | \ | 26A | 696B |
| 3118000 | | XFB ABUS3 BSPM SRIA | ; | | |
| 3119000 | | | | | |
| 3120000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 83  
DOC.#:

| LINE # | | SEQUENCE: $SUPCS | | ADDRESS (HEX) | IMAGE (HEX) |
|---|---|---|---|---|---|
| 3121000 | $ | \SET SPA FOR REST OF INTERRUPT VECTOR | \ | 26B | 8CA0 |
| 3122000 | | SSPAI LOC (CHN1) | ; | | |
| 3123000 | | | | | |
| 3124000 | $ | \LOAD MSB OF DATA BUS | \ | 26C | 656B |
| 3125000 | | XFB ABUS2 BSPM SRIA | ; | | |
| 3126000 | | | | | |
| 3127000 | $ | \CLEAR BUS STATUS | \ | 26D | 4084 |
| 3128000 | | RST | ; | | |
| 3129000 | | | | | |
| 3130000 | $ | \LOAD CYCLE BYTE IN ACU | \ | 26E | 8200 |
| 3131000 | | LCN AACU CNST(80#) | ; | | |
| 3132000 | | | | | |
| 3133000 | $ | \INITIATE BUS CYCLE | \ | 26F | 4020 |
| 3134000 | | CYC AACU | ; | | |
| 3135000 | | | | | |
| 3136000 | $RESUM-TNAK | \SKIP IF NO NAK | \ | 270 | C076 |
| 3137000 | | TFZ TNAK | ; | | |
| 3138000 | | | | | |
| 3139000 | $ | \NAK RECEIVED-LEAVE INTERRUPT STACKED | \ | 271 | F278 |
| 3140000 | | GTO ($RESUM-CBS) | ; | | |
| 3141000 | | | | | |
| 3142000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 84  
DOC.#:

| LINE # | | SEQUENCE: $SUPCS | | ADDRESS (HEX) | IMAGE (HEX) |
|---|---|---|---|---|---|
| 3143000 | | | | | |
| 3144000 | $RESUM-TACK | \SKIP IF ACK IS SET | \ | 272 | C08E |
| 3145000 | | TFO TACK | ; | | |
| 3146000 | | | | | |
| 3147000 | $ | \NO RESPONSE - WAIT | \ | 273 | F270 |
| 3148000 | | GTO ($RESUM-TNAK) | ; | | |
| 3149000 | | | | | |
| 3150000 | $ | \SET SPA FOR CHANNEL MONITOR | \ | 274 | 8C88 |
| 3151000 | | SSPAI LOC(MON1) | ; | | |
| 3152000 | | | | | |
| 3153000 | $ | \CLEAR ACU | \ | 275 | 600E |
| 3154000 | | ZER BACU | ; | | |
| 3155000 | | | | | |
| 3156000 | $ | \CLEAR MONITOR | \ | 276 | A200 |
| 3157000 | | MWT AACU | ; | | |
| 3158000 | | | | | |
| 3159000 | $ | \SET CHANNEL READY | \ | 277 | 401B |
| 3160000 | | SCR | ; | | |
| 3161000 | | | | | |
| 3162000 | $RESUM-CBS | \CLEAR BUS STATUS | \ | 278 | 4084 |
| 3163000 | | RST | ; | | |
| 3164000 | | | | | |
| 3165000 | $RESUM-NEXT | \INCREMENT INDEX REGISTER | \ | 279 | 6C00 |
| 3166000 | | INC AIDX BACU | ; | | |
| 3167000 | | | | | |
| 3168000 | $ | \SKIP IF ALL CHANNELS CHECKED | \ | 27A | C09A |
| 3169000 | | TFO TAX5 AACU | ; | | |
| 3170000 | | | | | |
| 3171000 | $ | \CHECK NEXT CHANNEL | \ | 27B | F25F |
| 3172000 | | GTO ($RESUM-LOOP) | ; | | |
| 3173000 | | | | | |
| 3174000 | $ | \GO TO CHECK FOR SEEKS STACKED | \ | 27C | F231 |
| 3175000 | | GTO ($SEEKS-ACK) | ; | | |

MODEL: MPDC-REV3D
REVISION: 000.00

RTL/6000 FILE EDIT
MICROPROGRAM SECTION

08/01/77   12.605   PAGE: 85
DOC.#:

```
LINE #                          SEQUENCE: SSUPCS                    ADDRESS  IMAGE
                                                                    (HEX)    (HEX)
3178000      \   THE SEEK UNSTACK ROUTINE IS CALLED BY THE WAIT
3179000          ROUTINE WHEN A SEEK OPERATION IS FOUND TO BE
3180000          STACKED (S.P. LOCATION SKSTK).
3181000
3182000          THE ROUTINE WILL SEQUENTIALLY EXAMINE ALL CHANNELS
3183000          STARTING WITH THE ONE AFTER THE LAST R/W. IF A
3184000          CHANNEL IS FOUND TO HAVE A SEEK STACKED THE
3185000          ROUTINE WILL UNSTACK THE TASK (SEEK) AND BRANCH
3186000          TO COMMAND DECODE. \
3187000
3188000
3189000 $SEEKUNSTK1    \DECREMENT SEEKS STACK            \     27D   603C
3190000                DEC AACU BACU                     ;
3191000
3192000      $         \RE-WRITE UPDATED SEEKS INDICATOR \     27E   A200
3193000                MWT AACU                          ;
3194000
3195000      $         \LAST R/W CHANNEL TO SPA          \     27F   8BE9
3196000                SSPA LOC(LSTRW)                   ;
3197000
3198000      $         \LAST R/W CHANNEL TO SPA          \     280   696A
3199000                XFB ASPA BSPM SRIA                ;
3200000
3201000 $SEEKUNSTK2    \INCREMENT LAST R/W CHANNEL       \     281   A100
3202000                IMA                               ;
3203000
3204000      $         \NO OP FOR TIMING                 \     282   0000
3205000                NOP                               ;
3206000
3207000      $         \MASK HIGH ORDER BITS             \     283   8807
3208000                ACN CNST(03#) ASPA                ;
3209000
3210000      $         \SKIP IF SEEK STACKED             \     284   C490
3211000                TFO TAX0 ASPM                     ;
3212000
3213000      $         \GO TO CHECK NEXT CHANNEL         \     285   F281
3214000                GTO ($SEEKUNSTK2)                 ;
3215000
3216000      $         \CLEAR SEEK STACKED INDICATOR     \     286   85EF
3217000                ACN CNST(7F#) ASPM                ;
3218000
3219000 $SEEKUNSTK3    \RE-WRITE UPDATED INDICATOR       \     287   A200
3220000                MWT AACU                          ;
3221000
3222000      $         \LOAD INDEX REGISTER              \     288   A830
3223000                LIR ASPA                          ;
3224000
3225000      $         \GO TO INITIATE TASK              \     289   F366
3226000                GTO ($CMDEC-E1)                   ;
3227000
3228000 SKIP HOF                                         ;
```

MODEL: MPDC-REV3D
REVISION: 000.00

RTL/6000 FILE EDIT
MICROPROGRAM SECTION

08/01/77   12.605   PAGE: 86
DOC.#:

```
LINE #                          SEQUENCE: SSUPCS                    ADDRESS  IMAGE
3229000                                                             (HEX)    (HEX)
3230000      \   THE POLLING ROUTINE IS CALLED WHEN THE WAIT
3231000          ROUTINE DETECTS A CHANGE IN DEVICE STATUS. THE
3232000          ROUTINE ANALYZES THE STATUS CHANGE TO DETERMINE
3233000          IF ANY SEEKS HAVE BECOME DONE OR IF ANY DEVICES
3234000          HAVE MADE A STATE TRANSITION (OFF LINE TO
3235000          READY OR READY TO OFF LINE).             \
3236000
3237000 $POLLSEEK      \SKIP IF PREVIOUS SEEK ACTIVE     \     28A   C052
3238000                TFZ TAX1 AACU                     ;
3239000
3240000      $         \GO TO CHECK FOR STATE TRANSITION \     28B   F2A4
3241000                GTO ($POLLREADY)                  ;
3242000
3243000      $         \SKIP IF NO SEEK ERROR            \     28C   C454
3244000                TFZ TAX2 ASPM                     ;
3245000
3246000      $         \SET SEEK ERROR STATUS            \     28D   F29E
3247000                GTO ($POLLSEEKER)                 ;
3248000
3249000      $         \SKIP IF SEEK COMPLETE            \     28E   C492
3250000                TFO TAX1 ASPM                     ;
3251000
3252000      $         \GO TO CHECK FOR STATE TRANSITION \     28F   F2A4
3253000                GTO ($POLLREADY)                  ;
3254000
3255000      $         \SET SPA FOR CHANNEL MONITOR      \     290   8C88
3256000                SSPAI LOC (MON1)                  ;
3257000
3258000      $         \SKIP IF NOT A RECALIBRATE        \     291   C45A
3259000                TFZ TAX5 ASPM                     ;
3260000
3261000      $         \GO TO SELECT PLATTER ZERO, TRACK ZERO \ 292   F3E7
3262000                GTO ($RECALPLSEL)                 ;
3263000
3264000      $         \SKIP IF SEEK ACTIVE BIT SET      \     293   C496
3265000                TFO TAX3 ASPM                     ;
3266000
3267000      $         \CHECK FOR STATE TRANSITION       \     294   F2A2
3268000                GTO ($POLLSEEK1)                  ;
3269000
3270000      $         \RESET SEEK BIT IN MONITOR        \     295   87AF
3271000                ACN ASPM CNST (EF#)               ;
3272000
3273000      $         \RE-WRITE MONITOR                 \     296   A200
3274000                MWT                               ;
3275000
3276000 SKIP HOF                                         ;
```

MODEL: MPDC-REV3D
REVISION: 000.00

RTL/6000 FILE EDIT
MICROPROGRAM SECTION

08/01/77   12.605   PAGE: 87
DOC.#:

```
LINE #                          SEQUENCE: SSUPCS                    ADDRESS  IMAGE
                                                                    (HEX)    (HEX)
3277000      $         \SET SPA FOR TASK                 \     297   8C0A
3278000                SSPAI LOC(TSK1)                   ;
3279000
3280000      $         \SKIP IF NOT IMPLIED SEEK         \     298   C454
3281000                TFZ TAX2 ASPM                     ;
3282000
```

MODEL: MPDC-REV30
REVISION: 000.00

RTL/6000 FILE EDIT
MICROPROGRAM SECTION

SEQUENCE: $SUPCS
-continued

| LINE # | | | | ADDRESS (HEX) | IMAGE (HEX) |
|---|---|---|---|---|---|
| 3283000 | $ | \GO TO INITIATE R/W | \ | 299 | F382 |
| 3284000 | | GTO ($CMDEC-E2) | ! | | |
| 3285000 | | | | | |
| 3286000 | $ | \SET SPA FOR DMA BYTE | \ | 29A | 8CB9 |
| 3287000 | | SSPAI LOC (DMA1) | ! | | |
| 3288000 | | | | | |
| 3289000 | $ | \SKIP IF NOT AN IMPLIED SEEK | \ | 29B | C454 |
| 3290000 | | TFZ TAX2 ASPM | ! | | |
| 3291000 | | | | | |
| 3292000 | $ | \GO TO CONTINUE READ/WRITE | \ | 29C | F382 |
| 3293000 | | GTO ($CMDEC-E2) | ! | | |
| 3294000 | | | | | |
| 3295000 | $ | \GO TO SEND INTERRUPT | \ | 29D | F33F |
| 3296000 | | GTO ($STARTINTPT) | ! | | |
| 3297000 | | | | | |
| 3298000 | $POLLSEEKER | \ADDRESS CHANNEL MONITOR | \ | 29E | 8CB8 |
| 3299000 | | SSPAI LOC (MON1) | ! | | |
| 3300000 | | | | | |
| 3301000 | $ | \SKIP IF SEEK ACTIVE SET | \ | 29F | C496 |
| 3302000 | | TFO TAX3 ASPM | ! | | |
| 3303000 | | | | | |
| 3304000 | $ | \SKIP IF NOT A RECALIBRATE | \ | 2A0 | C45A |
| 3305000 | | TFZ TAX5 ASPM | ! | | |
| 3306000 | | | | | |
| 3307000 | $ | GTO ($SEEK-ERR) | ! | 2A1 | F5A4 |
| 3308000 | | | | | |
| 3309000 | $POLLSEEK1 | \SET CHANNEL READY | \ | 2A2 | 401B |
| 3310000 | | SCR | ! | | |
| 3311000 | | | | | |
| 3312000 | $ | \SET SPA FOR UPDATED DEVICE STATUS | \ | 2A3 | 8CEA |
| 3313000 | | SSPAI LOC (DEVST) | ! | | |
| 3314000 | | | | | |
| 3315000 | SKIP HOF | | ! | | |

MODEL: MPDC-REV30
REVISION: 000.00

RTL/6000 FILE EDIT
MICROPROGRAM SECTION

SEQUENCE: $SUPCS

| LINE # | | | | ADDRESS (HEX) | IMAGE (HEX) |
|---|---|---|---|---|---|
| 3316000 | | | | | |
| 3317000 | $POLLREADY | \SKIP IF PREVIOUSLY NOT READY | \ | 2A4 | C050 |
| 3318000 | | TFZ TAX0 AACU | ! | | |
| 3319000 | | | | | |
| 3320000 | $ | \GO TO CHECK FOR OFF LINE TRANSITION | \ | 2A5 | F2A9 |
| 3321000 | | GTO ($POLLOFFLIN) | ! | | |
| 3322000 | | | | | |
| 3323000 | $ | \SKIP IF STILL NOT READY | \ | 2A6 | C450 |
| 3324000 | | TFZ TAX0 ASPM | ! | | |
| 3325000 | | | | | |
| 3326000 | $ | \GO TO SEND ATTENTION ON LINE TRANSITION | \ | 2A7 | F596 |
| 3327000 | | GTO ($TERM-ATT) | ! | | |
| 3328000 | | | | | |
| 3329000 | $ | \GO TO POLL NEXT CHANNEL | \ | 2A8 | F243 |
| 3330000 | | GTO ($POLLNEXT) | ! | | |
| 3331000 | | | | | |
| 3332000 | $POLLOFFLIN | \SKIP IF NOT READY | \ | 2A9 | C450 |
| 3333000 | | TFZ TAX0 ASPM | ! | | |
| 3334000 | | | | | |
| 3335000 | $ | \GO TO POLL NEXT CHANNEL | \ | 2AA | F243 |
| 3336000 | | GTO ($POLLNEXT) | ! | | |
| 3337000 | | | | | |
| 3338000 | $ | \GO TO SEND ATTENTION OFF LINE TRANSITION | \ | 2AB | F596 |
| 3339000 | | GTO ($TERM-ATT) | ! | | |
| 3340000 | | | | | |
| 3341000 | | | | | |
| 3342000 | SKIP HOF | | ! | | |

MODEL: MPDC-REV30
REVISION: 000.00

RTL/6000 FILE EDIT
MICROPROGRAM SECTION

SEQUENCE: $SUPCS

| LINE # | | | | ADDRESS (HEX) | IMAGE (HEX) |
|---|---|---|---|---|---|
| 3343000 | | | | | |
| 3344000 | \ | THE READ/WRITE UNSTACK ROUTINE IS CALLED BY THE | | | |
| 3345000 | | WAIT ROUTINE WHEN A READ/WRITE OPERATION IS FOUND | | | |
| 3346000 | | TO BE STACKED (S.P. LOCATION RWSTK). | | | |
| 3347000 | | | | | |
| 3348000 | | THE ROUTINE WILL SEQUENTIALLY EXAMINE ALL CHANNELS | | | |
| 3349000 | | STARTING WITH THE ONE AFTER THE LAST R/W. IF A | | | |
| 3350000 | | CHANNEL IS FOUND TO HAVE READ/WRITE STACKED, THE | | | |
| 3351000 | | ROUTINE WILL UNSTACK THE TASK (READ OR WRITE) | | | |
| 3352000 | | AND BRANCH TO COMMAND DECODE. | \ | | |
| 3353000 | | | | | |
| 3354000 | | | | | |
| 3355000 | $RDWTUNSTK1 | \DECREMENT R/W STACK | \ | 2AC | 603C |
| 3356000 | | DEC AACU BACU | ! | | |
| 3357000 | | | | | |
| 3358000 | $ | \RE-WRITE UPDATED R/W INDICATOR | \ | 2AD | A200 |
| 3359000 | | MWT AACU | ! | | |
| 3360000 | | | | | |
| 3361000 | $ | \SET SPA FOR LAST R/W CHANNEL | \ | 2AE | 8BE9 |
| 3362000 | | SSPA LOC(LSTRW) | ! | | |
| 3363000 | | | | | |
| 3364000 | $ | \LAST R/W CHANNEL TO SPA | \ | 2AF | 696A |
| 3365000 | | XFB ASPA BSPM SRIA | ! | | |
| 3366000 | | | | | |
| 3367000 | $RDWTUNSTK2 | \INCREMENT LAST R/W CHANNEL | \ | 2B0 | A100 |
| 3368000 | | IMA | ! | | |
| 3369000 | | | | | |
| 3370000 | $ | \NO OP FOR TIMING | \ | 2B1 | 0000 |
| 3371000 | | NOP | ! | | |
| 3372000 | | | | | |
| 3373000 | $ | \MASK HIGH ORDER BITS | \ | 2B2 | 8807 |
| 3374000 | | ACN CNST(03#) ASPA | ! | | |
| 3375000 | | | | | |
| 3376000 | $ | \SKIP IF R/W COMMAND STACKED | \ | 2B3 | C492 |
| 3377000 | | TFO TAX1 ASPM | ! | | |
| 3378000 | | | | | |
| 3379000 | $ | \GO TO CHECK NEXT CHANNEL | \ | 2B4 | F2B0 |
| 3380000 | | GTO ($RDWTUNSTK2) | ! | | |
| 3381000 | | | | | |
| 3382000 | $ | \CLEAR R/W STACKED INDICATOR | \ | 2B5 | 86EF |
| 3383000 | | ACN CNST(BF#) ASPM | ! | | |
| 3384000 | | | | | |
| 3385000 | $ | \GO TO LOAD INDEX REG. & INITIATE TASK | \ | 2B6 | F2B7 |
| 3386000 | | GTO ($SEEKUNSTK3) | ! | | |
| 3387000 | | | | | |
| 3388000 | SKIP HOF | | : | | |

```
MODEL: MPDC-REV3D                         RTL/6000 FILE EDIT                        08/01/77   12.605  PAGE:  90
REVISION: 000.00                          MICROPROGRAM SECTION                               DOC.#:
                                                                          ADDRESS   IMAGE
                                     SEQUENCE: $$UPCS                     (HEX)     (HEX)
LINE #
3389000      \ THE BUS REQUEST ROUTINE IS CALLED BY THE WAIT
3390000        ROUTINE WHENEVER AN UNSOLICITED BUS TRANSFER IS
3391000        DETECTED. THE PURPOSE OF THE BUS REQUEST ROUTINE IS TO
3392000        EXECUTE THE I/O REQUIREMENTS OF THE BUS CYCLE AND TO
3393000        INITIATE ANY DEVICE SUPPORT THAT IS REQUIRED.          \
3394000
3395000
3396000 $STARTBUSRQ    \SKIP IF RESPONSE NOT REQUIRED                 \    287      C044
3397000              TFZ TRSP                                         ;
3398000
3399000     $        \RESPONSE IS REQUIRED GO TO RESPONSE SEG         \    288      F326
3400000              GTO ($BUSRQ-RSVP)                                ;
3401000
3402000     $        \SET SPA FOR CH2 (LSB OF CHANNEL NUMBER)         \    289      8CA1
3403000              SSPA1 LOC(CHN2)                                  ;
3404000
3405000     $        \STORE BDC CHANNEL NUMBER (LSB)                  \    28A      A201
3406000              MWT ABUS1                                        ;
3407000
3408000     $        \FUNCTION CODE TO ACU                            \    28B      84EE
3409000              ACN ASPM CNST(3E#)                               ;
3410000
3411000     $        \SET SPA FOR CH1 (MSB OF CHANNEL NUMBER)         \    28C      8CA0
3412000              SSPA1 LOC(CHN1)                                  ;
3413000
3414000     $        \STORE BDC CHANNEL NUMBER (MSB)                  \    28D      A201
3415000              MWT ABUS1                                        ;
3416000
3417000
3418000      \ ADDRESS SCRATCH PAD MEMORY WITH FUNCTION CODE
3419000        INDEXED BY CHANNEL NUMBER.                             \
3420000
3421000
3422000     $        \ADDRESS SCRATCH PAD WITH FUNCTION CODE          \    28E      6C6A
3423000              XFB ASPA1 BACU SR1A                              ;
3424000
3425000     $        \STORE MSB OF DATA                               \    28F      A701
3426000              WIA ABUS2                                        ;
3427000
3428000     $        \ STORE LSB OF DATA                              \    2C0      AA01
3429000              MWT ABUS3                                        ;
3430000
3431000
3432000 SKIP HOF                                                      ;
```

```
MODEL: MPDC-REV3D                         RTL/6000 FILE EDIT                        08/01/77   12.605  PAGE:  91
REVISION: 000.00                          MICROPROGRAM SECTION                               DOC.#:
                                                                          ADDRESS   IMAGE
                                     SEQUENCE: $$UPCS                     (HEX)     (HEX)
LINE #
3433000      \ IF FUNCTION CODE IS OUTPUT ADDRESS
3434000        . POST DIRECTION BIT IN DMA CONTROL (DMA1, BIT0)
3435000        . STORE MAIN MEMORY'S MODULE NUMBER AT MOD1
3436000        ELSE GO TO CHECK FOR BUS PARITY ERROR,
3437000        FUNCTION CODE1                                         \
3438000
3439000     $        \ SET ACU FOR OUTPUT ADDRESS COMPARE             \    2C1      8021
3440000              LCN AACU CNST(09#)                               ;
3441000
3442000     $        \ COMPARE FUNCTION CODE WITH HEX 09              \    2C2      681A
3443000              XOR ASPA BACU                                    ;
3444000
3445000     $        \ SKIP IF FUNCTION CODE OUTPUT ADDRESS           \    2C3      C086
3446000              TFO TEQZ                                         ;
3447000
3448000     $        \ GO TO TEST FOR BUS PARITY ERROR                \    2C4      F2D0
3449000              GTO ($BUSRQPTYCK)                                ;
3450000
3451000     $        \ SET SPA FOR DIRECTION BIT                      \    2C5      8CA1
3452000              SSPA1 LOC(CHN2)                                  ;
3453000
3454000     $        \ CLEAR ACU                                      \    2C6      8000
3455000              LCN AACU CNST(00#)                               ;
3456000
3457000     $        \ SKIP IF DIRECTION IS ZERO (READ)               \    2C7      C452
3458000              TFZ TAX1 ASPM                                    ;
3459000
3460000     $        \ SET DIRECTION BIT IN ACU                       \    2C8      8200
3461000              LCN AACU CNST(80#)                               ;
3462000
3463000     $        \ SET SPA FOR DMA BYTE                           \    2C9      8C89
3464000              SSPA1 LOC(DMA1)                                  ;
3465000
3466000     $        \ STORE DMA BYTE                                 \    2CA      A200
3467000              MWT                                              ;
3468000
3469000 SKIP HOF                                                      ;
```

```
MODEL: MPDC-REV3D                         RTL/6000 FILE EDIT                        08/01/77   12.605  PAGE:  92
REVISION: 000.00                          MICROPROGRAM SECTION                               DOC.#:
                                                                          ADDRESS   IMAGE
                                     SEQUENCE: $$UPCS                     (HEX)     (HEX)
LINE #
3470000     $        \ SET SPA FOR MODULE NUMBER                      \    2CB      8C23
3471000              SSPA1 LOC(MOD1)                                  ;
3472000
3473000     $        \ STORE MODULE NUMBER                            \    2CC      A201
3474000              MWT ABUS1                                        ;
3475000
3476000     $        \ SKIP IF PARITY ERROR                           \    2CD      C0BA
3477000              TFC TPTY                                         ;
3478000
3479000     $        \ GO TO RELEASE BUS                              \    2CE      F33D
3480000              GTO ($BUSRQ-DONE)                                ;
3481000
3482000     $        \ GO TO SET PARITY ERROR                         \    2CF      F2D8
3483000              GTO ($BUSRQSETER)                                ;
3484000
3485000 SKIP HOF                                                      ;
```

| MODEL: MPDC-REV3D | | RTL/6000 FILE EDIT | | 08/01/77 | 12.605 PAGE: 93 |
|---|---|---|---|---|---|
| REVISION: 000.00 | | MICROPROGRAM SECTION | | DOC.#: | |
| | | | | ADDRESS | IMAGE |
| LINE # | | SEQUENCE: SSUPC5 | | (HEX) | (HEX) |
| 3486000 | | | | | |
| 3487000 | $BUSRQPTYCK | \ SKIP IF PARITY ERROR | \ | 2D0 | C0BA |
| 3488000 | | TFO TPTY | ; | | |
| 3489000 | | | | | |
| 3490000 | $ | \ GO TO TEST FOR FUNCTION CODE 1 | \ | 2D1 | F2DC |
| 3491000 | | GTO ($BUSRQCODE1) | ; | | |
| 3492000 | | | | | |
| 3493000 | $ | \ SET ACU FOR INTERRUPT FUNCTION CODE | \ | 2D2 | 8003 |
| 3494000 | | LCN AACU CNST(03#) | ; | | |
| 3495000 | | | | | |
| 3496000 | $ | \ COMPARE FOR OUTPUT INTERRUPT LEVEL | \ | 2D3 | 681A |
| 3497000 | | XOR ASPA BACU | ; | | |
| 3498000 | | | | | |
| 3499000 | $ | \ SKIP IF INTERRUPT CODE | \ | 2D4 | C086 |
| 3500000 | | TFO TEQZ | ; | | |
| 3501000 | | | | | |
| 3502000 | $ | \ GO TO SET PARITY ERROR | \ | 2D5 | F2D8 |
| 3503000 | | GTO ($BUSRQSETER) | ; | | |
| 3504000 | | | | | |
| 3505000 | $ | \ CLEAR INTERRUPT LEVEL | \ | 2D6 | A208 |
| 3506000 | | MDA | ; | | |
| 3507000 | | | | | |
| 3508000 | $ | \ CLEAR INTERRUPT LEVEL | \ | 2D7 | A200 |
| 3509000 | | MWT | ; | | |
| 3510000 | | | | | |
| 3511000 | $BUSRQSETER | \ SET SPA FOR STATUS BYTE | \ | 2D8 | 8C61 |
| 3512000 | | SSPAI LOC(STS2) | ; | | |
| 3513000 | | | | | |
| 3514000 | $ | \ SET PARITY ERROR | \ | 2D9 | 8412 |
| 3515000 | | OCN ASPM CNST(02#) | ; | | |
| 3516000 | | | | | |
| 3517000 | $ | \ RESTORE STATUS BYTE | \ | 2DA | A200 |
| 3518000 | | MWT | ; | | |
| 3519000 | | | | | |
| 3520000 | $ | \ GO TO SET INTERRUPT | \ | 2DB | F321 |
| 3521000 | | GTO ($BUSRQ-STP4) | ; | | |
| 3522000 | | | | | |
| 3523000 | | | | | |
| 3524000 | | \ IF FUNCTION CODE EQUALS 1 THEN | | | |
| 3525000 | | . GO TO BLT IF INITIALIZE | | | |
| 3526000 | | . GO TO STOP SEGMENT IF STOP I/O | | | |
| 3527000 | | . ENTER TEST MODE IF TEST IS SET | \ | | |
| 3528000 | | | | | |
| 3529000 | | | | | |
| 3530000 | SKIP HOF | | ; | | |

| MODEL: MPDC-REV3D | | RTL/6000 FILE EDIT | | 08/01/77 | 12.605 PAGE: 94 |
|---|---|---|---|---|---|
| REVISION: 000.00 | | MICROPROGRAM SECTION | | DOC.#: | |
| | | | | ADDRESS | IMAGE |
| LINE # | | SEQUENCE: SSUPC5 | | (HEX) | (HEX) |
| 3531000 | | | | | |
| 3532000 | $BUSRQCODE1 | \ LOAD ACU WITH OUTPUT CONTROL FUNCTION CODE | \ | 2DC | 8001 |
| 3533000 | | LCN AACU CNST(01#) | ; | | |
| 3534000 | | | | | |
| 3535000 | $ | \ COMPARE FUNCTION CODE EQUAL TO 01 | \ | 2DD | 681A |
| 3536000 | | XOR ASPA BACU | ; | | |
| 3537000 | | | | | |
| 3538000 | $ | \ SKIP IF FUNCTION CODE OUTPUT CONTROL | \ | 2DE | C086 |
| 3539000 | | TFO TEQZ | ; | | |
| 3540000 | | | | | |
| 3541000 | $ | \ GO TO TEST FOR GO COMMAND | \ | 2DF | F2E6 |
| 3542000 | | GTO ($BUSRQTSTGO) | ; | | |
| 3543000 | | | | | |
| 3544000 | $ | \ DECREMENT SPA | \ | 2E0 | A008 |
| 3545000 | | DMA | ; | | |
| 3546000 | | | | | |
| 3547000 | $ | \ SKIP IF NOT AN INITIALIZE | \ | 2E1 | C450 |
| 3548000 | | TFZ TAX0 ASPM | ; | | |
| 3549000 | | | | | |
| 3550000 | $ | \ INITIALIZE | \ | 2E2 | 1000 |
| 3551000 | | CLR | ; | | |
| 3552000 | | | | | |
| 3553000 | $ | \ SKIP IF NOT STOP I/O | \ | 2E3 | C452 |
| 3554000 | | TFZ TAX1 ASPM | ; | | |
| 3555000 | | | | | |
| 3556000 | $ | \ STOP I/O | \ | 2E4 | F309 |
| 3557000 | | GTO ($BUSRQ-STOP) | ; | | |
| 3558000 | | | | | |
| 3559000 | $ | \ GO TO RELEASE BUS | \ | 2E5 | F33D |
| 3560000 | | GTO ($BUSRQ-DONE) | ; | | |
| 3561000 | | | | | |
| 3562000 | | | | | |
| 3563000 | | \ IF THE FUNCTION CODE IS EQUAL TO A TASK FUNCTION | | | |
| 3564000 | | CODE, THEN | | | |
| 3565000 | | . RESET CHANNEL READY FLOP | | | |
| 3566000 | | . CLEAR DEVICE STATUS | | | |
| 3567000 | | . ENQUEUE TASK | \ | | |
| 3568000 | | | | | |
| 3569000 | | | | | |
| 3570000 | $BUSRQTSTGO | \ TASK FUNCTION CODE TO ACU | \ | 2E6 | 800B |
| 3571000 | | LCN AACU CNST(07#) | ; | | |
| 3572000 | | | | | |
| 3573000 | $ | \ COMPARE FUNCTION CODE TO 07# | \ | 2E7 | 681A |
| 3574000 | | XOR ASPA BACU | ; | | |
| 3575000 | | | | | |
| 3576000 | $ | \ SKIP IF OUTPUT TASK FUNCTION CODE | \ | 2E8 | C086 |
| 3577000 | | TFO TEQZ | ; | | |
| 3578000 | | | | | |
| 3579000 | SKIP HOF | | ; | | |

| MODEL: MPDC-REV3D | | RTL/6000 FILE EDIT | | 08/01/77 | 12.605 PAGE: 95 |
|---|---|---|---|---|---|
| REVISION: 000.00 | | MICROPROGRAM SECTION | | DOC.#: | |
| | | | | ADDRESS | IMAGE |
| LINE # | | SEQUENCE: SSUPC5 | | (HEX) | (HEX) |
| 3580000 | | | | | |
| 3581000 | $ | \ GO TO DONE | \ | 2E9 | F33D |
| 3582000 | | GTO ($BUSRQ-DONE) | ; | | |
| 3583000 | | | | | |
| 3584000 | $ | \ RESET CHANNEL READY | \ | 2EA | 4010 |
| 3585000 | | RCR | ; | | |
| 3586000 | | | | | |
| 3587000 | $ | \ SET SPA FOR CHANNEL MONITOR | \ | 2EB | 8C88 |
| 3588000 | | SSPAI LOC(MON1) | ; | | |

```
MODEL: MPDC-REV3D                          RTL/6000 FILE EDIT                      08/01/77   12.605  PAGE:  95
REVISION: 000.00                          MICROPROGRAM SECTION                       DOC.#:
                                                                          ADDRESS  IMAGE
LINE #                                    SEQUENCE: SSUPCS                 (HEX)   (HEX)
3589000                                         -continued
3590000   S         \ SET BUSY FLAG                              \         2EC    8100
3591000             LCN AACU CNST(40#)                           ;
3592000
3593000   S         \ STORE CHANNEL MONITOR                      \         2ED    A200
3594000             MWT                                          ;
3595000
3596000   S         \ SET SPA FOR STATUS BYTE                    \         2EE    8C61
3597000             SSPAI LOC(STS2)                              ;
3598000
3599000   S         \ SKIP IF NO PARITY ERROR                    \         2EF    C45C
3600000             TFZ TAX6 ASPM                                ;
3601000
3602000   S         \ PARITY ERROR-SEND INTERRUPT                \         2F0    F2D8
3603000             GTO ($BUSRQSETER)                            ;
3604000
3605000   S         \ CLEAR BUS STATUS                           \         2F1    4084
3606000             RST                                          ;
3607000
3608000   S         \ CLEAR ACU                                  \         2F2    600E
3609000             ZER BACU                                     ;
3610000
3611000   S         \ CLEAR LSB OF STATUS                        \         2F3    A208
3612000             WDA                                          ;
3613000
3614000   S         \ CLEAR MSB OF STATUS                        \         2F4    A200
3615000             MWT                                          ;
3616000
3617000   S         \ SET SPA FOR COMMAND CODE                   \         2F5    8C0A
3618000             SSPAI LOC(TSK1)                              ;
3619000
3620000   S         \ SKIP IF SEEK COMMAND.                      \         2F6    C450
3621000             TFZ TAX0 ASPM                                ;
3622000
3623000   S         \ SKIP IF NOT AN IMPLIED SEEK                \         2F7    C454
3624000             TFZ TAX2 ASPM                                ;
3625000
3626000   S         \ GO TO SET SEEK STACKED                     \         2F8    F301
3627000             GTO ($BUSRQ-SEEK)                            ;
3628000
3629000 SKIP HOF                                                 ;

MODEL: MPDC-REV3D                          RTL/6000 FILE EDIT                      08/01/77   12.605  PAGE:  96
REVISION: 000.00                          MICROPROGRAM SECTION                       DOC.#:
                                                                          ADDRESS  IMAGE
LINE #                                    SEQUENCE: SSUPCS                 (HEX)   (HEX)
3630000
3631000 $BUSRQ-RW   \ SET SPA FOR R/W STACKED INDICATOR          \         2F9    8BEB
3632000             SSPA LOC(RWSTK)                              ;
3633000
3634000   S         \ INCREMENT COUNT                            \         2FA    6400
3635000             INC ASPM BACU                                ;
3636000
3637000   S         \ RESTORE COUNT                              \         2FB    A200
3638000             MWT                                          ;
3639000
3640000   S         \ INDEX REG TO ACU                           \         2FC    6C3E
3641000             XFA AIDX BACU                                ;
3642000
3643000   S         \ ACU TO SPA                                 \         2FD    686A
3644000             XFB ASPA BACU SRIA                           ;
3645000
3646000   S         \ SET R/W STACKED INDICATOR                  \         2FE    8510
3647000             OCN ASPM CNST(40#)                           ;
3648000
3649000   S         \ RESTORE INDICATOR                          \         2FF    A200
3650000             MWT                                          ;
3651000
3652000   S         \ RETURN TO WAIT LOOP                        \         300    F33D
3653000             GTO ($BUSRQ-DONE)                            ;
3654000
3655000 $BUSRQ-SEEK \ SET SPA FOR SEEK STACKED INDICATOR         \         301    8BEA
3656000             SSPA LOC(SKSTK)                              ;
3657000
3658000   S         \ INCREMENT COUNT                            \         302    6400
3659000             INC ASPM BACU                                ;
3660000
3661000   S         \ RESTORE COUNT                              \         303    A200
3662000             MWT                                          ;
3663000
3664000   S         \ INDEX REG TO ACU                           \         304    6C3E
3665000             XFA AIDX BACU                                ;
3666000
3667000   S         \ ACU TO SPA                                 \         305    686A
3668000             XFB ASPA BACU SRIA                           ;
3669000
3670000   S         \ SET SEEK STACKED INDICATOR                 \         306    8610
3671000             OCN ASPM CNST(80#)                           ;
3672000
3673000   S         \ RESTORE INDICATOR                          \         307    A200
3674000             MWT                                          ;
3675000
3676000   S         \ RETURN TO WAIT LOOP                        \         308    F33D
3677000             GTO ($BUSRQ-DONE)                            ;
3678000
3679000
3680000 SKIP HOF                                                 ;

MODEL: MPDC-REV3D                          RTL/6000 FILE EDIT                      08/01/77   12.605  PAGE:  97
REVISION: 000.00                          MICROPROGRAM SECTION                       DOC.#:
                                                                          ADDRESS  IMAGE
LINE #                                    SEQUENCE: SSUPCS                 (HEX)   (HEX)
3681000             \ FUNCTION CODE. WITH STOP I/O SET HAS BEEN DETECTED.
3682000             . STOP ANY READ OR WRITE WHICH IS IN PROGRESS
3683000             . INITIALIZE CHANNEL MONITOR BYTE
3684000             . INITIATE INTERRUPT                         \
3685000
3686000 $BUSRQ-STOP \ SET SPA FOR LAST R/W CHANNEL               \         309    8BE9
3687000             SSPA LOC(LSTRW)                              ;
3688000
3689000   S         \ SKIP IF ADAPTER BUSY                       \         30A    C0A8
3690000             TFO TA0B                                     ;
```

MODEL: MPDC-REV3D  
REVISION: 000.00

RTL/6000 FILE EDIT  
MICROPROGRAM SECTION

08/01/77   12.605   PAGE: 97  
DOC.#:

SEQUENCE: $SUPCS  
-continued

| LINE # | | | | ADDRESS (HEX) | IMAGE (HEX) |
|---|---|---|---|---|---|
| 3691000 | | | | | |
| 3692000 | s | \ GO TO STOP TASK | \ | 30B | F310 |
| 3693000 | | GTO ($BUSRQ-STP1) | ! | | |
| 3694000 | | | | | |
| 3695000 | s | \IS STOP I/O FOR ACTIVE CHANNEL | \ | 30C | 6D1A |
| 3696000 | | XOR AIDX BSPM | ! | | |
| 3697000 | | | | | |
| 3698000 | s | \ SKIP IF STOP I/O IS FOR ACTIVE CHANNEL | \ | 30D | C086 |
| 3699000 | | TFO TEQZ | ! | | |
| 3700000 | | | | | |
| 3701000 | s | \STOP I/O FOR NON-ACTIVE CHANNEL-DEQUE TASK | \ | 30E | F310 |
| 3702000 | | GTO ($BUSRQ-STP1) | ! | | |
| 3703000 | | | | | |
| 3704000 | s | \ GO TO STOP READ OR WRITE OPERATION | \ | 30F | F59C |
| 3705000 | | GTO ($TERM-NOR) | ! | | |
| 3706000 | | | | | |
| 3707000 | $BUSRQ-STP1 | \ INDEX REGISTER TO ACU | \ | 310 | 6C3E |
| 3708000 | | XFA AIDX | ! | | |
| 3709000 | | | | | |
| 3710000 | s | \ ACU TO SPA | \ | 311 | 686A |
| 3711000 | | XFB ASPA BACU SRIA | ! | | |
| 3712000 | | | | | |
| 3713000 | s | \ CLEAR ACU | \ | 312 | 600E |
| 3714000 | | ZER | ! | | |
| 3715000 | | | | | |
| 3716000 | s | \ SKIP IF NO SEEK STACKED | \ | 313 | C450 |
| 3717000 | | TFZ TAXO ASPM | ! | | |
| 3718000 | | | | | |
| 3719000 | s | \ GO TO CLEAR SEEK STACKED | \ | 314 | F318 |
| 3720000 | | GTO ($BUSRQ-STP2) | ! | | |
| 3721000 | | | | | |
| 3722000 | s | \ SKIP IF NO R/W STACKED | \ | 315 | C452 |
| 3723000 | | TFZ TAX1 ASPM | ! | | |
| 3724000 | | | | | |
| 3725000 | s | \ GO TO CLEAR R/W STACKED | \ | 316 | F31D |
| 3726000 | | GTO ($BUSRQ-STP3) | ! | | |
| 3727000 | | | | | |
| 3728000 | s | \ GO TO SEND INTERRUPT | \ | 317 | F321 |
| 3729000 | | GTO ($BUSRQ-STP4) | ! | | |
| 3730000 | | | | | |
| 3731000 | SKIP HOF | | ! | | |

MODEL: MPDC-REV3D  
REVISION: 000.00

RTL/6000 FILE EDIT  
MICROPROGRAM SECTION

08/01/77   12.605   PAGE: 98  
DOC.#:

SEQUENCE: $SUPCS

| LINE # | | | | ADDRESS (HEX) | IMAGE (HEX) |
|---|---|---|---|---|---|
| 3732000 | | | | | |
| 3733000 | $BUSRQ-STP2 | \ CLEAR SEEK STACKED INDICATOR | \ | 318 | A200 |
| 3734000 | | MWT | ! | | |
| 3735000 | | | | | |
| 3736000 | s | \ SET SPA FOR SEEK STACK INDICATOR | \ | 319 | 8BEA |
| 3737000 | | SSPA LOC(SKSTK) | ! | | |
| 3738000 | | | | | |
| 3739000 | s | \ DECREMENT INDICATOR | \ | 31A | 643C |
| 3740000 | | DEC ASPM | ! | | |
| 3741000 | | | | | |
| 3742000 | s | \ RE-WRITE INDICATOR | \ | 31B | A200 |
| 3743000 | | MWT | ! | | |
| 3744000 | | | | | |
| 3745000 | s | \ GO TO SEND INTERRUPT | \ | 31C | F321 |
| 3746000 | | GTO ($BUSRQ-STP4) | ! | | |
| 3747000 | | | | | |
| 3748000 | $BUSRQ-STP3 | \ CLEAR R/W STACKED INDICATOR | \ | 31D | A200 |
| 3749000 | | MWT | ! | | |
| 3750000 | | | | | |
| 3751000 | s | \ SET SPA FOR R/W STACK INDICATOR | \ | 31E | 8BEB |
| 3752000 | | SSPA LOC(RWSTK) | ! | | |
| 3753000 | | | | | |
| 3754000 | s | \ DECREMENT INDICATOR | \ | 31F | 643C |
| 3755000 | | DEC ASPM | ! | | |
| 3756000 | | | | | |
| 3757000 | s | \ RE-WRITE INDICATOR | \ | 320 | A200 |
| 3758000 | | MWT | ! | | |
| 3759000 | | | | | |
| 3760000 | $BUSRQ-STP4 | \ RESET BUS STATUS | \ | 321 | 4084 |
| 3761000 | | RST | ! | | |
| 3762000 | | | | | |
| 3763000 | s | \ SET SPA FOR CHANNEL MONITOR | \ | 322 | 8C88 |
| 3764000 | | SSPAI LOC(MON1) | ! | | |
| 3765000 | | | | | |
| 3766000 | s | \ SET INTERRUPT STORED | \ | 323 | 8430 |
| 3767000 | | OCN ASPM CNST(08#) | ! | | |
| 3768000 | | | | | |
| 3769000 | s | \ RE-WRITE MONITOR | \ | 324 | A200 |
| 3770000 | | MWT | ! | | |
| 3771000 | | | | | |
| 3772000 | s | \ GO TO WAIT LOOP | \ | 325 | F253 |
| 3773000 | | GTO ($WAIT-CONTD) | ! | | |
| 3774000 | | | | | |
| 3775000 | | | | | |
| 3776000 | SKIP HOF | | ! | | |

MODEL: MPDC-REV3D  
REVISION: 000.00

RTL/6000 FILE EDIT  
MICROPROGRAM SECTION

08/01/77   12.605   PAGE: 99  
DOC.#:

SEQUENCE: $SUPCS

| LINE # | | | | ADDRESS (HEX) | IMAGE (HEX) |
|---|---|---|---|---|---|
| 3777000 | | \ RESPONSE IS REQUIRED. LOAD BUS DATA REGISTER WITH 2 | | | |
| 3778000 | | BYTES FROM SCRATCH PAD USING THE FUNCTION CODE AS THE | | | |
| 3779000 | | STARTING ADDRESS. | \ | | |
| 3780000 | | | | | |
| 3781000 | $BUSRQ-RSVP | \ FUNCTION CODE TO ACU | \ | 326 | 603F |
| 3782000 | | XFA ABUS1 BACU | ! | | |
| 3783000 | | | | | |
| 3784000 | s | \ MASK UNUSED BITS | \ | 327 | 80EE |
| 3785000 | | ACN AACU CNST(3E#) | ! | | |
| 3786000 | | | | | |
| 3787000 | s | \ ADDRESS S.P. WITH FUNCTION CODE | \ | 328 | 6C6A |
| 3788000 | | XFB ASPAI BACU SRIA | ! | | |
| 3789000 | | | | | |
| 3790000 | s | \ LOAD MSB OF DATA IN BUS DATA REGISTER | \ | 329 | 616B |
| 3791000 | | XFB ABUS1 BSPM SRIA | ! | | |

MODEL: MPDC-REV3D
REVISION: 000.00

RTL/6000 FILE EDIT
MICROPROGRAM SECTION

SEQUENCE: $SUPCS
-continued

| LINE # | | | ADDRESS (HEX) | IMAGE (HEX) |
|---|---|---|---|---|
| 3792000 | | | | |
| 3793000 | S | \ INCREMENT SPA \ | 32A | A100 |
| 3794000 | | IMA | | |
| 3795000 | | | | |
| 3796000 | S | \ LOAD LSB OF DATA IN BJS DATA REGISTER \ | 32B | 616B |
| 3797000 | | XFB ABUS1 BSPM SR1A | | |
| 3798000 | | | | |
| 3799000 | S | \ SET CYCLE PARAMETERS \ | 32C | 8240 |
| 3800000 | | LCN AACU CNST(90#) | | |
| 3801000 | | | | |
| 3802000 | S | \ INITIATE BUS CYCLE \ | 32D | 4020 |
| 3803000 | | CYC AACU | | |
| 3804000 | | | | |
| 3805000 | SKIP HOF | | | |

MODEL: MPDC-REV3D
REVISION: 000.00

RTL/6000 FILE EDIT
MICROPROGRAM SECTION

SEQUENCE: $SUPCS

| LINE # | | | ADDRESS (HEX) | IMAGE (HEX) |
|---|---|---|---|---|
| 3806000 | S | \ HEX 19 TO ACU \ | 32E | 8061 |
| 3807000 | | LCN AACU CNST(19#) | | |
| 3808000 | | | | |
| 3809000 | S | \ COMPARE FOR INPUT STATUS FUNCTION CODE \ | 32F | 681A |
| 3810000 | | XOR ASPA BACU | | |
| 3811000 | | | | |
| 3812000 | S | \ SKIP IF INPUT STATUS FUNCTION CODE \ | 330 | C086 |
| 3813000 | | TFO TEQZ | | |
| 3814000 | | | | |
| 3815000 | S | \ DO NOT CLEAR ATTENTION \ | 331 | F336 |
| 3816000 | | GTO ($BUSRQ-SHR) | | |
| 3817000 | | | | |
| 3818000 | S | \ RESET STATUS 13 AND 14 \ | 332 | 87E5 |
| 3819000 | | ACN ASPM CNST(F9#) | | |
| 3820000 | | | | |
| 3821000 | S | \ RESTORE STATUS BYTE 2 \ | 333 | A208 |
| 3822000 | | WDA AACU | | |
| 3823000 | | | | |
| 3824000 | S | \ RESET ATTENTION BIT \ | 334 | 86EF |
| 3825000 | | ACN ASPM CNST(BF#) | | |
| 3826000 | | | | |
| 3827000 | S | \ RESTORE STATUS BYTE 1 \ | 335 | A200 |
| 3828000 | | MWT | | |
| 3829000 | | | | |
| 3830000 | SKIP HOF | | | |

MODEL: MPDC-REV3D
REVISION: 000.00

RTL/6000 FILE EDIT
MICROPROGRAM SECTION

SEQUENCE: $SUPCS

| LINE # | | | ADDRESS (HEX) | IMAGE (HEX) |
|---|---|---|---|---|
| 3831000 | | | | |
| 3832000 | $BUSRQ-SHR | \ SKIP IF ACK NOT RECEIVED \ | 336 | C04E |
| 3833000 | | TFZ TACK | | |
| 3834000 | | | | |
| 3835000 | S | \ ACK WAS RECEIVED GO TO DONE \ | 337 | F33D |
| 3836000 | | GTO ($BUSRQ-DONE) | | |
| 3837000 | | | | |
| 3838000 | S | \ SKIP IF NAK WAS RECEIVED \ | 338 | C086 |
| 3839000 | | TFO TNAK | | |
| 3840000 | | | | |
| 3841000 | S | \ NO RESPONSE LOOP \ | 339 | F336 |
| 3842000 | | GTO ($BUSRQ-SHR) | | |
| 3843000 | | | | |
| 3844000 | S | \ NAK RECEIVED - SET SPA FOR STS2 \ | 33A | 8C61 |
| 3845000 | | SSPAI LOC(STS2) | | |
| 3846000 | | | | |
| 3847000 | S | \ SET NON-EXISTANT RESOURCE ERROR \ | 33B | 8418 |
| 3848000 | | OCN ASPM CNST(04#) | | |
| 3849000 | | | | |
| 3850000 | S | \ RESTORE STS2 \ | 33C | A200 |
| 3851000 | | MWT | | |
| 3852000 | | | | |
| 3853000 | $BUSRQ-DONE | \ CLEAR BUS STATUS \ | 33D | 4084 |
| 3854000 | | RST | | |
| 3855000 | | | | |
| 3856000 | S | \ GO TO WAIT \ | 33E | F253 |
| 3857000 | | GTO ($WAIT-CONTD) | | |
| 3858000 | | | | |
| 3859000 | SKIP HOF | | | |

MODEL: MPDC-REV3D
REVISION: 000.00

RTL/6000 FILE EDIT
MICROPROGRAM SECTION

SEQUENCE: $SUPCS

| LINE # | | | ADDRESS (HEX) | IMAGE (HEX) |
|---|---|---|---|---|
| 3860000 | \ | THE INTERRUPT ROUTINE IS ENTERED UPON DETECTION | | |
| 3861000 | | OF A DEVICE STATE TRANSITION, OR AFTER THE EXECUTION | | |
| 3862000 | | OF A DATA TRANSFER, OR AFTER THE EXECUTION OF AN | | |
| 3863000 | | OUTPUT CONTROL WORD \ | | |
| 3864000 | | | | |
| 3865000 | | | | |
| 3866000 | $STARTINTPT | \ SET SPA FOR INTERRUPT LEVEL \ | 33F | 8C03 |
| 3867000 | | SSPAI LOC(ILC2) | | |
| 3868000 | | | | |
| 3869000 | S | \ STRIP 2 HIGH ORDER BITS \ | 340 | 84EF |
| 3870000 | | ACN ASPM CNST (3F#) | | |
| 3871000 | | | | |
| 3872000 | S | \ CHECK FOR INTERRUPT LEVEL ZERO \ | 341 | 602A |
| 3873000 | | XFB BACU | | |
| 3874000 | | | | |
| 3875000 | S | \ SKIP IF INTERRUPT LEVEL NOT ZERO \ | 342 | C046 |
| 3876000 | | TFZ TEQZ | | |
| 3877000 | | | | |
| 3878000 | S | \ INTERRUPT LEVEL ZERO-RESET MONITOR \ | 343 | F360 |
| 3879000 | | GTO ($INTPT-ACK) | | |
| 3880000 | | | | |
| 3881000 | S | \ SET SPA FOR INTERRUPT VECTOR \ | 344 | 8CAB |
| 3882000 | | SSPAI LOC(IDF1) | | |
| 3883000 | | | | |
| 3884000 | S | \ STORE INTERRUPT VECTOR \ | 345 | A200 |
| 3885000 | | MWT AACU | | |
| 3886000 | | | | |
| 3887000 | S | \SET SPA FOR LSB OF CP CHANNEL NUMBER \ | 346 | 8C03 |
| 3888000 | | SSPAI LOC(ILC2) | | |
| 3889000 | | | | |
| 3890000 | SKIP HOF | | | |

```
MODEL: MPDC-REV3D                        RTL/6000 FILE EDIT                        08/01/77   12.605  PAGE: 103
REVISION: 000.00                         MICROPROGRAM SECTION                      DOC.#:
                                                                         ADDRESS  IMAGE
LINE #                              SEQUENCE: S$UPCS                     (HEX)    (HEX)
3891000
3892000  S        \ CLEAR LOW ORDER BITS                 \                347     8704
3893000           ACN ASPM CNST (C0#)                    ;
3894000
3895000  S        \ LOAD LSB OF BUS ADDRESS              \                348     6C6B
3896000           XFB ABUS4 BACU SRIA                    ;
3897000
3898000  S        \SET SPA FOR 2ND BYTE OF CP CHANNEL NUMBER \            349     8C02
3899000           SSPAI LOC(ILC1)                        ;
3900000
3901000  S        \ LOAD MID OF BUS ADDRESS              \                34A     606B
3902000           XFB ABUS4 BSPM SRIA                    ;
3903000
3904000  S        \ LOAD MSB OF BUS ADDRESS              \                34B     6C4F
3905000           ZER ABUS4 SRIA                         ;
3906000
3907000  S        \ SET SPA FOR LSB OF MPDC CHANNEL NUMBER \              34C     8CA1
3908000           SSPAI LOC(CHN2)                        ;
3909000
3910000  S        \ SAVE ONLY ADDRESS BITS               \                34D     8704
3911000           ACN ASPM CNST (C0#)                    ;
3912000
3913000  S        \ SET SPA FOR INTERRUPT VECTOR         \                34E     8CA8
3914000           SSPAI LOC(IDF1)                        ;
3915000
3916000  S        \ GENERATE LSB OF INTERRUPT VECTOR     \                34F     643A
3917000           ORR ASPM BACU                          ;
3918000
3919000  S        \ STORE INTERRUPT VECTOR               \                350     A200
3920000           MWT AACU                               ;
3921000
3922000  S        \ LOAD LSB OF INTERRUPT VECTOR IN BUS REG \             351     686B
3923000           XFB ABUS3 BACU SRIA                    ;
3924000
3925000  S        \ SET SPA FOR MSB OF INTERRUPT VECTOR  \                352     8CA0
3926000           SSPAI LOC(CHN1)                        ;
3927000
3928000  S        \ LOAD MSB OF INTERRUPT VECTOR IN BUS REG. \            353     656B
3929000           XFB ABUS2 BSPM SRIA                    ;
3930000
3931000  S        \CLEAR BUS STATUS                      \                354     4084
3932000           RST                                    ;
3933000
3934000  S        \ SET CYCLE PARAMETERS                 \                355     8200
3935000           LCN AACU CNST (80#)                    ;
3936000
3937000  S        \ SET CYCLE                            \                356     4020
3938000           CYC                                    ;
3939000
3940000 SKIP HOF                                         ;
```

```
MODEL: MPDC-REV3D                        RTL/6000 FILE EDIT                        08/01/77   12.605  PAGE: 104
REVISION: 000.00                         MICROPROGRAM SECTION                      DOC.#:
                                                                         ADDRESS  IMAGE
LINE #                              SEQUENCE: S$UPCS                     (HEX)    (HEX)
3941000
3942000 $INTPT-TACK  \ SKIP IF NO ACK RESPONSE           \                357     C04E
3943000           TFZ IACK                               ;
3944000
3945000  S        \ GO TO SET CHANNEL READY              \                358     F360
3946000           GTO ($INTPT-ACK)                       ;
3947000
3948000  S        \ SKIP IF NAK RESPONSE                 \                359     C086
3949000           TFO TNAK                               ;
3950000
3951000  S        \ NO NAK GO TO TEST ACK                \                35A     F357
3952000           GTO ($INTPT-TACK)                      ;
3953000
3954000 $INTPT-NAK   \ NAK RECEIVED-SET SPA FOR CHANNEL MONITOR \         35B     8C88
3955000           SSPAI LOC (MON1)                       ;
3956000
3957000  S        \ SET INTERRUPT PENDING                \                35C     8610
3958000           OCN ASPM CNST (80#)                    ;
3959000
3960000  S        \ RESTORE MONITOR CHANNEL              \                35D     A200
3961000           MWT AACU                               ;
3962000
3963000  S        \ RESET CHANNEL READY                  \                35E     4010
3964000           RCR                                    ;
3965000
3966000  S        \ CLEAR BUS STATUS AND RETURN TO WAIT  \                35F     F364
3967000           GTO ($INTPT-EXIT)                      ;
3968000
3969000 $INTPT-ACK   \ SET SPA FOR CHANNEL MONITOR       \                360     8C88
3970000           SSPAI LOC(MON1)                        ;
3971000
3972000  S        \ RESET MONITOR                        \                361     600E
3973000           ZER                                    ;
3974000
3975000  S        \ RESTORE MONITOR                      \                362     A200
3976000           MWT AACU                               ;
3977000
3978000  S        \ SET CHANNEL READY                    \                363     4018
3979000           SCR                                    ;
3980000
3981000 $INTPT-EXIT  \ RESET BUS STATUS                  \                364     4084
3982000           RST                                    ;
3983000
3984000  S        \ GO TO WAIT                           \                365     F210
3985000           GTO ($START-WAIT)                      ;
3986000
3987000
3988000 SKIP HOF                                         ;
```

```
MODEL: MPDC-REV3D                        RTL/6000 FILE EDIT
REVISION: 000.00                         MICROPROGRAM SECTION
                                                                         ADDRESS  IMAGE
LINE #                              SEQUENCE: S$UPCS                     (HEX)    (HEX)
3989000           \ THE FOLLOWING FIRMWARE IS THE BEGINNING OF THE DEVICE
3990000             SPECIFIC ROUTINES DEDICATED TO THE SUPPORT OF THE
3991000             CAELUS CARTRIDGE DISK.
3992000             SIGNIFICANT STATUS AND WORK REGISTERS ARE DEFINED AS
3993000             FOLLOWS
```

```
MODEL: MPDC-REV3D                           RTL/6000 FILE EDIT                      08/01/77   12.605  PAGE: 105
REVISION: 000.00                            MICROPROGRAM SECTION                    DOC.#:
LINE #                          SEQUENCE: SSUPC5                       ADDRESS  IMAGE
                                     -continued                        (HEX)    (HEX)
3994000
3995000    \ ADAPTER DEVICE I.D.          ADAPTER COMMAND (AAD2)
3996000       BIT                            BIT
3997000         0 - 0                          0 - ADAPTER BUSY
3998000         1 - 0                          1 - DATA TRANSFER
3999000         2 - 1                          2 - RECALIBRATE
4000000         3 - 1                          3 - DIAGNOSTIC MODE
4001000         4 - 0                          4 - SEARCH
4002000         5 - 0                          5 - WRITE
4003000         6 - 200 T.P.I.                 6 - READ
4004000         7 - FIXED VOLUME PRESENT       7 - FORMAT                  \
4005000
4006000
4007000    \ ADAPTER STATUS I (AAD2)      ADAPTER STATUS II (AAD3)
4008000       BIT                            BIT
4009000         0 - DRIVE READY               0 - READ/WRITE ERROR
4010000         1 - SEEK COMPLETE             1 - SECTOR PLUSE ERROR
4011000         2 - SEEK TIMEOUT              2 - UNDERRUN/OVERRUN
4012000         3 - 0                         3 - WRITE PROTECT
4013000         4 - 0                         4 - CRC ERROR
4014000         5 - 0                         5 - SEARCH MISCOMPARE
4015000         6 - 0                         6 - ADDRESS MARK ERROR
4016000         7 - 0                         7 - SECOND INDEX DETECTED \
4017000
4018000
4019000    \ CHANNEL MONITOR BYTE         DMA BYTE
4020000       BIT                            BIT
4021000         0 - INTERRUPT PENDING         0 - READ=0, WRITE=1
4022000         1 - CHANNEL BUSY              1 - UNUSED
4023000         2 - STOP I/O                  2 - IMPLIED SEEK
4024000         3 - SEEK ACTIVE               3 - IGNORE READ ERRORS
4025000         4 - INTERRUPT STORED          4 - UNUSED
4026000         5 - RECALIBRATE OPERATION     5 - UNUSED
4027000         6 - UNUSED                    6 - UNUSED
4028000         7 - UNUSED                    7 - UNUSED             \
4029000
4030000 SKIP HOF                                                         ;
```

```
MODEL: MPDC-REV3D                           RTL/6000 FILE EDIT                      08/01/77   12.605  PAGE: 106
REVISION: 000.00                            MICROPROGRAM SECTION                    DOC.#:
LINE #                          SEQUENCE: SSUPC5                       ADDRESS  IMAGE
4031000  \ THIS PORTION OF COMMAND DECODE PERFORMS THE FOLLOWING         (HEX)   (HEX)
4032000     OPERATIONS
4033000         1. SELECTS THE DEVICE
4034000         2. PARTIAL COMMAND DECODE                     \
4035000
4036000
4037000 SCMDEC-E1        \ADDRESS DMA BYTE                     \          366    8C89
4038000                  SSPAI LOC (DMA1)                      ;
4039000
4040000  S               \RESET ALL BUT DIRECTION BIT          \          367    8604
4041000                  ACN ASPM CNST (80#)                   ;
4042000
4043000  S               \RESTORE DMA BYTE                     \          368    A200
4044000                  MWT                                   ;
4045000
4046000  S               \ ADDRESS UNIT SELECT                 \          369    8CEB
4047000                  SSPAI LOC(UNSEL)                      ;
4048000
4049000  S               \ SEND TO ADAPTER                     \          36A    7D6A
4050000                  XFB AAD3 BSPM SRIA                    ;
4051000
4052000  S               \ RETURN FROM SEEK OR RECALIBRATE     \          36B    E21D
4053000                  LRA ($START-WAIT)                     ;
4054000
4055000  S               \ ADDRESS TASK                        \          36C    8C0A
4056000                  SSPAI LOC(TSK1)                       ;
4057000
4058000  S               \ SKIP IF NOT WRAP TEST               \          36D    C452
4059000                  TFZ ASPM TAK1                         ;
4060000
4061000  S               GTO (SCMDEC-E2)                       ;          36E    F382
4062000
4063000  S               \ SKIP IF DEVICE READY                \          36F    D890
4064000                  TFO AAD2 TAX0                         ;
4065000
4066000  S               GTO ($STARTINTPT)                     ;          370    F33F
4067000
4068000  S               \ SKIP IF R/W                         \          371    C490
4069000                  TFO ASPM TAX0                         ;
4070000
4071000  S               GTO ($SK-RCB)                         ;          372    F3B3
4072000
4073000 SKIP HOF                                                ;
```

```
MODEL: MPDC-REV3D                           RTL/6000 FILE EDIT                      08/01/77   12.605  PAGE: 107
REVISION: 000.00                            MICROPROGRAM SECTION                    DOC.#:
LINE #                          SEQUENCE: SSUPC5                       ADDRESS  IMAGE
4074000  S               \SET SPA FOR UNIT SELECT BYTE         \          373    8CEB
4075000                  SSPAI LOC (UNSEL)                     ;
4076000
4077000  S               \CLEAR TRACK BIT                      \          374    87E7
4078000                  ACN ASPM CNST (FB#)                   ;
4079000
4080000  S               \RESTORE                              \          375    A200
4081000                  MWT                                   ;
4082000
4083000  S               \ ADDRESS CONF B UPPER                \          376    8C42
4084000                  SSPAI LOC(CNF3)                       ;
4085000
4086000  S               \ SHIFT TRACK BIT                     \          377    6430
4087000                  LSH ASPM                              ;
4088000
4089000  S               \ SHIFT TRACK BIT                     \          378    6030
4090000                  LSH                                   ;
4091000
4092000  S               \ ADDRESS UNIT SELECT                 \          379    8CEB
4093000                  SSPAI LOC(UNSEL)                      ;
4094000
```

MODEL: MPDC-REV3D  
REVISION: 000.00

RTL/6000 FILE EDIT  
MICROPROGRAM SECTION

SEQUENCE: SSUPCS  
-continued

| LINE # | | | | ADDRESS (HEX) | IMAGE (HEX) |
|---|---|---|---|---|---|
| 4095000 | s | \ SUPERIMPOSE UNIT SELECT BITS | \ | 37A | 643A |
| 4096000 | | ORR ASPM | ; | | |
| 4097000 | | | | | |
| 4098000 | s | \ SEND TO ADAPTER | \ | 37B | 7C6A |
| 4099000 | | XFB AAD3 SRIA | ; | | |
| 4100000 | | | | | |
| 4101000 | s | \ RESTORE UNSEL WITH NEW TRACK | \ | 37C | A200 |
| 4102000 | | MWT | ; | | |
| 4103000 | | | | | |
| 4104000 | s | \ ADDRESS TASK | \ | 37D | 8C0A |
| 4105000 | | SSPAI LOC(TSK1) | ; | | |
| 4106000 | | | | | |
| 4107000 | s | \ SKIP IF NO SEEK IMPLIED | \ | 37E | C454 |
| 4108000 | | TFZ ASPM TAX2 | ; | | |
| 4109000 | | | | | |
| 4110000 | s | GTO ($SEEK-IMPL) | ; | 37F | F3B0 |
| 4111000 | | | | | |
| 4112000 | s | \ SKIP IF NO SEEK ERROR | \ | 380 | D854 |
| 4113000 | | TFZ AAD2 TAX2 | ; | | |
| 4114000 | | | | | |
| 4115000 | s | GTO ($SEEK-ERR) | ; | 381 | F5A4 |
| 4116000 | | | | | |
| 4117000 | SKIP HOF | | ; | | |

MODEL: MPDC-REV3D  
REVISION: 000.00

RTL/6000 FILE EDIT  
MICROPROGRAM SECTION

SEQUENCE: SSUPCS

| LINE # | | | | ADDRESS (HEX) | IMAGE (HEX) |
|---|---|---|---|---|---|
| 4118000 | | | | | |
| 4119000 | | \ THIS PORTION OF COMMAND DECODE- | | | |
| 4120000 | | 1. STORES THE CURRENTLY ACTIVE CHANNEL FOR FUTURE | | | |
| 4121000 | | USE BY THE WAIT LOOP. | | | |
| 4122000 | | 2. LOADS THE BUS INTERFACE COUNTERS (MEMORY ADDRESS, | | | |
| 4123000 | | RANGE, AND OFFSET RANGE) FOR USE DURING THE | | | |
| 4124000 | | PENDING READ/WRITE OPERATION. | \ | | |
| 4125000 | | | | | |
| 4126000 | $CMDEC-E2 | \ ADDRESS LAST R/W | \ | 382 | 8BE9 |
| 4127000 | | SSPA LOC(LSTRW) | ; | | |
| 4128000 | | | | | |
| 4129000 | s | \ STORE CH # | \ | 383 | AE00 |
| 4130000 | | MWT AIDX | ; | | |
| 4131000 | | | | | |
| 4132000 | s | \ ADDRESS DMA BYTE | \ | 384 | 8C89 |
| 4133000 | | SSPAI LOC(DMA1) | ; | | |
| 4134000 | | | | | |
| 4135000 | s | \SKIP IF WRITE MODE | \ | 385 | C490 |
| 4136000 | | TFO ASPM TAX0 | ; | | |
| 4137000 | | | | | |
| 4138000 | s | GTO ($CMDEC-LDOF) | ; | 386 | F38B |
| 4139000 | | | | | |
| 4140000 | $ZER-OSR | \ CLEAR OFFSET LOWER | \ | 387 | 6C4F |
| 4141000 | | ZER ABUS4 SRIA | ; | | |
| 4142000 | | | | | |
| 4143000 | s | \ CLEAR OFFSET UPPER | \ | 388 | 6C4F |
| 4144000 | | ZER ABUS4 SRIA | ; | | |
| 4145000 | | | | | |
| 4146000 | s | \ ADDRESS RANGE LOWER | \ | 389 | 8C29 |
| 4147000 | | SSPAI LOC(RNG2) | ; | | |
| 4148000 | | | | | |
| 4149000 | s | GTO ($CMDEC-LD) | ; | 38A | F38C |
| 4150000 | | | | | |
| 4151000 | $CMDEC-LDOF | \ ADDRESS OFFSET LOWER | \ | 38B | 8C2B |
| 4152000 | | SSPAI LOC(OFR2) | ; | | |
| 4153000 | | | | | |
| 4154000 | $CMDEC-LD | \ LOAD OFFSET RANGE AND RANGE | \ | 38C | 6D6B |
| 4155000 | | XFB ABUS4 BSPM SRIA | ; | | |
| 4156000 | | | | | |
| 4157000 | s | \ DECREMENT S.P. ADDRESS | \ | 38D | A008 |
| 4158000 | | DMA | ; | | |
| 4159000 | | | | | |
| 4160000 | s | \NO OP FOR TIMING | \ | 38E | 0000 |
| 4161000 | | NOP | ; | | |
| 4162000 | | | | | |
| 4163000 | s | \ SKIP IF OFFSET AND RANGE LOADED | \ | 38F | C85A |
| 4164000 | | TFZ ASPA TAX5 | ; | | |
| 4165000 | | | | | |
| 4166000 | s | GTO ($CMDEC-LD) | ; | 390 | F38C |
| 4167000 | | | | | |
| 4168000 | SKIP HOF | | ; | | |

MODEL: MPDC-REV3D  
REVISION: 000.00

RTL/6000 FILE EDIT  
MICROPROGRAM SECTION

SEQUENCE: SSUPCS

| LINE # | | | | ADDRESS (HEX) | IMAGE (HEX) |
|---|---|---|---|---|---|
| 4169000 | s | \ ADDRESS LOWER | \ | 391 | 8C21 |
| 4170000 | | SSPAI LOC(ADR2) | ; | | |
| 4171000 | | | | | |
| 4172000 | s | \ LOAD | \ | 392 | 6D6B |
| 4173000 | | XFB ABUS4 BSPM SRIA | ; | | |
| 4174000 | | | | | |
| 4175000 | s | \ DECRCMENT SPA | \ | 393 | A008 |
| 4176000 | | DMA | ; | | |
| 4177000 | | | | | |
| 4178000 | s | \ LOAD ADDRESS MIDDLE | \ | 394 | 6D6B |
| 4179000 | | XFB ABUS4 BSPM SRIA | ; | | |
| 4180000 | | | | | |
| 4181000 | s | \ ADDRESS UPPER | \ | 395 | 8C23 |
| 4182000 | | SSPAI LOC(MOD1) | ; | | |
| 4183000 | | | | | |
| 4184000 | s | \ LOAD | \ | 396 | 6D6B |
| 4185000 | | XFB ABUS4 BSPM SRIA | ; | | |
| 4186000 | | | | | |
| 4187000 | s | \SET SPA FOR MSB OF CHANNEL NUMBER | \ | 397 | 8CA0 |
| 4188000 | | SSPAI LOC(CHN1) | ; | | |
| 4189000 | | | | | |
| 4190000 | s | \LOAD MSB OF CHANNEL NUMBER IN BUS REG | \ | 398 | 656B |
| 4191000 | | XFB ABUS2 BSPM SRIA | ; | | |
| 4192000 | | | | | |
| 4193000 | s | \SET SPA FOR LSB OF CHANNEL NUMBER | \ | 399 | 8CA1 |
| 4194000 | | SSPAI LOC(CHN2) | ; | | |
| 4195000 | | | | | |

MODEL: MPDC-REV3D　　　　　　　　　　　　　　　　RTL/6000 FILE EDIT　　　　　　　　　　　08/01/77　　12.605　PAGE: 109
REVISION: 000.00　　　　　　　　　　　　　　　　MICROPROGRAM SECTION　　　　　　　　　　　　DOC.#:
　　　　　　　　　　　　　　　　　　　　　　　　　　　　　　　　　　　　　　　　　ADDRESS　IMAGE
LINE #　　　　　　　　　　　　　　　　SEQUENCE: $$UPCS　　　　　　　　　　　　　　　　(HEX)　(HEX)
　　　　　　　　　　　　　　　　　　　　　　　　-continued

```
4196000  s        \SAVE ONLY ADDRESS BITS                \        39A  8704
4197000           ACN ASPM CNST (C0#)                    ;
4198000
4199000  s        \LOAD LSB OF CHANNEL NUMBER IN BUS REG \        39B  686B
4200000           XFB ABUS3 BACU SRIA                    ;
4201000
4202000  s        \SKIP IF RANGE EQUAL ZERO              \        39C  C0A2
4203000           TFO TRGZ                               ;
4204000
4205000  s        GTO (SCMDEC-CT)                        ;        39D  F3A0
4206000
4207000  s        \SKIP IF OFFSET RANGE NON-ZERO         \        39E  C060
4208000           TFZ TORZ                               ;
4209000
4210000  s        GTO (STERM-NOR)                        ;        39F  F59C
4211000
4212000  SKIP HOF                                        ;
```

MODEL: MPDC-REV3D　　　　　　　　　　　　　　　　RTL/6000 FILE EDIT　　　　　　　　　　　08/01/77　　12.605　PAGE: 110
REVISION: 000.00　　　　　　　　　　　　　　　　MICROPROGRAM SECTION　　　　　　　　　　　　DOC.#:
　　　　　　　　　　　　　　　　　　　　　　　　　　　　　　　　　　　　　　　　　ADDRESS　IMAGE
LINE #　　　　　　　　　　　　　　　　SEQUENCE: $$UPCS　　　　　　　　　　　　　　　　(HEX)　(HEX)

```
4213000
4214000  SCMDEC-CT  \ ADDRESS TASK                       \        3A0  8C0A
4215000             SSPAI LOC(TSK1)                      ;
4216000
4217000  s          \ SKIP IF NOT WRAP AROUND            \        3A1  C452
4218000             TFZ ASPM TAX1                        ;
4219000
4220000  s          GTO (SWRAP)                          ;        3A2  F49F
4221000
4222000  s          \ SETUP FOR 256 BYTE DATA FIELDS     \        3A3  8100
4223000             LCN CNST(40#)                        ;
4224000
4225000  s          \ SKIP IF DATA FIELDS ARE 256 BYTES  \        3A4  C456
4226000             TFZ ASPM TAX3                        ;
4227000
4228000  s          \ SETUP FOR 576 BYTE DATA FIELDS     \        3A5  8240
4229000             LCN CNST(90#)                        ;
4230000
4231000  s          \ ADDRESS DATA LENGTH (LOC #5)       \        3A6  8C09
4232000             SSPAI LOC(DATL)                      ;
4233000
4234000  s          \ STORE DATA FIELD SIZE + ADDRESS TASK \      3A7  A300
4235000             WIA                                  ;
4236000
4237000  s          \ SKIP IF NOT FORMAT                 \        3A8  C49E
4238000             TFO ASPM TAX7                        ;
4239000
4240000  s          GTO (SFORMAT)                        ;        3A9  F3FC
4241000
4242000  s          \ SKIP IF DIAGNOSTIC                 \        3AA  C49C
4243000             TFO ASPM TAX6                        ;
4244000
4245000  s          GTO ($SCH-SET)                       ;        3AB  F420
4246000
4247000  s          \ ADDRESS DMA BYTE                   \        3AC  8C89
4248000             SSPAI LOC(DMA1)                      ;
4249000
4250000  s          \ SKIP IF WRITE                      \        3AD  C490
4251000             TFO ASPM TAX0                        ;
4252000
4253000  s          GTO (SDIAG-READ)                     ;        3AE  F561
4254000
4255000  s          GTO($SCH-SET)                        ;        3AF  F420
4256000
4257000  SKIP HOF                                        ;
```

MODEL: MPDC-REV3D　　　　　　　　　　　　　　　　RTL/6000 FILE EDIT　　　　　　　　　　　08/01/77　　12.605　PAGE: 111
REVISION: 000.00　　　　　　　　　　　　　　　　MICROPROGRAM SECTION　　　　　　　　　　　　DOC.#:
　　　　　　　　　　　　　　　　　　　　　　　　　　　　　　　　　　　　　　　　　ADDRESS　IMAGE
LINE #　　　　　　　　　　　　　　　　SEQUENCE: $$UPCS　　　　　　　　　　　　　　　　(HEX)　(HEX)

```
4258000  \ THE IMPLIED SEEK IS USED DURING AN EXTENDED SEARCH
4259000    AND READ OPERATION. WHEN AUTOMATIC CYLINDER
4260000    LINKING IS REQUIRED.                          \
4261000
4262000
4263000  $SEEK-IMPL  \ ADDRESS DMA BYTE                  \        3B0  8C89
4264000              SSPAI LOC(DMA1)                     ;
4265000
4266000  s           \ SET SEEK IMPLIED                  \        3B1  8490
4267000              OCN ASPM CNST(20#)                  ;
4268000
4269000  s           \ RESTORE DMA BYTE                  \        3B2  A200
4270000              MWT                                 ;
4271000
4272000  \ THIS PORTION OF THE SEEK/RECALIBRATE ROUTINE SETS THE
4273000    SEEK ACTIVE BIT IN THE CHANNEL MONITOR BYTE FOR USE
4274000    BY THE WAIT-LOOP. TO DETERMINE WHICH CHANNELS HAVE
4275000    POSITIONERS IN MOTION.                        \
4276000
4277000  $SK-RCB    \SET SPA FOR CHANNEL MONITOR         \        3B3  8C88
4278000             SSPAI LOC (MON1)                     ;
4279000
4280000  s          \SET SEEK ACTIVE BIT                 \        3B4  8450
4281000             OCN ASPM CNST (10#)                  ;
4282000
4283000  s          \RE-WRITE MONITOR                    \        3B5  A200
4284000             MWT                                  ;
4285000
4286000  s          \SET SPA FOR UNIT SELECT BYTE        \        3B6  8C8B
4287000             SSPAI LOC (UNSEL)                    ;
4288000
4289000  s          \CLEAR PLATTER AND MSB OF CYLINDER   \        3B7  878F
4290000             ACN ASPM CNST (E7#)                  ;
4291000
4292000  s          \RESTORE                             \        3B8  A200
4293000             MWT                                  ;
4294000
4295000  s          \SET SPA FOR TASK                    \        3B9  8C0A
```

| LINE # | | SEQUENCE: $SUPCS -continued | | ADDRESS (HEX) | IMAGE (HEX) |
|---|---|---|---|---|---|
| 296000 | | SSPAI LOC (TSK1) | ; | | |
| 297000 | | | | | |
| 298000 | $ | \SKIP IF NOT IMPLIED SEEK | \ | 3BA | C454 |
| 299000 | | TFZ ASPM TAX2 | ; | | |
| 300000 | | | | | |
| 301000 | $ | GTO ($SEEK) | ; | 3BB | F3BE |
| 302000 | | | | | |
| 303000 | $ | \ SKIP IF SEEK | \ | 3BC | C49E |
| 304000 | | TFO ASPM TAX7 | ; | | |
| 305000 | | | | | |
| 306000 | $ | GTO ($RECAL) | ; | 3BD | F3F1 |
| 307000 | | | | | |
| 308000 | SKIP HOF | | ; | | |

| LINE # | | SEQUENCE: $SUPCS | | ADDRESS (HEX) | IMAGE (HEX) |
|---|---|---|---|---|---|
| 4309000 | | | | | |
| 4310000 | $SEEK | \SKIP IF NO SEEK ERROR | \ | 38E | D854 |
| 4311000 | | TFZ TAX2 AAD2 | ; | | |
| 4312000 | | | | | |
| 4313000 | $ | GTO ($SEEK-ERR) | ; | 38F | F5A4 |
| 4314000 | | | | | |
| 4315000 | $ | \ADDRESS LSB OF CYLINDER | \ | 3C0 | 8C41 |
| 4316000 | | SSPAI LOC (CNF2) | ; | | |
| 4317000 | | | | | |
| 4318000 | $ | \SKIP IF 100 TPI DEVICE | \ | 3C1 | 045C |
| 4319000 | | TFZ TAX6 AAD1 | ; | | |
| 4320000 | | | | | |
| 4321000 | $ | GTO ($SEEK-2TPI) | ; | 3C2 | F3CF |
| 4322000 | | | | | |
| 4323000 | $ | \LSB OF MAX CYLINDER TO ACU | \ | 3C3 | 8328 |
| 4324000 | | LCN CNST (CC#) | ; | | |
| 4325000 | | | | | |
| 4326000 | $ | \CURRENT CYLINDER MINUS MAX CYLINDER | \ | 3C4 | 6418 |
| 4327000 | | SUB ASPM BACU | ; | | |
| 4328000 | | | | | |
| 4329000 | $ | \SKIP IF NOT AN ILLEGAL CYLINDER | \ | 3C5 | C04A |
| 4330000 | | TFZ TCOT | ; | | |
| 4331000 | | | | | |
| 4332000 | $ | GTO ($SEEK-ILL) | ; | 3C6 | F5AB |
| 4333000 | | | | | |
| 4334000 | $ | \ADDRESS MSB OF CYLINDER | \ | 3C7 | 8C40 |
| 4335000 | | SSPAI LOC (CNF1) | ; | | |
| 4336000 | | | | | |
| 4337000 | $ | \SKIP IF NOT AN ILLEGAL CYLINDER | \ | 3C8 | C45E |
| 4338000 | | TFZ ASPM TAX7 | ; | | |
| 4339000 | | | | | |
| 4340000 | $ | GTO ($SEEK-ILL) | ; | 3C9 | F5AB |
| 4341000 | | | | | |
| 4342000 | $ | \ SAVE VOLUME BIT | \ | 3CA | 8424 |
| 4343000 | | ACN ASPM CNST (08#) | ; | | |
| 4344000 | | | | | |
| 4345000 | $ | \ ADDRESS CONF A LOWER | \ | 3CB | 8C41 |
| 4346000 | | SSPAI LOC(CNF2) | ; | | |
| 4347000 | | | | | |
| 4348000 | $ | \ SKIP IF MSB CYL BIT = 0 | \ | 3CC | C450 |
| 4349000 | | TFZ ASPM TAX0 | ; | | |
| 4350000 | | | | | |
| 4351000 | $ | \ SET MSB OF CYLINDER | \ | 3CD | 8050 |
| 4352000 | | OCN CNST (10#) | ; | | |
| 4353000 | | | | | |
| 4354000 | $ | GTO ($SEEK150) | ; | 3CE | F3DD |
| 4355000 | | | | | |
| 4356000 | SKIP HOF | | ; | | |

| LINE # | | SEQUENCE: $SUPCS | | ADDRESS (HEX) | IMAGE (HEX) |
|---|---|---|---|---|---|
| 4357000 | $SEEK-2TPI | \LSB OF MAX CYLINDER TO ACU | \ | 3CF | 8260 |
| 4358000 | | LCN CNST (98#) | ; | | |
| 4359000 | | | | | |
| 4360000 | $ | \CURRENT CYLINDER MINUS MAX CYLINDER | \ | 3D0 | 6418 |
| 4361000 | | SUB ASPM BACU | ; | | |
| 4362000 | | | | | |
| 4363000 | $ | \ADDRESS MSB OF CYLINDER | \ | 3D1 | 8C40 |
| 4364000 | | SSPAI LOC (CNF1) | ; | | |
| 4365000 | | | | | |
| 4366000 | $ | \SAVE ONLY CYCLINDER BIT | \ | 3D2 | 8405 |
| 4367000 | | ACN ASPM CNST (01#) | ; | | |
| 4368000 | | | | | |
| 4369000 | $ | \ADDRESS WORK LOCATION OF SPM | \ | 3D3 | 8CAA |
| 4370000 | | SSPAI LOC (WL01) | ; | | |
| 4371000 | | | | | |
| 4372000 | $ | \STORE CYCLINDER BIT | \ | 3D4 | A200 |
| 4373000 | | MWT | ; | | |
| 4374000 | | | | | |
| 4375000 | $ | \MSB OF MAX CYLINDER TO ACU | \ | 3D5 | 8001 |
| 4376000 | | LCN CNST (01#) | ; | | |
| 4377000 | | | | | |
| 4378000 | $ | \CURRENT CYLINDER MINUS MAX CYLINDER MSB | \ | 3D6 | 6498 |
| 4379000 | | SUB ASPM BACU COTI | ; | | |
| 4380000 | | | | | |
| 4381000 | $ | \SKIP IF VALID CYCLINDER | \ | 3D7 | C04A |
| 4382000 | | TFZ TCOT | ; | | |
| 4383000 | | | | | |
| 4384000 | $ | GTO ($SEEK-ILL) | ; | 3D8 | F5AB |
| 4385000 | | | | | |
| 4386000 | $ | \ADDRESS CONF A UPPER | \ | 3D9 | 8C40 |
| 4387000 | | SSPAI LOC (CNF1) | ; | | |
| 4388000 | | | | | |
| 4389000 | $ | \SAVE VOLUME AND CYLINDER BITS | \ | 3DA | 8424 |
| 4390000 | | ACN ASPM CNST (08#) | ; | | |
| 4391000 | | | | | |
| 4392000 | $ | \SKIP IF MSB OF CYCLINDER IS ZERO | \ | 3DB | C45E |
| 4393000 | | TFZ TAX7 ASPM | ; | | |
| 4394000 | | | | | |
| 4395000 | $ | \SET MSB OF CYLINDER | \ | 3DC | 8050 |
| 4396000 | | OCN CNST (10#) | ; | | |
| 4397000 | | | | | |
| 4398000 | SKIP HOF | | ; | | |

```
MODEL: MPDC-REV3D                           RTL/6000 FILE EDIT                      08/01/77    12.605  PAGE: 114
REVISION: 000.00                            MICROPROGRAM SECTION                      DOC.#:
                                                                              ADDRESS  IMAGE
LINE #                                      SEQUENCE: $$UPCS                   (HEX)   (HEX)
4399000  $SEEK150      \ ADDRESS UNIT SELECT                        \            3DD    8CEB
4400000               SSPAI LOC(UNSEL)                              !
4401000
4402000   $            \ SUPERIMPOSE SELECTION BITS                 \            3DE    643A
4403000               ORR ASPM                                      !
4404000
4405000   $            \RESTORE                                     \            3DF    A200
4406000               MWT                                           !
4407000
4408000   $            \ SEND TO ADAPTER                            \            3E0    7C6A
4409000               XFB AAD3 SRIA                                 !
4410000
4411000   $            \ ADDRESS CONF A LOWER                       \            3E1    8C41
4412000               SSPAI LOC(CNF2)                               !
4413000
4414000   $            \ STORE CYL IN ACU                           \            3E2    643E
4415000               XFA ASPM                                      !
4416000
4417000   $            \ SKIP IF 200 TPI                            \            3E3    D49C
4418000               TFO AAD1 TAX6                                 !
4419000
4420000   $            \ SHIFT CYL # LEFT FOR 100 TPI               \            3E4    6030
4421000               LSH                                           !
4422000
4423000   $            \ SEND TO ADAPTER                            \            3E5    746A
4424000               XFB AAD1 SRIA                                 !
4425000
4426000   $            GTO ($STROBE)                                !            3E6    F3F5
4427000
4428000  SKIP HOF                                                   !

MODEL: MPDC-REV3D                           RTL/6000 FILE EDIT                      08/01/77    12.605  PAGE: 115
REVISION: 000.00                            MICROPROGRAM SECTION                      DOC.#:
                                                                              ADDRESS  IMAGE
LINE #                                      SEQUENCE: $$UPCS                   (HEX)   (HEX)
4429000       \ THIS PORTION OF THE RECALIBRATE ROUTINE IS USED FOR
4430000         ZEROING THE CONFIGURATION WORDS IN ORDER TO SELECT
4431000         PLATTER ZERO, TRACK ZERO AFTER THE RECALIBRATE.     \
4432000
4433000  $RECALPLSEL   \RESET RECALIBRATE BIT                       \            3E7    87E7
4434000               ACN ASPM CNST (FB#)                           !
4435000
4436000   $            \RESTORE MONITOR                             \            3E8    A200
4437000               MWT                                           !
4438000
4439000   $            \CLEAR ACU                                   \            3E9    600E
4440000               ZER                                           !
4441000
4442000   $            \SET SPA FOR MSB OF CONFIGURATION WORDS      \            3EA    8C40
4443000               SSPAI LOC (CNF1)                              !
4444000
4445000   $            \CLEAR FOUR BYTES OF CONFIGURATION           \            3EB    A300
4446000               WIA                                           !
4447000
4448000   $            WIA                                          !            3EC    A300
4449000
4450000   $            WIA                                          !            3ED    A300
4451000
4452000   $            MWT                                          !            3EE    A200
4453000
4454000   $            \SET RETURN FOR WAIT LOOP                    \            3EF    E21D
4455000               LRA ($START-WAIT)                             !
4456000
4457000   $            GTO ($SEEK)                                  !            3F0    F3BE
4458000
4459000  SKIP HOF                                                   !

MODEL: MPDC-REV3D                           RTL/6000 FILE EDIT                      08/01/77    12.605  PAGE: 116
REVISION: 000.00                            MICROPROGRAM SECTION                      DOC.#:
                                                                              ADDRESS  IMAGE
LINE #                                      SEQUENCE: $$UPCS                   (HEX)   (HEX)
4460000  $RECAL        \ SET RECALIBRATE IN ADAPTER                 \            3F1    9880
4461000               LCN AAD2 CNST (20#)                           !
4462000
4463000   $            \SET SPA FOR CHANNEL MONITOR                 \            3F2    8CBB
4464000               SSPAI LOC (MONI)                              !
4465000
4466000   $            \SET RECALIBRATE BIT                         \            3F3    8418
4467000               OCN ASPM CNST (04#)                           !
4468000
4469000   $            \RESTORE MONITOR                             \            3F4    A200
4470000               MWT                                           !
4471000
4472000  $STROBE       \ SET SEEK STROBE                            \            3F5    786B
4473000               XFB AAD6 SRIA                                 !
4474000
4475000   $            \ ADDRESS DEVICE STATUS                      \            3F6    8CEA
4476000               SSPAI LOC(DEVST)                              !
4477000
4478000   $            \ RESET SEEK COMPLETE BIT                    \            3F7    86EF
4479000               ACN ASPM CNST (BF#)                           !
4480000
4481000   $            \ RESTORE                                    \            3F8    A200
4482000               MWT                                           !
4483000
4484000   $            \ RESET SEEK STROBE                          \            3F9    786B
4485000               XFB AAD6 SRIA                                 !
4486000
4487000   $            \ RESET ADAPTER COMMAND                      \            3FA    9800
4488000               LCN AAD2                                      !
4489000
4490000   $            RTN                                          !            3FB    C200
4491000
4492000  SKIP HOF                                                   !
```

```
MODEL: MPDC-REV3D                                    RTL/6000 FILE EDIT                          08/01/77    12.605  PAGE: 117
REVISION: 000.00                                     MICROPROGRAM SECTION                        DOC.#:
                                                                                         ADDRESS  IMAGE
LINE #                                               SEQUENCE: SSUPCS                    (HEX)   (HEX)
4493000
4494000  SFORMAT     \ ADDRESS DMA BYTE                              \                    3FC    BC89
4495000              SSPAI LOC(DMA1)                                 !
4496000
4497000     s        \ SKIP IF FORMAT WRITE                          \                    3FD    C490
4498000              TFO ASPM TAX0                                   !
4499000
4500000     s        GTO ($FMT-READ)                                 !                    3FE    F4E7
4501000
4502000  SFWT-IDT    \ SET FORMAT WRITE WITH DATA TRANSFER           \                    3FF    8309
4503000              LCN CNST (C5#)                                  !
4504000
4505000     s        \ ADDRESS TASK                                  \                    400    BC0A
4506000              SSPAI LOC(TSK1)                                 !
4507000
4508000     s        \ SKIP IF NOT DIAGNOSTIC MODE                   \                    401    C45C
4509000              TFZ ASPM TAX6                                   !
4510000
4511000     s        \ SET DIAGNOSTIC MODE                           \                    402    8050
4512000              OCN CNST(10#)                                   !
4513000
4514000     s        \ SEND COMMAND TO ADAPTER                       \                    403    786A
4515000              XFB AAD2 SRIA                                   !
4516000
4517000     s        \ CLEAR STATUS AND FIFO IN ADP                  \                    404    746B
4518000              XFB AAD5 SRIA                                   !
4519000
4520000     s        \ LOAD AMK UPPER                                \                    405    93L2
4521000              LCN AAD0 CNST (FA#)                             !
4522000
4523000     s        \ LOAD AMK LOWER                                \                    406    92A2
4524000              LCN AAD0 CNST (AA#)                             !
4525000
4526000     s        \ LOAD DATA COUNT                               \                    407    9401
4527000              LCN AAD1 CNST (01#)                             !
4528000
4529000     s        \ LOAD RETURN                                   \                    408    E411
4530000              LRA ($FWT-DAT)                                  !
4531000
4532000 SKIP HOF                                                     !

MODEL: MPDC-REV3D                                    RTL/6000 FILE EDIT                          08/01/77    12.605  PAGE: 118
REVISION: 000.00                                     MICROPROGRAM SECTION                        DOC.#:
                                                                                         ADDRESS  IMAGE
LINE #                                               SEQUENCE: SSUPCS                    (HEX)   (HEX)
4533000
4534000  SWRT-MODE   \SET RETURN FROM DATA LOOP                      \                    409    E525
4535000              LRA ($WRT-EOF)                                  !
4536000
4537000     s        \SET BYTE WRITE MODE                            \                    40A    81A2
4538000              LCN CNST (6A#)                                  !
4539000
4540000     s        \SKIP IF BYTE MODE                              \                    40B    C0BB
4541000              TFO TBYT                                        !
4542000
4543000  SWRT-RET    \SET WRITE MODE ONLY                            \                    40C    8182
4544000              LCN CNST (62#)                                  !
4545000
4546000     s        \SKIP IF ADAPTER HARDWARE REQUEST               \                    40D    C0B0
4547000              TFO TAHR                                        !
4548000
4549000     s        \ERROR OR END OF FIELD                          \                    40E    C200
4550000              RTN                                             !
4551000
4552000     s        \ENABLE WRITE HARDWARE PATH                     \                    40F    0601
4553000              EWP                                             !
4554000
4555000     s        GTO ($DATA-LOOP)                                !                    410    F504
4556000
4557000 SKIP HOF

MODEL: MPDC-REV3D                                    RTL/6000 FILE EDIT                          08/01/77    12.605  PAGE: 119
REVISION: 000.00                                     MICROPROGRAM SECTION                        DOC.#:
                                                                                         ADDRESS  IMAGE
LINE #                                               SEQUENCE: SSUPCS                    (HEX)   (HEX)
4558000
4559000  SFWT-DAT    \ DMK UPPER TO ADP                              \                    411    93E9
4560000              LCN AAD0 CNST (FD#)                             !
4561000
4562000     s        \ DMK LOWER TO ADP                              \                    412    9369
4563000              LCN AAD0 CNST (DD#)                             !
4564000
4565000     s        \ ADDRESS DATA LENGTH                           \                    413    BC09
4566000              SSPAI LOC(DATL)                                 !
4567000
4568000     s        \ DATA COUNT TO ADAPTER                         \                    414    756A
4569000              XFB AAD1 BSPM SRIA                              !
4570000
4571000     s        \ SET FORMAT WRITE WITH NO DATA XFER            \                    415    9A09
4572000              LCN AAD2 CNST (85#)                             !
4573000
4574000     s        \ LOAD RETURN FROM WAIT-LOOP                    \                    416    E418
4575000              LRA ($FWT-RET)                                  !
4576000
4577000     s        GTO ($START-WAIT)                               !                    417    F210
4578000
4579000  SFWT-RET    \ SKIP IF NOT EOR                               \                    418    C062
4580000              TFZ TRGZ                                        !
4581000
4582000     s        GTO ($END-GAP)                                  !                    419    F41D
4583000
4584000     s        \ SKIP IF END OF FIELD                          \                    41A    C06A
4585000              TFZ TNDR                                        !
4586000
4587000     s        GTO ($TERM-STS)                                 !                    41B    F57D
4588000
4589000     s        GTO ($FWT-IDT)                                  !                    41C    F3FF
4590000
4591000  SEND-GAP    \ SKIP IF NDTSRQ                                \                    41D    C0AA
4592000              TFO TNDR                                        !
4593000
4594000     s        GTO ($END-GAP)                                  !                    41E    F41D
4595000
4596000     s        GTO ($TERM-NOR)                                 !                    41F    F59C
4597000
4598000 SKIP HOF                                                     !
```

```
MODEL: MPDC-REV3D                          RTL/6000 FILE EDIT                 08/01/77   12.605  PAGE: 120
REVISION: 000.00                          MICROPROGRAM SECTION                DOC.#:
                                                                    ADDRESS   IMAGE
  LINE #                   SEQUENCE: $$UPCS                          (HEX)    (HEX)
 4599000
 4600000       \ THIS IS THE ENTRY POINT FOR LOADING THE ADDRESS MARK
 4601000         AND SEARCH ARGUMENT DURING A SEARCH AND READ OR A
 4602000         SEARCH AND WRITE OPERATION.                       \
 4603000
 4604000 $SCH-SET     \ CLEAR STATUS + FIFO IN ADP                  \   420    746B
 4605000             XFB AAD5 SRIA                                  ;
 4606000
 4607000 $           \ LOAD AMK UPPER                               \   421    93E2
 4608000             LCN AAD0 CNST(FA#)                             ;
 4609000
 4610000 $           \ LOAD AMK LOWER                               \   422    92A2
 4611000             LCN AAD0 CNST(AA#)                             ;
 4612000
 4613000 $           \ ADDRESS CONF A UPPER                         \   423    8C40
 4614000             SSPAI LOC(CNF1)                                ;
 4615000
 4616000 $SCH-ARG    \SEND FIRST BYTE OF SEARCH ARG                 \   424    716A
 4617000             XFB AAD0 BSPM SRIA                             ;
 4618000
 4619000 $           \ INCREMENT SPA                                \   425    A100
 4620000             IMA                                            ;
 4621000
 4622000 $           \SEND SECOND BYTE OF SEARCH ARG                \   426    716A
 4623000             XFB AAD0 BSPM SRIA                             ;
 4624000
 4625000 $           \INCREMENT SPA                                 \   427    A100
 4626000             IMA                                            ;
 4627000
 4628000 $           \SEND THIRD BYTE OF SEARCH ARG                 \   428    716A
 4629000             XFB AAD0 BSPM SRIA                             ;
 4630000
 4631000 $           \INCREMENT SPA                                 \   429    A100
 4632000             IMA                                            ;
 4633000
 4634000 $           \SEND FOURTH BYTE OF SEARCH ARG                \   42A    716A
 4635000             XFB AAD0 BSPM SRIA                             ;
 4636000
 4637000 $           \ LOAD DATA COUNTER                            \   42B    9401
 4638000             LCN AAD1 CNST(01#)                             ;
 4639000
 4640000 $           \ STORE SEARCH + WRITE CONSTANT                \   42C    822B
 4641000             LCN CNST(8C#)                                  ;
 4642000
 4643000 SKIP HOF                                                   ;

MODEL: MPDC-REV3D                          RTL/6000 FILE EDIT                 08/01/77   12.605  PAGE: 121
REVISION: 000.00                          MICROPROGRAM SECTION                DOC.#:
                                                                    ADDRESS   IMAGE
  LINE #                   SEQUENCE: $$UPCS                          (HEX)    (HEX)
 4644000 $           \ ADDRESS DMA CONTROL                          \   42D    8C89
 4645000             SSPAI LOC(DMA1)                                ;
 4646000
 4647000 $           \ SKIP IF WRITE                                \   42E    C490
 4648000             TFO ASPM TAX0                                  ;
 4649000
 4650000 $           \ STORE SEARCH + READ COMMAND                  \   42F    8222
 4651000             LCN CNST(BA#)                                  ;
 4652000
 4653000 $           \ SEND COMMAND TO ADAPTER                      \   430    7B6A
 4654000             XFB AAD2 SRIA                                  ;
 4655000
 4656000 $           \ LOAD RETURN                                  \   431    E433
 4657000             LRA ($SCH-RET)                                 ;
 4658000
 4659000 $           GTO ($START-WAIT)                              ;   432    F21D
 4660000
 4661000 SKIP HOF                                                   ;

MODEL: MPDC-REV3D                          RTL/6000 FILE EDIT                 08/01/77   12.605  PAGE: 122
REVISION: 000.00                          MICROPROGRAM SECTION                DOC.#:
                                                                    ADDRESS   IMAGE
  LINE #                   SEQUENCE: $$UPCS                          (HEX)    (HEX)
 4662000      \ THIS IS THE RETURN POINT FROM THE WAIT-LOOP AFTER THE
 4663000        ADAPTER HAS SIGNALED FIRMWARE THAT A SEARCH OF AN ID
 4664000        FIELD HAS BEEN COMPLETED.                           \
 4665000
 4666000 $SCH-RET    \SKIP IF ADDRESS MARK ERROR                    \   433    DC9C
 4667000             TFO TAX6 AAD3                                  ;
 4668000
 4669000 $           GTO ($SCH-RET1)                                ;   434    F43A
 4670000
 4671000 $           \SKIP IF SECOND INDEX DETECTED                 \   435    DC9E
 4672000             TFO TAX7 AAD3                                  ;
 4673000
 4674000 $           GTO ($SCH-SET)                                 ;   436    F420
 4675000
 4676000 $           \ADDRESS STS1                                  \   437    8C60
 4677000             SSPAI LOC (STS1)                               ;
 4678000
 4679000 $           \SET UNSUCESSFUL SEARCH                        \   438    8611
 4680000             OCN ASPM CNST (81#)                            ;
 4681000
 4682000 $           GTO ($TERM-CL)                                 ;   439    F58E
 4683000
 4684000 $SCH-RET1   \ SKIP IF EOF+ID                               \   43A    C06A
 4685000             TFZ INDR                                       ;
 4686000
 4687000 $           GTO ($TERM-STS)                                ;   43B    F57D
 4688000
 4689000 $           \GET STATUS (SEARCH COMPARISON RESULT)         \   43C    7C3E
 4690000             XFA AAD3                                       ;
 4691000
 4692000 $           \Skip IF NO ERROR (HIT ON SEARCH)              \   43D    C086
 4693000             TFO TFQZ                                       ;
 4694000
 4695000 $           GTO ($SCH-ERR)                                 ;   43E    F44E
 4696000
 4697000 $           \RESET INDEX MARK COUNTER                      \   43F    704F
 4698000             ZER AAD4 SRIA                                  ;
 4699000
```

MODEL: MPDC-REV3.0  
REVISION: 000.00

RTL/6000 FILE EDIT  
MICROPROGRAM SECTION

08/01/77   12.605 PAGE: 122  
DOC.#:

| LINE # | | SEQUENCE: SSUPCS -continued | ADDRESS (HEX) | IMAGE (HEX) |
|---|---|---|---|---|
| 4700000 | S | \ ADDRESS DMA CONTROL \ | 440 | 8C89 |
| 4701000 | | SSPAI LOC(DMA1) ; | | |
| 4702000 | | | | |
| 4703000 | S | \ SKIP IF WRITE \ | 441 | C490 |
| 4704000 | | TFO ASPM TAX0 ; | | |
| 4705000 | | | | |
| 4706000 | S | GTO ($READ-DATA) ; | 442 | F543 |
| 4707000 | | | | |
| 4708000 | SKIP HOF | ; | | |

MODEL: MPDC-REV3D  
REVISION: 000.00

RTL/6000 FILE EDIT  
MICROPROGRAM SECTION

08/01/77   12.605 PAGE: 123  
DOC.#:

| LINE # | | SEQUENCE: SSUPCS | ADDRESS (HEX) | IMAGE (HEX) |
|---|---|---|---|---|
| 4709000 | S | \ LOAD DMK UPPER \ | 443 | 93E9 |
| 4710000 | | LCN AAD0 CNST(FD#) ; | | |
| 4711000 | | | | |
| 4712000 | S | \ LOAD DMK LOWER \ | 444 | 9369 |
| 4713000 | | LCN AAD0 CNST(DD#) ; | | |
| 4714000 | | | | |
| 4715000 | S | \ ADDRESS DATA LENGTH \ | 445 | 8C09 |
| 4716000 | | SSPAI LOC(DATL) ; | | |
| 4717000 | | | | |
| 4718000 | S | \ SEND DATA LENGTH TO ADAPTER \ | 446 | 756A |
| 4719000 | | XFB AAD1 BSPM SRIA ; | | |
| 4720000 | | | | |
| 4721000 | S | \ ADDRESS TASK \ | 447 | 8C0A |
| 4722000 | | SSPAI LOC(TSK1) ; | | |
| 4723000 | | | | |
| 4724000 | S | \ SET WRITE \ | 448 | 8308 |
| 4725000 | | LCN CNST(C4#) ; | | |
| 4726000 | | | | |
| 4727000 | S | \ SKIP IF NOT DIAGNOSTIC \ | 449 | C45C |
| 4728000 | | TFZ ASPM TAX6 ; | | |
| 4729000 | | | | |
| 4730000 | S | \ SET DIAGNOSTIC \ | 44A | 835B |
| 4731000 | | OCN CNST(D4#) ; | | |
| 4732000 | | | | |
| 4733000 | S | \ SEND WRITE CMD TO ADP \ | 44B | 786A |
| 4734000 | | XFB AAD2 SRIA ; | | |
| 4735000 | | | | |
| 4736000 | S | \ LOAD RETURN FROM DMA-CHK \ | 44C | E453 |
| 4737000 | | LRA ($SCH-UPD) ; | | |
| 4738000 | | | | |
| 4739000 | S | GTO ($WRT-MODE) ; | 44D | F409 |
| 4740000 | | | | |
| 4741000 | SSCH-ERR | \ SAVE READ ERROR \ | 44E | 8024 |
| 4742000 | | ACN CNST(08#) ; | | |
| 4743000 | | | | |
| 4744000 | S | \ ADDRESS STATUS UPPER \ | 44F | 8C60 |
| 4745000 | | SSPAI LOC(STS1) ; | | |
| 4746000 | | | | |
| 4747000 | S | \ SAVE PREVIOUSLY READ ERROR BIT \ | 450 | 643A |
| 4748000 | | ORR ASPM ; | | |
| 4749000 | | | | |
| 4750000 | S | \ RESTORE STS1 \ | 451 | A200 |
| 4751000 | | MWT ; | | |
| 4752000 | | | | |
| 4753000 | S | GTO ($SCH-SET) ; | 452 | F420 |
| 4754000 | | | | |
| 4755000 | SKIP HOF | ; | | |

MODEL: MPDC-REV3D  
REVISION: 000.00

RTL/6000 FILE EDIT  
MICROPROGRAM SECTION

08/01/77   12.605 PAGE: 124  
DOC.#:

| LINE # | | SEQUENCE: SSUPCS | ADDRESS (HEX) | IMAGE (HEX) |
|---|---|---|---|---|
| 4756000 | | | | |
| 4757000 | | \ THIS PORTION OF FIRMWARE IS USED FOR THE FOLLOWING- | | |
| 4758000 | | 1. INCREMENTING THE SECTOR NUMBER. | | |
| 4759000 | | 2. CHECKING IF AUTOMATIC TRACK OR CYLINDER | | |
| 4760000 | | LINKING IS REQUIRED. \ | | |
| 4761000 | | | | |
| 4762000 | SSCH-UPD | \ ADDRESS SECTOR NUMBER \ | 453 | 8C43 |
| 4763000 | | SSPAI LOC(CNF4) ; | | |
| 4764000 | | | | |
| 4765000 | S | \ INCREMENT SECTOR \ | 454 | 6400 |
| 4766000 | | INC ASPM ; | | |
| 4767000 | | | | |
| 4768000 | S | \ RESTORE NEW SECTOR \ | 455 | A200 |
| 4769000 | | MWT ; | | |
| 4770000 | | | | |
| 4771000 | S | \SET SPA FOR DATA LENGTH \ | 456 | 8C09 |
| 4772000 | | SSPAI LOC (DATL) ; | | |
| 4773000 | | | | |
| 4774000 | S | \SET CONSTANT FOR 24 SECTORS \ | 457 | 8060 |
| 4775000 | | LCN CNST (18#) ; | | |
| 4776000 | | | | |
| 4777000 | S | \SKIP IF DATA LENGTH = 256 \ | 458 | C456 |
| 4778000 | | TFZ TAX3 ASPM ; | | |
| 4779000 | | | | |
| 4780000 | S | \SET CONSTANT FOR 12 SECTORS \ | 459 | 802B |
| 4781000 | | LCN CNST (0C#) ; | | |
| 4782000 | | | | |
| 4783000 | S | \SET SPA FOR SECTOR NUMBER \ | 45A | 8C43 |
| 4784000 | | SSPAI LOC (CNF4) ; | | |
| 4785000 | | | | |
| 4786000 | S | \CHECK IF LINKING REQUIRED \ | 45B | 641A |
| 4787000 | | XOR ASPM BACU ; | | |
| 4788000 | | | | |
| 4789000 | S | \SKIP IF NO LINKING REQUIRED \ | 45C | C046 |
| 4790000 | | TFZ TEQZ ; | | |
| 4791000 | | | | |
| 4792000 | S | GTO ($MAX-SECTOR) ; | 45D | F482 |
| 4793000 | | | | |
| 4794000 | SSCH-LRA | \SET RETURN FOR LOADING SEARCH ARGUMENT \ | 45E | E420 |
| 4795000 | | LRA ($SCH-SET) ; | | |
| 4796000 | | | | |
| 4797000 | SSCH-TRGZ | \ SKIP IF RANGE NOT ZERO \ | 45F | C062 |
| 4798000 | | TFZ TRGZ ; | | |
| 4799000 | | | | |
| 4800000 | S | GTO ($TERM-NOR) ; | 460 | F59C |
| 4801000 | | | | |
| 4802000 | SKIP HOF | ; | | |

```
MODEL: MPDC-REV3D                           RTL/6000 FILE EDIT                    08/01/77  12.605  PAGE: 125
REVISION: 000.00                           MICROPROGRAM SECTION                   DOC.#:
                                                                           ADDRESS  IMAGE
  LINE #                              SEQUENCE: SSUPCS                      (HEX)   (HEX)
  4803000       \ THIS PART OF FIRMWARE IS USED FOR UPDATING SCRATCH PAD
  4804000         AFTER THE SUCESSFULL READING OR WRITTING OF A DATA FIELD.
  4805000         DURING WRITE OPERATIONS A FIRMWARE UPDATE TAKES PLACE
  4806000         SINCE THE HARDWARE WILL BE 16 WORDS INTO THE NEXT FIELD
  4807000         (EXTENDED OPERATION).
  4808000         DURING A READ OPERATION, THE BUS INTERFACE COUNTERS ARE
  4809000         STORED SINCE THEY ARE EXACT.                       \
  4810000
  4811000  $DEC-RNG       \SET SPA FOR DMA BYTE                              461   8C89
  4812000                 SSPAI LOC (DMA1)                    ;
  4813000
  4814000   $             \SKIP IF WRITE OPERATION            \             462    C490
  4815000                 TFO TAX0 ASPM                       ;
  4816000
  4817000   $             \GO TO STORE BUS INTERFACE COUNTERS \             463    F538
  4818000                 GTO ($STORE-CTRS)                   ;
  4819000
  4820000   $             \ ADDRESS DATA LENGTH               \             464    8C09
  4821000                 SSPAI LOC(DATL)                     ;
  4822000
  4823000   $             \ SKIP IF DATA LENGTH = 256          \            465    C450
  4824000                 TFZ ASPM TAX0                       ;
  4825000
  4826000   $             GTO ($DATL-576)                     ;             466    F473
  4827000
  4828000   $             \ LOAD CONSTANT FOR 256              \            467    8001
  4829000                 LCN CNST(01#)                       ;
  4830000
  4831000   $             \ ADDRESS RANGE UPPER                \            468    8C2B
  4832000                 SSPAI LOC(RNG1)                     ;
  4833000
  4834000   $             \ SUBTRACT 256 BYTES FROM COUNT      \            469    6418
  4835000                 SUB ASPM                            ;
  4836000
  4837000   $             \ RESTORE RANGE UPPER                \            46A    A200
  4838000                 MWT                                 ;
  4839000
  4840000   $             \ LOAD CONSTANT FOR 256              \            46B    8001
  4841000                 LCN CNST(01#)                       ;
  4842000
  4843000   $             \ ADDRESS MEMORY ADDRESS MIDDLE      \            46C    8C20
  4844000                 SSPAI LOC(ADR1)                     ;
  4845000
  4846000   $             \ ADD 256 TO MEMORY ADDRESS          \            46D    6424
  4847000                 ADD ASPM                            ;
  4848000
  4849000   $             \ RESTORE ADR1                       \            46E    A200
  4850000                 MWT                                 ;
  4851000
  4852000  SKIP HOF                                           ;

MODEL: MPDC-REV3D                           RTL/6000 FILE EDIT                    08/01/77  12.605  PAGE: 126
REVISION: 000.00                           MICROPROGRAM SECTION                   DOC.#:
                                                                           ADDRESS  IMAGE
  LINE #                              SEQUENCE: SSUPCS                      (HEX)   (HEX)
  4853000  $INC-MOD       \ ADDRESS MODULE                     \            46F    8C23
  4854000                 SSPAI LOC(MOD1)                     ;
  4855000
  4856000   $             \ UPDATE MODULE                      \            470    6480
  4857000                 INC ASPM COTI                       ;
  4858000
  4859000   $             \ RESTORE MOD1                       \            471    A200
  4860000                 MWT                                 ;
  4861000
  4862000   $             RTN                                 ;             472    C200
  4863000
  4864000  $DATL-576      \ LOAD CONSTANT FOR 64               \            473    8100
  4865000                 LCN CNST(40#)                       ;
  4866000
  4867000   $             \ ADDRESS RANGE LOWER                \            474    8C29
  4868000                 SSPAI LOC(RNG2)                     ;
  4869000
  4870000   $             \ SUBTRACT 64 FROM RANGE             \            475    6418
  4871000                 SUB ASPM                            ;
  4872000
  4873000   $             \ RESTORE RNG2 AND ADDRESS RANGE UPPER \          476    A208
  4874000                 WDA                                 ;
  4875000
  4876000   $             \ LOAD CONSTANT FOR 512              \            477    8002
  4877000                 LCN CNST(02#)                       ;
  4878000
  4879000   $             \ SUBTRACT 512 FROM RNG USING PREVIOUS CARRY \    478    6498
  4880000                 SUB ASPM COTI                       ;
  4881000
  4882000   $             \ RESTORE RNG1                       \            479    A200
  4883000                 MWT                                 ;
  4884000
  4885000   $             \ LOAD CONSTANT FOR 64               \            47A    8100
  4886000                 LCN CNST(40#)                       ;
  4887000
  4888000  SKIP HOF                                           ;

MODEL: MPDC-REV3D                           RTL/6000 FILE EDIT                    08/01/77  12.605  PAGE: 127
REVISION: 000.00                           MICROPROGRAM SECTION                   DOC.#:
                                                                           ADDRESS  IMAGE
  LINE #                              SEQUENCE: SSUPCS                      (HEX)   (HEX)
  4889000   $             \ ADDRESS MEMORY ADDRESS LOWER       \            47B    8C21
  4890000                 SSPAI LOC(ADR2)                     ;
  4891000
  4892000   $             \ ADD 64 TO ADDRESS                  \            47C    6424
  4893000                 ADD ASPM                            ;
  4894000
  4895000   $             \ RESTORE ADR2 AND ADDRESS ADR1      \            47D    A208
  4896000                 WDA                                 ;
  4897000
  4898000   $             \ LOAD CONSTANT FOR 512              \            47E    8002
  4899000                 LCN CNST(02#)                       ;
  4900000
  4901000   $             \ ADD 512 TO ADDRESS USING PREVIOUS CARRY \       47F    64A4
  4902000                 ADD ASPM COTI                       ;
  4903000
  4904000   $             \ RESTORE ADR1                       \            480    A200
  4905000                 MWT                                 ;
  4906000
  4907000   $             GTO ($INC-MOD)                      ;             481    F46F
  4908000
  4909000  SKIP HOF                                           ;
```

MODEL: MPDC-REV3D
REVISION: 000.00

RTL/6000 FILE EDIT
MICROPROGRAM SECTION

08/01/77  12.605  PAGE: 128
DOC.#:

| LINE # | | | SEQUENCE: SSUPCS | | ADDRESS (HEX) | IMAGE (HEX) |
|---|---|---|---|---|---|---|
| 4910000 | | | | | | |
| 4911000 | | \ THE MAX-SECTOR ROUTINE IS USED TO DETERMINE IF A HEAD | | | | |
| 4912000 | | OR CYLINDER SWITCH IS NECESSARY AFTER DETECTING SECTOR | | | | |
| 4913000 | | 12 OR 24. WHEN SWITCHING IS REQUIRED, THIS ROUTINE | | | | |
| 4914000 | | WILL UPDATE THE CONFIGURATION WORDS IN SCRATCH PAD | | | | |
| 4915000 | | TO THE NEW TRACK AND CYLINDER. | \ | | |
| 4916000 | | | | | | |
| 4917000 | $MAX-SECTOR | \SKIP IF NOT END OF RANGE | \ | 482 | C062 |
| 4918000 | | TFZ TRGZ | ; | | |
| 4919000 | | | | | | |
| 4920000 | $ | GTO ($TERM-NOR) | ; | 483 | F59C |
| 4921000 | | | | | | |
| 4922000 | $ | \ ZERO SECTOR NUMBER | \ | 484 | 600E |
| 4923000 | | ZER | ; | | |
| 4924000 | | | | | | |
| 4925000 | $ | \ RESTORE SECTOR AND ADDRESS TRACK (CNF3) | \ | 485 | A208 |
| 4926000 | | WDA | ; | | |
| 4927000 | | | | | | |
| 4928000 | $ | \ LOAD CONSTANT TO UPDATE TRACK | \ | 486 | 8001 |
| 4929000 | | LCN CNST(01#) | ; | | |
| 4930000 | | | | | | |
| 4931000 | $ | \ TOGGLE TRACK BIT | \ | 487 | 641A |
| 4932000 | | XOR ASPM | ; | | |
| 4933000 | | | | | | |
| 4934000 | $ | \ RESTORE TRACK AND ADDRESS CYLINDER (CNF2) | \ | 488 | A208 |
| 4935000 | | WDA | ; | | |
| 4936000 | | | | | | |
| 4937000 | $ | \ SKIP IF TRACK = 0 | \ | 489 | C05E |
| 4938000 | | TFZ AACU TAX7 | ; | | |
| 4939000 | | | | | | |
| 4940000 | $ | GTO ($UPD-UNSEL) | ; | 48A | F49A |
| 4941000 | | | | | | |
| 4942000 | $ | \ INCREMENT CYLINDER | \ | 48B | 6400 |
| 4943000 | | INC ASPM | ; | | |
| 4944000 | | | | | | |
| 4945000 | $ | \ RESTORE CYLINDER AND ADDRESS MSB | | 48C | A208 |
| 4946000 | | OF CYLINDER (CNF1) | \ | | |
| 4947000 | | WDA | ; | | |
| 4948000 | | | | | | |
| 4949000 | $ | \ INCREMENT MSB BASED ON PREVIOUS CARRY | \ | 48D | 6480 |
| 4950000 | | INC ASPM COT1 | ; | | |
| 4951000 | | | | | | |
| 4952000 | $ | \ RESTORE MSB OF CYLINDER | \ | 48E | A200 |
| 4953000 | | MWT | ; | | |
| 4954000 | | | | | | |
| 4955000 | SKIP HOF | | ; | | |

MODEL: MPDC-REV3D
REVISION: 000.00

RTL/6000 FILE EDIT
MICROPROGRAM SECTION

08/01/77  12.605  PAGE: 129
DOC.#:

| LINE # | | | SEQUENCE: SSUPCS | | ADDRESS (HEX) | IMAGE (HEX) |
|---|---|---|---|---|---|---|
| 4956000 | $ | \ ADDRESS DMA BYTE | \ | 48F | 8C89 |
| 4957000 | | SSPAI LOC(DMA1) | ; | | |
| 4958000 | | | | | | |
| 4959000 | $ | \ SET IMPLIED SEEK BIT | \ | 490 | 8490 |
| 4960000 | | OCN ASPM CNST (20#) | ; | | |
| 4961000 | | | | | | |
| 4962000 | $ | \ RESET FIRST PASS BIT | \ | 491 | 82EF |
| 4963000 | | ACN CNST(BF#) | ; | | |
| 4964000 | | | | | | |
| 4965000 | $ | \ RESTORE DMA BYTE | \ | 492 | A200 |
| 4966000 | | MWT | ; | | |
| 4967000 | | | | | | |
| 4968000 | $ | \ ADDRESS UNIT SELECT | \ | 493 | 8CEB |
| 4969000 | | SSPAI LOC(UNSEL) | ; | | |
| 4970000 | | | | | | |
| 4971000 | $ | \ RESET TRACK BIT | \ | 494 | 87E7 |
| 4972000 | | ACN ASPM CNST(FB#) | ; | | |
| 4973000 | | | | | | |
| 4974000 | $ | \ RESTORE UNSEL | \ | 495 | A200 |
| 4975000 | | MWT | ; | | |
| 4976000 | | | | | | |
| 4977000 | $ | \RESET MOTHER BOARD FIFO | \ | 496 | 0088 |
| 4978000 | | RDA | ; | | |
| 4979000 | | | | | | |
| 4980000 | $ | \CLEAR STATUS AND FIFO IN ADAPTER | \ | 497 | 744F |
| 4981000 | | ZER AAD5 SRIA | ; | | |
| 4982000 | | | | | | |
| 4983000 | $ | LRA (SSEEK-IMPL) | ; | 498 | E3B0 |
| 4984000 | | | | | | |
| 4985000 | $ | GTO (SDEC-RNG) | ; | 499 | F461 |
| 4986000 | | | | | | |
| 4987000 | $UPD-UNSEL | \ ADDRESS UNIT SELECT | \ | 49A | 8CEB |
| 4988000 | | SSPAI LOC(UNSEL) | ; | | |
| 4989000 | | | | | | |
| 4990000 | $ | \ SET TRACK = 1 | \ | 49B | 8418 |
| 4991000 | | OCN ASPM CNST(04#) | ; | | |
| 4992000 | | | | | | |
| 4993000 | $ | \ RESTORE UNSEL | \ | 49C | A200 |
| 4994000 | | MWT | ; | | |
| 4995000 | | | | | | |
| 4996000 | $ | \ SEND NEW TRACK TO ADAPTER | \ | 49D | 7C6A |
| 4997000 | | XFB AAD3 SRIA | ; | | |
| 4998000 | | | | | | |
| 4999000 | $ | GTO ($SCH-LRA) | ; | 49E | F45E |
| 5000000 | | | | | | |
| 5001000 | | | | | | |
| 5002000 | SKIP HOF | | ; | | |

MODEL: MPDC-REV3D
REVISION: 000.00

RTL/6000 FILE EDIT
MICROPROGRAM SECTION

08/01/77  12.605  PAGE: 130
DOC.#:

| LINE # | | SEQUENCE: SSUPCS | ADDRESS (HEX) | IMAGE (HEX) |
|---|---|---|---|---|
| 5003000 | \ THIS IS THE BEGINNING OF THE WRAPAROUND FIRMWARE. THE | | | |
| 5004000 | ROUTINES PERFORM THE FOLLOWING FUNCTIONS- | | | |
| 5005000 | 1. LOADS UP TO 16 BYTES INTO EITHER THE MOTHER BOARD | | | |
| 5006000 | OR ADAPTER FIFO IN ORDER TO VERIFY THE OUTPUT | | | |
| 5007000 | DATA PATH. | | | |
| 5008000 | 2. READS THE DATA PREVIOUSLY LOADED FROM THE MOTHER | | | |
| 5009000 | BOARD OR ADAPTER FIFO IN ORDER TO VERIFY THE INPUT | | | |
| 5010000 | DATA PATH. | \ | | |
| 5011000 | | | | |

```
MODEL: MPDC-REV3D                                    RTL/6000 FILE EDIT              08/01/77    12.605  PAGE: 130
REVISION: 000.00                                     MICROPROGRAM SECTION                 DOC.#:
                                                                                 ADDRESS  IMAGE
                                           SEQUENCE: SSUPCS                      (HEX)    (HEX)
 LINE #                                         -continued
5012000  SWRAP         \ SKIP IF ADAPTER WRAPAROUND              \                49F     C45E
5013000                TFZ ASPM TAX7                             ;
5014000
5015000  S             \ GO TO MOTHER BRD WRAP                   \                4A0     F4BC
5016000                GTO (SWRAP-MOTH)                          ;
5017000
5018000  S             \ ADDRESS DMA BYTE                        \                4A1     8C89
5019000                SSPA1 LOC(DMA1)                           ;
5020000
5021000  S             \ SKIP IF WRITE MODE                      \                4A2     C490
5022000                TFO ASPM TAX0                             ;
5023000
5024000  S             GTO (SWRAP-READ)                          ;                4A3     F4B1
5025000
5026000      \ THIS IS THE ADAPTER WRITE WRAPAROUND ROUTINE. IT LOADS
5027000        FROM MEMORY UP TO 16 DATA BYTES INTO THE ADAPTER FIFO.     \
5028000
5029000  SWRAP-WRT     \ CLEAR ADP STATUS AND FIFO               \                4A4     746B
5030000                XFB AAD5 SR1A                             ;
5031000
5032000  S             \ SET DATA COUNT = 16                     \                4A5     9408
5033000                LCN AAD1 CNST(04#)                        ;
5034000
5035000  S             \ LOAD ADP CMD                            \                4A6     9808
5036000                LCN AAD2 CNST(C4#)                        ;
5037000
5038000  S             \ SET BYTE MODE WRITE                     \                4A7     81A2
5039000                LCN CNST(6A#)                             ;
5040000
5041000  S             \ SKIP IF BYTE MODE                       \                4A8     C0B8
5042000                TFO TBYT                                  ;
5043000
5044000  S             \ SET WRITE MODE                          \                4A9     8182
5045000                LCN CNST(62#)                             ;
5046000
5047000  S             \ENABLE WRITE HARDWARE PATH               \                4AA     0601
5048000                EWP                                       ;
5049000
5050000  SKIP HOF                                                ;

MODEL: MPDC-REV3D                                    RTL/6000 FILE EDIT              08/01/77    12.605  PAGE: 131
REVISION: 000.00                                     MICROPROGRAM SECTION                 DOC.#:
                                                                                 ADDRESS  IMAGE
                                           SEQUENCE: SSUPCS                      (HEX)    (HEX)
 LINE #
5051000  S             \LOAD RETURN                              \                4AB     E591
5052000                LRA (STERM-CL3)                           ;
5053000
5054000  S             \ LOAD RETURN FROM DMA-CHK                \                4AC     E59D
5055000                LRA (STERM-NOR1)                          ;
5056000
5057000  S             \SET CYCLE                                \                4AD     4020
5058000                CYC                                       ;
5059000
5060000  SWRAP-WAIT    \SKIP IF NO ADAPTER BUFFER REQUEST        \                4AE     C0BC
5061000                TFO TNBR                                  ;
5062000
5063000  S             GTO (SWRAP-WAIT)                          ;                4AF     F4AE
5064000
5065000  S             GTO (SDMA-CHK)                            ;                4B0     F574
5066000
5067000      \ THIS IS THE ADAPTER READ WRAPAROUND ROUTINE. IT TRANSFERS
5068000        TO MEMORY FROM THE ADAPTER FIFO THE DATA BYTES
5069000        PREVIOUSLY LOADED BY THE ADAPTER WRITE WRAPAROUND
5070000        COMMAND.                                          \
5071000
5072000  SWRAP-HEAD    \ SET DATA COUNT = 16                     \                4B1     9420
5073000                LCN AAD1 CNST(08#)                        ;
5074000
5075000  S             \ LOAD ADP CMD                            \                4B2     9802
5076000                LCN AAD2 CNST(C2#)                        ;
5077000
5078000  S             \ SET BUSS = READ BYTE MODE               \                4B3     8128
5079000                LCN CNST(4C#)                             ;
5080000
5081000  S             \ SKIP IF BYTE MODE                       \                4B4     C0B8
5082000                TFO TBYT                                  ;
5083000
5084000  S             \ SET BUS = READ MODE                     \                4B5     8108
5085000                LCN CNST(44#)                             ;
5086000
5087000  S             \ENABLE READ HARDWARE PATH                \                4B6     0600
5088000                ERP                                       ;
5089000
5090000  S             \ LOAD RETURN FROM DMA-CHK                \                4B7     E59C
5091000                LRA (STERM-NOR)                           ;
5092000
5093000  S             \SET CYCLE                                \                4B8     4020
5094000                CYC                                       ;
5095000
5096000  SKIP HOF                                                ;

MODEL: MPDC-REV3D                                    RTL/6000 FILE EDIT              08/01/77    12.605  PAGE: 132
REVISION: 000.00                                     MICROPROGRAM SECTION                 DOC.#:
                                                                                 ADDRESS  IMAGE
                                           SEQUENCE: SSUPCS                      (HEX)    (HEX)
 LINE #
5097000
5098000  SWRAP-READ1   \SKIP IF NO ADAPTER BUFFER REQUEST        \                4B9     C0BC
5099000                TFO TNBR                                  ;
5100000
5101000  S             GTO (SWRAP-READ1)                         ;                4BA     F4B9
5102000
5103000  S             GTO (SREAD-EOR2)                          ;                4BB     F519
5104000
5105000      \ THIS IS THE BEGINNING OF THE MOTHER BOARD WRAPAROUND
5106000        FIRMWARE.                                         \
5107000
5108000  SWRAP-MOTH    \ SET SPA FOR RANGE UPPER                 \                4BC     8C28
5109000                SSPA1 LOC(RNG1)                           ;
5110000
5111000  S             \ TRANSFER RANGE UPPER THRU ALU           \                4BD     612A
```

```
MODEL: MPDC-REV3D                          RTL/6000 FILE EDIT                    08/01/77    12.605  PAGE: 132
REVISION: 000.00                           MICROPROGRAM SECTION                  DOC.#:
                                                                        ADDRESS  IMAGE
LINE #                                  SEQUENCE: SSUPC5                 (HEX)   (HEX)
5112000                  XFB BSPM                                -continued
5113000
5114000    S             \ SKIP IF RANGE UPPER ZERO           \           4BE    C086
5115000                  TFO TEQZ                             ;
5116000
5117000    S             \ ABORT - RANGE GT 16                \           4BF    F4E1
5118000                  GTO ($WRAP-STS)                      ;
5119000
5120000    S             \ SET SPA FOR RANGE LOWER            \           4C0    8C29
5121000                  SSPAI LOC(RNG2)                      ;
5122000
5123000    S             \ HEX11 TO ACU                       \           4C1    8041
5124000                  LCN CNST(11#)                        ;
5125000
5126000    S             \ CHECK FOR RANGE LOWER GT 16        \           4C2    6418
5127000                  SUB ASPM BACU                        ;
5128000
5129000    S             \ SKIP IF RANGE LOWER LT 16          \           4C3    C04A
5130000                  TFZ TCOT                             ;
5131000
5132000    S             \ ABORT - RANGE GT 16                \           4C4    F4E1
5133000                  GTO ($WRAP-STS)                      ;
5134000
5135000    S             \ SET SPA FOR DMA BYTE               \           4C5    8C89
5136000                  SSPAI LOC(DMA1)                      ;
5137000
5138000    S             \ SKIP IF WRITE MODE                 \           4C6    C490
5139000                  TFO ASPM TAX0                        ;
5140000
5141000    S             \ GO TO READ WRAP FOR MOTHER BOARD   \           4C7    F4D3
5142000                  GTO ($WRAP-RDM0)                     ;
5143000
5144000 SKIP HOF                                              ;

MODEL: MPDC-REV3D                          RTL/6000 FILE EDIT                    08/01/77    12.605  PAGE: 133
REVISION: 000.00                           MICROPROGRAM SECTION                  DOC.#:
                                                                        ADDRESS  IMAGE
LINE #                                  SEQUENCE: SSUPC5                 (HEX)   (HEX)
5145000
5146000         \ THIS IS THE MOTHER BOARD WRITE WRAPAROUND ROUTINE. IT
5147000         LOADS FROM MEMORY UP TO 16 DATA BYTES INTO THE MOTHER
5148000         BOARD FIFO.                                   \
5149000
5150000 $WRAP-WRTM0      \ SET BYTE MODE WRITE IN ACU         \           4C8    81A2
5151000                  LCN CNST(6A#)                        ;
5152000
5153000    S             \ SKIP IF BYTE MODE                  \           4C9    C088
5154000                  TFO TBYT                             ;
5155000
5156000    S             \ SET WRITE MODE IN ACU              \           4CA    8182
5157000                  LCN CNST(62#)                        ;
5158000
5159000    S             \ SET TEST MODE                      \           4CB    0180
5160000                  STD                                  ;
5161000
5162000    S             \ENABLE WRITE HARDWARE PATH          \           4CC    0601
5163000                  EWP                                  ;
5164000
5165000    S             \ SET CYCLE                          \           4CD    4020
5166000                  CYC                                  ;
5167000
5168000 $WRAP-WRTM1      \ SKIP IF RANGE ZERO                 \           4CE    C0A2
5169000                  TFO TRGZ                             ;
5170000
5171000    S             \ WAIT FOR RANGE ZERO                \           4CF    F4CE
5172000                  GTO ($WRAP-WRTM1)                    ;
5173000
5174000    S             \ LOAD RETURN                        \           4D0    E592
5175000                  LRA ($TERM-CL4)                      ;
5176000
5177000    S             \ LOAD RETURN                        \           4D1    E590
5178000                  LRA ($TERM-NOR1)                     ;
5179000
5180000    S             GTO ($DMA-CHK)                       ;           4D2    F574
5181000
5182000 SKIP HOF                                              ;

MODEL: MPDC-REV3D                          RTL/6000 FILE EDIT                    08/01/77    12.605  PAGE: 134
REVISION: 000.00                           MICROPROGRAM SECTION                  DOC.#:
                                                                        ADDRESS  IMAGE
LINE #                                  SEQUENCE: SSUPC5                 (HEX)   (HEX)
5183000
5184000         \ THIS IS THE MOTHER BOARD READ WRAPAROUND ROUTINE. IT
5185000         TRANSFERS TO MEMORY FROM THE MOTHER BOARD FIFO THE DATA
5186000         BYTES PREVIOUSLY LOADED BY THE WRITE WRAPAROUND COMMAND. \
5187000
5188000 $WRAP-RDM0       \ SET BYTE MODE READ IN ACU          \           4D3    8128
5189000                  LCN CNST(4C#)                        ;
5190000
5191000    S             \ SKIP IF BYTE MODE                  \           4D4    C088
5192000                  TFO TBYT                             ;
5193000
5194000    S             \ SET READ MODE IN ACU               \           4D5    8108
5195000                  LCN CNST(44#)                        ;
5196000
5197000    S             \ SET TEST MODE                      \           4D6    0180
5198000                  STD                                  ;
5199000
5200000    S             \ SET CYCLE                          \           4D7    4020
5201000                  CYC                                  ;
5202000
5203000    S             \LOAD RETURN                         \           4D8    E59C
5204000                  LRA ($TERM-NOR)                      ;
5205000
5206000 $WRAP-RDM01      \ENABLE READ HARDWARE PATH           \           4D9    0600
5207000                  ERP                                  ;
5208000
5209000    S             \ SEND BYTE TO INTERFACE             \           4DA    7C4F
5210000                  ZER AAD7 SRIA                        ;
5211000
5212000    S             \NO OP FOR TIMING                    \           4DB    0000
```

| MODEL: MPDC-REV3D | | RTL/6000 FILE EDIT | | 08/01/77 | 12.605 PAGE: 134 |
| --- | --- | --- | --- | --- | --- |
| REVISION: 000.00 | | MICROPROGRAM SECTION | | DOC.#: | |
| | | | | ADDRESS | IMAGE |
| LINE # | | SEQUENCE: $SUPC5 | | (HEX) | (HEX) |
| | | -continued | | | |
| 5213000 | | NOP | | | |
| 5214000 | | | | | |
| 5215000 | $WRAP-RDMO2 | \SKIP IF BUS CYCLE NOT ACTIVE | \ | 4DC | C042 |
| 5216000 | | TFZ TBCA | ; | | |
| 5217000 | | | | | |
| 5218000 | $ | \WAIT FOR BUS TO FINISH | \ | 4DD | F4DC |
| 5219000 | | GTO ($WRAP-RDMO2) | ; | | |
| 5220000 | | | | | |
| 5221000 | $ | \SKIP IF END OF RANGE | \ | 4DE | C0A2 |
| 5222000 | | TFO TRGZ | ; | | |
| 5223000 | | | | | |
| 5224000 | $ | \SEND INTERFACE ANOTHER BYTE | \ | 4DF | F4D9 |
| 5225000 | | GTO ($WRAP-RDMO1) | ; | | |
| 5226000 | | | | | |
| 5227000 | $ | \GO TO CHECK FOR SINGLE BYTE STORED | \ | 4E0 | F519 |
| 5228000 | | GTO ($READ-EOR2) | ; | | |
| 5229000 | | | | | |
| 5230000 | SKIP HOF | | ; | | |

| MODEL: MPDC-REV3D | | RTL/6000 FILE EDIT | | 08/01/77 | 12.605 PAGE: 135 |
| --- | --- | --- | --- | --- | --- |
| REVISION: 000.00 | | MICROPROGRAM SECTION | | DOC.#: | |
| | | | | ADDRESS | IMAGE |
| LINE # | | SEQUENCE: $SUPC5 | | (HEX) | (HEX) |
| 5231000 | | | | | |
| 5232000 | $WRAP-STS | \ SET STATUS BYTE 1 IN ACU | \ | 4E1 | 8280 |
| 5233000 | | LCN CNST(A0#) | ; | | |
| 5234000 | | | | | |
| 5235000 | $ | \ SKIP IF DEVICE READY | \ | 4E2 | D890 |
| 5236000 | | TFO AAD2 TAX0 | ; | | |
| 5237000 | | | | | |
| 5238000 | $ | \ SET STATUS BYTE 1 NOT RDY IN ACU | \ | 4E3 | 8080 |
| 5239000 | | LCN CNST(20#) | ; | | |
| 5240000 | | | | | |
| 5241000 | $ | \ SET SPA FOR STS1 | \ | 4E4 | 8C60 |
| 5242000 | | SSPAI LOC(STS1) | ; | | |
| 5243000 | | | | | |
| 5244000 | $ | \ UPDATE STATUS | \ | 4E5 | A200 |
| 5245000 | | MWT | ; | | |
| 5246000 | | | | | |
| 5247000 | $ | GTO ($TERM-CL2) | ; | 4E6 | F58F |
| 5248000 | | | | | |
| 5249000 | SKIP HOF | | ; | | |

| MODEL: MPDC-REV3D | | RTL/6000 FILE EDIT | | 08/01/77 | 12.605 PAGE: 136 |
| --- | --- | --- | --- | --- | --- |
| REVISION: 000.00 | | MICROPROGRAM SECTION | | DOC.#: | |
| | | | | ADDRESS | IMAGE |
| LINE # | | SEQUENCE: $SUPC5 | | (HEX) | (HEX) |
| 5250000 | $FMT-READ | \ CLEAR ADP STATUS + FIFO +RESET READ GATE | \ | 4E7 | 746B |
| 5251000 | | XFB AAD5 SRIA | ; | | |
| 5252000 | | | | | |
| 5253000 | $ | \SKIP IF RANGE NOT ZERO | \ | 4E8 | C062 |
| 5254000 | | TFZ TRGZ | ; | | |
| 5255000 | | | | | |
| 5256000 | $ | \GO TO TERMINATION | \ | 4E9 | F59C |
| 5257000 | | GTO ($TERM-NOR) | ; | | |
| 5258000 | | | | | |
| 5259000 | $READ-IDT | \SET SPA FOR LOW ORDER BYTE OF TASK | \ | 4EA | 8C0B |
| 5260000 | | SSPAI LOC (TSK2) | ; | | |
| 5261000 | | | | | |
| 5262000 | $ | \SKIP IF IGNORE READ ERRORS SET | \ | 4EB | C490 |
| 5263000 | | TFO ASPM TAX0 | ; | | |
| 5264000 | | | | | |
| 5265000 | $ | GTO ($READ-IDT1) | ; | 4EC | F4F0 |
| 5266000 | | | | | |
| 5267000 | $ | \SET SPA FOR DMA BYTE | \ | 4ED | 8C89 |
| 5268000 | | SSPAI LOC (DMA1) | ; | | |
| 5269000 | | | | | |
| 5270000 | $ | \ SET IGNORE READ ERROR BIT | \ | 4EE | 8450 |
| 5271000 | | OCN ASPM CNST (10#) | ; | | |
| 5272000 | | | | | |
| 5273000 | $ | \RESTORE DMA BYTE | \ | 4EF | A200 |
| 5274000 | | MWT | ; | | |
| 5275000 | | | | | |
| 5276000 | $READ-IDT1 | \ SET FORMAT READ COMMAND | \ | 4F0 | 8303 |
| 5277000 | | LCN CNST(C3#) | ; | | |
| 5278000 | | | | | |
| 5279000 | $ | \ ADDRESS TASK | \ | 4F1 | 8C0A |
| 5280000 | | SSPAI LOC(TSK1) | ; | | |
| 5281000 | | | | | |
| 5282000 | $ | \ SKIP IF NOT DIAGNOSTIC MODE | \ | 4F2 | C45C |
| 5283000 | | TFZ ASPM TAX6 | ; | | |
| 5284000 | | | | | |
| 5285000 | $ | GTO ($READ-IDT2) | ; | 4F3 | F4FC |
| 5286000 | | | | | |
| 5287000 | $ | \ SEND COMMAND TO ADAPTER | \ | 4F4 | 786A |
| 5288000 | | XFB AAD2 SRIA | ; | | |
| 5289000 | | | | | |
| 5290000 | $ | \ LOAD AMK UPPER | \ | 4F5 | 93E2 |
| 5291000 | | LCN AAD0 CNST(FA#) | ; | | |
| 5292000 | | | | | |
| 5293000 | $ | \ LOAD AMK LOWER | \ | 4F6 | 92A2 |
| 5294000 | | LCN AAD0 CNST(AA#) | ; | | |
| 5295000 | | | | | |
| 5296000 | SKIP HOF | | ; | | |

| MODEL: MPDC-REV3D | | RTL/6000 FILE EDIT | | 08/01/77 | 12.605 PAGE: 137 |
| --- | --- | --- | --- | --- | --- |
| REVISION: 000.00 | | MICROPROGRAM SECTION | | DOC.#: | |
| | | | | ADDRESS | IMAGE |
| LINE # | | SEQUENCE: $SUPC5 | | (HEX) | (HEX) |
| 5297000 | $ | \ LOAD DATA COUNTER = 4 | \ | 4F7 | 9401 |
| 5298000 | | LCN AAD1 CNST(01#) | ; | | |
| 5299000 | | | | | |
| 5300000 | $ | \ RETURN FROM READ-EOF | \ | 4F8 | E543 |
| 5301000 | | LRA ($READ-DATA) | ; | | |
| 5302000 | | | | | |
| 5303000 | $ | \ RETURN FROM DATA-LOOP IF AAP REQ | \ | 4F9 | E518 |
| 5304000 | | LRA ($READ-EOR) | ; | | |
| 5305000 | | | | | |
| 5306000 | $ | \ RETURN FROM WAIT-LOOP,FIRST TIME ONLY | \ | 4FA | E51F |

MODEL: MPDC-REV3D  
REVISION: 000.00

RTL/6000 FILE EDIT  
MICROPROGRAM SECTION

08/01/77    12.605    PAGE: 137  
DOC.#:

SEQUENCE: $$UPCS  
-continued

| LINE # | | | | ADDRESS (HEX) | IMAGE (HEX) |
|---|---|---|---|---|---|
| 5307000 | | LRA ($READ-AMK) | \ | | |
| 5308000 | | | | | |
| 5309000 | s | GTO ($START-WAIT) | ! | 4FB | F21D |
| 5310000 | | | | | |
| 5311000 | $READ-IDT2 | \SET DIAGNOSTIC READ ID | \ | 4FC | 9B43 |
| 5312000 | | LCN AAD2 CNST (D3#) | ! | | |
| 5313000 | | | | | |
| 5314000 | s | GTO ($DIAG-READ4) | ! | 4FD | F56D |
| 5315000 | | | | | |
| 5316000 | $READ-MODE | \ SET BUS = READ BYTE MODE | \ | 4FE | 8128 |
| 5317000 | | LCN CNST(4C#) | ! | | |
| 5318000 | | | | | |
| 5319000 | s | \ SKIP IF BYTE MODE | \ | 4FF | C0B8 |
| 5320000 | | TFO TBYT | ! | | |
| 5321000 | | | | | |
| 5322000 | $READ-RET | \ SET BUS = READ MODE | \ | 500 | 810B |
| 5323000 | | LCN CNST(44#) | ! | | |
| 5324000 | | | | | |
| 5325000 | s | \SKIP IF ADAPTER HARDWARE REQUEST | \ | 501 | C080 |
| 5326000 | | TFO TAHR | ! | | |
| 5327000 | | | | | |
| 5328000 | s | \ERROR OR END OF FIELD | \ | 502 | C200 |
| 5329000 | | RTN | ! | | |
| 5330000 | | | | | |
| 5331000 | s | \ENABLE READ HARDWARE PATH | \ | 503 | 0600 |
| 5332000 | | ERP | ! | | |
| 5333000 | | | | | |
| 5334000 | SKIP HOF | | ! | | |

MODEL: MPDC-REV3D  
REVISION: 000.00

RTL/6000 FILE EDIT  
MICROPROGRAM SECTION

08/01/77    12.605    PAGE: 138  
DOC.#:

SEQUENCE: $$UPCS

```
5335000     \ THIS IS THE COMMON DATA LOOP USED BY THE READ AND WRITE
5336000       ROUTINES. IT IS USED TO CHECK FOR THE ADAPTER FIFO
5337000       BEING FULL ON WRITES AND EMPTY ON READS IN ORDER TO
5338000       DETERMINE IF AN UNSOLICITED BUS REQUEST CAN BE
5339000       PROCESSED.                                      \
5340000
```

| LINE # | | | | ADDRESS (HEX) | IMAGE (HEX) |
|---|---|---|---|---|---|
| 5341000 | $DATA-LOOP | \SET CYCLE | \ | 504 | 4020 |
| 5342000 | | CYC | ! | | |
| 5343000 | | | | | |
| 5344000 | $DATA1 | \ SKIP IF NO ADAPTER BUFFER REQUEST | \ | 505 | C0BC |
| 5345000 | | TFO TNBR | ! | | |
| 5346000 | | | | | |
| 5347000 | s | GTO ($DATA1) | ! | 506 | F505 |
| 5348000 | | | | | |
| 5349000 | s | \NO OP FOR TIMING | \ | 507 | 0000 |
| 5350000 | | NOP | ! | | |
| 5351000 | | | | | |
| 5352000 | s | \NO OP FOR TIMING | \ | 508 | 0000 |
| 5353000 | | NOP | ! | | |
| 5354000 | | | | | |
| 5355000 | s | \CLEAR ACU | \ | 509 | 600E |
| 5356000 | | ZER | ! | | |
| 5357000 | | | | | |
| 5358000 | $DATA2 | \ SKIP IF NO BUS CYCLE ACTIVE | \ | 50A | C042 |
| 5359000 | | TFZ TBCA | ! | | |
| 5360000 | | | | | |
| 5361000 | s | GTO ($DATA2) | ! | 50B | F50A |
| 5362000 | | | | | |
| 5363000 | s | \CLEAR CYCLE REGISTER | \ | 50C | 4020 |
| 5364000 | | CYC | ! | | |
| 5365000 | | | | | |
| 5366000 | s | \ SKIP IF NO ADP REQUEST | \ | 50D | C04C |
| 5367000 | | TFZ TREQ | ! | | |
| 5368000 | | | | | |
| 5369000 | s | \ RETURN TO- | | 50E | C200 |
| 5370000 | | 1. FWT-DAT - FORMAT WRITES | | | |
| 5371000 | | 2. READ-EOR - ADAPTER REQ DURING READ DATA | | | |
| 5372000 | | 3. WRT-EOF - ADAPTER REQ DURING WRITE DATA | \ | | |
| 5373000 | | RTN | ! | | |
| 5374000 | | | | | |
| 5375000 | SKIP HOF | | ! | | |

MODEL: MPDC-REV3D  
REVISION: 000.00

RTL/6000 FILE EDIT  
MICROPROGRAM SECTION

08/01/77    12.605    PAGE: 139  
DOC.#:

SEQUENCE: $$UPCS

| LINE # | | | | ADDRESS (HEX) | IMAGE (HEX) |
|---|---|---|---|---|---|
| 5376000 | s | \ ADDRESS DMA BYTE | \ | 50F | 8C89 |
| 5377000 | | SSPA1 LOC(DMA1) | ! | | |
| 5378000 | | | | | |
| 5379000 | s | \ SKIP IF WRITE MODE | \ | 510 | C490 |
| 5380000 | | TFO ASPM TAX0 | ! | | |
| 5381000 | | | | | |
| 5382000 | s | GTO ($DATA3) | ! | 511 | F515 |
| 5383000 | | | | | |
| 5384000 | s | \ RETURN FROM WAIT-LOOP | \ | 512 | E40C |
| 5385000 | | LRA ($WRT-RET) | ! | | |
| 5386000 | | | | | |
| 5387000 | s | \ RETURN FROM DMA-CHK | \ | 513 | E21D |
| 5388000 | | LRA ($START-WAIT) | ! | | |
| 5389000 | | | | | |
| 5390000 | s | GTO ($DMA-CHK) | ! | 514 | F574 |
| 5391000 | | | | | |
| 5392000 | $DATA3 | \ RETURN FROM WAIT-LOOP | \ | 515 | E4FE |
| 5393000 | | LRA ($READ-MODE) | ! | | |
| 5394000 | | | | | |
| 5395000 | s | \ RETURN FROM DMA-CHK | \ | 516 | E21D |
| 5396000 | | LRA ($START-WAIT) | ! | | |
| 5397000 | | | | | |
| 5398000 | s | GTO ($DMA-CHK) | ! | 517 | F574 |
| 5399000 | | | | | |
| 5400000 | SKIP HOF | | ! | | |

```
MODEL: MPDC-REV3D                         RTL/6000 FILE EDIT              08/01/77   12.605  PAGE: 140
REVISION: 000.00                          MICROPROGRAM SECTION            DOC.#:
                                                                ADDRESS  IMAGE
LINE #                        SEQUENCE: $SUPCS                  (HEX)    (HEX)
5401000  $READ-EOR   \ LOAD RETURN                         \     518    E529
5402000              LRA ($READ-EOF)                       ;
5403000
5404000  $READ-EOR2  \SKIP IF OFFSET RANGE HISTORY          \     519    C06C
5405000              TFZ TORH                              ;
5406000
5407000  $          \SKIP IF SINGLE BYTE STORED             \     51A    C0A4
5408000              TFO TSBS                              ;
5409000
5410000  $          GTO ($DMA-CHK)                          ;     51B    F574
5411000
5412000  $          \ LOAD BUS CYCLE                        \     51C    8326
5413000              LCN CNST(CC#)                         ;
5414000
5415000  $          \ CYCLE BUS                             \     51D    4020
5416000              CYC                                   ;
5417000
5418000  $          GTO ($DMA-CHK)                          ;     51E    F574
5419000
5420000  $READ-AMK   \ SKIP IF NO ADDRESS MARK ERROR        \     51F    DC5C
5421000              TFZ AAD3 TAX6                         ;
5422000
5423000  $          GTO ($READ-STS)                         ;     520    F533
5424000
5425000  $READ-AMK1  \SKIP IF ADAPTER HARDWARE REQUEST      \     521    C080
5426000              TFO TAHR                              ;
5427000
5428000  $          \SKIP IF NO ERROR                       \     522    C04C
5429000              TFZ TREQ                              ;
5430000
5431000  $          GTO ($READ-MODE)                        ;     523    F4FE
5432000
5433000  $          GTO ($READ-AMK1)                        ;     524    F521
5434000
5435000  $WRT-EOF    \ SKIP IF NOT EOF                      \     525    C0AA
5436000              TFO TNDR                              ;
5437000
5438000  $          GTO ($DMA-CHK)                          ;     526    F574
5439000
5440000  $          \ LOAD RETURN FROM DMA-CHK              \     527    E57D
5441000              LRA ($TERM-STS)                       ;
5442000
5443000  $          GTO ($DMA-CHK)                          ;     528    F574
5444000
5445000 SKIP HOF                                            ;

MODEL: MPDC-REV3D                         RTL/6000 FILE EDIT              08/01/77   12.605  PAGE: 141
REVISION: 000.00                          MICROPROGRAM SECTION            DOC.#:
                                                                ADDRESS  IMAGE
LINE #                        SEQUENCE: $SUPCS                  (HEX)    (HEX)
5446000
5447000  $READ-EOF   \ZERO TO ACU                           \     529    600E
5448000              ZER                                   ;
5449000
5450000  $          \CLEAR CYCLE REGISTER                   \     52A    4020
5451000              CYC                                   ;
5452000
5453000  $          \SKIP IF NO NON-DATA SERVICE REQUEST    \     52B    C06A
5454000              TFZ TNDR                              ;
5455000
5456000  $          GTO ($READ-STS)                         ;     52C    F533
5457000
5458000  $          \ GET DEVICE STATUS                     \     52D    7C3E
5459000              XFA AAD3                              ;
5460000
5461000  $          \ SKIP IF ERROR                         \     52E    C046
5462000              TFZ TEQZ                              ;
5463000
5464000  $          \ RETURN TO-                                   52F    C200
5465000                  1. READ-DATA-FORMAT READ
5466000                  2. TERM-NOR-EOR                   \
5467000              RTN                                   ;
5468000
5469000  $          \ADDRESS DMA BYTE                       \     530    8C89
5470000              SSPAI LOC (DMA1)                      ;
5471000
5472000  $          \SKIP IF NOT IGNORING READ ERRORS       \     531    C456
5473000              TFZ ASPM TAX3                         ;
5474000
5475000  $          GTO ($READ-STS1)                        ;     532    F535
5476000
5477000  $READ-STS   \ LOAD RETURN FROM STORE-CTRS          \     533    E57D
5478000              LRA ($TERM-STS)                       ;
5479000
5480000  $          GTO ($STORE-CTRS)                       ;     534    F538
5481000
5482000  $READ-STS1  \RESET IGNORE READ ERROR BIT           \     535    87AF
5483000              ACN ASPM CNST (EF#)                   ;
5484000
5485000  $          \UPDATE DMA BYTE                        \     536    A200
5486000              MWT                                   ;
5487000
5488000  $          RTN                                    ;     537    C200
5489000
5490000 SKIP HOF                                            ;

MODEL: MPDC-REV3D                         RTL/6000 FILE EDIT              08/01/77   12.605  PAGE: 142
REVISION: 000.00                          MICROPROGRAM SECTION            DOC.#:
                                                                ADDRESS  IMAGE
LINE #                        SEQUENCE: $SUPCS                  (HEX)    (HEX)
5491000
5492000          \ THIS ROUTINE IS USED TO STORE THE BUS INTERFACE
5493000            COUNTERS (ADDRESS, RANGE, AND OFFSET RANGE) IN RWS.  \
5494000
5495000  $STORE-CTRS \ ADDRESS OFFSET LOWER                 \     538    8C2B
5496000              SSPAI LOC(OFR2)                       ;
5497000
5498000  $          \ SAVE OFFSET LOWER IN DSR2             \     539    AE09
5499000              WDA ABUS4                             ;
5500000
5501000  $          \ SAVE OFFSET UPPER IN DSR1             \     53A    AE09
5502000              WDA ABUS4                             ;
```

| MODEL: MPDC-REV3D | RTL/6000 FILE EDIT | 08/01/77 12.605 PAGE: 142 |
|---|---|---|
| REVISION: 000.00 | MICROPROGRAM SECTION | DOC.#: |

| LINE # | | | SEQUENCE: SSUPCS -continued | | ADDRESS (HEX) | IMAGE (HEX) |
|---|---|---|---|---|---|---|
| 5503000 | | | | | | |
| 5504000 | S | | \ SAVE RANGE LOWER IN RNG2 | \ | 53B | AE09 |
| 5505000 | | | WDA ABUS4 | ; | | |
| 5506000 | | | | | | |
| 5507000 | S | | \ SAVE RANGE UPPER IN RNG1 | \ | 53C | AE01 |
| 5508000 | | | MWT ABUS4 | ; | | |
| 5509000 | | | | | | |
| 5510000 | S | | \ ADDRESS ADR2 | \ | 53D | 8C21 |
| 5511000 | | | SSPAI LOC(ADR2) | ; | | |
| 5512000 | | | | | | |
| 5513000 | S | | \ SAVE ADDRESS LOWER | \ | 53E | AE09 |
| 5514000 | | | WDA ABUS4 | ; | | |
| 5515000 | | | | | | |
| 5516000 | S | | \ SAVE ADDRESS MID | \ | 53F | AE01 |
| 5517000 | | | MWT ABUS4 | ; | | |
| 5518000 | | | | | | |
| 5519000 | S | | \ ADDRESS MOD1 | \ | 540 | 8C23 |
| 5520000 | | | SSPAI LOC(MOD1) | ; | | |
| 5521000 | | | | | | |
| 5522000 | S | | \ SAVE MEM MODULE | \ | 541 | AE01 |
| 5523000 | | | MWT ABUS4 | ; | | |
| 5524000 | | | | | | |
| 5525000 | S | | \ RETURN TO- | | 542 | C200 |
| 5526000 | | | 1. END-GAP - FORMAT WRITE | | | |
| 5527000 | | | 2. TERM-CL2 - NORMAL TERMINATION | | | |
| 5528000 | | | 3. TERM-STS - ERROR IN DEVICE STATUS ON READ | | | |
| 5529000 | | | 4. SCH-SET - EXTENDED SEARCH AND READ | | | |
| 5530000 | | | EXTENDED SEARCH AND WRITE | | | |
| 5531000 | | | 5. SEEK-IMPL- IMPLICIT SEEK DURING AUTO TRACK | | | |
| 5532000 | | | AND CYLINDER LINKING | \ | | |
| 5533000 | | | RTN | ; | | |
| 5534000 | | | | | | |
| 5535000 | SKIP HOF | | | ; | | |

| MODEL: MPDC-REV3D | RTL/6000 FILE EDIT | 08/01/77 12.605 PAGE: 143 |
|---|---|---|
| REVISION: 000.00 | MICROPROGRAM SECTION | DOC.#: |

| LINE # | | | SEQUENCE: SSUPCS | | ADDRESS (HEX) | IMAGE (HEX) |
|---|---|---|---|---|---|---|
| 5536000 | | | | | | |
| 5537000 | SREAD-DATA | | \SKIP IF RANGE NOT EQUAL ZERO | \ | 543 | C062 |
| 5538000 | | | TFZ TRG2 | ; | | |
| 5539000 | | | | | | |
| 5540000 | S | | GTO (STERM-NOR) | ; | 544 | F59C |
| 5541000 | | | | | | |
| 5542000 | S | | \SET SPA FOR DMA BYTE | \ | 545 | 8C89 |
| 5543000 | | | SSPAI LOC (DMA1) | ; | | |
| 5544000 | | | | | | |
| 5545000 | S | | \RESET IGNORE READ ERROR BIT | \ | 546 | B7B4 |
| 5546000 | | | ACN ASPM CNST (E0#) | ; | | |
| 5547000 | | | | | | |
| 5548000 | S | | \RESTORE DMA BYTE | \ | 547 | A200 |
| 5549000 | | | MWT | ; | | |
| 5550000 | | | | | | |
| 5551000 | S | | \ LOAD DATA MARK UPPER | \ | 548 | 93E9 |
| 5552000 | | | LCN AAD0 CNST(FD#) | ; | | |
| 5553000 | | | | | | |
| 5554000 | S | | \ LOAD DMK LOWER | \ | 549 | 9369 |
| 5555000 | | | LCN AAD0 CNST(DD#) | ; | | |
| 5556000 | | | | | | |
| 5557000 | S | | \ ADDRESS DATA LENGTH | \ | 54A | 8C09 |
| 5558000 | | | SSPAI LOC(DATL) | ; | | |
| 5559000 | | | | | | |
| 5560000 | S | | \ LOAD DATA LENGTH | \ | 54B | 756A |
| 5561000 | | | XFB AAD1 BSPM SRIA | ; | | |
| 5562000 | | | | | | |
| 5563000 | S | | \ ADDRESS TASK | \ | 54C | 8C0A |
| 5564000 | | | SSPAI LOC(TSK1) | ; | | |
| 5565000 | | | | | | |
| 5566000 | S | | \ SKIP IF NOT FORMAT READ ID | \ | 54D | C45A |
| 5567000 | | | TFZ ASPM TAX5 | ; | | |
| 5568000 | | | | | | |
| 5569000 | S | | GTO ($SPACE-DATA) | ; | 54E | F556 |
| 5570000 | | | | | | |
| 5571000 | SKIP HOF | | | ; | | |

| MODEL: MPDC-REV3D | RTL/6000 FILE EDIT | 08/01/77 12.605 PAGE: 144 |
|---|---|---|
| REVISION: 000.00 | MICROPROGRAM SECTION | DOC.#: |

| LINE # | | | SEQUENCE: SSUPCS | | ADDRESS (HEX) | IMAGE (HEX) |
|---|---|---|---|---|---|---|
| 5572000 | S | | \ SET READ COMMAND IN ADAPTER | \ | 54F | 9A02 |
| 5573000 | | | LCN AAD2 CNST(C2#) | ; | | |
| 5574000 | | | | | | |
| 5575000 | S | | \ RETURN FROM DMA-CHK IF SEARCH AND READ | \ | 550 | E453 |
| 5576000 | | | LRA ($SCH-UPD) | ; | | |
| 5577000 | | | | | | |
| 5578000 | S | | \ SKIP IF SEARCH AND READ | \ | 551 | C49E |
| 5579000 | | | TFO ASPM TAX7 | ; | | |
| 5580000 | | | | | | |
| 5581000 | S | | \ RETURN FROM DMA-CHK IF FORMAT READ | \ | 552 | E4E7 |
| 5582000 | | | LRA ($FMT-READ) | ; | | |
| 5583000 | | | | | | |
| 5584000 | S | | \ RETURN FROM DATA LOOP IF EOF | \ | 553 | E51B |
| 5585000 | | | LRA ($READ-EOR) | ; | | |
| 5586000 | | | | | | |
| 5587000 | S | | \ RETURN FROM WAIT-LOOP FIRST TIME ONLY | \ | 554 | E51F |
| 5588000 | | | LRA ($READ-AMK) | ; | | |
| 5589000 | | | | | | |
| 5590000 | S | | GTO ($START-WAIT) | ; | 555 | F210 |
| 5591000 | | | | | | |
| 5592000 | SKIP HOF | | | | | |

| MODEL: MPDC-REV3D | RTL/6000 FILE EDIT | 08/01/77 12.605 PAGE: 145 |
|---|---|---|
| REVISION: 000.00 | MICROPROGRAM SECTION | DOC.#: |

| LINE # | | | SEQUENCE: SSUPCS | | ADDRESS (HEX) | IMAGE (HEX) |
|---|---|---|---|---|---|---|
| 5593000 | | | | | | |
| 5594000 | SSPACE-DATA | | \ SET READ WITHOUT DATA XFER IN ADAPTER | \ | 556 | 9A02 |
| 5595000 | | | LCN AAD2 CNST(82#) | ; | | |
| 5596000 | | | | | | |
| 5597000 | S | | \ RETURN FROM WAIT LOOP | \ | 557 | E4E7 |

MODEL: MPDC-REV3D
REVISION: 000.00

RTL/6000 FILE EDIT
MICROPROGRAM SECTION

08/01/77  12.605  PAGE: 145
DOC.#:

| LINE # | | SEQUENCE: $SUPCS -continued | | ADDRESS (HEX) | IMAGE (HEX) |
|---|---|---|---|---|---|
| 5598000 | | LRA ($FMT-READ) | ; | | |
| 5599000 | | | | | |
| 5600000 | S | GTO ($START-WAIT) | ; | 558 | F21D |
| 5601000 | | | | | |
| 5602000 | $DIAG-AMK | \SKIP IF NO ADDRESS MARK ERROR | \ | 559 | DC5C |
| 5603000 | | TFZ AAD3 TAX6 | ; | | |
| 5604000 | | | | | |
| 5605000 | S | GTO ($DIAG-AMK2) | ; | 55A | F55F |
| 5606000 | | | | | |
| 5607000 | $DIAG-AMK1 | \SKIP IF ADAPTER HARDWARE REQUEST | \ | 55B | C080 |
| 5608000 | | TFO TAHR | ; | | |
| 5609000 | | | | | |
| 5610000 | S | \SKIP IF NO ERROR | \ | 55C | C04C |
| 5611000 | | TFZ TREQ | ; | | |
| 5612000 | | | | | |
| 5613000 | S | GTO ($READ-MODE) | ; | 55D | F4FE |
| 5614000 | | | | | |
| 5615000 | S | GTO ($DIAG-AMK1) | ; | 55E | F55B |
| 5616000 | | | | | |
| 5617000 | $DIAG-AMK2 | \ SKIP IF NO ADAPTER ERRORS | \ | 55F | C06A |
| 5618000 | | TFZ TNDR | ; | | |
| 5619000 | | | | | |
| 5620000 | S | GTO ($READ-STS) | ; | 560 | F533 |
| 5621000 | | | | | |
| 5622000 | $DIAG-READ | \ADDRESS TASK | \ | 561 | 8C0A |
| 5623000 | | SSPAI LOC (TSK1) | ; | | |
| 5624000 | | | | | |
| 5625000 | S | \SKIP IF HEAD ALIGNMENT TASK | \ | 562 | C49B |
| 5626000 | | TFO TAX4 ASPM | ; | | |
| 5627000 | | | | | |
| 5628000 | S | GTO ($DIAG-READ3) | ; | 563 | F56A |
| 5629000 | | | | | |
| 5630000 | S | \SET ADAPTER COMMAND | \ | 564 | 9A43 |
| 5631000 | | LCN AAD2 CNST (93#) | ; | | |
| 5632000 | | | | | |
| 5633000 | SKIP HOF | | | | |

MODEL: MPDC-REV3D
REVISION: 000.00

RTL/6000 FILE EDIT
MICROPROGRAM SECTION

08/01/77  12.605  PAGE: 146
DOC.#:

| LINE # | | SEQUENCE: $SUPCS | | ADDRESS (HEX) | IMAGE (HEX) |
|---|---|---|---|---|---|
| 5634000 | $DIAG-READ1 | \RESET BUS | \ | 565 | 4084 |
| 5635000 | | RST | ; | | |
| 5636000 | | | | | |
| 5637000 | S | \LOAD DUMMY RETURN | \ | 566 | E56B |
| 5638000 | | LRA ($DIAG-READ2) | ; | | |
| 5639000 | | | | | |
| 5640000 | S | GTO ($START-WAIT) | ; | 567 | F21D |
| 5641000 | | | | | |
| 5642000 | $DIAG-READ2 | \RESET INDEX COUNT | \ | 568 | 707F |
| 5643000 | | XFA AAD4 SRIA | ; | | |
| 5644000 | | | | | |
| 5645000 | S | GTO ($DIAG-READ1) | ; | 569 | F565 |
| 5646000 | | | | | |
| 5647000 | $DIAG-READ3 | \RESET ADAPTER BUSY | \ | 56A | 9800 |
| 5648000 | | LCN AAD2 CNST (00#) | ; | | |
| 5649000 | | | | | |
| 5650000 | S | \CLEAR ADAPTER STATUS AND FIFO | \ | 56B | 746B |
| 5651000 | | XFB AAD5 SRIA | ; | | |
| 5652000 | | | | | |
| 5653000 | S | \LOAD ADAPTER COMMAND | \ | 56C | 9B62 |
| 5654000 | | LCN AAD2 CNST(DA#) | ; | | |
| 5655000 | | | | | |
| 5656000 | $DIAG-READ4 | \LOAD AMK UPPER | \ | 56D | 93E2 |
| 5657000 | | LCN AAD0 CNST (FA#) | ; | | |
| 5658000 | | | | | |
| 5659000 | S | \ LOAD AMK LOWER | \ | 56E | 92A2 |
| 5660000 | | LCN AAD0 CNST(AA#) | ; | | |
| 5661000 | | | | | |
| 5662000 | S | \ LOAD DUMMY DATA LENGTH | \ | 56F | 97EB |
| 5663000 | | LCN AAD1 CNST(FF#) | ; | | |
| 5664000 | | | | | |
| 5665000 | S | \ RETURN FROM READ-EOF | \ | 570 | E59C |
| 5666000 | | LRA ($TERM-NOR) | ; | | |
| 5667000 | | | | | |
| 5668000 | S | \ RETURN FROM DATA-LOOP IF ADP REQ | \ | 571 | E518 |
| 5669000 | | LRA ($READ-EOR) | ; | | |
| 5670000 | | | | | |
| 5671000 | S | \ RETURN FROM WAIT-LOOP FIRST TIME | \ | 572 | E559 |
| 5672000 | | LRA ($DIAG-AMK) | ; | | |
| 5673000 | | | | | |
| 5674000 | S | GTO ($START-WAIT) | ; | 573 | F21D |
| 5675000 | | | | | |
| 5676000 | SKIP HOF | | | | |

MODEL: MPDC-REV3D
REVISION: 000.00

RTL/6000 FILE EDIT
MICROPROGRAM SECTION

08/01/77  12.605  PAGE: 147
DOC.#:

| LINE # | | SEQUENCE: $SUPCS | | ADDRESS (HEX) | IMAGE (HEX) |
|---|---|---|---|---|---|
| 5677000 | | | | | |
| 5678000 | \ THE DMA-CHK ROUTINE STORES THE FOLLOWING BUS STATUS | | | | | |
| 5679000 | \ INDICATORS BEFORE GOING TO THE WAIT-LOOP TO CHECK | | | | | |
| 5680000 | \ FOR AN UNSOLICITED BUS REQUEST- | | | | | |
| 5681000 | | BIT 0 = 0 | | | |
| 5682000 | | BIT 1 = 0 | | | |
| 5683000 | | BIT 2 = 0 | | | |
| 5684000 | | BIT 3 = 0 | | | |
| 5685000 | | BIT 4 = BUS YELLOW INDICATOR | | | |
| 5686000 | | BIT 5 = BUS NAK | | | |
| 5687000 | | BIT 6 = BUS PARITY ERROR | | | |
| 5688000 | | BIT 7 = BUS RED INDICATOR | \ | | |
| 5689000 | | | | | |
| 5690000 | $DMA-CHK | \ SKIP IF NO BUS CYCLES ACTIVE | \ | 574 | C042 |
| 5691000 | | TFZ TBCA | ; | | |
| 5692000 | | | | | |
| 5693000 | S | \ WAIT FOR BUS TO FINISH | \ | 575 | F574 |
| 5694000 | | GTO ($DMA-CHK) | ; | | |
| 5695000 | | | | | |
| 5696000 | S | \ ADDRESS STATUS BYTE LOWER | \ | 576 | 8C61 |
| 5697000 | | SSPAI LOC(STS2) | ; | | |
| 5698000 | | | | | |

| MODEL: MPDC-REV3D | | | | |
|---|---|---|---|---|
| REVISION: 000.00 | | RTL/6000 FILE EDIT | | |
| | | MICROPROGRAM SECTION | | |
| | | | ADDRESS | IMAGE |
| LINE # | | SEQUENCE: $SUPC5 | (HEX) | (HEX) |
| | | -continued | | |
| 5699000 | S | \ XFER BUS ERROR TO ACU \ | 577 | 667A |
| 5700000 | | ORR ASPM BBST SRIA ; | | |
| 5701000 | | | | |
| 5702000 | S | \ RESTORE \ | 578 | A200 |
| 5703000 | | MWT ; | | |
| 5704000 | | | | |
| 5705000 | S | \RESET BUS STATUS \ | 579 | 4084 |
| 5706000 | | RST ; | | |
| 5707000 | | | | |
| 5708000 | S | \MASK BUS YELLOW BIT \ | 57A | 800F |
| 5709000 | | ACN AACU CNST (07#) ; | | |
| 5710000 | | | | |
| 5711000 | S | \SKIP IF BUS RED, BUS NAK, OR BUS PARITY \ | 57B | C046 |
| 5712000 | | TFZ TEQZ ; | | |
| 5713000 | | | | |
| 5714000 | SKIP HOF | ; | | |

| MODEL: MPDC-REV3D | | | | |
|---|---|---|---|---|
| REVISION: 000.00 | | RTL/6000 FILE EDIT | | |
| | | MICROPROGRAM SECTION | | |
| | | | ADDRESS | IMAGE |
| LINE # | | SEQUENCE: $SUPC5 | (HEX) | (HEX) |
| 5715000 | S | \ RETURN TO- | 57C | C200 |
| 5716000 | | 1. TERM-NOR - TEST MODE WRITE | | |
| 5717000 | | 2. SCH-UPD - SCH/WRT W/O ERROR ON DATA | | |
| 5718000 | | FIELD | | |
| 5719000 | | 3. FMT-DAT - FORMAT WRITE (EOF ON ID) | | |
| 5720000 | | 4. START-WAIT - SERVICE BUS REQUESTS | | |
| 5721000 | | DURING DATA TRANSFERS | | |
| 5722000 | | 5. TERM-STS - DEVICE ERROR ON WRITE | | |
| 5723000 | | OPERATION | | |
| 5724000 | | 6. READ-EOF - EOF ON ALL READS | | |
| 5725000 | | 7. SCH-SET - SCH/READ W/O ERROR ON DATA | | |
| 5726000 | | FIELD WITHOUT END OF RANGE | | |
| 5727000 | | 8. FMT-READ - FORMAT READ ID AND DATA | | |
| 5728000 | | (EOF ON DATA FIELD) \ | | |
| 5729000 | | RTN ; | | |
| 5730000 | | | | |
| 5731000 | SKIP HOF | ; | | |

| MODEL: MPDC-REV3D | | | | |
|---|---|---|---|---|
| REVISION: 000.00 | | RTL/6000 FILE EDIT | | |
| | | MICROPROGRAM SECTION | | |
| | | | ADDRESS | IMAGE |
| LINE # | | SEQUENCE: $SUPC5 | (HEX) | (HEX) |
| 5732000 | STERM-STS | \ SKIP IF DEVICE READY \ | 57D | D890 |
| 5733000 | | TFO AAD2 TAX0 ; | | |
| 5734000 | | | | |
| 5735000 | S | GTO (STERM-ATT) ; | 57E | F596 |
| 5736000 | | | | |
| 5737000 | S | \ INPUT DEVICE ERROR STATUS \ | 57F | 7C3E |
| 5738000 | | XFA AAD3 ; | | |
| 5739000 | | | | |
| 5740000 | S | \ SET READY \ | 580 | 8210 |
| 5741000 | | OCN CNST(80#) ; | | |
| 5742000 | | | | |
| 5743000 | S | \ SAVE STS1 ERROR BITS AND READY \ | 581 | 82E7 |
| 5744000 | | ACN CNST(BB#) ; | | |
| 5745000 | | | | |
| 5746000 | S | \ ADDRESS STATUS UPPER \ | 582 | 8C60 |
| 5747000 | | SSPAI LOC(STS1) ; | | |
| 5748000 | | | | |
| 5749000 | S | \ SAVE PREVIOUS STORED STATUS \ | 583 | 643A |
| 5750000 | | ORR ASPM ; | | |
| 5751000 | | | | |
| 5752000 | S | \SET SPA FOR TASK \ | 584 | 8C0A |
| 5753000 | | SSPAI LOC (TSK1) ; | | |
| 5754000 | | | | |
| 5755000 | S | \SKIP IF FORMAT OPERATION \ | 585 | C45E |
| 5756000 | | TFZ TAX7 ASPM ; | | |
| 5757000 | | | | |
| 5758000 | S | GTO (STERM-STS1) ; | 586 | F589 |
| 5759000 | | | | |
| 5760000 | S | \SKIP IF RANGE NOT ZERO \ | 587 | C062 |
| 5761000 | | TFZ TRGZ ; | | |
| 5762000 | | | | |
| 5763000 | S | \CLEAR FORMAT ERROR BIT \ | 588 | B3EE |
| 5764000 | | ACN CNST(FE#) ; | | |
| 5765000 | | | | |
| 5766000 | STERM-STS1 | \SET SPA FOR STS1 \ | 589 | 8C60 |
| 5767000 | | SSPAI LOC (STS1) ; | | |
| 5768000 | | | | |
| 5769000 | S | \ RESTORE STS1 AND INCREMENT TO STS2 \ | 58A | A300 |
| 5770000 | | WIA ; | | |
| 5771000 | | | | |
| 5772000 | S | \ INPUT DEVICE STATUS \ | 58B | 7C3E |
| 5773000 | | XFA AAD3 ; | | |
| 5774000 | | | | |
| 5775000 | S | \ SAVE RWTFRR AND SECERR \ | 58C | 8304 |
| 5776000 | | ACN CNST(C0#) ; | | |
| 5777000 | | | | |
| 5778000 | S | \ SAVE PREVIOUS STORED BUS STATUS \ | 58D | 643A |
| 5779000 | | ORR ASPM ; | | |
| 5780000 | | | | |
| 5781000 | SKIP HOF | ; | | |

| MODEL: MPDC-REV3D | | | | |
|---|---|---|---|---|
| REVISION: 000.00 | | RTL/6000 FILE EDIT | | |
| | | MICROPROGRAM SECTION | | |
| | | | ADDRESS | IMAGE |
| LINE # | | SEQUENCE: $SUPC5 | (HEX) | (HEX) |
| 5782000 | | | | |
| 5783000 | STERM-CL1 | \ RESTORE STATUS BYTE \ | 58E | A200 |
| 5784000 | | MWT ; | | |
| 5785000 | | | | |
| 5786000 | STERM-CL2 | \CLEAR STATUS AND FIFO IN ADAPTER \ | 58F | 746B |
| 5787000 | | XFB AAD5 SRIA ; | | |
| 5788000 | | | | |
| 5789000 | S | \CLEAR ADAPTER HARDWARE REQUEST \ | 590 | 7C4F |
| 5790000 | | ZER AAD7 SRIA ; | | |
| 5791000 | | | | |
| 5792000 | STERM-CL3 | \CLEAR ADAPTER AND RESET MDC FIFO \ | 591 | 008B |

```
MODEL: MPDC-REV3D                        RTL/6000 FILE EDIT                          08/01/77    12.605  PAGE: 150
REVISION: 000.00                         MICROPROGRAM SECTION                                DOC.#:
                                                                        ADDRESS   IMAGE
LINE #                        SEQUENCE: $SUPCS                          (HEX)     (HEX)
                                         -continued
5793000              RDA                                        ;
5794000
5795000 $TERM-CL4    \CLEAR ACU                          \         592     600E
5796000              ZER                                       ;
5797000
5798000  $           \ RESET BUS CYCLES                  \         593     4020
5799000              CYC                                       ;
5800000
5801000  $           \ RESET TEST MODE                   \         594     0080
5802000              RSD                                       ;
5803000
5804000  $           GTO ($STARTINTPT)                   ;         595     F33F
5805000
5806000 $TERM-ATT    \ ADDRESS DEVICE STATUS             \         596     8CEA
5807000              SSPAI LOC(DEVST)                       ;
5808000
5809000  $           \ STORE NEW STATUS                  \         597     BA00
5810000              MWT AAD2                                  ;
5811000
5812000  $           \ SAVE READY BIT                    \         598     8604
5813000              ACN ASPM CNST(80#)                        ;
5814000
5815000  $           \ SET ATTENTION BIT                 \         599     8110
5816000              OCN CNST(40#)                             ;
5817000
5818000  $           \ ADDRESS STATUS UPPER              \         59A     8C60
5819000              SSPAI LOC(STS1)                           ;
5820000
5821000  $           GTO ($TERM-CL1)                     ;         59B     F58E
5822000
5823000 SKIP HOF                                                  ;

MODEL: MPDC-REV3D                        RTL/6000 FILE EDIT                          08/01/77    12.605  PAGE: 151
REVISION: 000.00                         MICROPROGRAM SECTION                                DOC.#:
                                                                        ADDRESS   IMAGE
LINE #                        SEQUENCE: $SUPCS                          (HEX)     (HEX)
5824000
5825000 $TERM-NOR    \ LOAD RETURN                       \         59C     E58F
5826000              LRA ($TERM-CL2)                           ;
5827000
5828000 $TERM-NOR1   \CLEAR ACU                          \         59D     600E
5829000              ZER                                       ;
5830000
5831000  $           \RESET BUS CYCLE BYTE               \         59E     4020
5832000              CYC                                       ;
5833000
5834000  $           \ READY BIT TO ACU                  \         59F     783E
5835000              XFA AAD2                                  ;
5836000
5837000  $           \ MASK READY BIT                    \         5A0     8204
5838000              ACN CNST(80#)                             ;
5839000
5840000  $           \ ADDRESS STATUS UPPER              \         5A1     8C60
5841000              SSPAI LOC(STS1)                           ;
5842000
5843000  $           \ RESTORE STS1                      \         5A2     A200
5844000              MWT                                       ;
5845000
5846000  $           GTO ($STORE-CTRS)                   ;         5A3     F53B
5847000
5848000 SKIP HOF                                                  ;

MODEL: MPDC-REV3D                        RTL/6000 FILE EDIT                          08/01/77    12.605  PAGE: 152
REVISION: 000.00                         MICROPROGRAM SECTION                                DOC.#:
                                                                        ADDRESS   IMAGE
LINE #                        SEQUENCE: $SUPCS                          (HEX)     (HEX)
5849000 $SEEK-ERR    \ SET SEEK ERROR BIT 2              \         5A4     8080
5850000              LCN CNST(20#)                             ;
5851000
5852000  $           \ ADDRESS STATUS LOWER              \         5A5     8C61
5853000              SSPAI LOC(STS2)                           ;
5854000
5855000  $           \ SAVE PREVIOUS BUS ERRORS          \         5A6     643A
5856000              ORR ASPM                                  ;
5857000
5858000  $           \ RESTORE STS2 AND ADDRESS STS1     \         5A7     A208
5859000              WDA                                       ;
5860000
5861000  $           \ READY BIT TO ACU                  \         5A8     783E
5862000              XFA AAD2                                  ;
5863000
5864000  $           \ MASK READY BIT                    \         5A9     8204
5865000              ACN CNST(80#)                             ;
5866000
5867000  $           GTO ($TERM-CL1)                     ;         5AA     F58E
5868000
5869000 $SEEK-ILL    \ SET READY AND ILLEGAL SEEK        \         5AB     8208
5870000              LCN CNST(84#)                             ;
5871000
5872000  $           \ ADDRESS STATUS UPPER              \         5AC     8C60
5873000              SSPAI LOC(STS1)                           ;
5874000
5875000  $           \ STORE STATUS                      \         5AD     A200
5876000              MWT                                       ;
5877000
5878000  $           GTO ($STARTINTPT)                   ;         5AE     F33F
5879000
5880000 SKIP HOF                                                  ;
```

```
MODEL: MPDC-REV3D                           RTL/6000 FILE EDIT                    08/01/77    12.605  PAGE: 153
REVISION: 000.00                            MICROPROGRAM SECTION                  DOC.#:
                                                                        ADDRESS  IMAGE
LINE #                                   SEQUENCE: $SUPCS                (HEX)   (HEX)
5881000  $UNUSED       CSNF      \CONTROL STORE NO OP FILLER       \!
5882000
5883000  $             (5FA#)\HALT- IF RETURN FAILS                \        5FA    0040
5884000                HLT                                         !
5885000
5886000  $BLT-LRA002   (5FB#)\DECREMENT ACU                        \        5FB    607C
5887000                DEC AACU SRIA                               !
5888000
5889000  $BLT-LRA003   (5FC#)\DECREMENT ACU                        \        5FC    607C
5890000                DEC AACU SRIA                               !
5891000
5892000  $BLT-LRA004   (5FD#)\DECREMENT ACU                        \        5FD    607C
5893000                DEC AACU SRIA                               !
5894000
5895000  $             (5FE#)\                                     \        5FE    F058
5896000                GTO ($BLT-LRA001)                           !
5897000
5898000  $UPCS-LRC     (5FF#)\LRC WORD FOR PROM SCAN               \        5FF    3708
5899000                LONGPAR (0,5FE#,EVEN)                       !
5900000
5901000
5902000  SKIP HOF                                                  !

MODEL: MPDC-REV3D                           RTL/6000 FILE EDIT                    08/01/77    12.605  PAGE: 154
REVISION: 000.00                            MICROPROGRAM SECTION                  DOC.#:
                                                                        ADDRESS  IMAGE
LINE #                                   SEQUENCE: $SUPCS                (HEX)   (HEX)
5903000
5904000  \ THAT'S IT . THERE IS NO MORE .                         \!
                                         THERE ARE NO SEVERE MESSAGES IN THE ABOVE FILE.
                                         THERE ARE NO WARNING MESSAGES IN THE ABOVE FILE.
```

In accordance with the invention, a logic data transfer control system is provided for predicting the availability of storage locations in a peripheral controller before data is requested from main memory. Thus, in a data processing environment wherein plural system units are electrically coupled to a common communication bus for asynchronous transfer of information therebetween, a data transfer rate from main memory to a peripheral controller may be accommodated without loss of data.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A logic data transfer control system for a peripheral controller having hardware control means and firmware control means, said peripheral controller servicing a peripheral storage device in a data processing system having a main memory unit, and plural system units including said peripheral controller electrically coupled to a common communication bus for asynchronous transfer of information therebetween, which comprises:

a. plural data FIFOs receiving binary information from said main memory unit in response to data requests issued by said hardware control means to said common bus;

b. a predictor FIFO responsive to load control signals initiated at the inception of said data requests for anticipating the capacity of said plural data FIFOs to receive said binary information;

c. first logic control means responsive to said firmware and said hardware control means and to input control signals from said predictor FIFO for issuing bus cycle requests to said hardware control means and supplying said load control signals to said predictor FIFO; and d. second logic control means responsive to output register control signals of said predictor FIFO for unloading said plural data FIFOs and said predictor FIFO for transfer of data to said peripheral storage device.

2. The combination set forth in claim 1, wherein said first logic control means includes:

a. a first AND gate responsive to said hardware control means;

b. a second AND gate responsive to said predictor FIFO and to said hardware and said firmware control means;

c. a flip-flop in electrical communication with said first AND gate and responsive to said second AND gate for issuing bus cycle requests to said hardware control means; and d. a third AND gate in electrical communication with said second AND gate and responsive to said hardware and said firmware control means for supplying said load control signals to said predictor FIFO.

3. The combination set forth in claim 1, wherein said plural data FIFOs include left byte FIFOs and right byte FIFOs for storing two byte data words, and said second logic control means includes:

a. a first AND gate responsive to said firmware and said hardware control means;

b. a first flip-flop in electrical communication with said first AND gate for supplying a first output data transfer control signal to said left byte FIFOs;

c. a second AND gate in electrical communication with said first AND gate and responsive to said firmware and said hardware control means;

d. a second flip-flop in electrical communication with said first flip-flop and said first AND gate for supplying a second output data transfer control signal to said right byte FIFOs and to said predictor FIFO; and e. a third flip-flop responsive to said second AND gate and in electrical communication with said first and said second flip-flops for alternately selecting either said left byte FIFOs, or said right byte and predictor FIFOs for output data transfers.

4. A method of controlling the transfer of data words from a main memory of a data processing system through a peripheral controller having plural data FIFOs operating in parallel in a data path, and further having a predictor FIFO, said controller communicating asynchronously with said main memory on a common communication bus, which comprises:
   a. generating a data request from said controller to said main memory;
   b. loading said predictor FIFO with a control flag byte upon issuing said data request to provide an indication of the capacity of said plural data FIFOs to receive a second data word before a first data word is loaded into said plural data FIFOs;
   c. sensing an input control signal of said predictor FIFO immediately upon loading a data word from said main memory into said plural data FIFOs;
   d. repeating steps (a) through (c) if said input control signal indicates said plural data FIFOs shall have the capacity to receive additional data; and
   e. unloading said plural data FIFOs and said predictor FIFO if said input control signal indicates said plural data FIFOs shall not have the capacity to receive additional data.

* * * * *